US012697533B2

(12) United States Patent
Reimers et al.

(10) Patent No.: US 12,697,533 B2
(45) Date of Patent: Aug. 4, 2026

(54) RIDEABLE GOLF BAG CART

(71) Applicant: Eric W. Reimers, Missoula, MT (US)

(72) Inventors: Eric W. Reimers, Missoula, MT (US);
Dale H. Truett, Missoula, MT (US)

( * ) Notice: Subject to any disclaimer, the term of this
patent is extended or adjusted under 35
U.S.C. 154(b) by 484 days.

(21) Appl. No.: 18/378,643

(22) Filed: Oct. 10, 2023

(65) Prior Publication Data

US 2024/0042294 A1 Feb. 8, 2024

Related U.S. Application Data

(63) Continuation-in-part of application No. 17/838,341,
filed on Jun. 13, 2022, now Pat. No. 11,931,633,
which is a continuation of application No.
16/423,080, filed on May 27, 2019, now Pat. No.
11,358,042.

(60) Provisional application No. 62/677,315, filed on May
29, 2018, provisional application No. 62/677,332,
filed on May 29, 2018.

(51) Int. Cl.
| | |
|---|---|
| *A63B 55/60* | (2015.01) |
| *B60R 3/00* | (2006.01) |
| *B60R 9/08* | (2006.01) |
| *B60R 25/04* | (2013.01) |
| *B60R 25/20* | (2013.01) |
| *B62H 5/08* | (2006.01) |
| *B62J 11/00* | (2020.01) |
| *B62J 17/08* | (2020.01) |
| *B62J 99/00* | (2020.01) |
| *B62K 11/02* | (2006.01) |
| *B62K 11/14* | (2006.01) |
| *B62K 19/46* | (2006.01) |
| *B62J 50/20* | (2020.01) |

(52) U.S. Cl.
CPC .............. *A63B 55/61* (2015.10); *B60R 3/002*
(2013.01); *B60R 9/08* (2013.01); *B60R 25/04*
(2013.01); *B60R 25/20* (2013.01); *B62H 5/08*
(2013.01); *B62J 11/00* (2013.01); *B62J 17/08*
(2013.01); *B62J 99/00* (2013.01); *B62K 11/02*
(2013.01); *B62K 11/14* (2013.01); *B62K 19/46*
(2013.01); *A63B 2055/601* (2015.10); *A63B*
*2055/602* (2015.10); *A63B 2210/50* (2013.01);
*B62J 50/20* (2020.02); *B62K 2204/00*
(2013.01)

(58) Field of Classification Search
CPC ................ A63B 55/61; A63B 2210/50; A63B
2055/601; B60R 9/08
See application file for complete search history.

(56) References Cited

U.S. PATENT DOCUMENTS

| | | |
|---|---|---|
| 2,908,510 A | 10/1959 | Lossau |
| 3,247,923 A | 4/1966 | Cornell |
| 3,605,929 A | 9/1971 | Rolland |
| 3,648,795 A | 3/1972 | Moulton |
| 3,777,836 A | 12/1973 | Riza |
| 3,979,136 A | 9/1976 | Lassiere |
| 4,874,055 A | 10/1989 | Beer |
| 5,265,695 A | 11/1993 | Piazzi |

(Continued)

*Primary Examiner* — Alentin Neacsu
*Assistant Examiner* — Michael R Stabley
(74) *Attorney, Agent, or Firm* — Dawsey Co., LPA;
David J. Dawsey

(57) ABSTRACT

A rideable golf cart adapted to transport a rider and a golf
bag for use on a golf course. The cart includes a frame and
a seat, a front wheel and steering components, a rear wheel,
an inclined bag support structure, and a motor/control sub-
assembly.

20 Claims, 130 Drawing Sheets

(56)                    References Cited

U.S. PATENT DOCUMENTS

| | | | |
|---|---|---|---|
| 5,277,267 A | 1/1994 | Tiffany | |
| 5,328,193 A | 7/1994 | Shiew | |
| 5,697,467 A | 12/1997 | Gojack | |
| 5,899,284 A | 5/1999 | Reimers | |
| 6,139,032 A | 10/2000 | Hartman | |
| 6,168,174 B1 * | 1/2001 | MacDougall | ............ B62B 3/12 |
| | | | 280/DIG. 6 |
| 6,659,208 B2 | 12/2003 | Gaffney | |
| 7,086,491 B2 | 8/2006 | Matte | |
| 7,537,076 B2 | 5/2009 | Falkiner | |
| 7,631,715 B2 | 12/2009 | Falkiner | |
| 7,690,390 B2 | 4/2010 | Hopkins | |
| 8,091,749 B2 | 1/2012 | Stautzenberger | |
| 8,308,178 B2 | 11/2012 | Hoerdum | |
| 8,365,850 B2 | 2/2013 | Gal | |
| 8,490,732 B2 | 7/2013 | Sugimoto | |
| D745,843 S | 12/2015 | Wuttig | |
| 9,199,147 B2 | 12/2015 | Azizi | |
| 9,339,431 B2 | 5/2016 | Menard | |
| 9,550,540 B1 | 1/2017 | Wang | |
| 10,016,666 B2 | 7/2018 | Reimers | |
| 10,179,624 B1 | 1/2019 | ODonnell | |
| 10,189,529 B1 | 1/2019 | Wang | |
| 11,260,935 B2 | 3/2022 | Reimers | |
| 11,358,042 B2 | 6/2022 | Reimers | |
| 2008/0023236 A1 | 1/2008 | Falkiner | |
| 2010/0206652 A1 | 8/2010 | Kielland | |
| 2016/0052464 A1 | 2/2016 | Wadey | |
| 2017/0254137 A1 | 9/2017 | Peck | |
| 2017/0327084 A1 | 11/2017 | Park | |
| 2018/0022411 A1 | 1/2018 | Kistemaker | |
| 2018/0056152 A1 | 3/2018 | Reimers | |

* cited by examiner

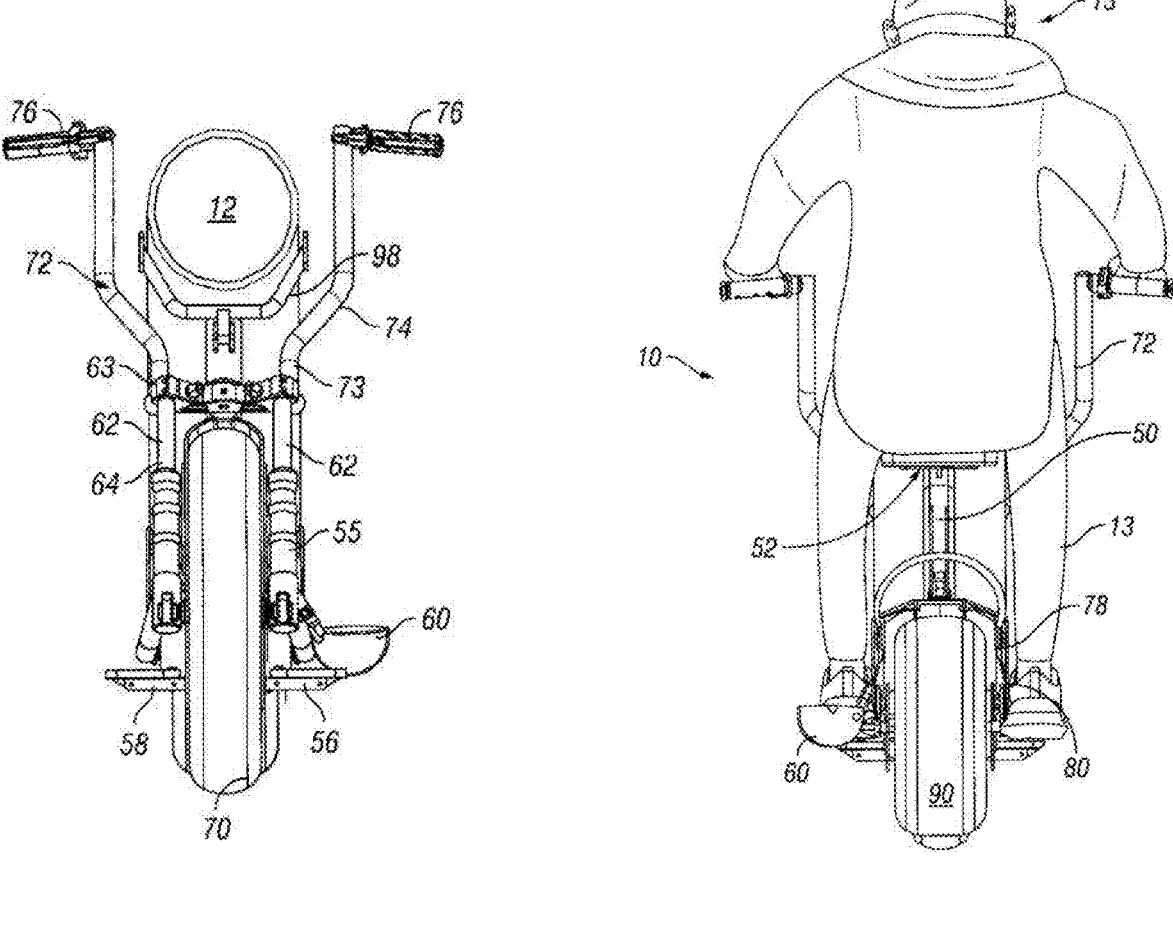
*Fig. 5*             *Fig. 6*

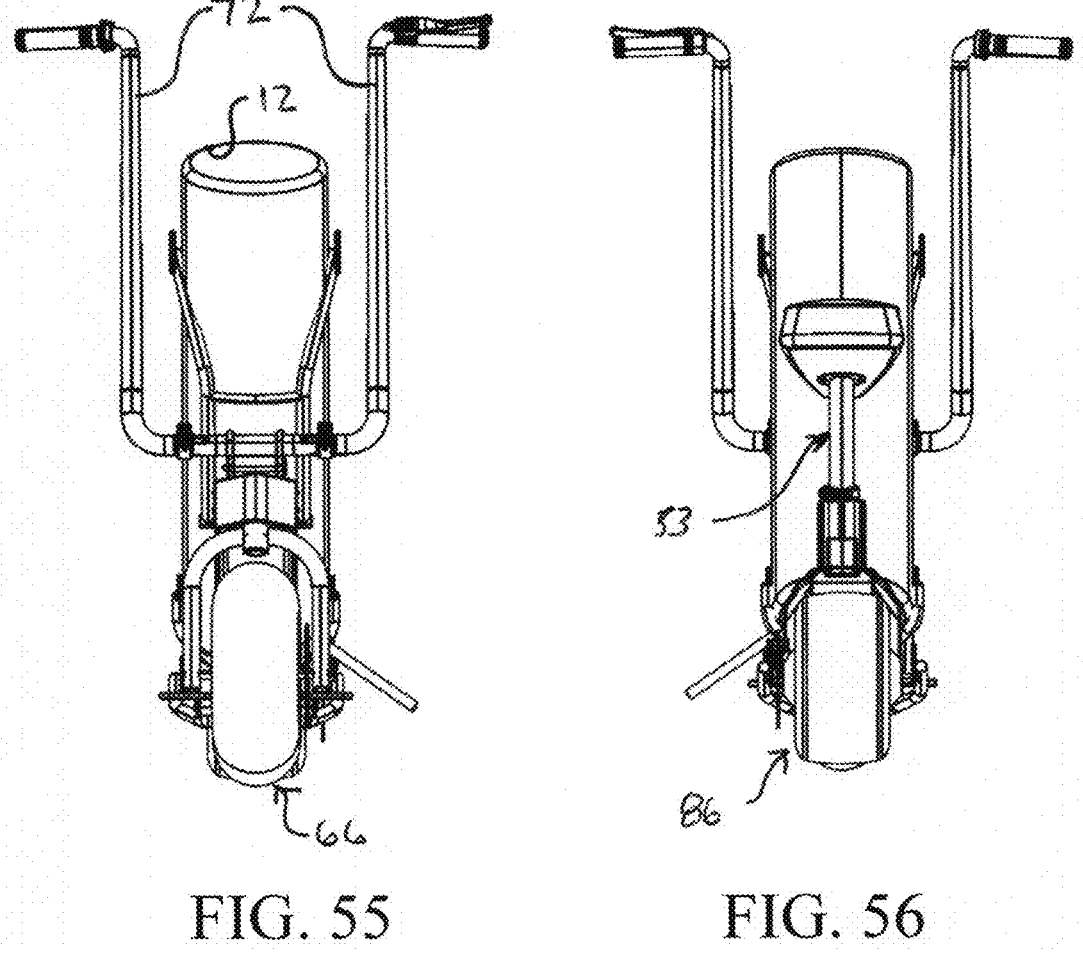
FIG. 55                    FIG. 56

RIDEABLE GOLF BAG CART

CROSS-REFERENCE TO RELATED APPLICATIONS

This application is a continuation-in-part application of U.S. patent application Ser. No. 17/838,341, filed on Jun. 13, 2022, which is a continuation of U.S. patent application Ser. No. 16/423,080, now U.S. Pat. No. 11,358,042, filed on May 27, 2019, which is a non-provisional application, claiming priority from US provisional applications No. 62/677,315 and 62/677,332 by the same inventors, filed May 29, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

TECHNICAL FIELD

The present invention relates generally to accessories for golfers and particularly to personal powered golf bag carts and methods for transporting golf bags and the golfer.

BACKGROUND OF THE INVENTION

Although the purists in the golf community insist that the only way to properly play golf is to carry the golf bag, either personally or through the use of a caddy, many golfers prefer to use carts to transport the golf bags and associated equipment. While riding carts are required by many courses, a great number of players desire to gain at least some of the exercise benefits of more compact and efficient means of transporting themselves and their equipment during the round while avoiding the often higher costs of renting a multiplayer cart from the course. For this reason walking carts are popular, but a rideable personal cart would be even better for those who wish or need to limit their exertions.

For many years pull carts, usually two-wheeled, were the norm. However, powered options, such as electric bag carts are fairly popular and gyroscopic two wheeled units with room for a rider and bag have been introduced.

Nonetheless, demand continues for more compact, more stable, more convenient and lighter golf bag carts, particularly personal rideable powered carts.

SUMMARY OF INVENTION

Accordingly, it is an object of the present invention to provide a powered rideable golf bag cart for transporting a golf bag and rider in a highly stable manner.

Another object of the invention is to provide a rideable personal golf cart which does not cause meaningful damage to fairways and other "through the green" areas of golf courses.

A further object of the present invention is to provide a rideable cart system with convenient support of the golf bag between the legs of the rider.

Yet another object of the invention is to provide a rideable powered cart which has a minimal footprint.

Another object of the invention is to rideable powered golf cart which is steerable by the rider and has sufficient power to negotiate most golf course terrain.

Still another object of one alternate embodiment of the invention is to provide shade and some rain protection to the rider.

A further object of one embodiment of the present invention is to provide a single passenger riding golf bag cart which is adapted to partially collapse to a storage mode for transport or storage.

Briefly, one preferred embodiment of the present invention is a personal rideable golf cart/cycle having the general shape of a two wheeled cycle. The cart/cycle is generally symmetrical about a longitudinal plane and includes a plurality of compatible subassemblies, each providing important functions to the whole. The subassemblies (each also designated as an "sba") include: a cycle frame subassembly; a personal support subassembly; a front wheel/steering subassembly; a rear wheel subassembly; a bag support subassembly; and a motive/control subassembly. The user rides, steers, and controls the speed from a seat above approximately the front of the rear wheel. The golf bag and its contents golf bag are supported at an angle between the golfer's legs, which extend downward to running boards (foot support plates) on either side of the frame. An electrical motor is powered by a battery mounted on the frame and is controlled by control elements mounted on the steering unit. Portions of the personal, bag support, and steering subassemblies are collapsible for convenient transport and storage.

Another equally preferred embodiment includes, in addition to the above features, a removable overhead canopy extending from the steering/handle to above the rider's head and a console for carrying various accessories situated above the upper bag cradle and the golf bag.

An advantage of the present invention is that it provides a simple, relatively lightweight, and comfortable single user powered riding golf cart.

Another advantage of the invention is that it is bilaterally symmetrical and relatively thin such that multiple units may be parked in a smaller space than conventional riding carts.

Yet another advantage of the present invention is that the cycle structure provides a familiar and comfortable means of transport for the golfer and equipment around the golf course.

Still another advantage of the present invention is that it may be considered by many courses to be usable on the course, rather than restricted to cart paths, thus drastically aiding the comfort of the golfer and reducing the time taken to play a round of golf.

Another advantage of the present invention is that the partially collapsible aspects make it convenient for storage at a golf course and home and also for transport between locations.

A still further advantage of the present rideable golf bag cart/cycle invention is that no straps or similar restraints are necessary to keep the golf bag in place and provide easy access to the clubs during use.

Yet another advantage of the present invention is that the open frame of the bag support subassembly permits easy access to the pockets of the golf bag, so that the golfer may store and retrieve golf balls and accessories.

Another advantage of the present invention is that it provides the "feel" of a walking round, without the wear and tear on the golfer's body.

An additional advantage of the present invention is that the golf bag is maintained along the centerline (longitudinal plane) so as to avoid disruption of the balance during use and steering.

Another advantage of the present advantage of the present invention is that the incline of the golf bag (between twenty and forty-five degrees) maintains the clubs in a stable and easily accessible orientation.

A further advantage of the invention is that it is economical to use as a rental unit by the golf course.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 5 a front elevational view of the presently preferred embodiment of the invention;

FIG. 6. is a rear elevational view of the riding golf bag cart/cycle of the present invention, showing a rider in phantom;

FIG. 55 is a front elevational view of an alternate embodiment of the invention, shown with a golf bag;

FIG. 56 is a rear elevational view of an alternate embodiment of the invention, shown with a golf bag;

FIG. 97 is a top view of an alternate embodiment of the invention, shown with a golf bag;

FIG. 98 is a bottom view of an alternate embodiment of the invention, shown with a golf bag;

FIG. 109 is a front elevational view of an alternate embodiment of the invention, shown with a golf bag;

FIG. 110 is a rear elevational view of an alternate embodiment of the invention, shown with a golf bag;

FIG. 111 is a right elevation view of an alternate embodiment of the invention, shown with a golf bag;

FIG. 112 is a left elevation view of an alternate embodiment of the invention, shown with a golf bag;

FIG. 113 is a top view of an alternate embodiment of the invention, shown with a golf bag;

FIG. 114 is a bottom view of an alternate embodiment of the invention, shown with a golf bag;

FIG. 115 is a left elevation view of an alternate embodiment of the invention, shown in a folded state;

FIG. 116 is a front left perspective view of the invention alternate embodiment, showing a golf bag;

FIG. 117 is a front elevational view of an alternate embodiment of the invention, shown with a golf bag;

FIG. 118 is a rear elevational view of an alternate embodiment of the invention, shown with a golf bag;

FIG. 119 is a right elevation view of an alternate embodiment of the invention, shown with a golf bag;

FIG. 120 is a left elevation view of an alternate embodiment of the invention, shown with a golf bag;

Figures 121, 122:
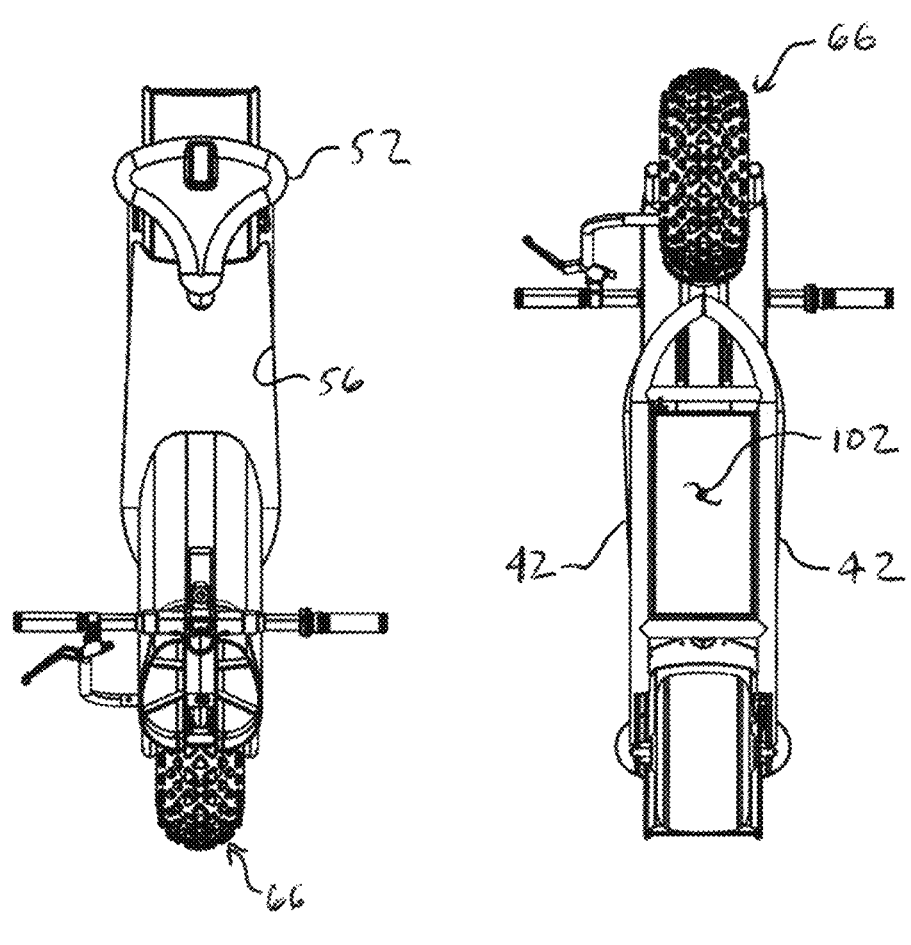
Figure 123:
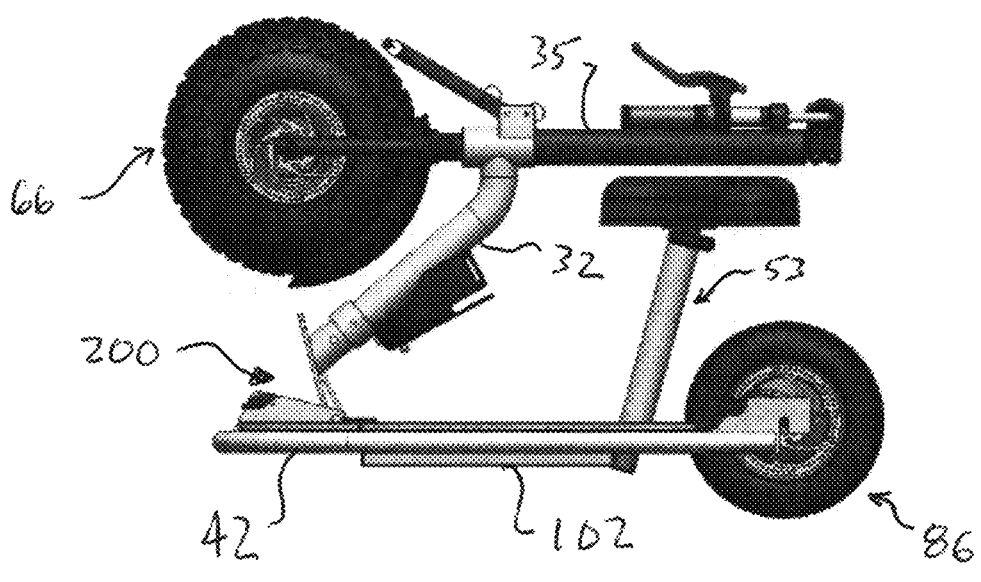
Figure 124:
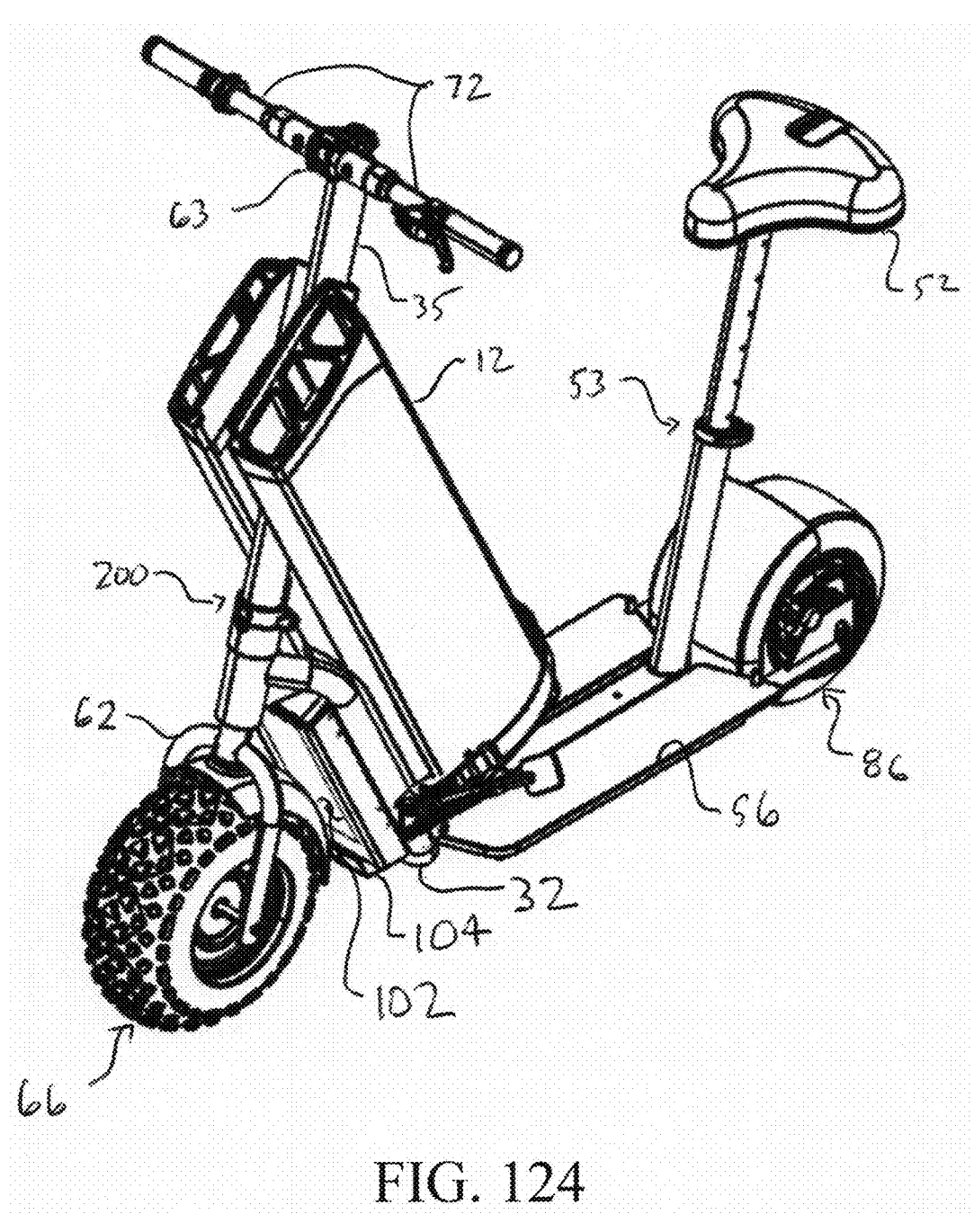
Figures 125, 126:
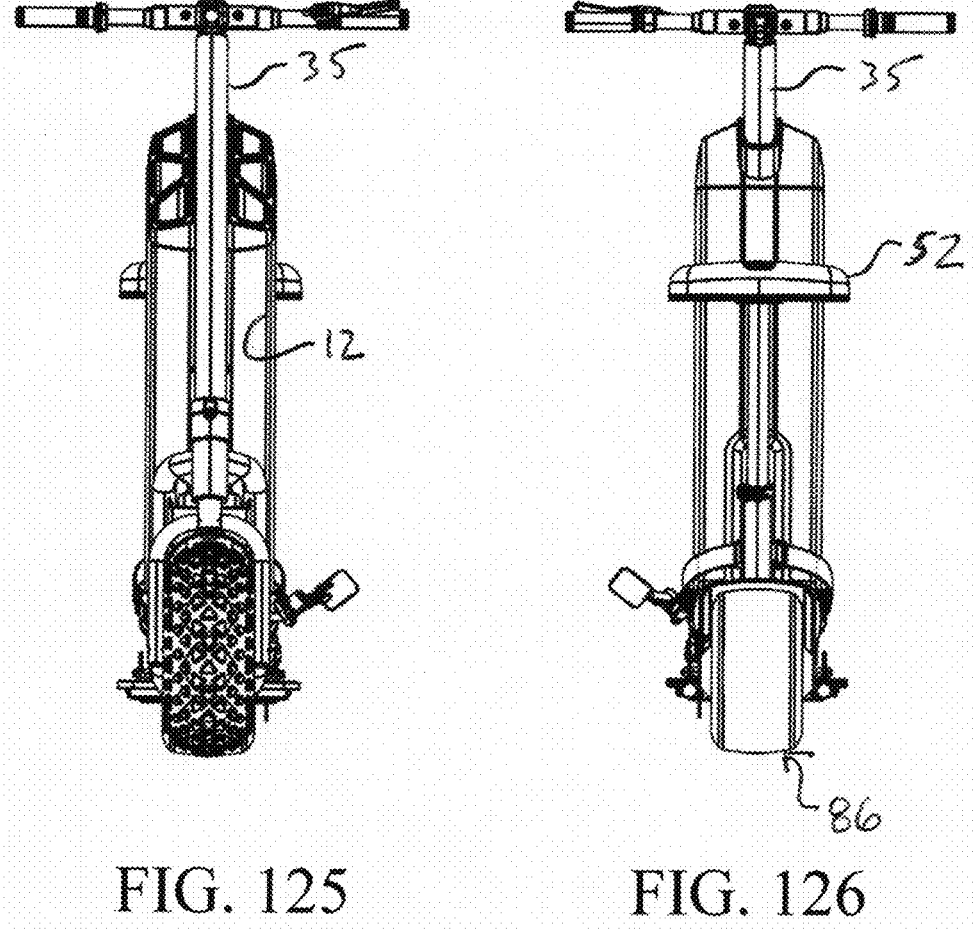
Figure 127:
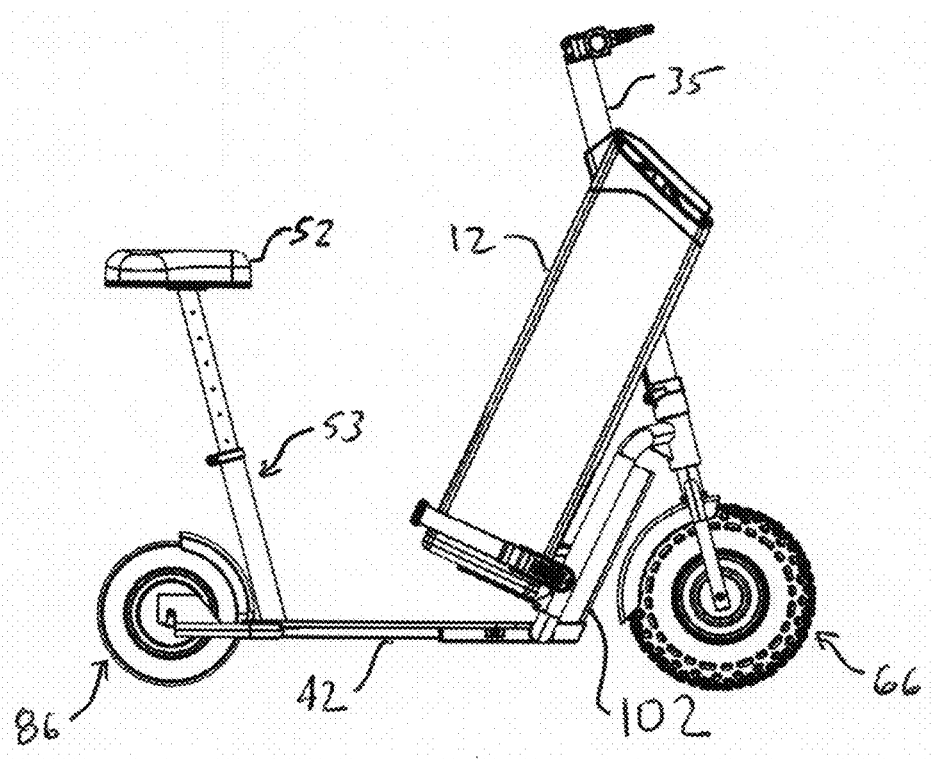
Figure 128:
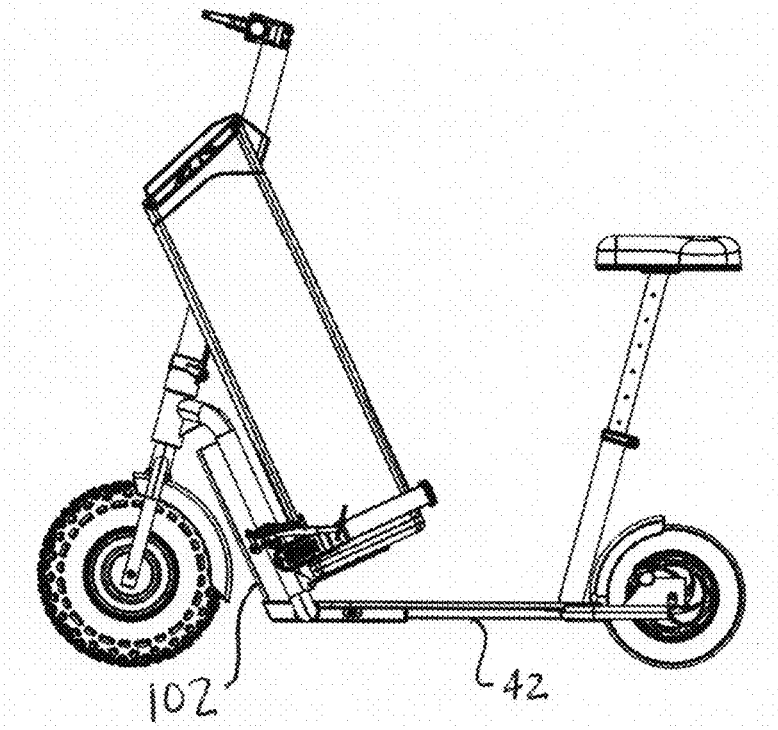
Figures 129, 130:
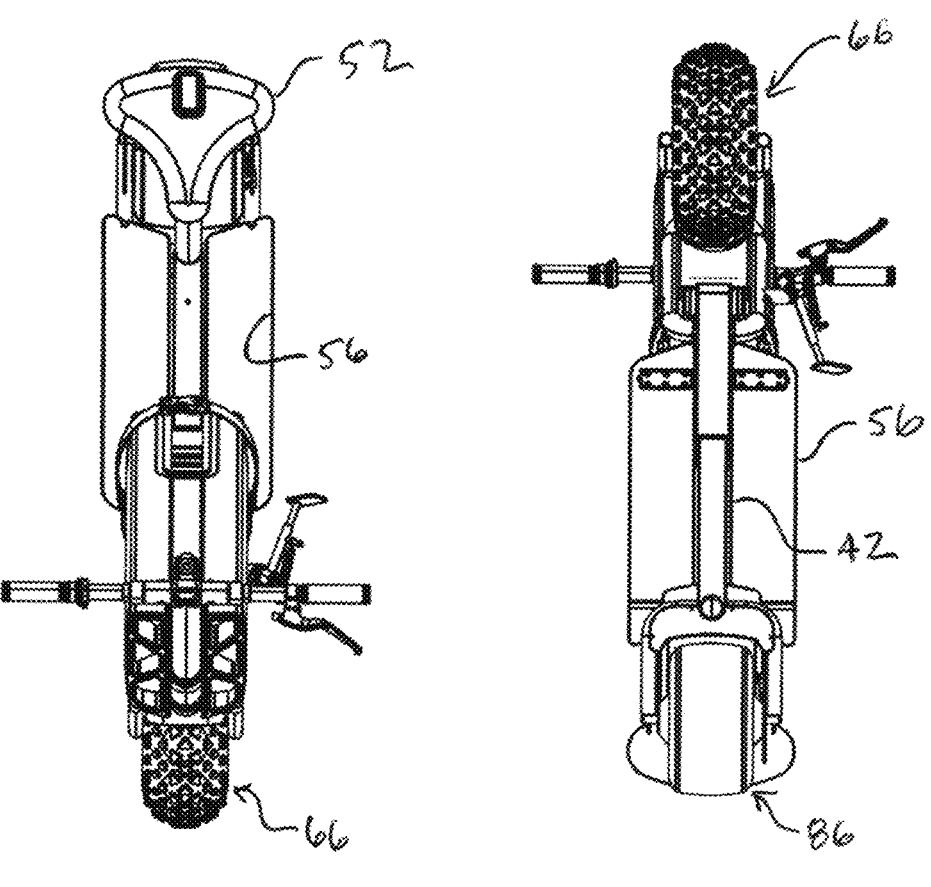
Figure 131:
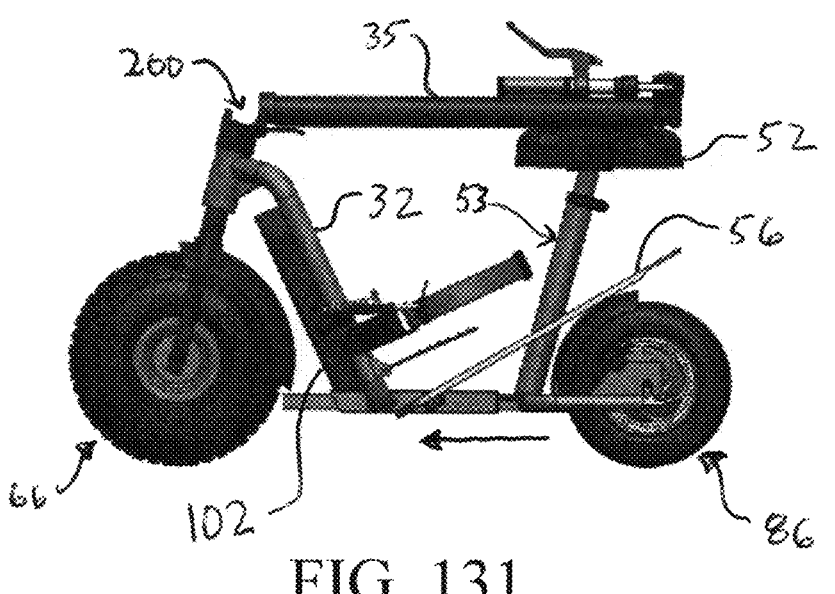
Figure 132:
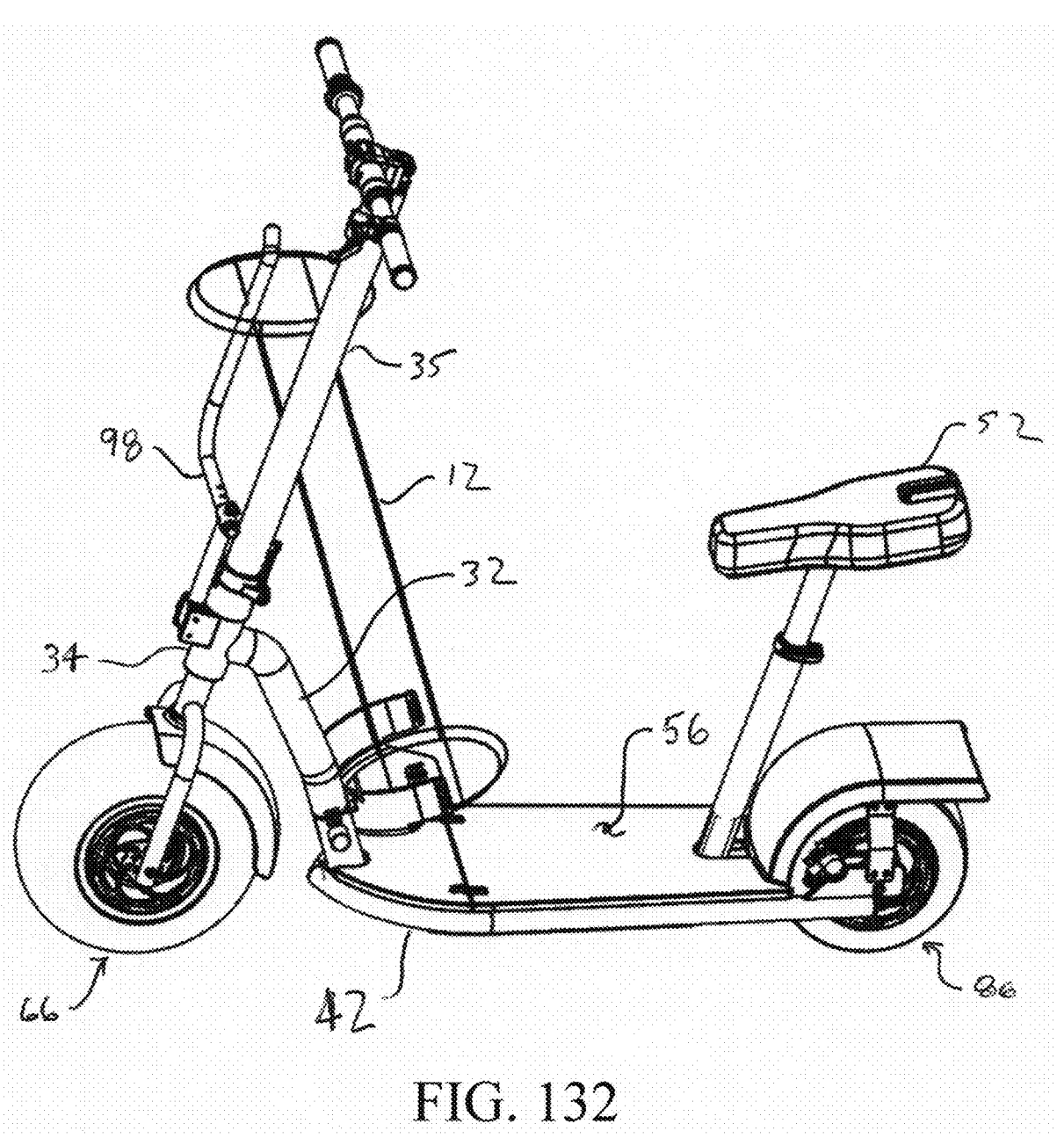
Figures 133, 134:
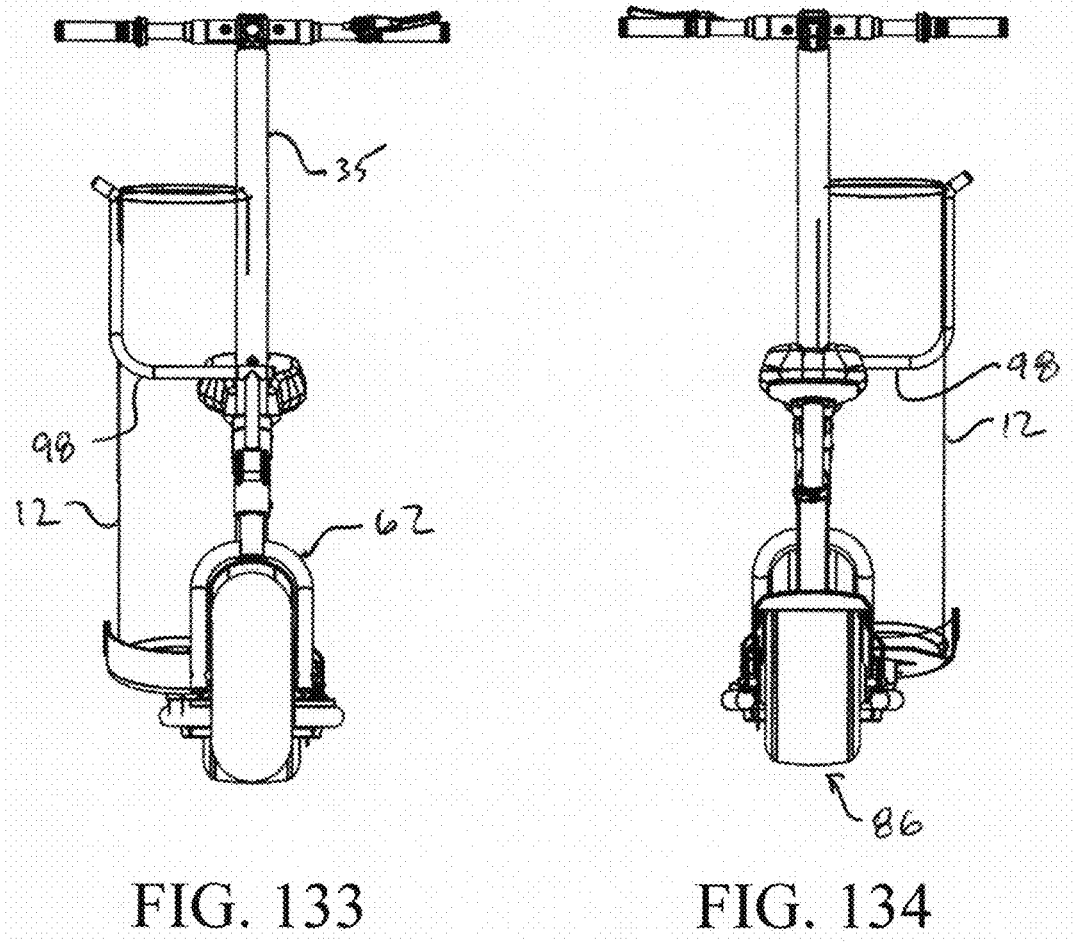
Figures 135, 136:
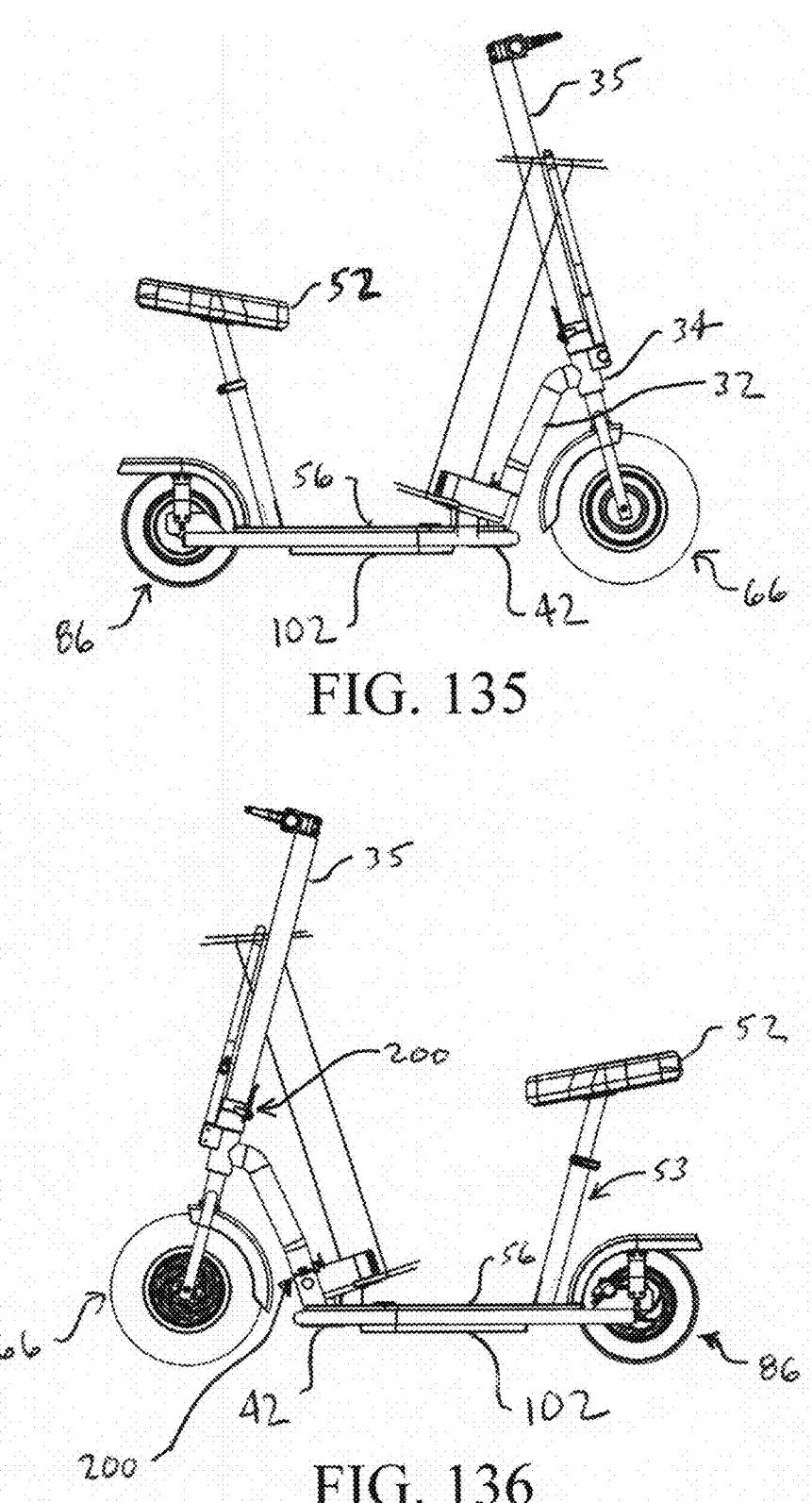
Figures 137, 138:
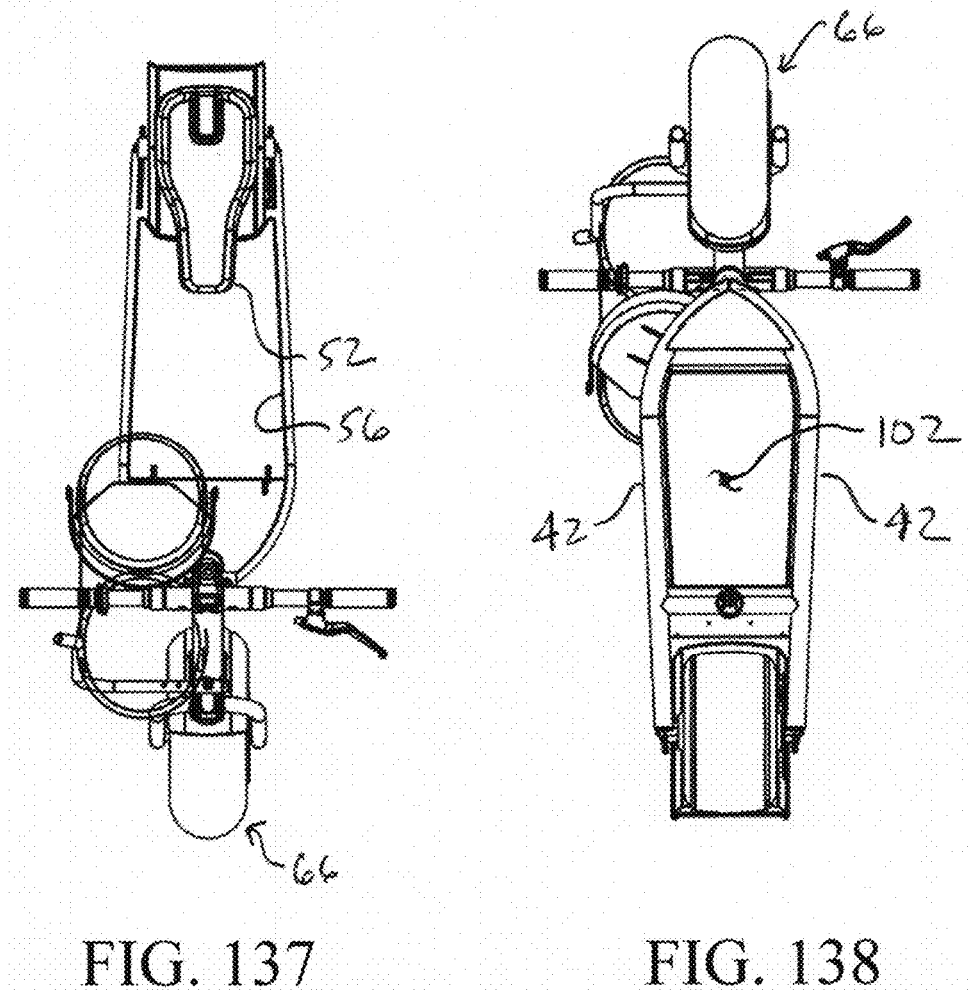
Figure 139:
Figure 140:
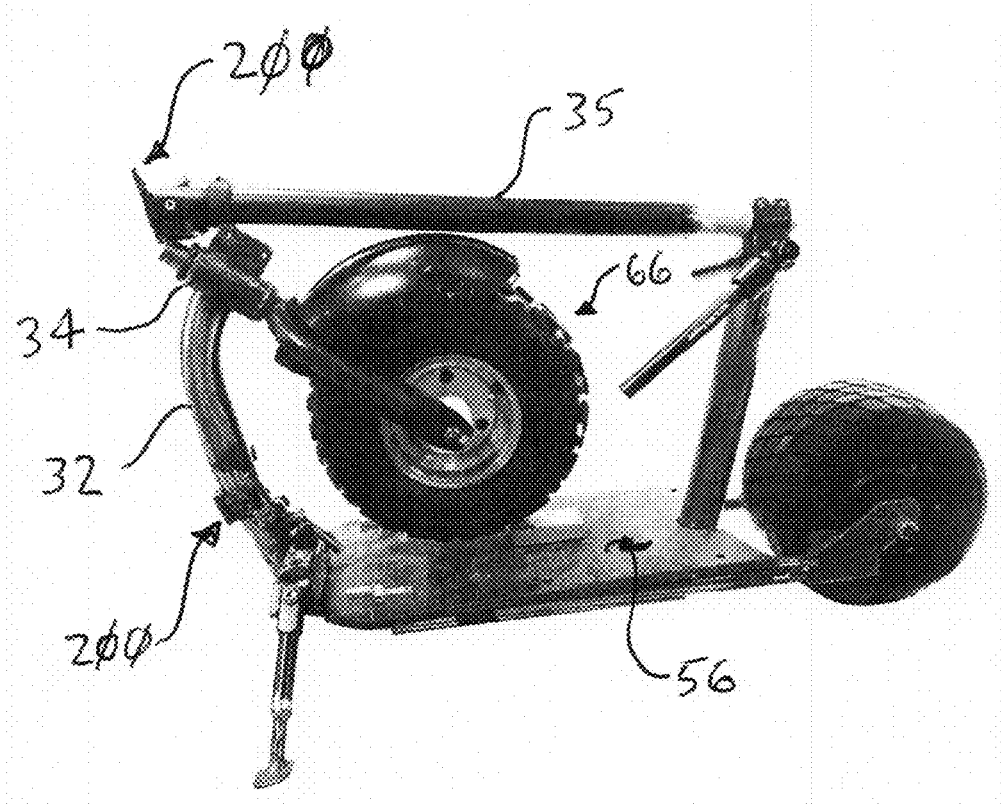
Figure 141:
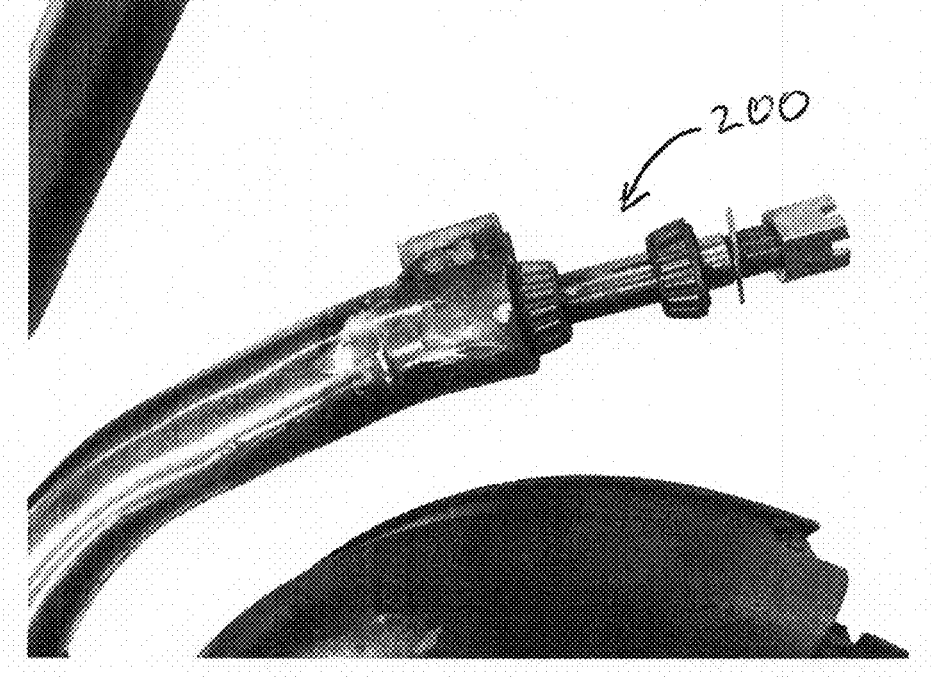
Figure 142:
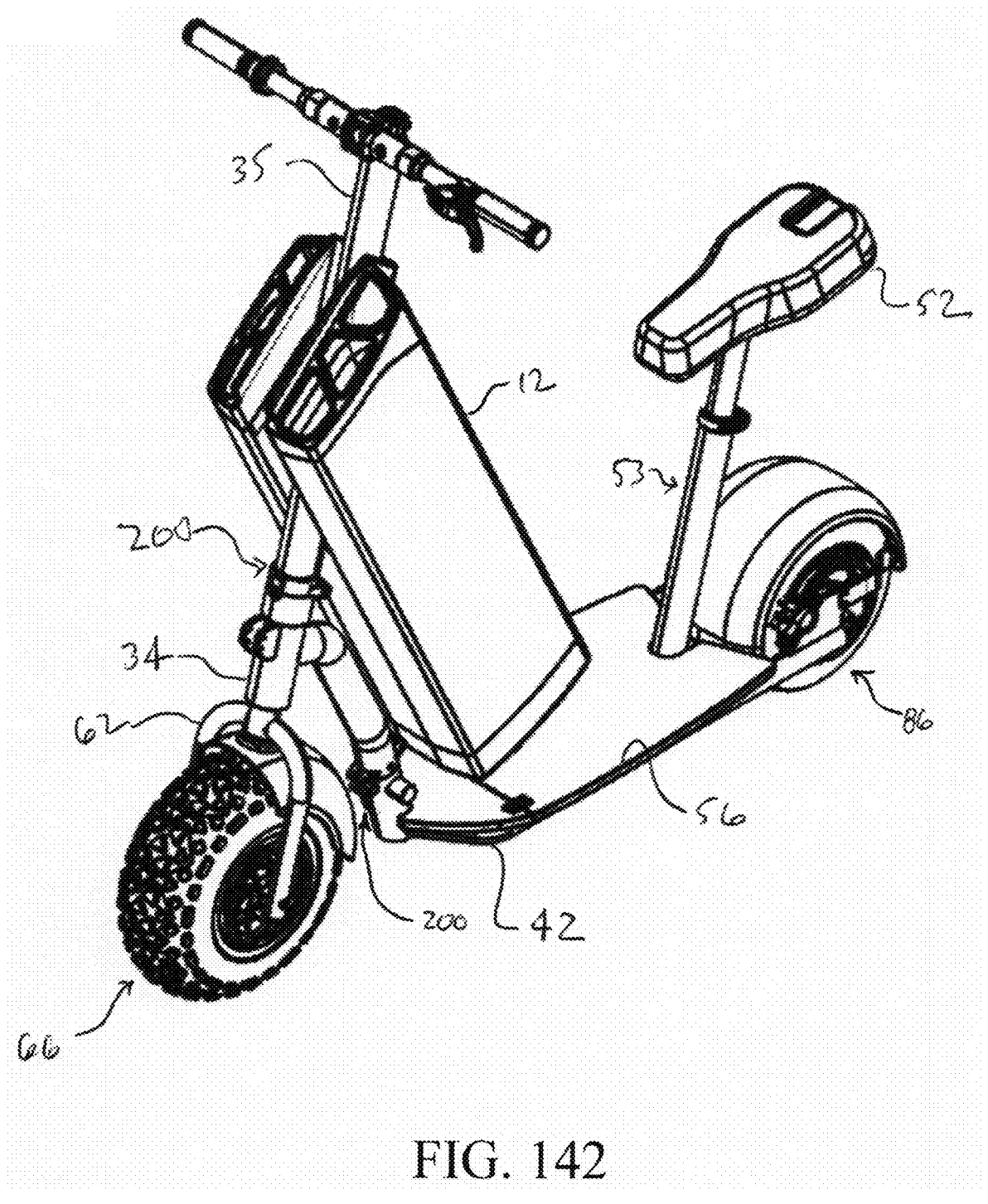
Figures 143, 144:
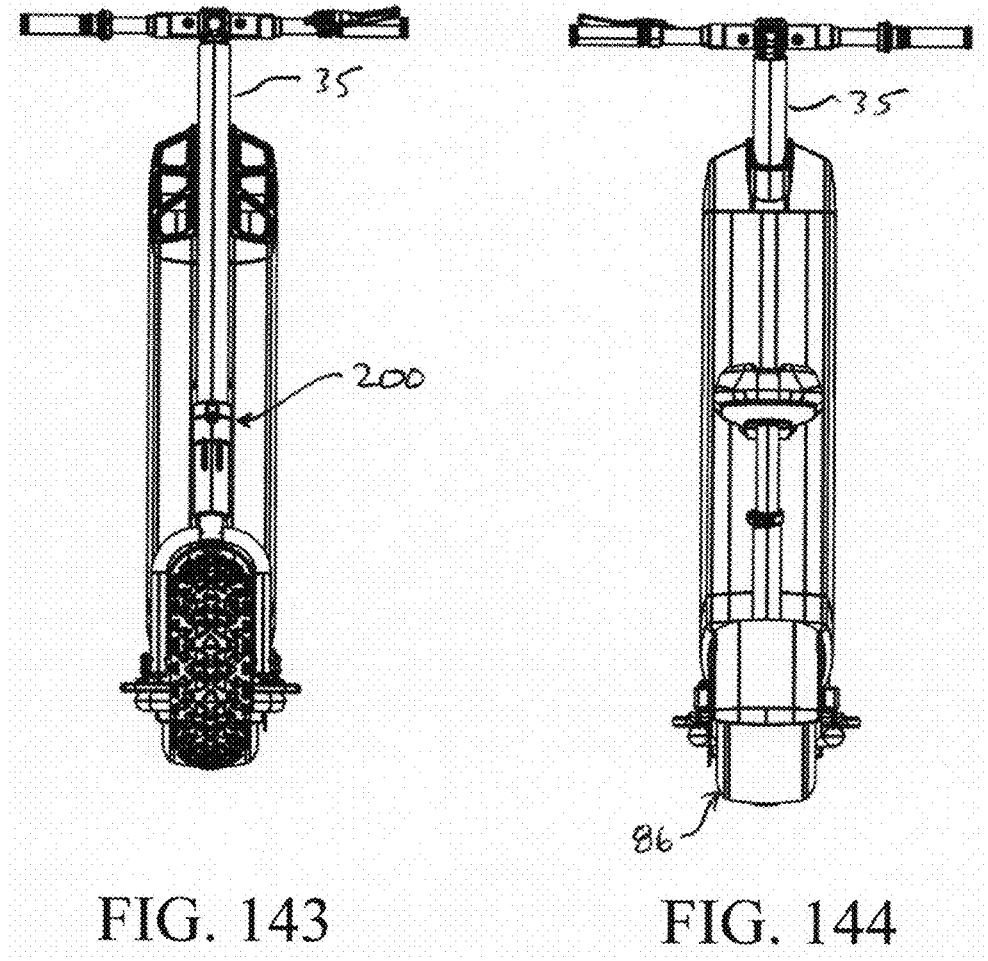
Figure 145:
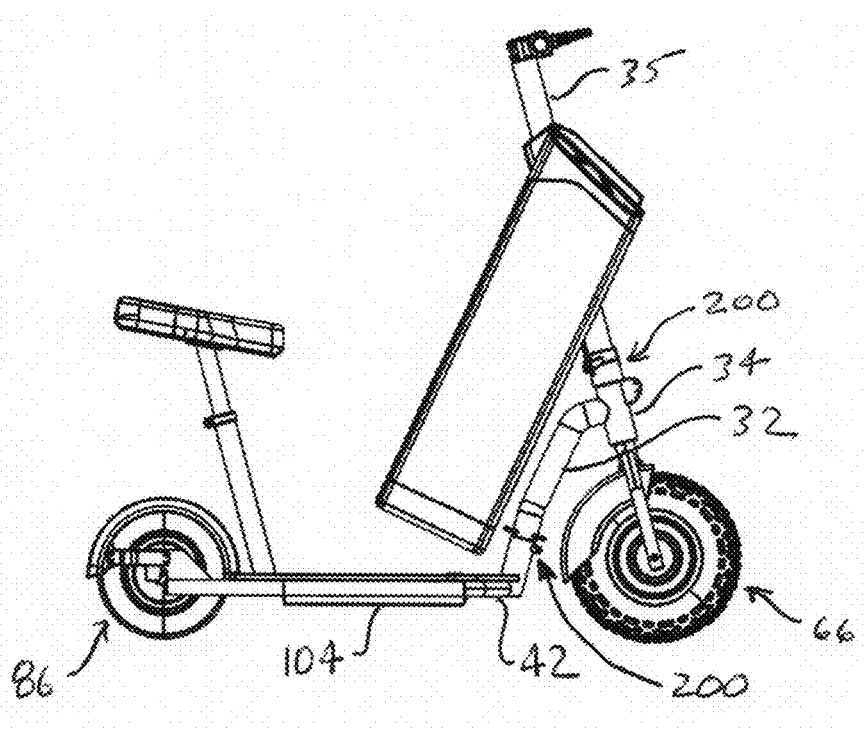
Figure 146:
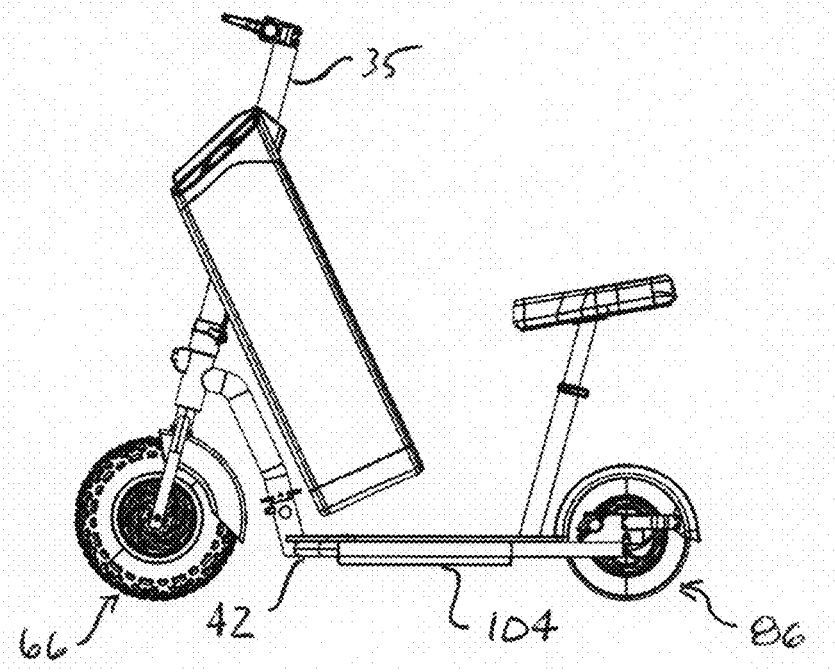
Figures 147, 148:
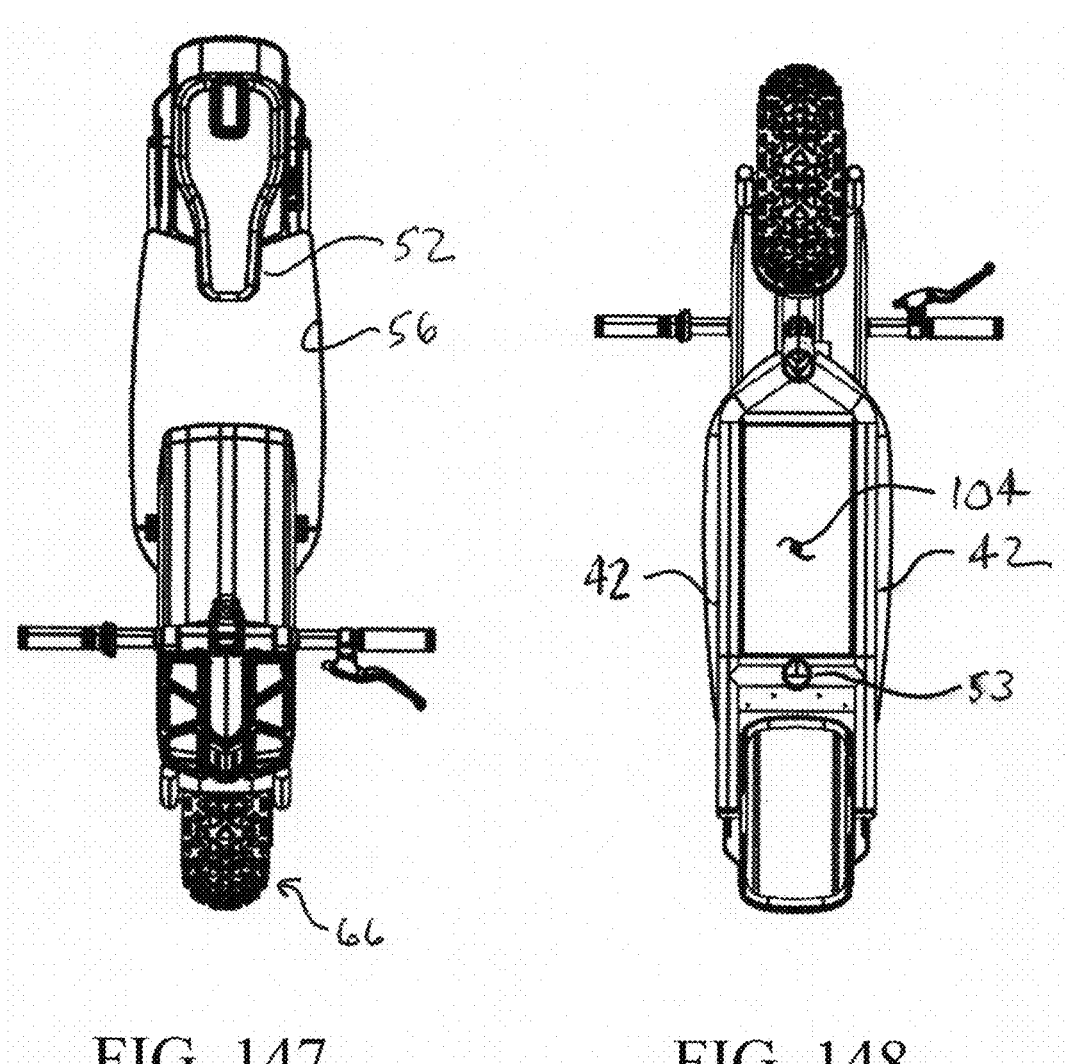
Figure 149:
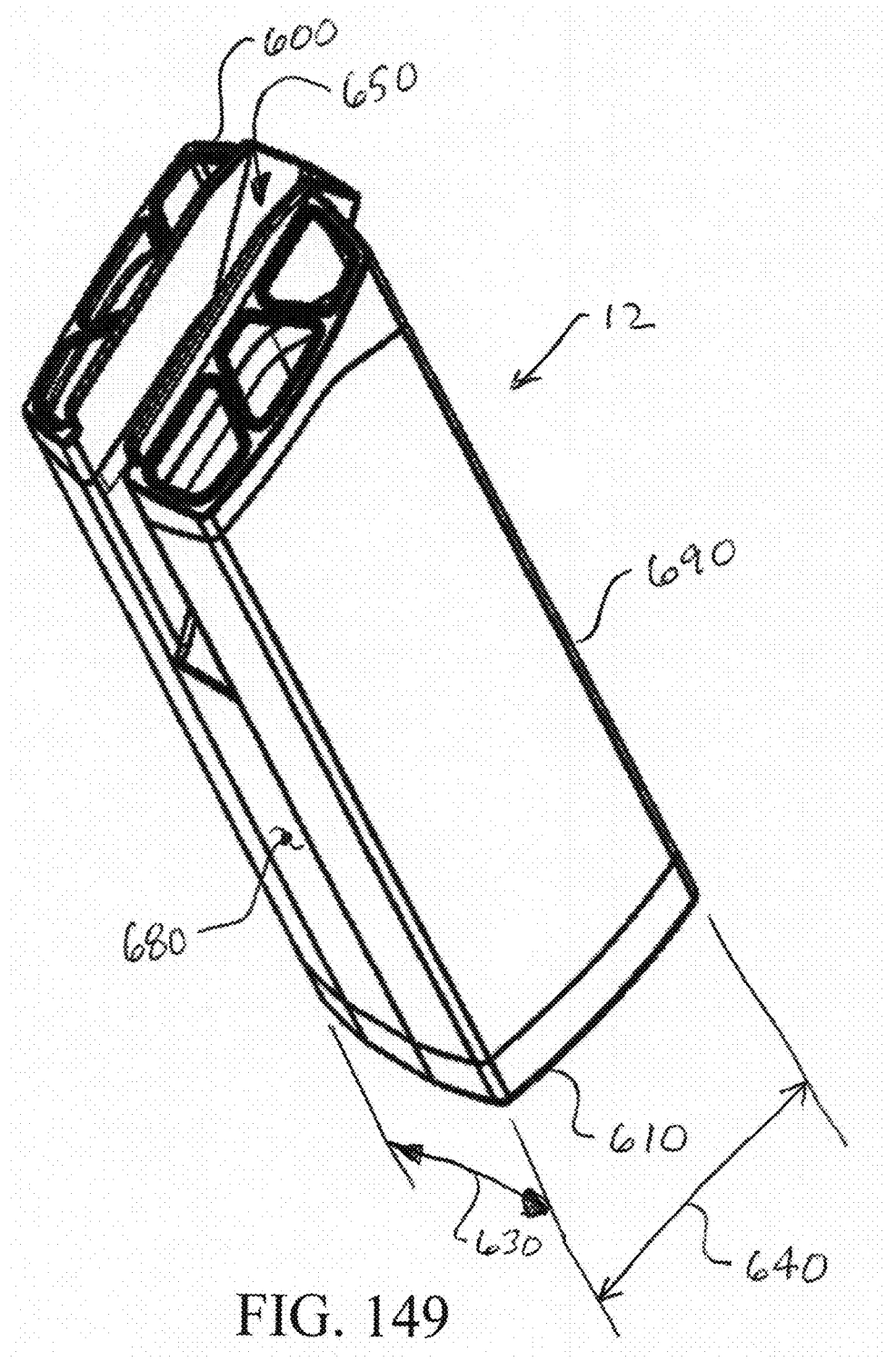
Figures 150, 151:
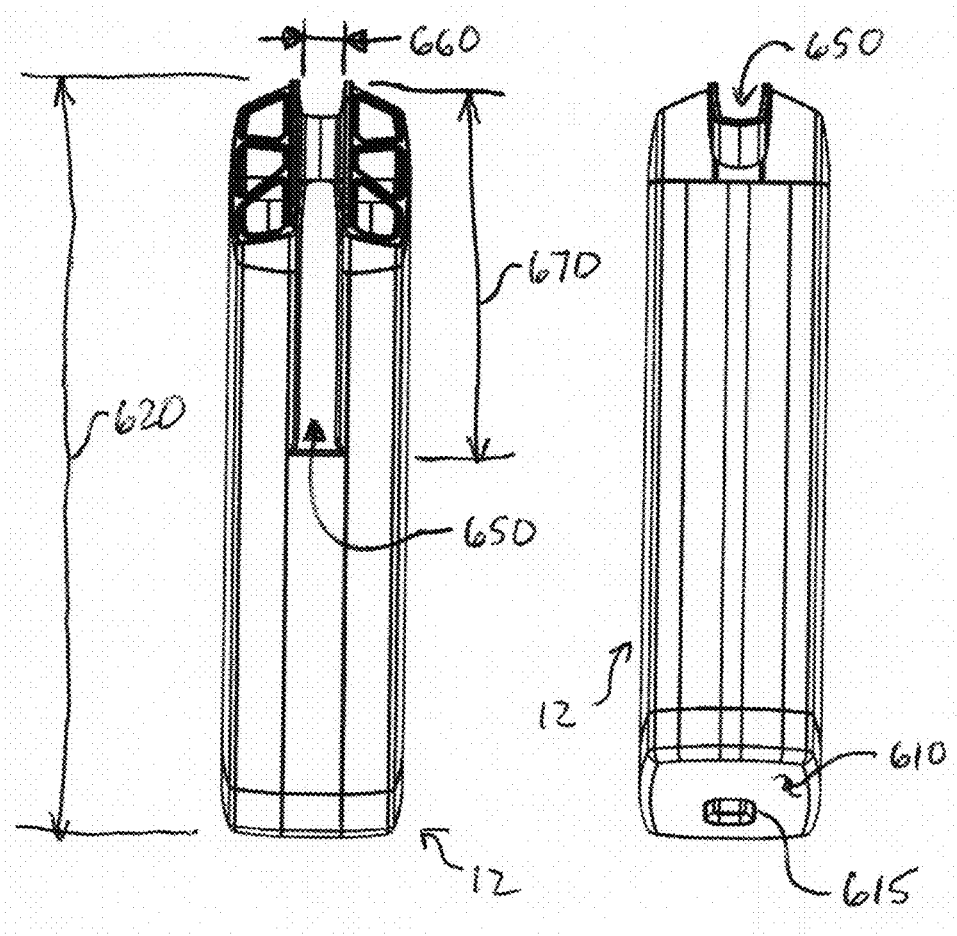
Figure 152:
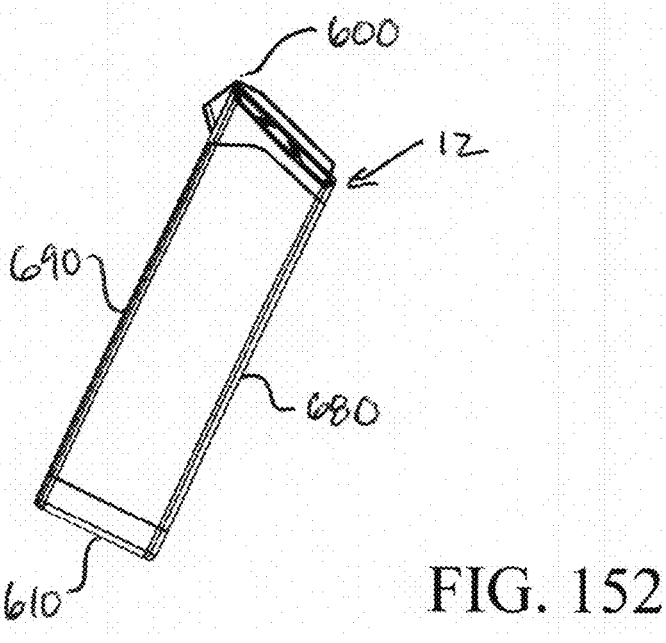
Figures 153, 154:
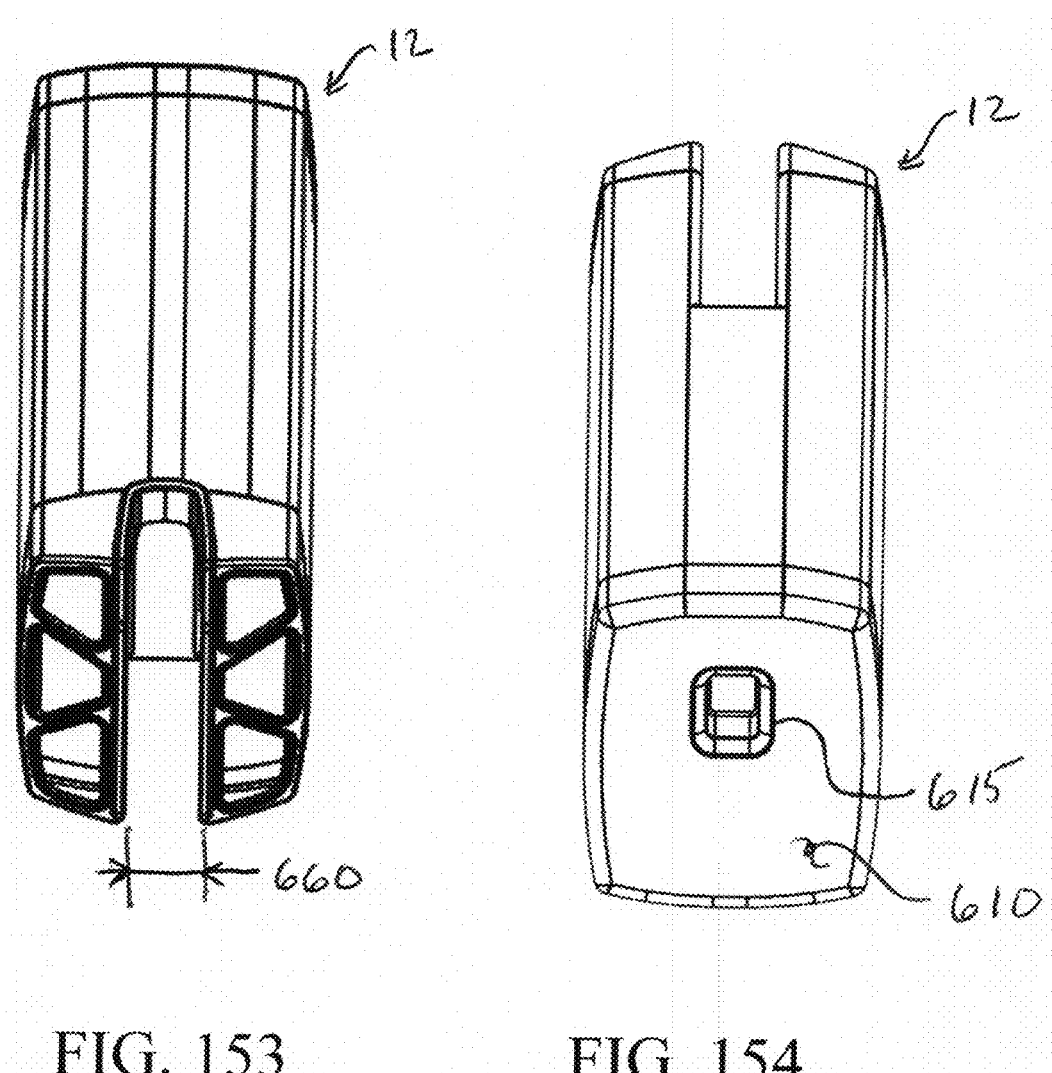
Figure 155:
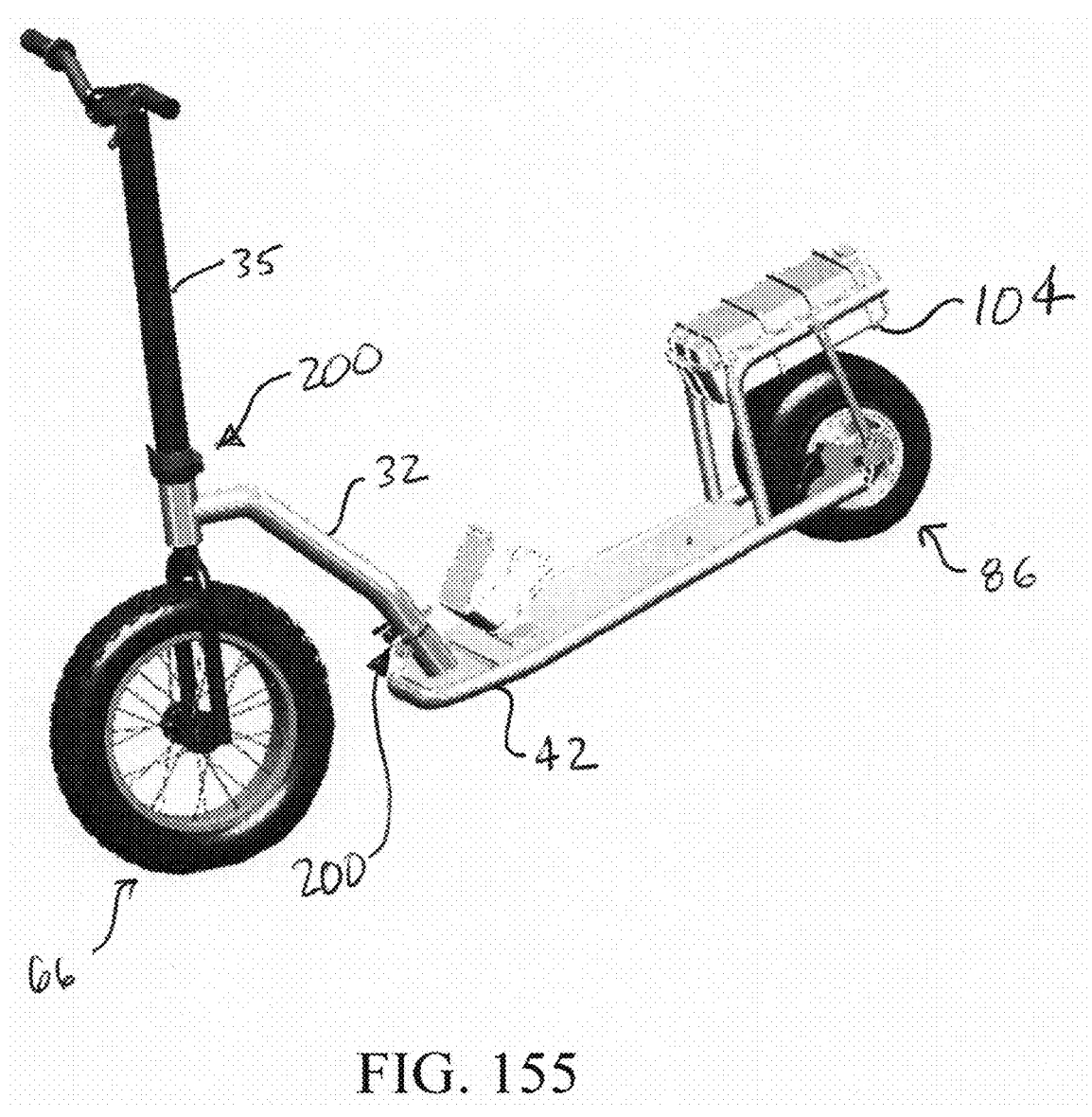
Figures 156, 157:
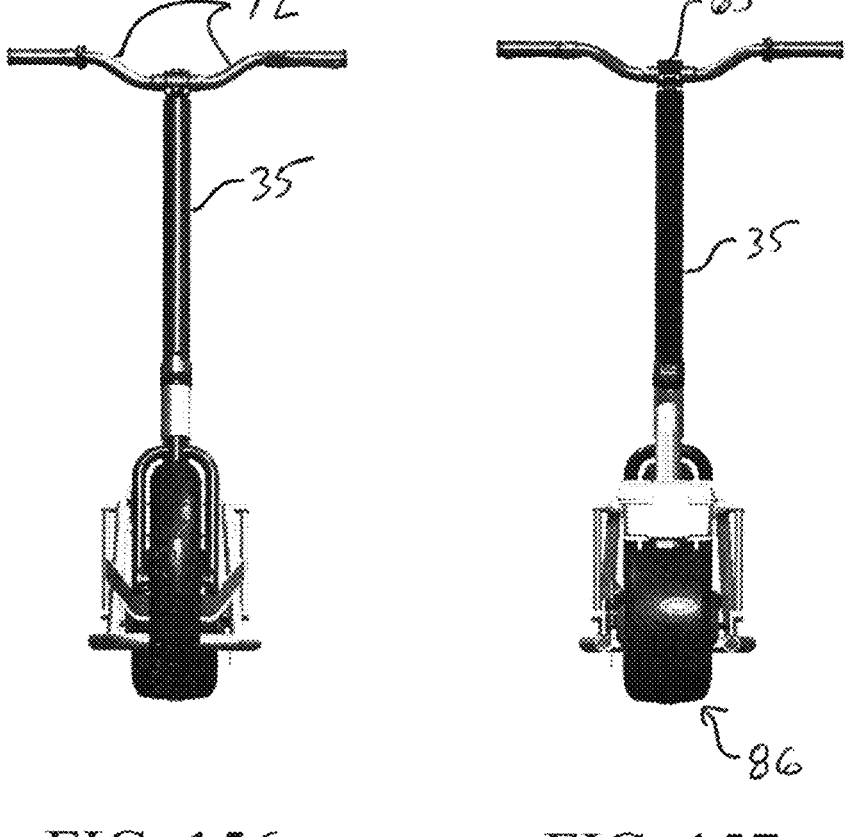
Figures 158, 159:
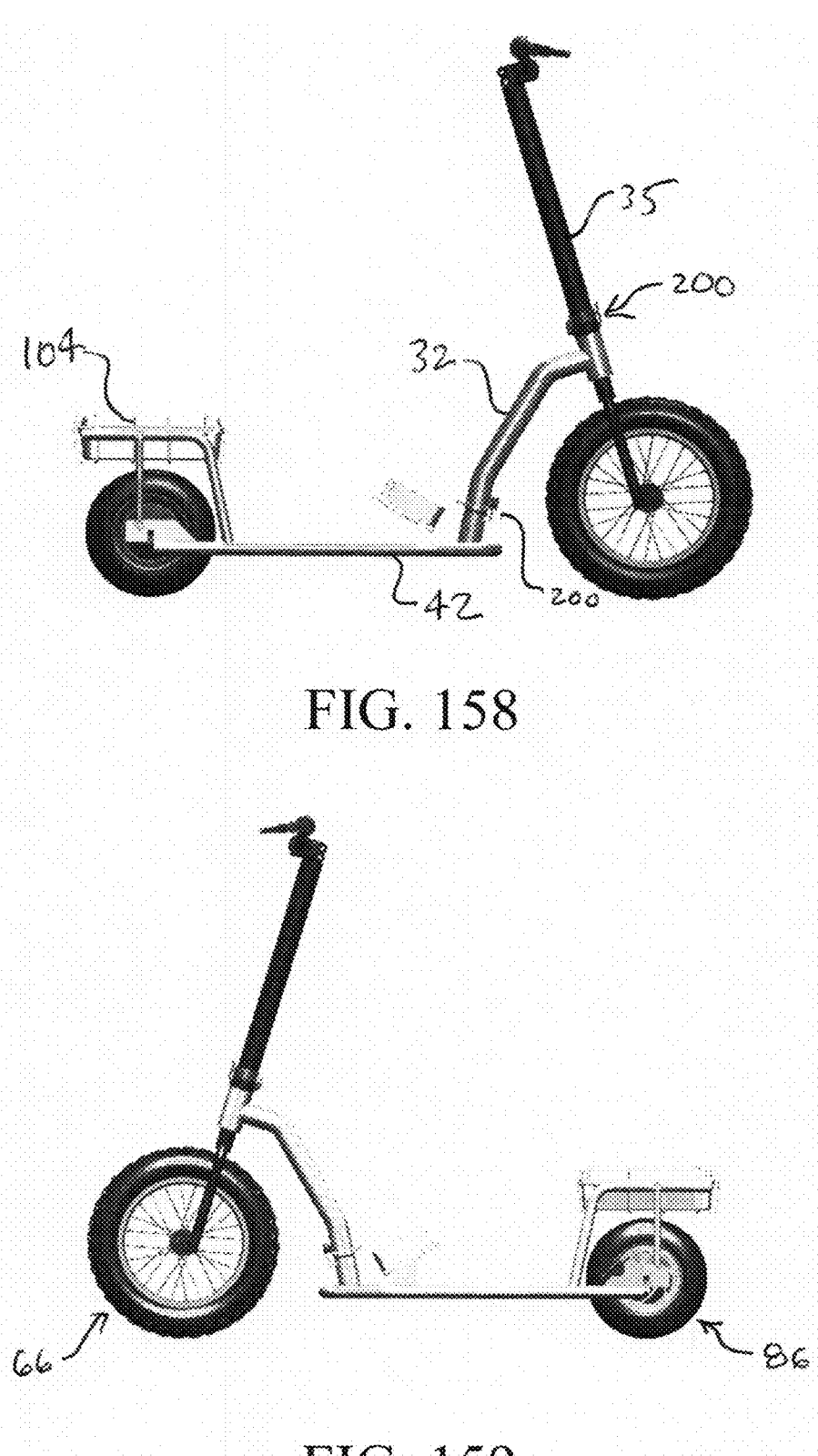
Figures 160, 161:
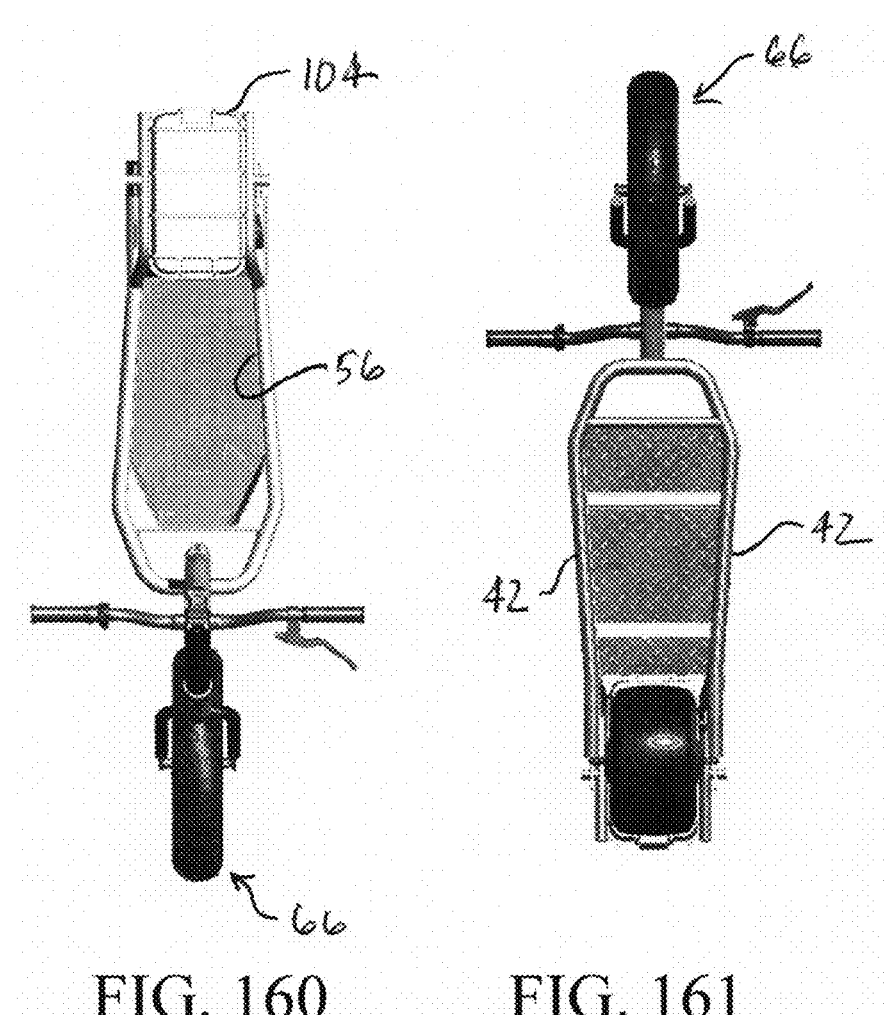
Figure 162:
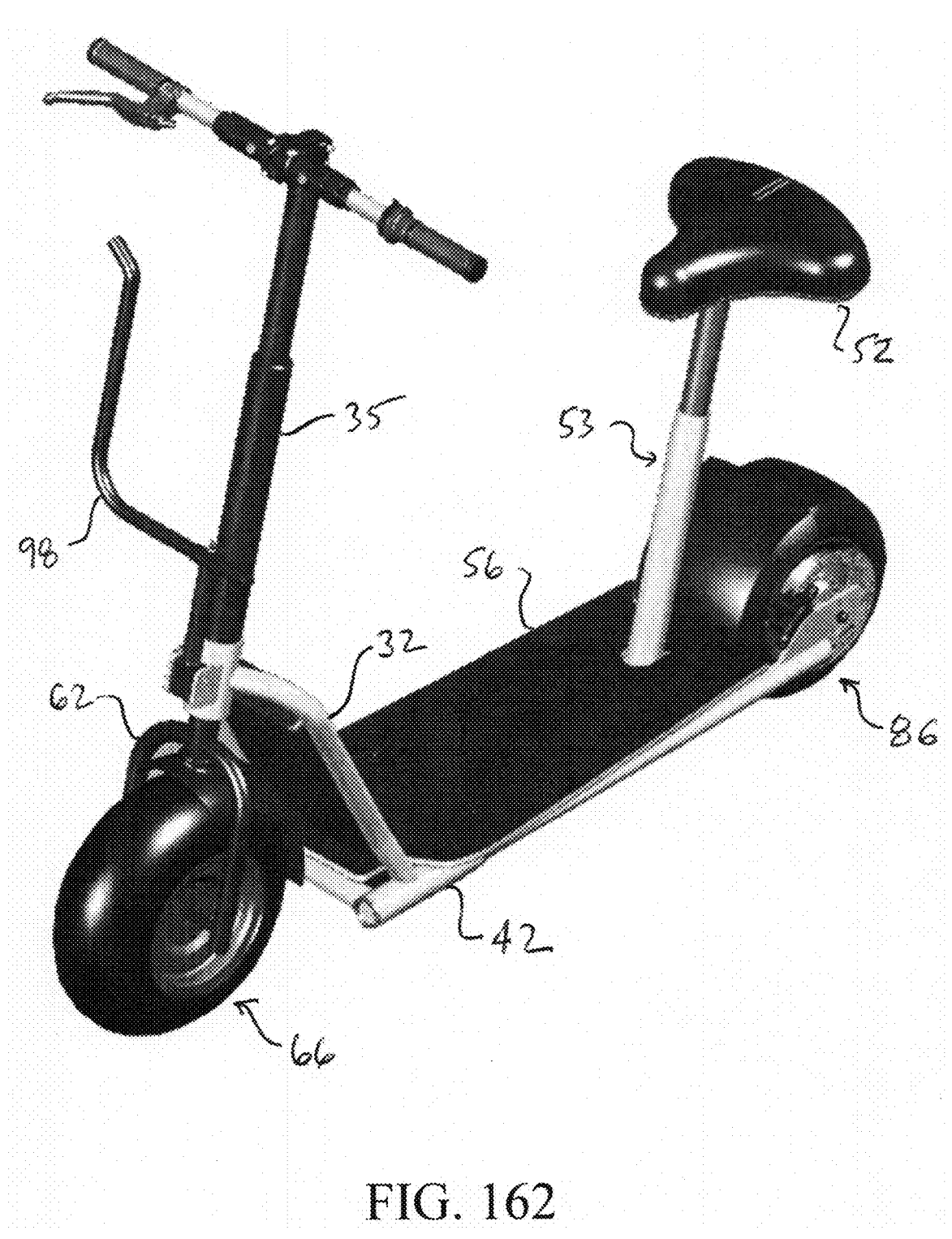
Figures 163, 164:
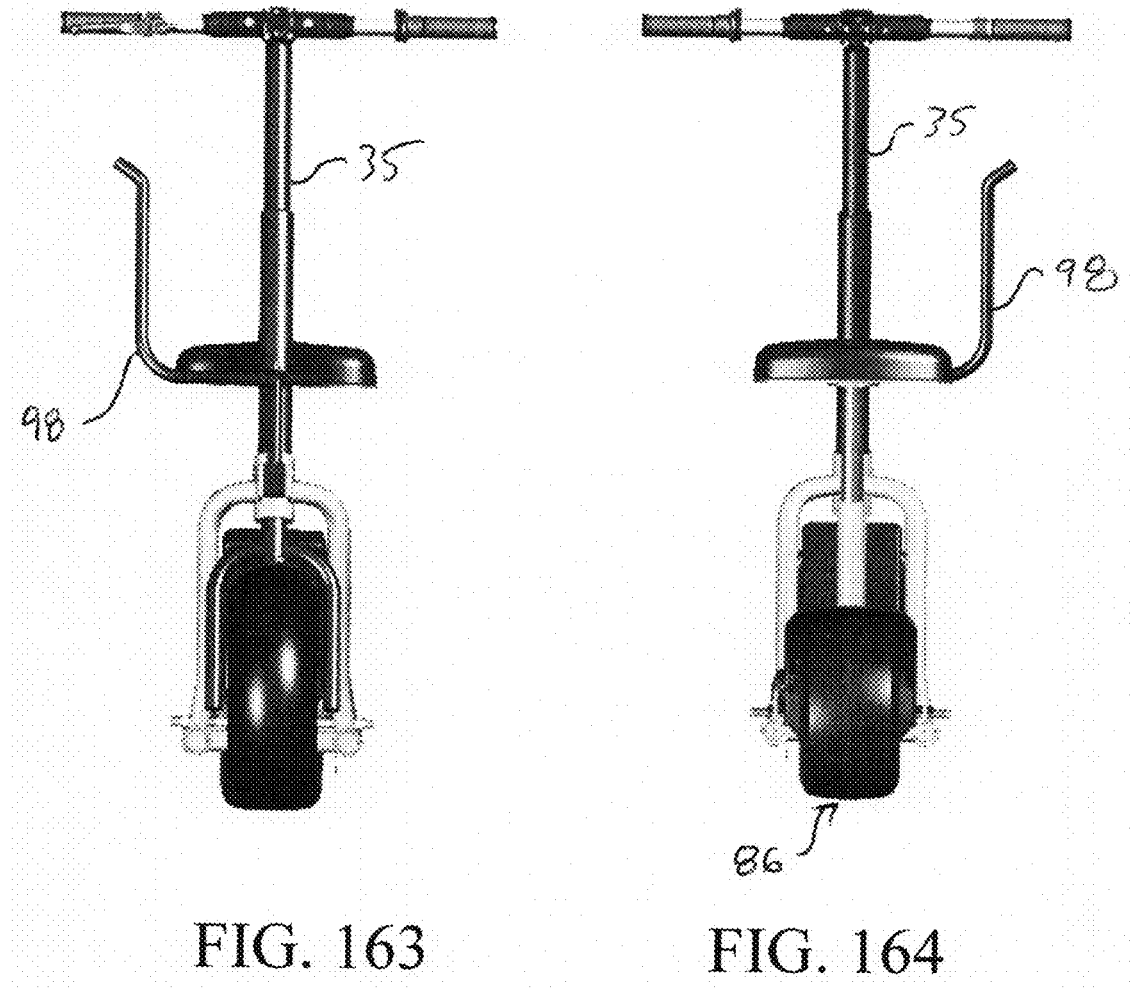
Figure 165:
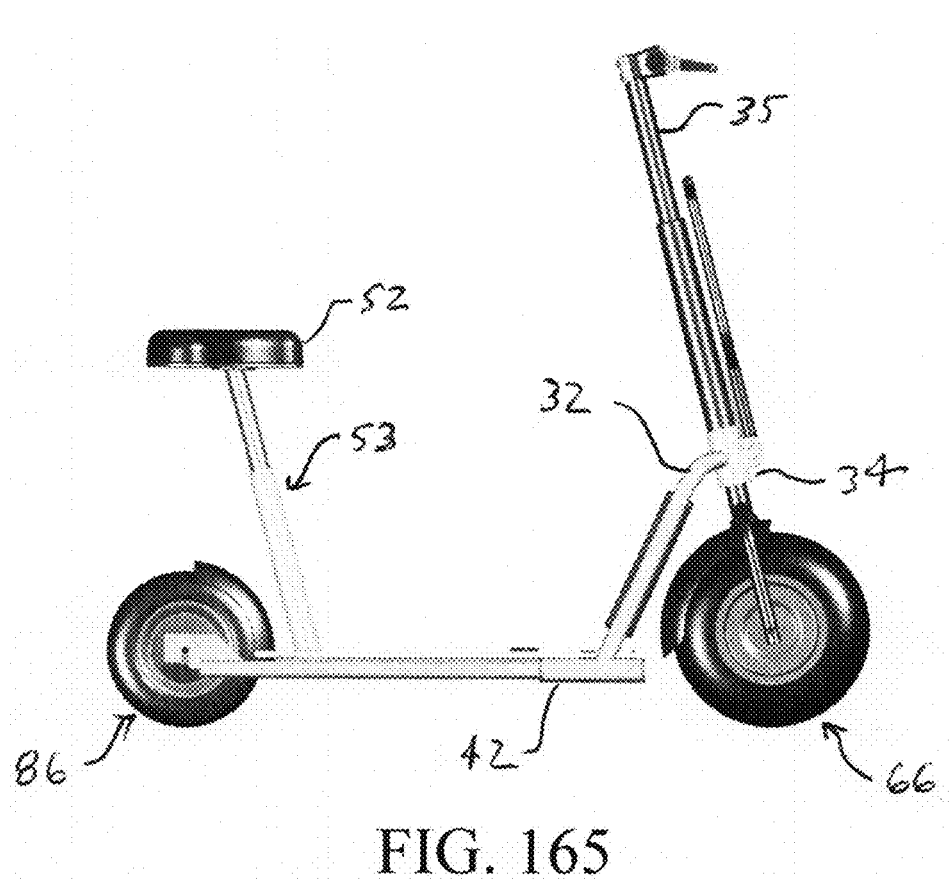
Figure 166:
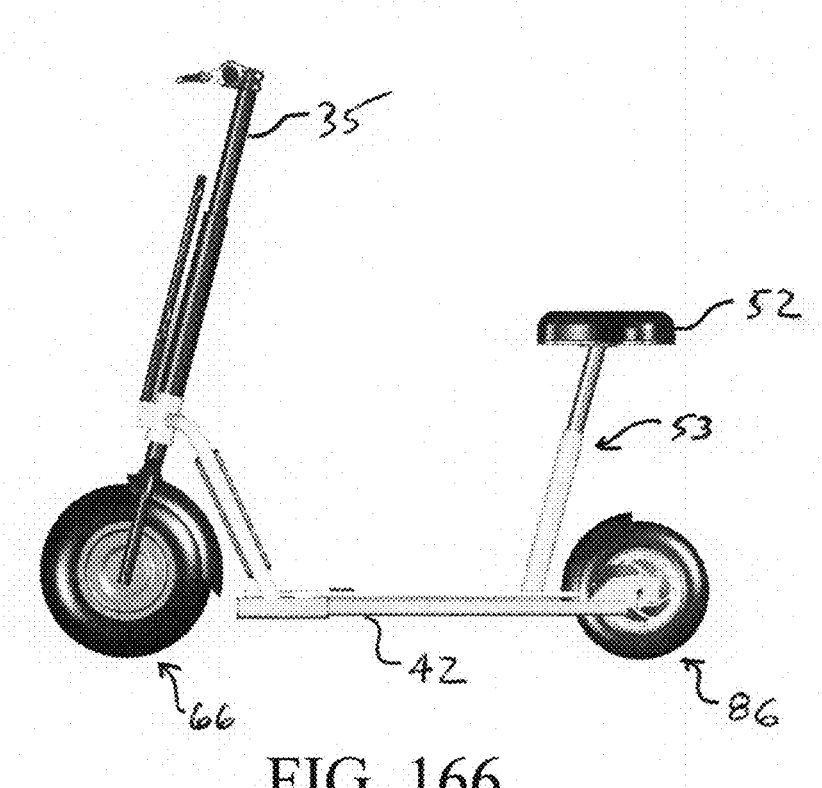
Figures 167, 168:
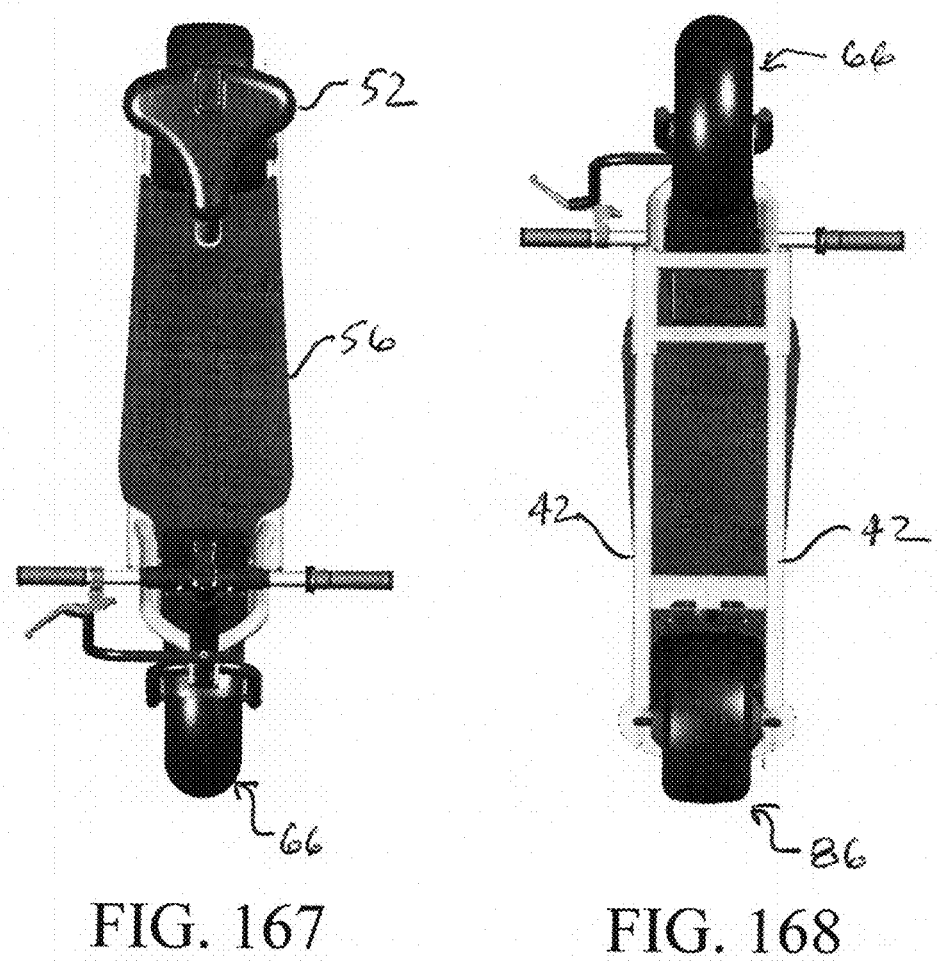
Figure 169:
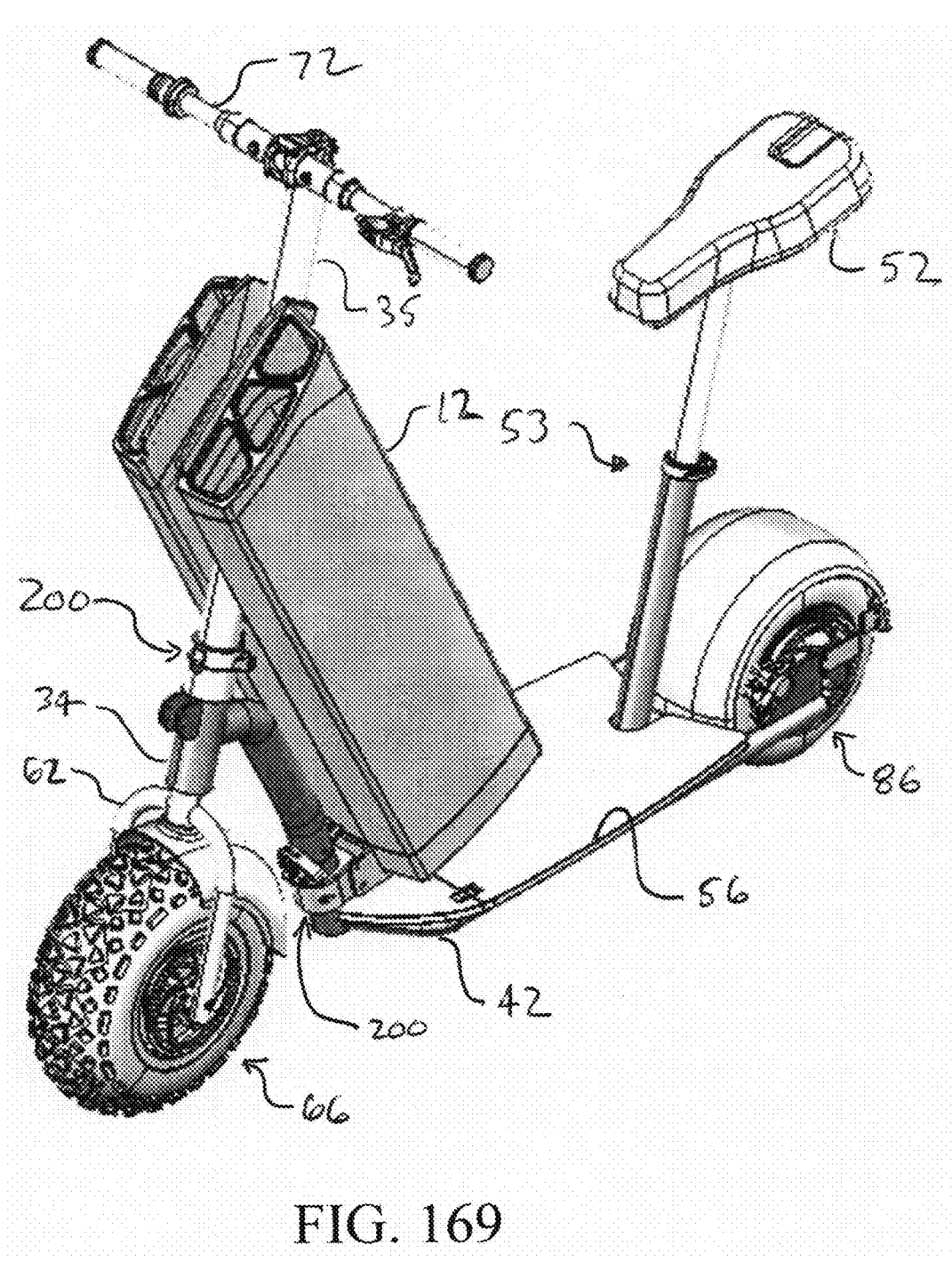
Figures 170, 171:
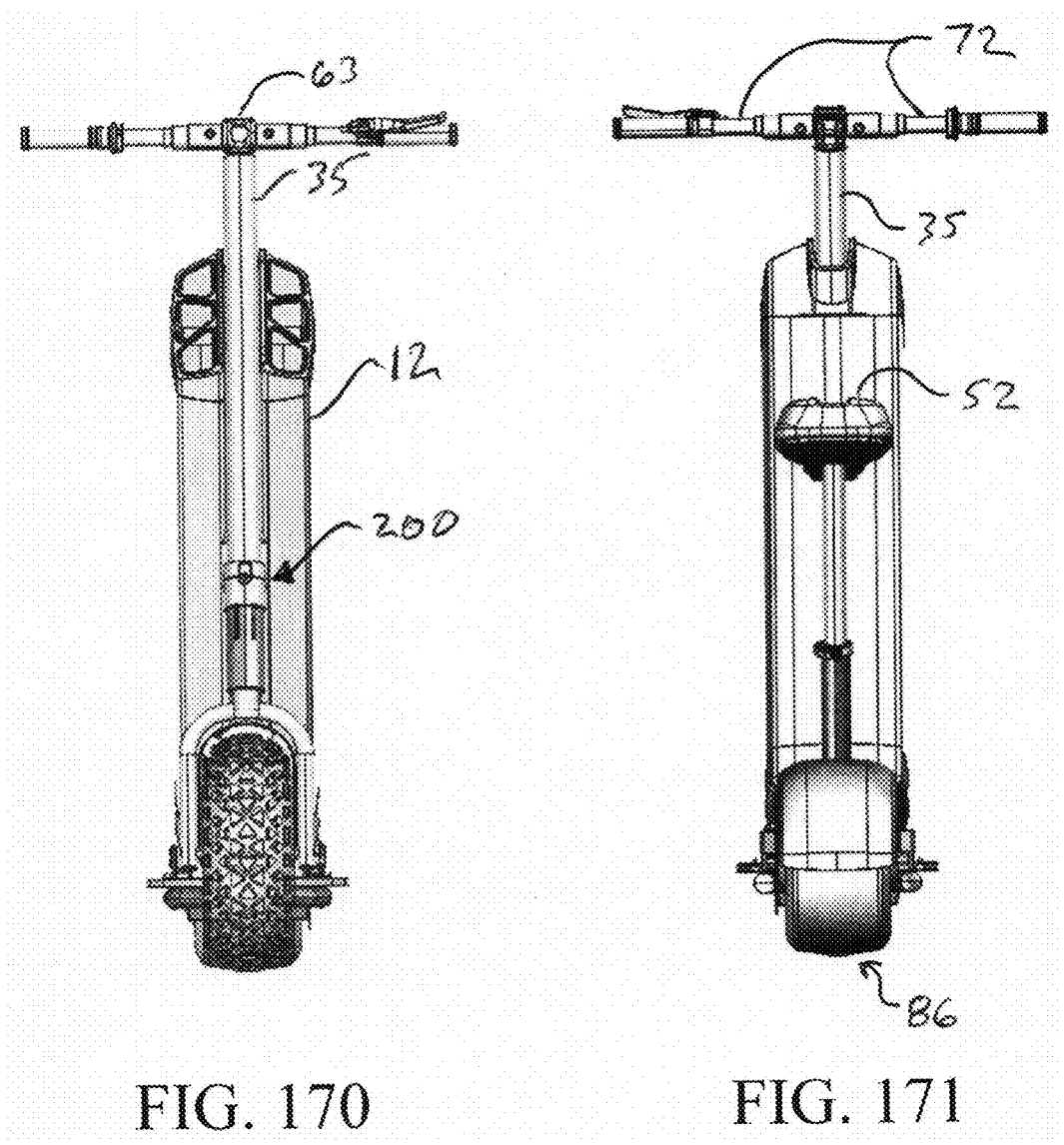
Figure 172:
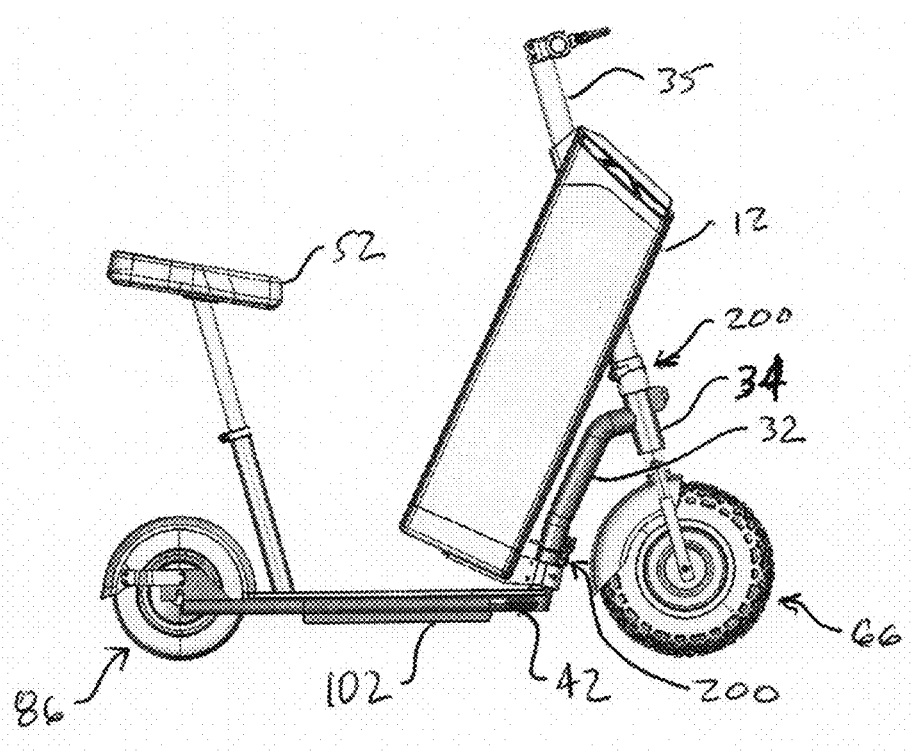
Figure 173:
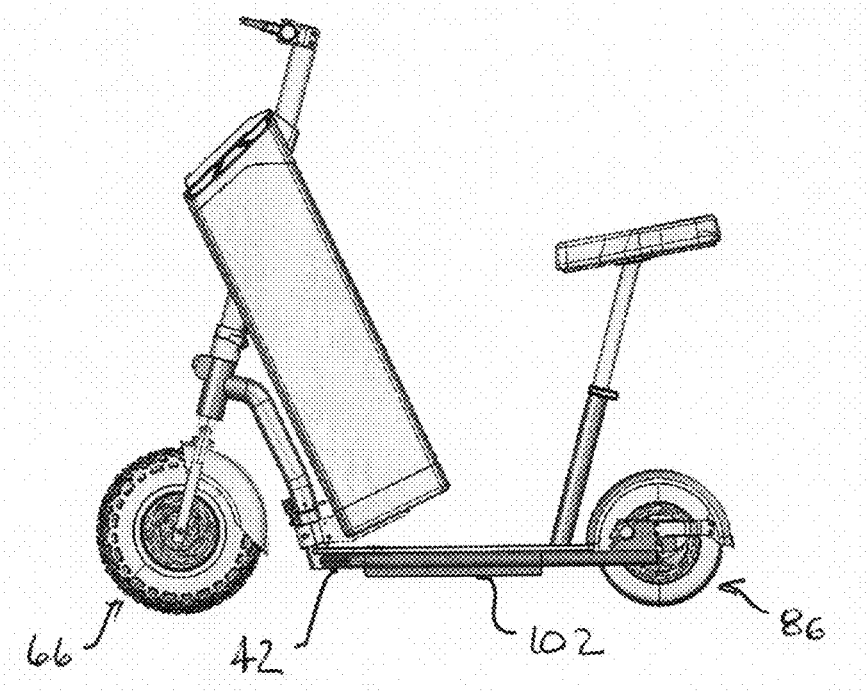
Figures 174, 175:
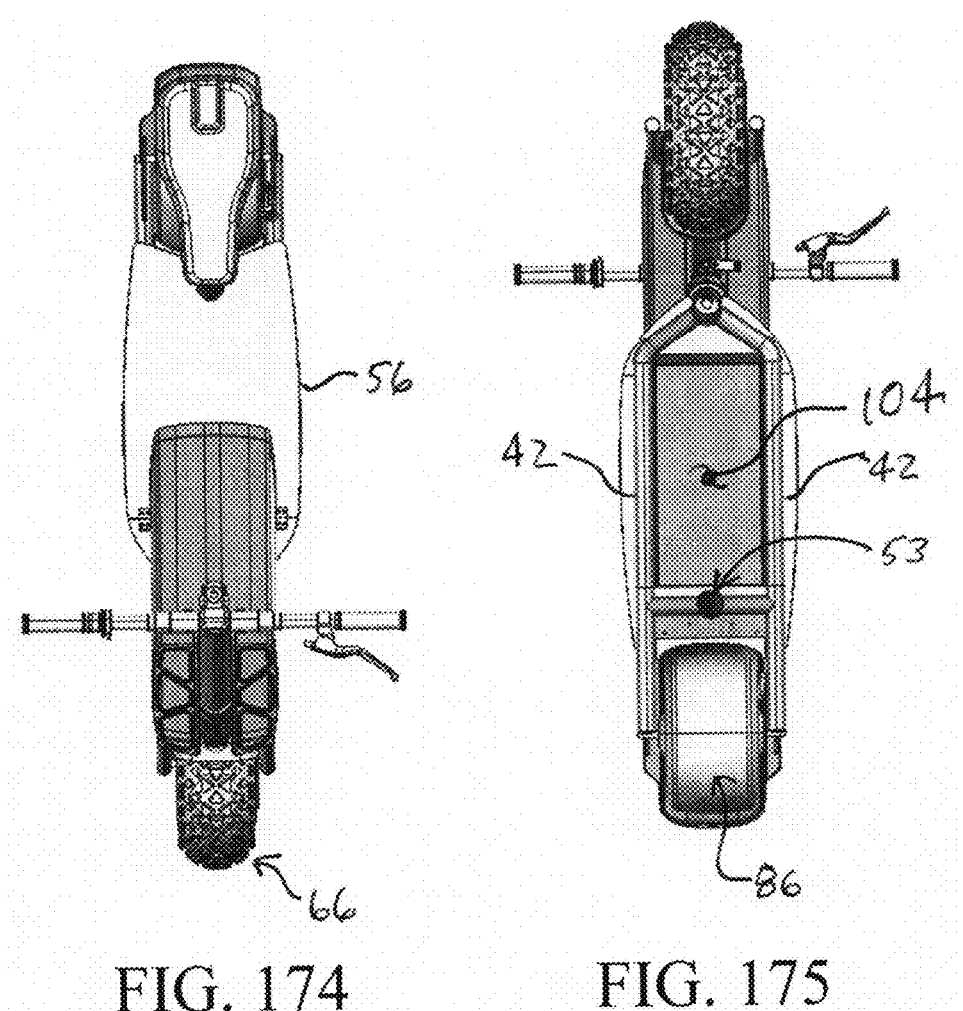
Figure 176:
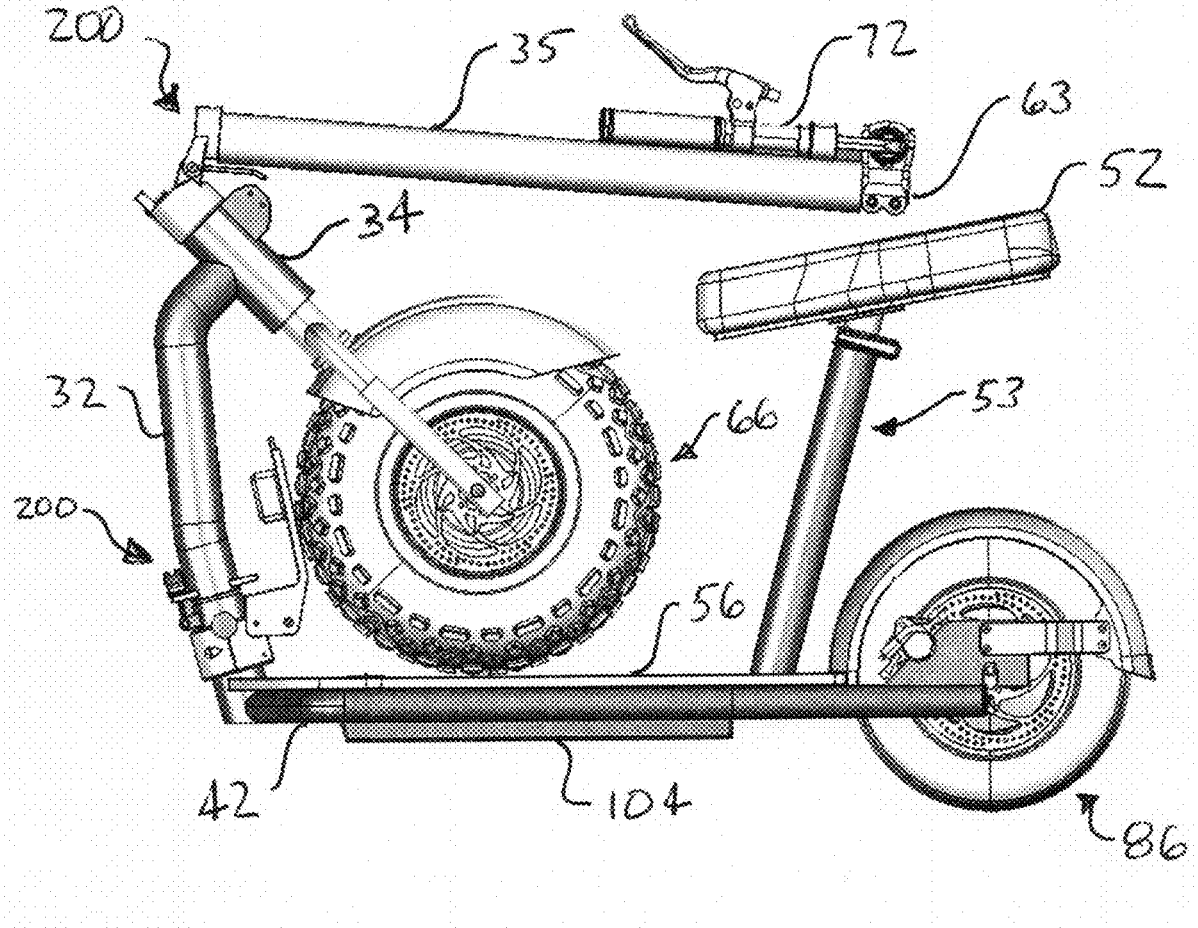
Figure 177:
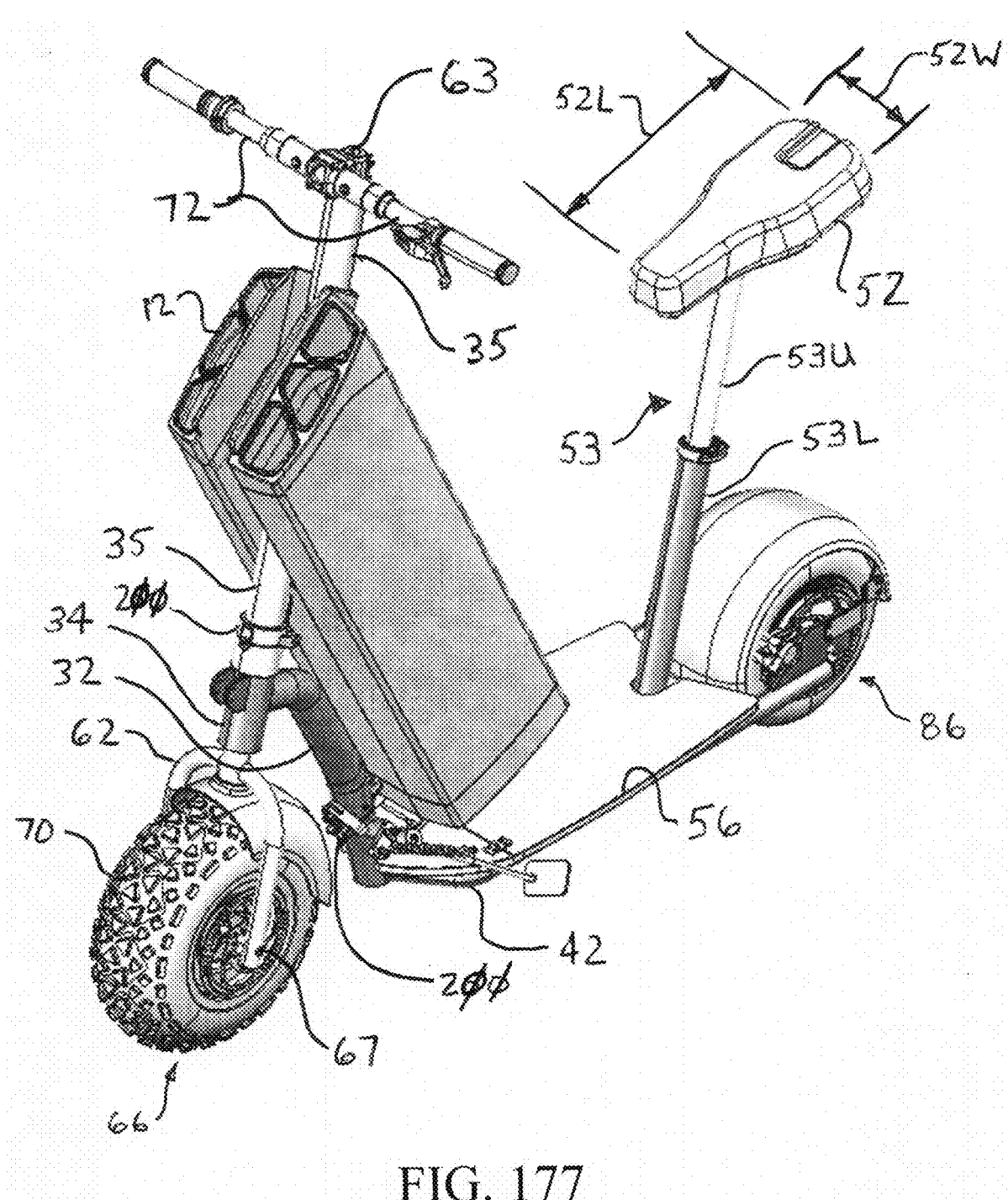
Figures 178, 179:
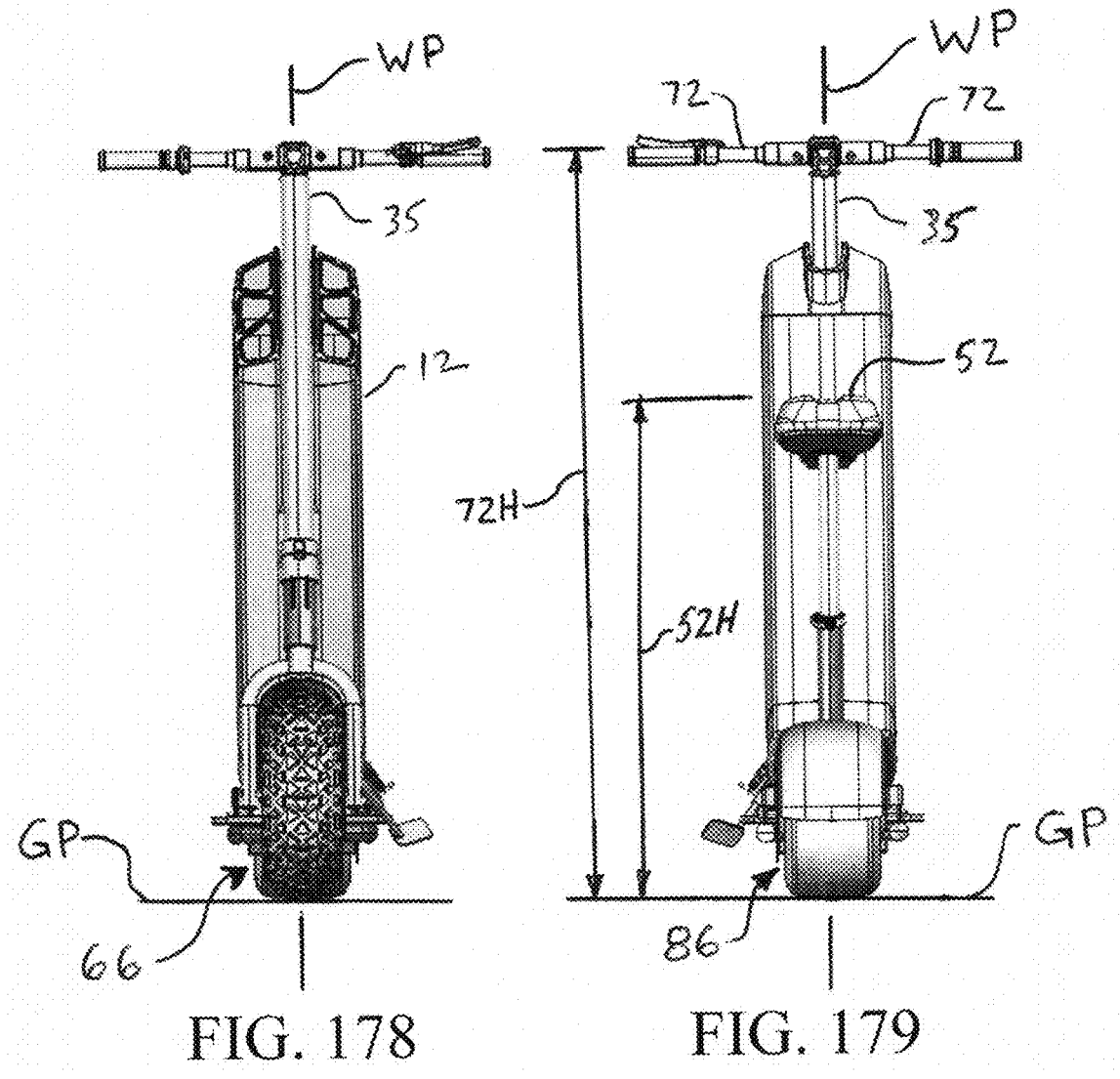
Figure 180:
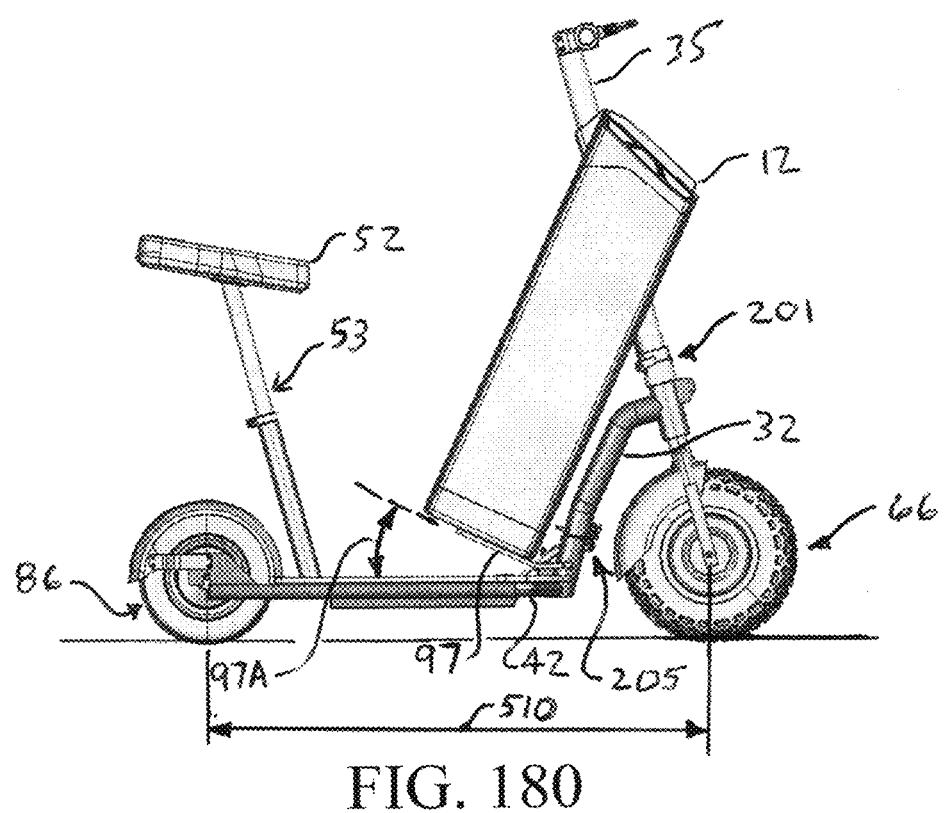
Figure 181:
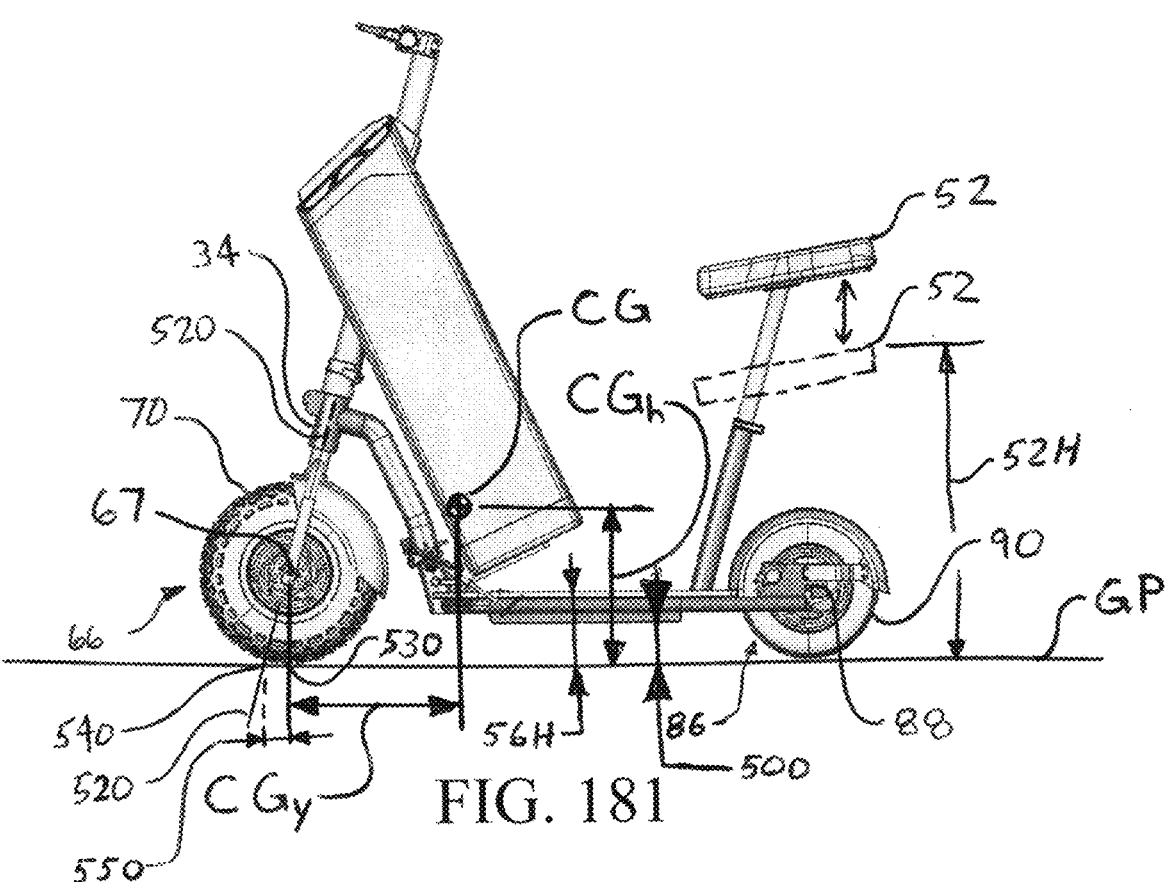
Figures 182, 183:
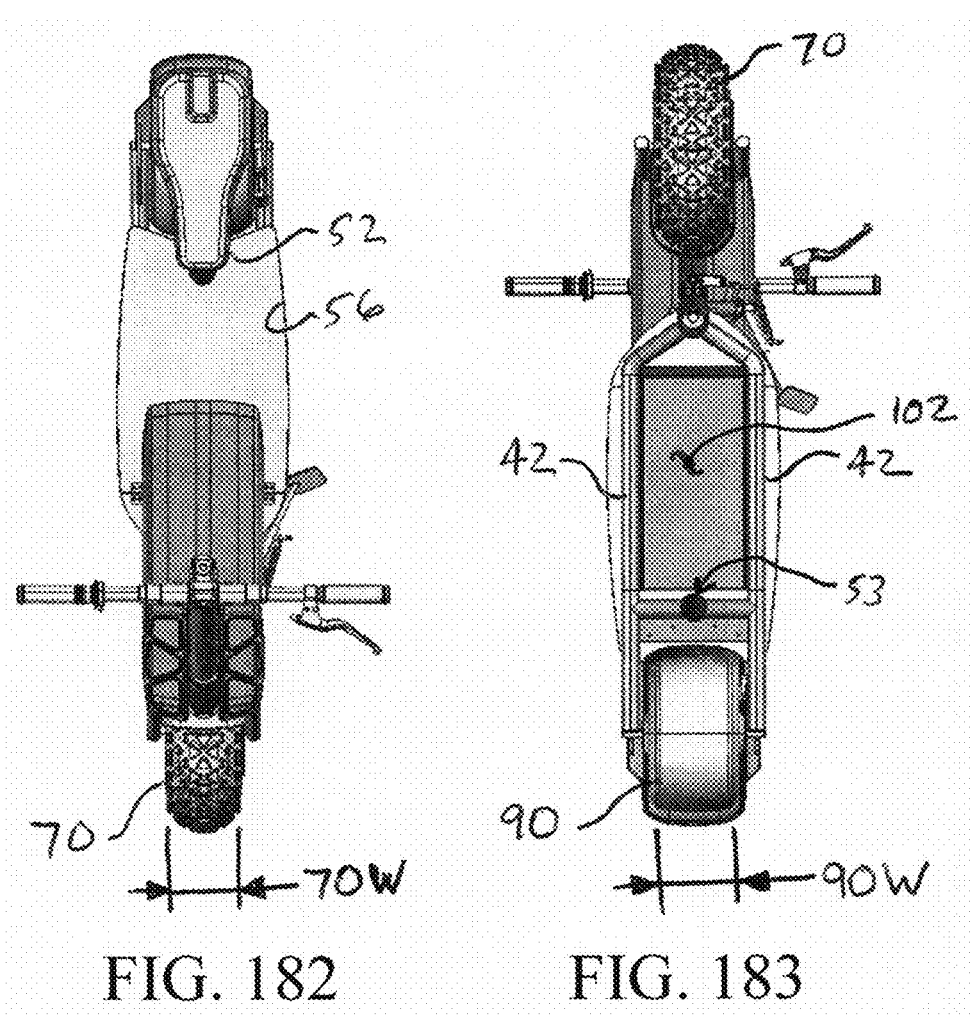
Figure 184:
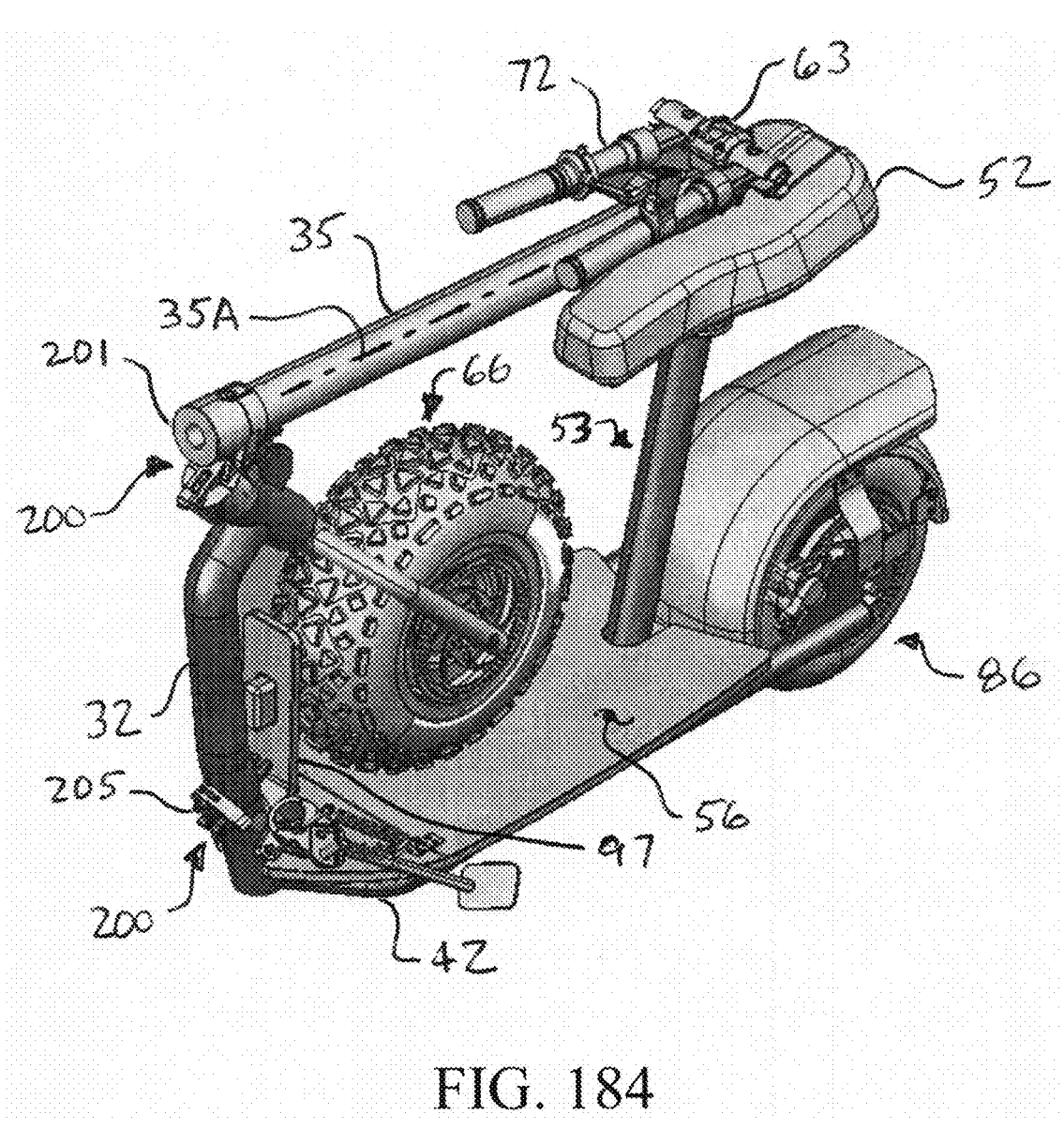
Figure 185:
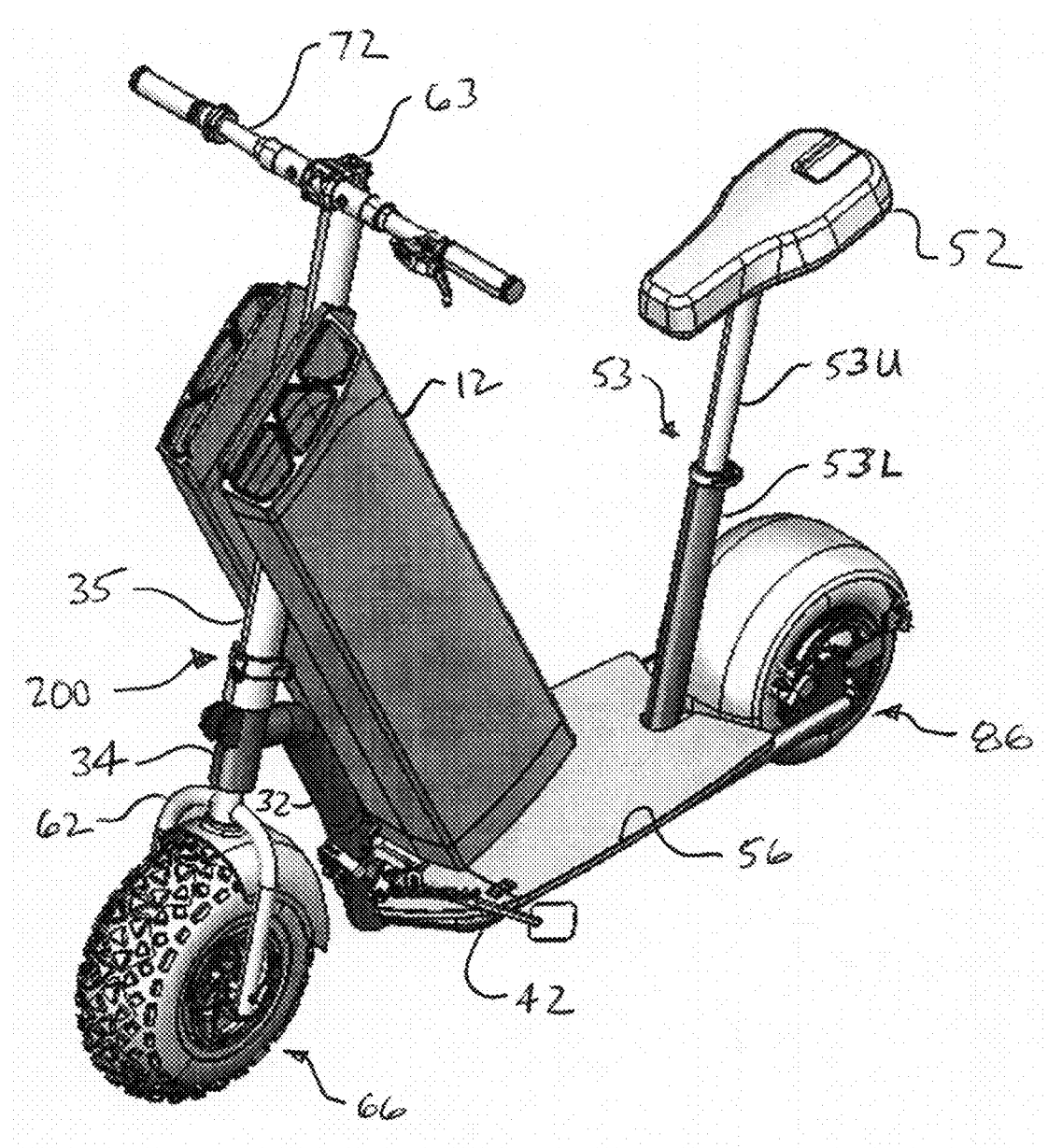
Figure 186:
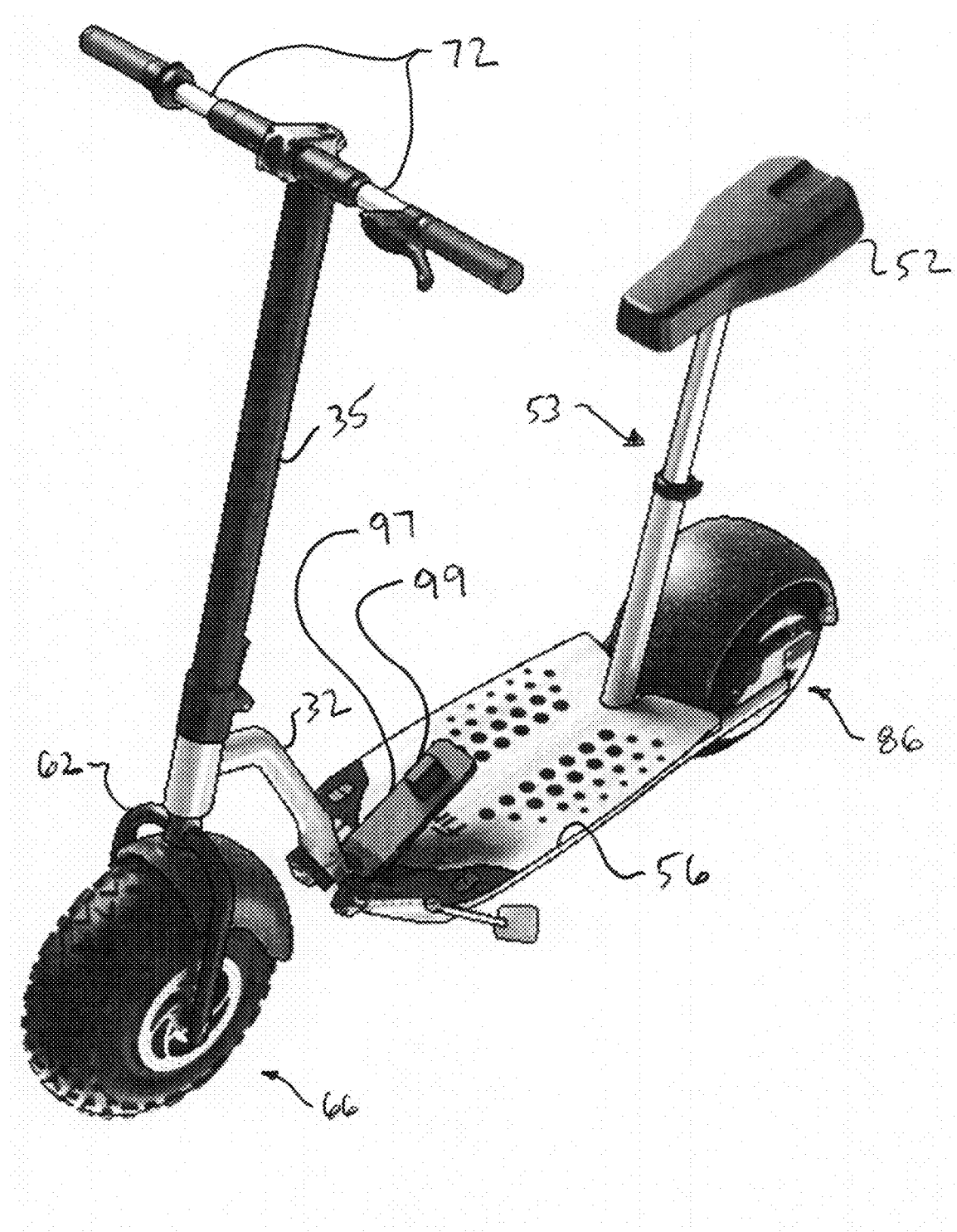
Figure 187:
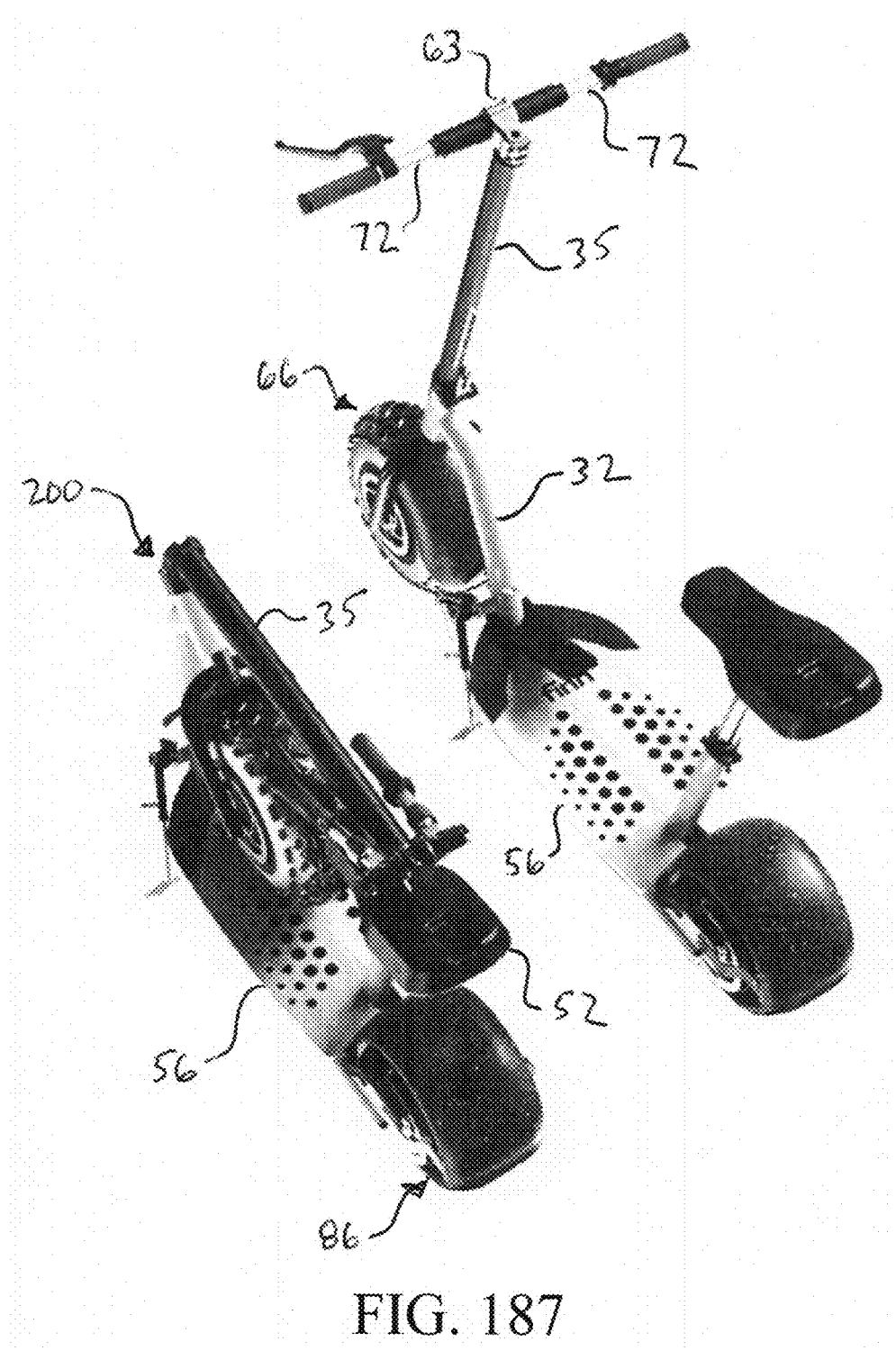
Figures 188, 189:
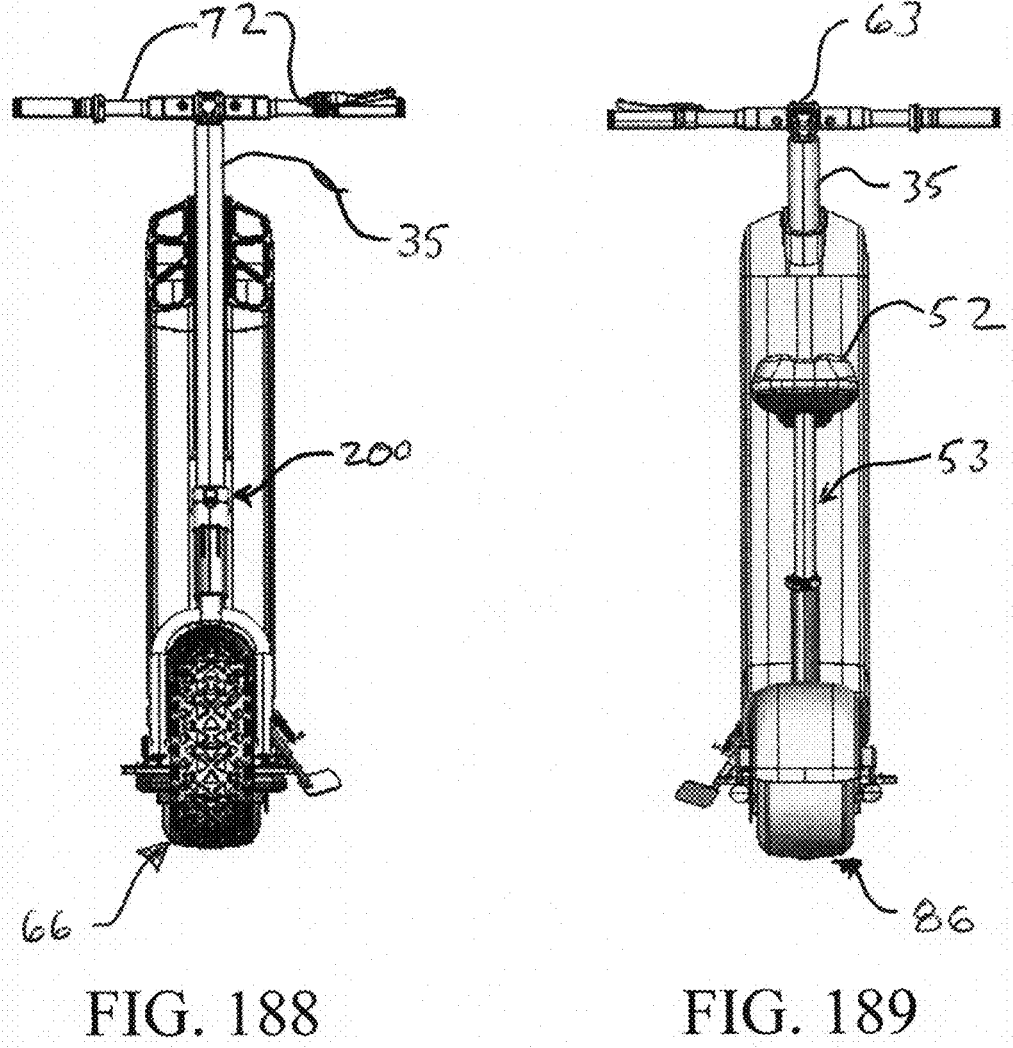
Figure 190:
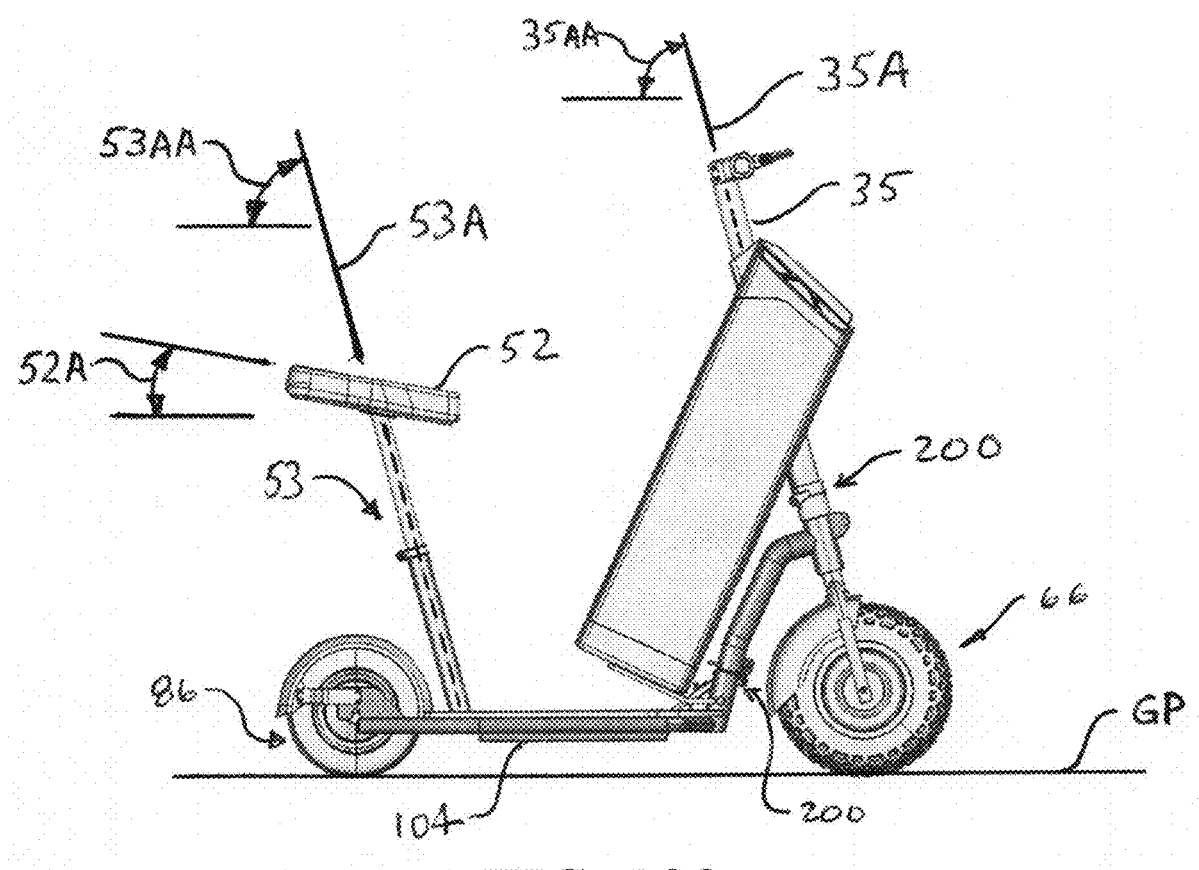
Figure 191:
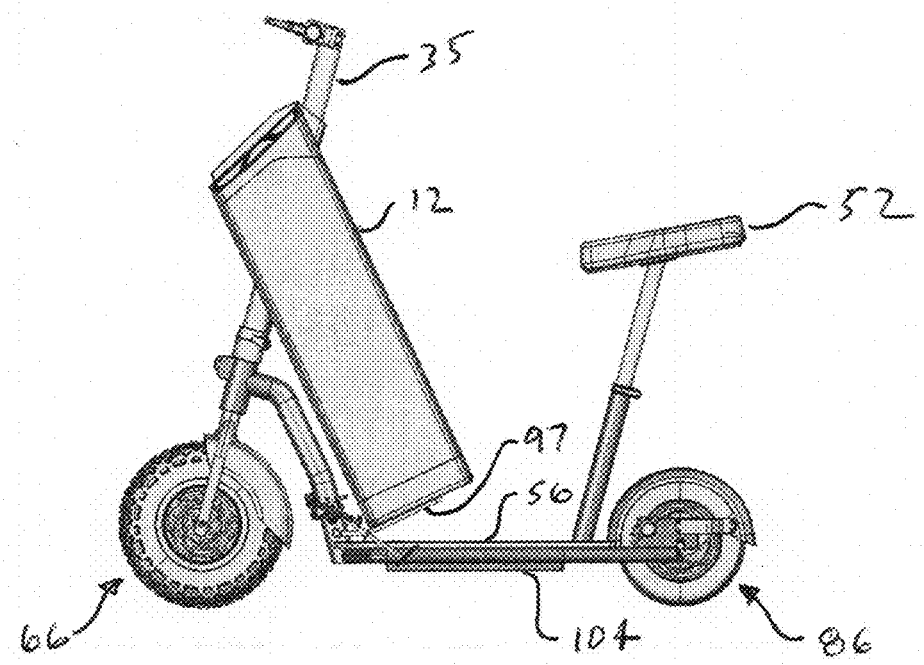
Figures 192, 193:
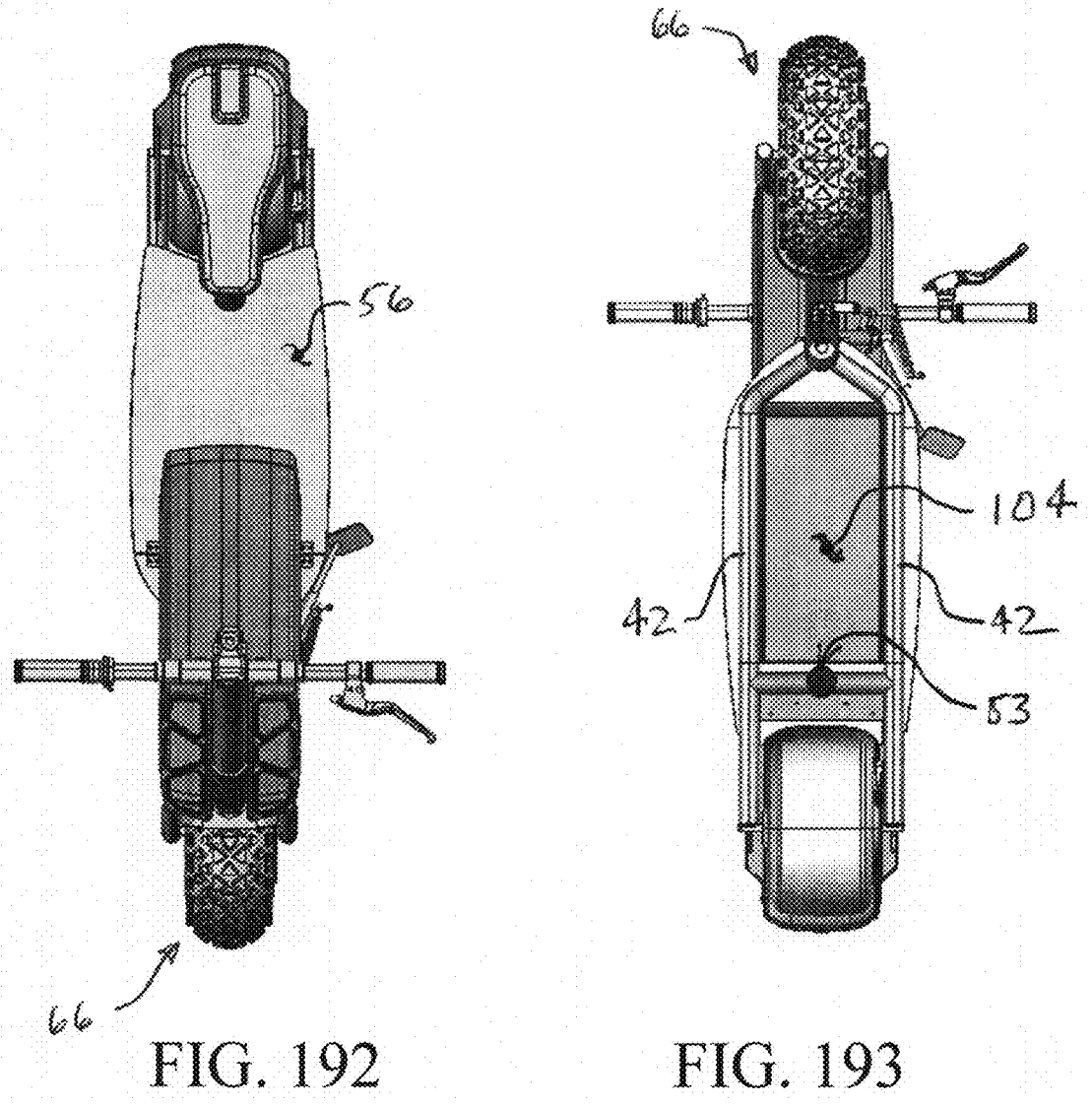
Figure 194:
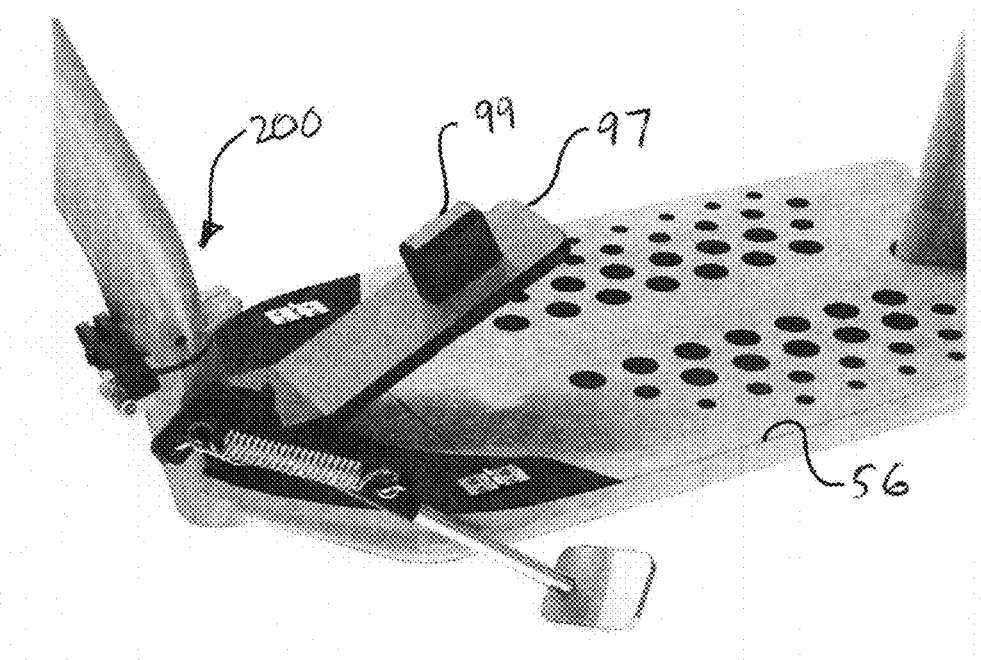
Figure 195:
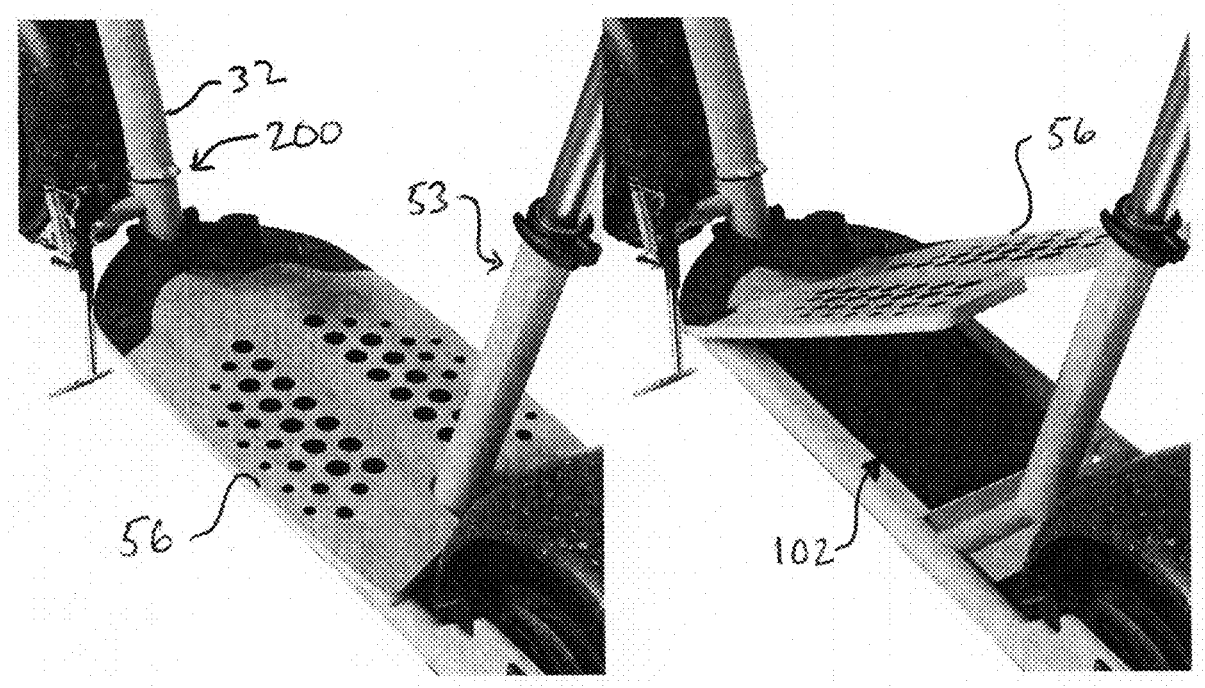
Figure 196:
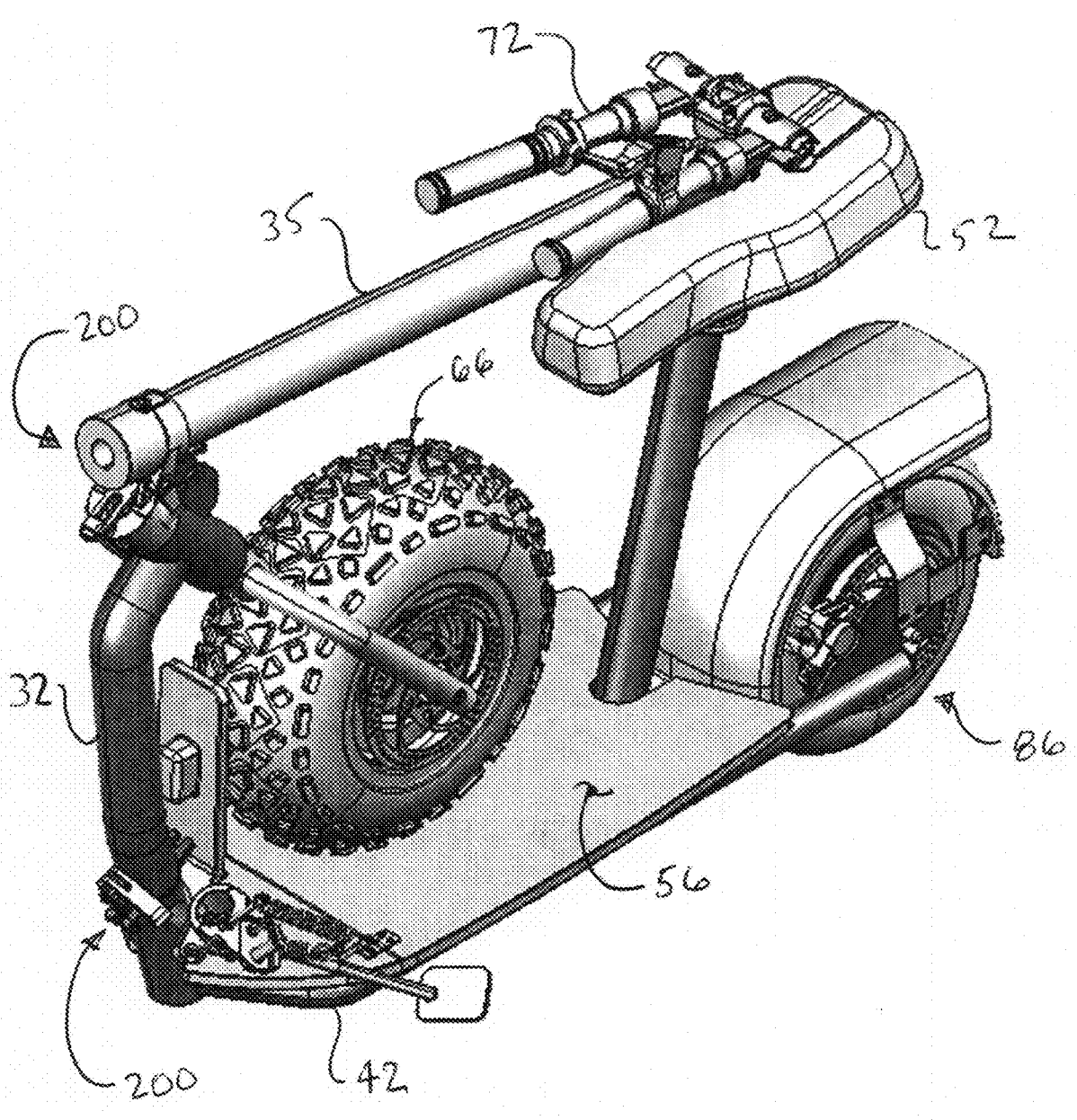
Figure 197:
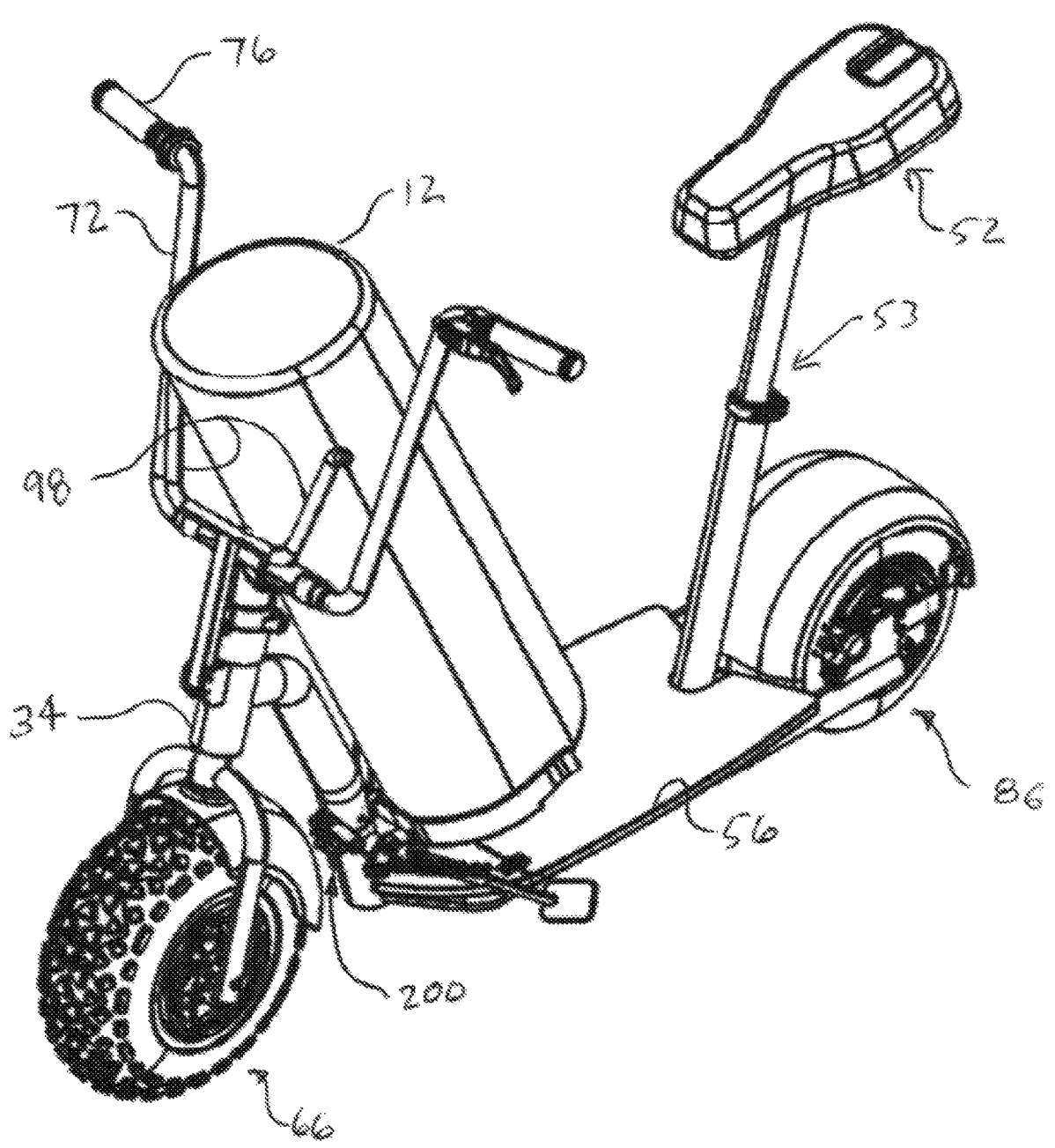
Figures 198, 199:
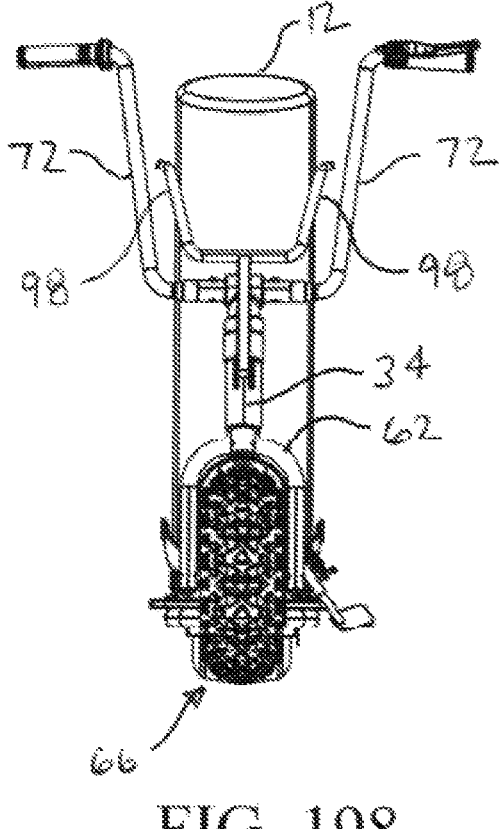
Figure 200:
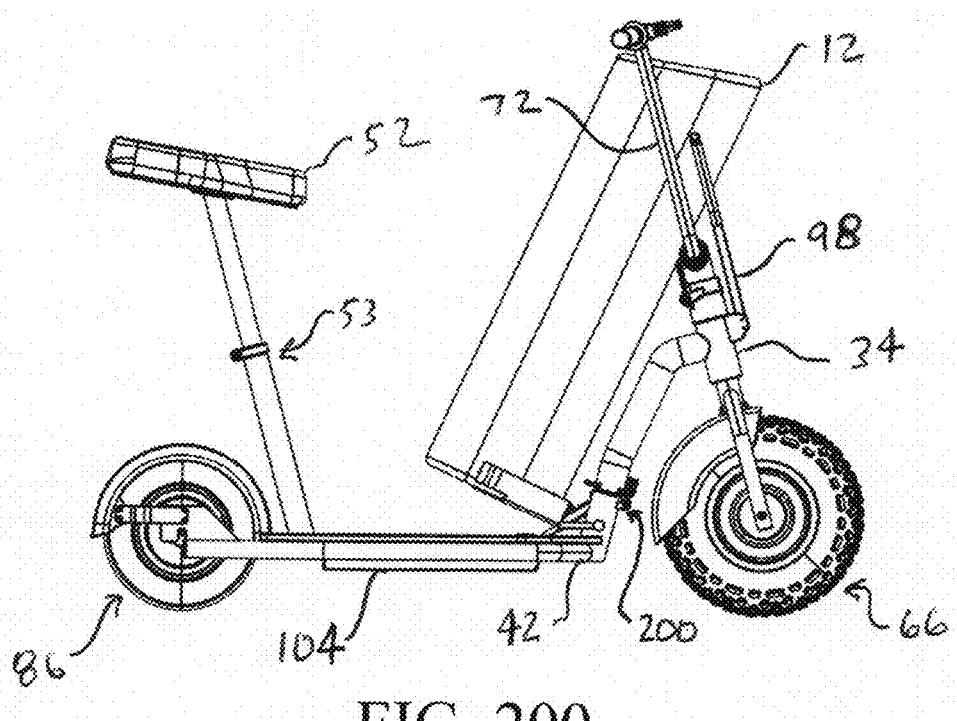
Figure 201:
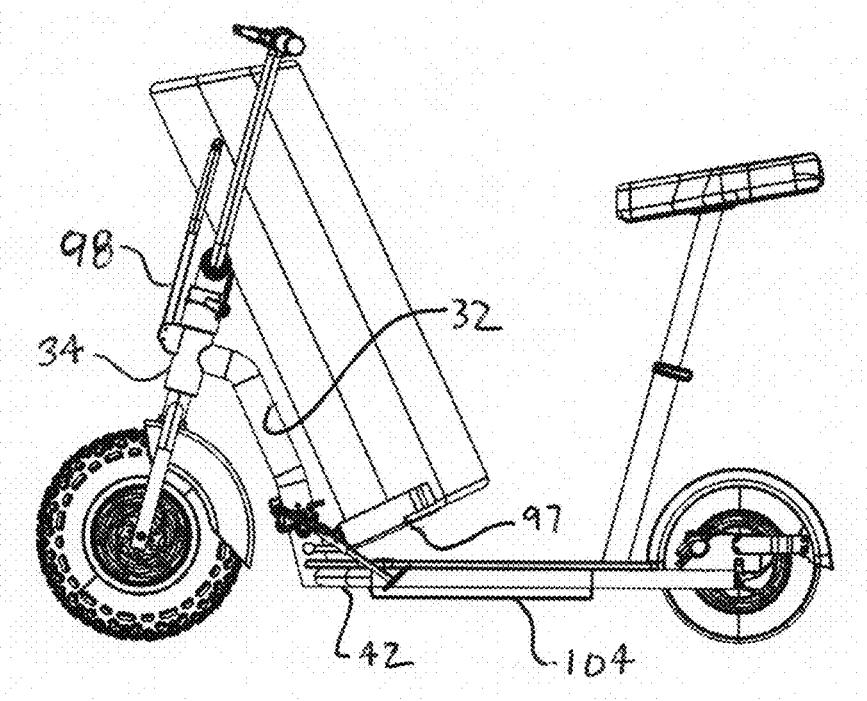
Figures 202, 203:
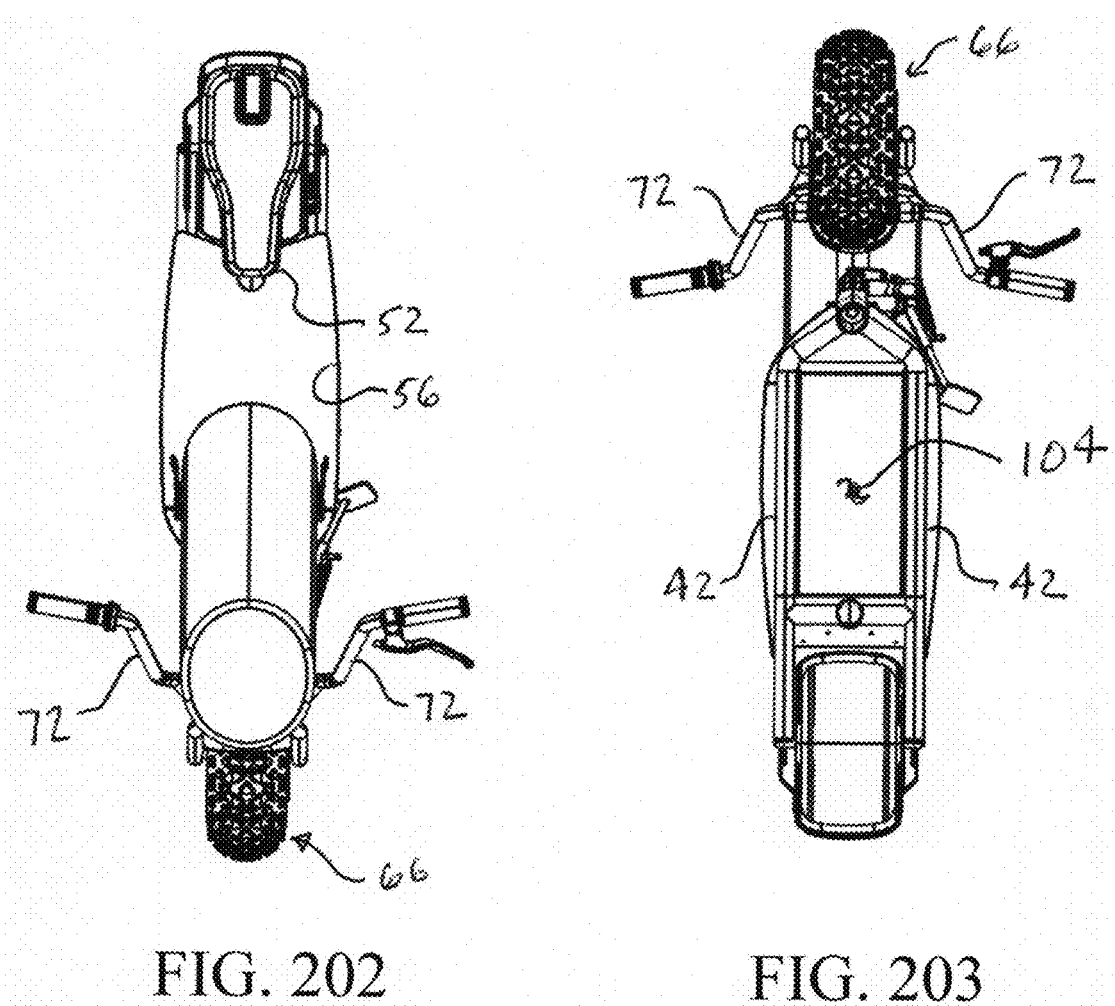
Figure 204:
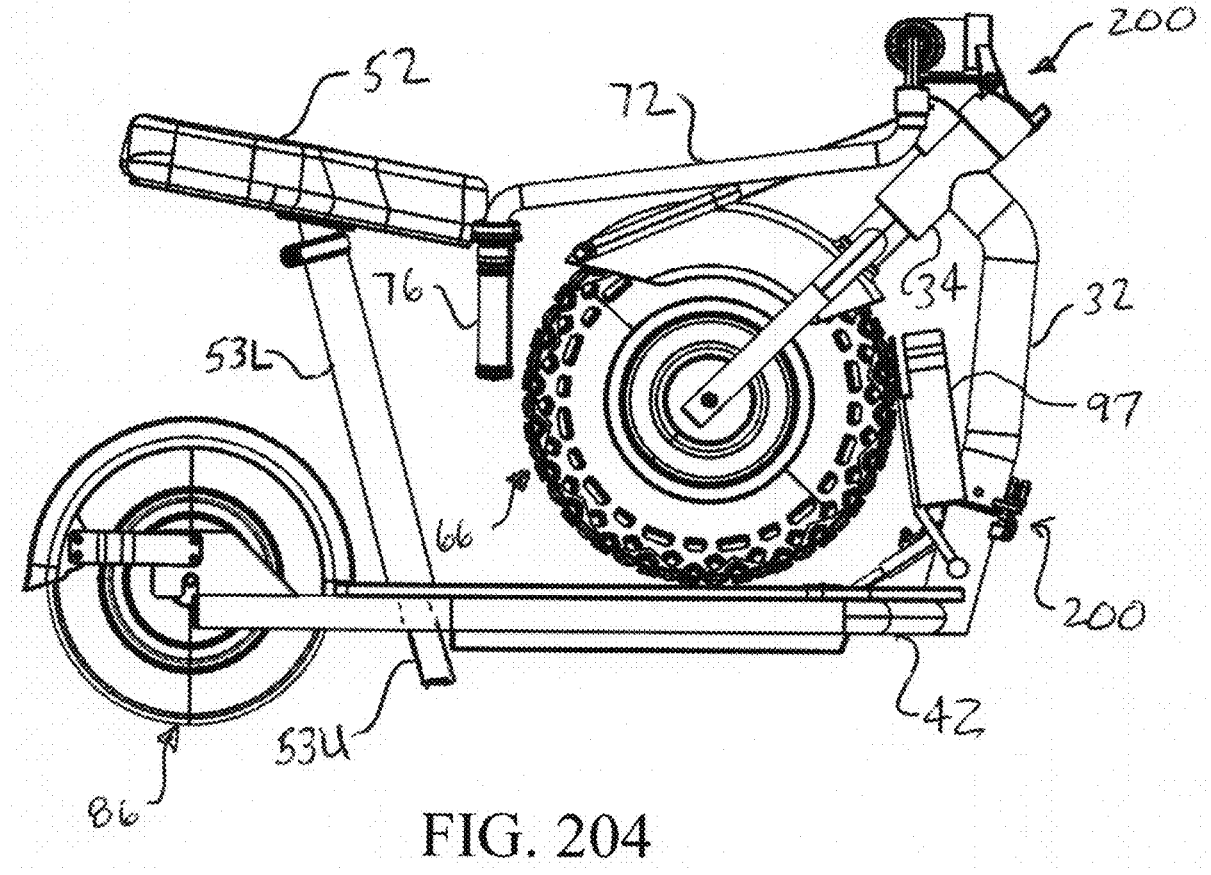
Figures 205, 206, 207, 208:
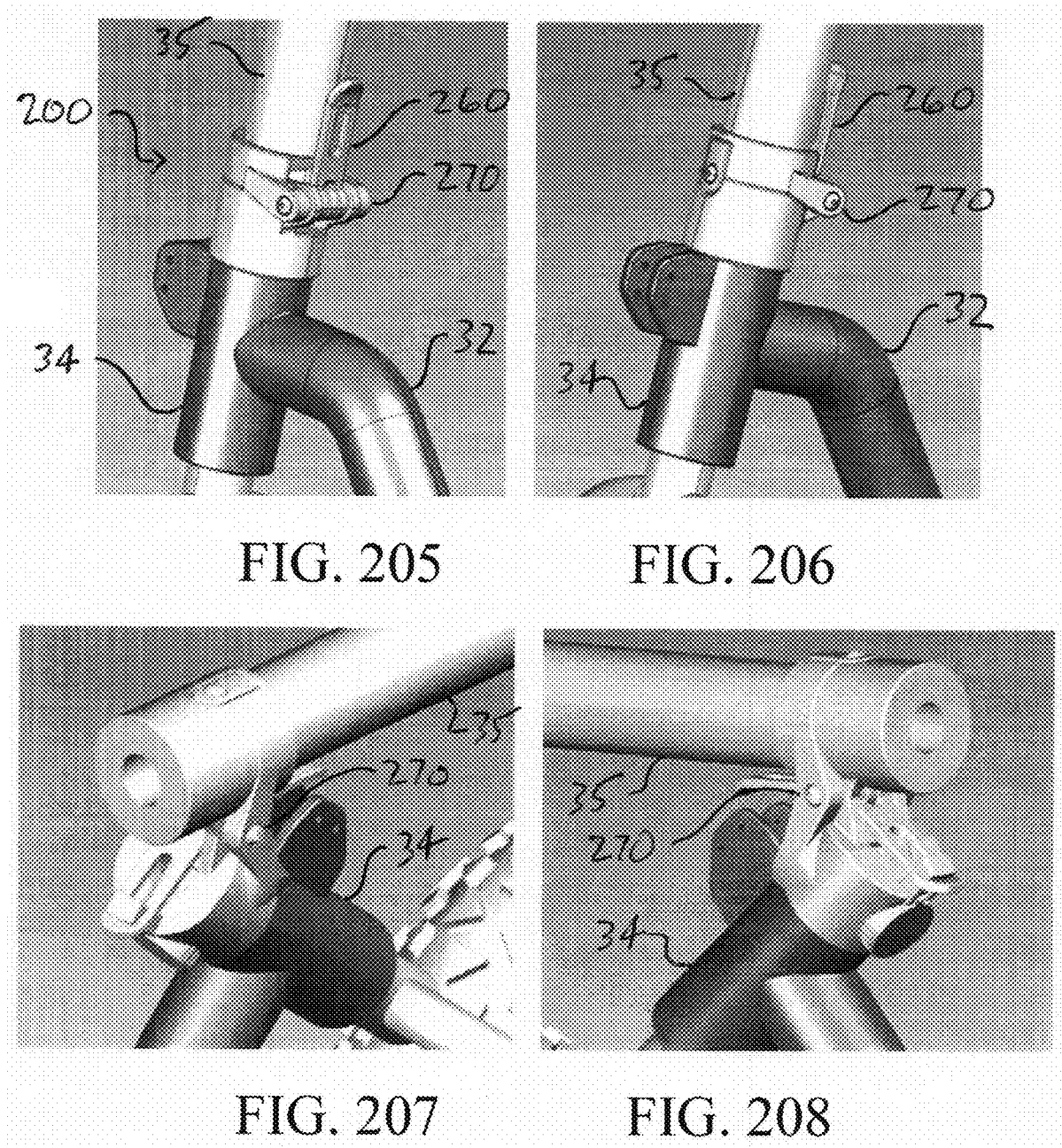
Figures 209, 210:
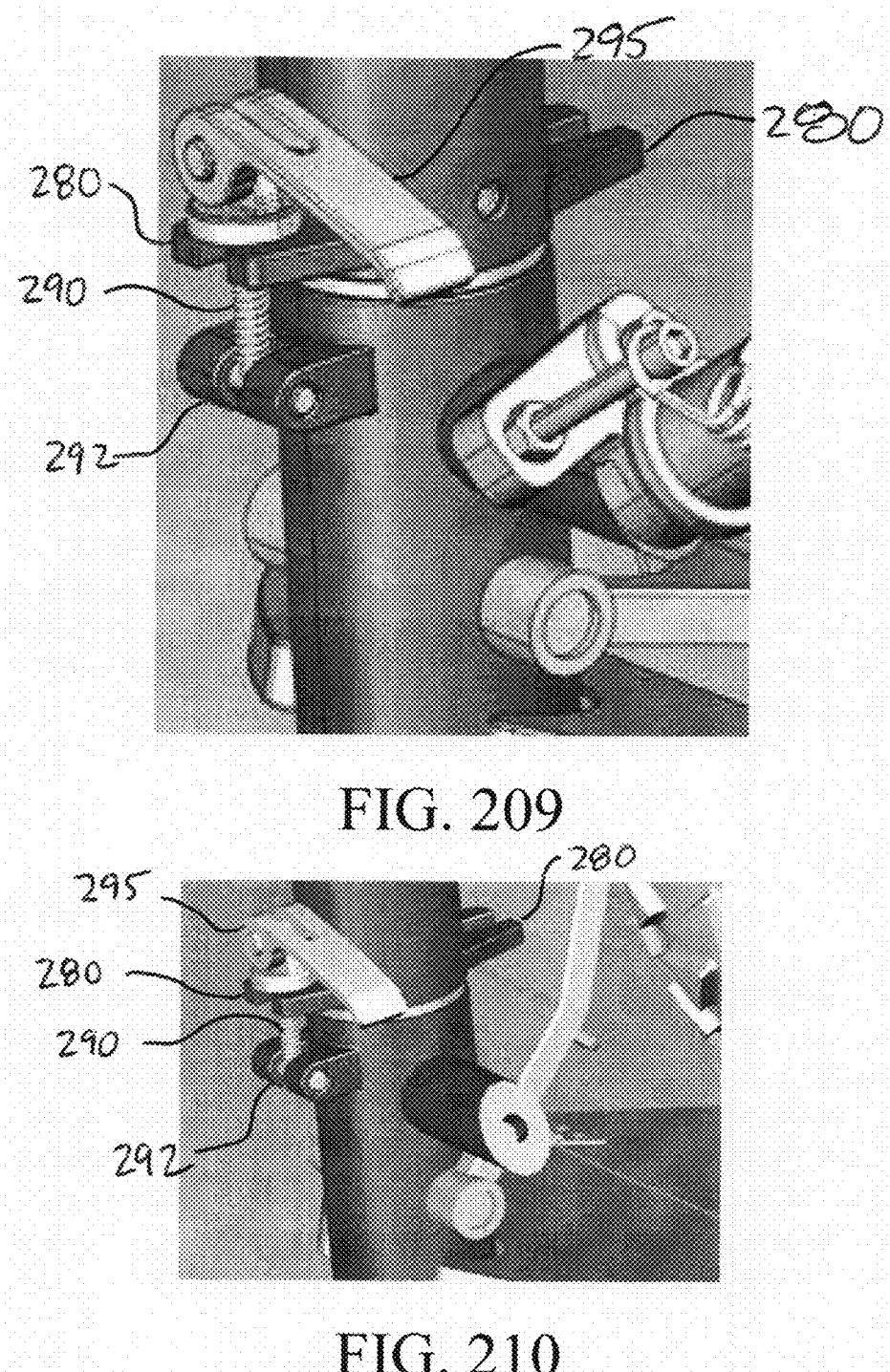

FIG. 121 is a top view of an alternate embodiment of the invention, shown with a golf bag;

FIG. 122 is a bottom view of an alternate embodiment of the invention, shown with a golf bag;

FIG. 123 is a left elevation view of an alternate embodiment of the invention, shown in a folded state;

FIG. 124 is a front left perspective view of the invention alternate embodiment, showing a golf bag;

FIG. 125 is a front elevational view of an alternate embodiment of the invention, shown with a golf bag;

FIG. 126 is a rear elevational view of an alternate embodiment of the invention, shown with a golf bag;

FIG. 127 is a right elevation view of an alternate embodiment of the invention, shown with a golf bag;

FIG. 128 is a left elevation view of an alternate embodiment of the invention, shown with a golf bag;

FIG. 129 is a top view of an alternate embodiment of the invention, shown with a golf bag;

FIG. 130 is a bottom view of an alternate embodiment of the invention, shown with a golf bag;

FIG. 131 is a left elevation view of an alternate embodiment of the invention, shown in a folded state;

FIG. 132 is a left perspective view of the invention alternate embodiment, showing a golf bag;

FIG. 133 is a front elevational view of an alternate embodiment of the invention, shown with a golf bag;

FIG. 134 is a rear elevational view of an alternate embodiment of the invention, shown with a golf bag;

FIG. 135 is a right elevation view of an alternate embodiment of the invention, shown with a golf bag;

FIG. 136 is a left elevation view of an alternate embodiment of the invention, shown with a golf bag;

FIG. 137 is a top view of an alternate embodiment of the invention, shown with a golf bag;

FIG. 138 is a bottom view of an alternate embodiment of the invention, shown with a golf bag;

FIG. 139 is a perspective view of a golf bag;

FIG. 140 is a front left perspective view of an alternate embodiment of the invention, shown in a folded state;

FIG. 141 shows a frame tube bearing assembly;

FIG. 142 is a front left perspective view of the invention alternate embodiment, showing a golf bag;

FIG. 143 is a front elevational view of an alternate embodiment of the invention, shown with a golf bag;

FIG. 144 is a rear elevational view of an alternate embodiment of the invention, shown with a golf bag;

FIG. 145 is a right elevation view of an alternate embodiment of the invention, shown with a golf bag;

FIG. 146 is a left elevation view of an alternate embodiment of the invention, shown with a golf bag;

FIG. 147 is a top view of an alternate embodiment of the invention, shown with a golf bag;

FIG. 148 is a bottom view of an alternate embodiment of the invention, shown with a golf bag;

FIG. 149 is a front left perspective view of a golf bag embodiment;

FIG. 150 is a front elevation view of a golf bag embodiment;

FIG. 151 is a rear elevation view of a golf bag embodiment;

FIG. 152 is a right elevation view of a golf bag embodiment;

FIG. 153 is a top view of a golf bag embodiment;

FIG. 154 is a bottom view of a golf bag embodiment;

FIG. 155 is a front left perspective view of the invention alternate embodiment, showing a golf bag;

FIG. 156 is a front elevational view of an alternate embodiment of the invention, shown with a golf bag;

FIG. 157 is a rear elevational view of an alternate embodiment of the invention, shown with a golf bag;

FIG. 158 is a right elevation view of an alternate embodiment of the invention, shown with a golf bag;

FIG. 159 is a left elevation view of an alternate embodiment of the invention, shown with a golf bag;

FIG. 160 is a top view of an alternate embodiment of the invention, shown with a golf bag;

FIG. 161 is a bottom view of an alternate embodiment of the invention, shown with a golf bag;

FIG. 162 is a front left perspective view of the invention alternate embodiment, showing a golf bag;

FIG. 163 is a front elevational view of an alternate embodiment of the invention, shown with a golf bag;

FIG. 164 is a rear elevational view of an alternate embodiment of the invention, shown with a golf bag;

FIG. 165 is a right elevation view of an alternate embodiment of the invention, shown with a golf bag;

FIG. 166 is a left elevation view of an alternate embodiment of the invention, shown with a golf bag;

FIG. 167 is a top view of an alternate embodiment of the invention, shown with a golf bag;

FIG. 168 is a bottom view of an alternate embodiment of the invention, shown with a golf bag;

FIG. 169 is a front left perspective view of the invention alternate embodiment, showing a golf bag;

FIG. 170 is a front elevational view of an alternate embodiment of the invention, shown with a golf bag;

FIG. 171 is a rear elevational view of an alternate embodiment of the invention, shown with a golf bag;

FIG. 172 is a right elevation view of an alternate embodiment of the invention, shown with a golf bag;

FIG. 173 is a left elevation view of an alternate embodiment of the invention, shown with a golf bag;

FIG. 174 is a top view of an alternate embodiment of the invention, shown with a golf bag;

FIG. 175 is a bottom view of an alternate embodiment of the invention, shown with a golf bag;

FIG. 176 is a left elevation view of an alternate embodiment of the invention, shown in a folded state;

FIG. 177 is a front left perspective view of the invention alternate embodiment, showing a golf bag;

FIG. 178 is a front elevational view of an alternate embodiment of the invention, shown with a golf bag;

FIG. 179 is a rear elevational view of an alternate embodiment of the invention, shown with a golf bag;

FIG. 180 is a right elevation view of an alternate embodiment of the invention, shown with a golf bag;

FIG. 181 is a left elevation view of an alternate embodiment of the invention, shown with a golf bag;

FIG. 182 is a top view of an alternate embodiment of the invention, shown with a golf bag;

FIG. 183 is a bottom view of an alternate embodiment of the invention, shown with a golf bag;

FIG. 184 is a front left perspective view of an alternate embodiment of the invention, shown in a folded state;

FIG. 185 is a front left perspective view of the invention alternate embodiment, showing a golf bag;

FIG. 186 is a front left perspective view of the invention alternate embodiment, without a golf bag;

FIG. 187 is two separate rear left perspective views of the invention alternate embodiment, wherein one is non-folded state and the other in a folded state;

FIG. 188 is a front elevation view of an alternate embodiment of the invention, shown with a golf bag;

FIG. 189 is a rear elevation view of an alternate embodiment of the invention, shown with a golf bag;

FIG. 190 is a right elevation view of an alternate embodiment of the invention, shown with a golf bag;

FIG. 191 is a left elevation view of an alternate embodiment of the invention, shown with a golf bag;

FIG. 192 is a top view of an alternate embodiment of the invention, shown with a golf bag;

FIG. 193 is a bottom view of an alternate embodiment of the invention, shown with a golf bag;

FIG. 194 is a partial front left perspective view of an alternate embodiment of the invention, showing the running board and the bag support base;

FIG. 195 is two partial rear left perspective views of an alternate embodiment of the invention, showing the running board and a battery underneath the running board;

FIG. 196 is a front left perspective view of an alternate embodiment of the invention, shown in a folded state;

FIG. 197 is a front left perspective view of the invention alternate embodiment, showing a golf bag;

FIG. 198 is a front elevational view of an alternate embodiment of the invention, shown with a golf bag;

FIG. 199 is a rear elevational view of an alternate embodiment of the invention, shown with a golf bag;

FIG. 200 is a right elevation view of an alternate embodiment of the invention, shown with a golf bag;

FIG. 201 is a left elevation view of an alternate embodiment of the invention, shown with a golf bag;

FIG. 202 is a top view of an alternate embodiment of the invention, shown with a golf bag;

FIG. 203 is a bottom view of an alternate embodiment of the invention, shown with a golf bag;

FIG. 204 is a left elevation view of an alternate embodiment of the invention, shown in a folded state;

FIG. 205 is a rear left perspective view of steering bracket and steering column;

FIG. 206 is a front left perspective view of steering bracket and steering column;

FIG. 207 is a rear right perspective view of steering bracket and steering column in a folded state;

FIG. 208 is a rear left perspective view of steering bracket and steering column in a folded state;

FIG. 209 is view of an unfolded steering column and steering column locking mechanism; and FIG. 210 is another view of an unfolded steering column and steering column locking mechanism.

DETAILED DESCRIPTION OF THE INVENTION

The present invention is a personal rideable golf bag cart in the form of a riding cycle used to transport the user along with golf bags loaded with golf clubs and accessories. The rideable golf bag cart/cycle is referred to by the general reference character 10 in the drawings and description. The rideable cart 10 may be used with various golf bags and may exist in multiple embodiments.

Figure 1:
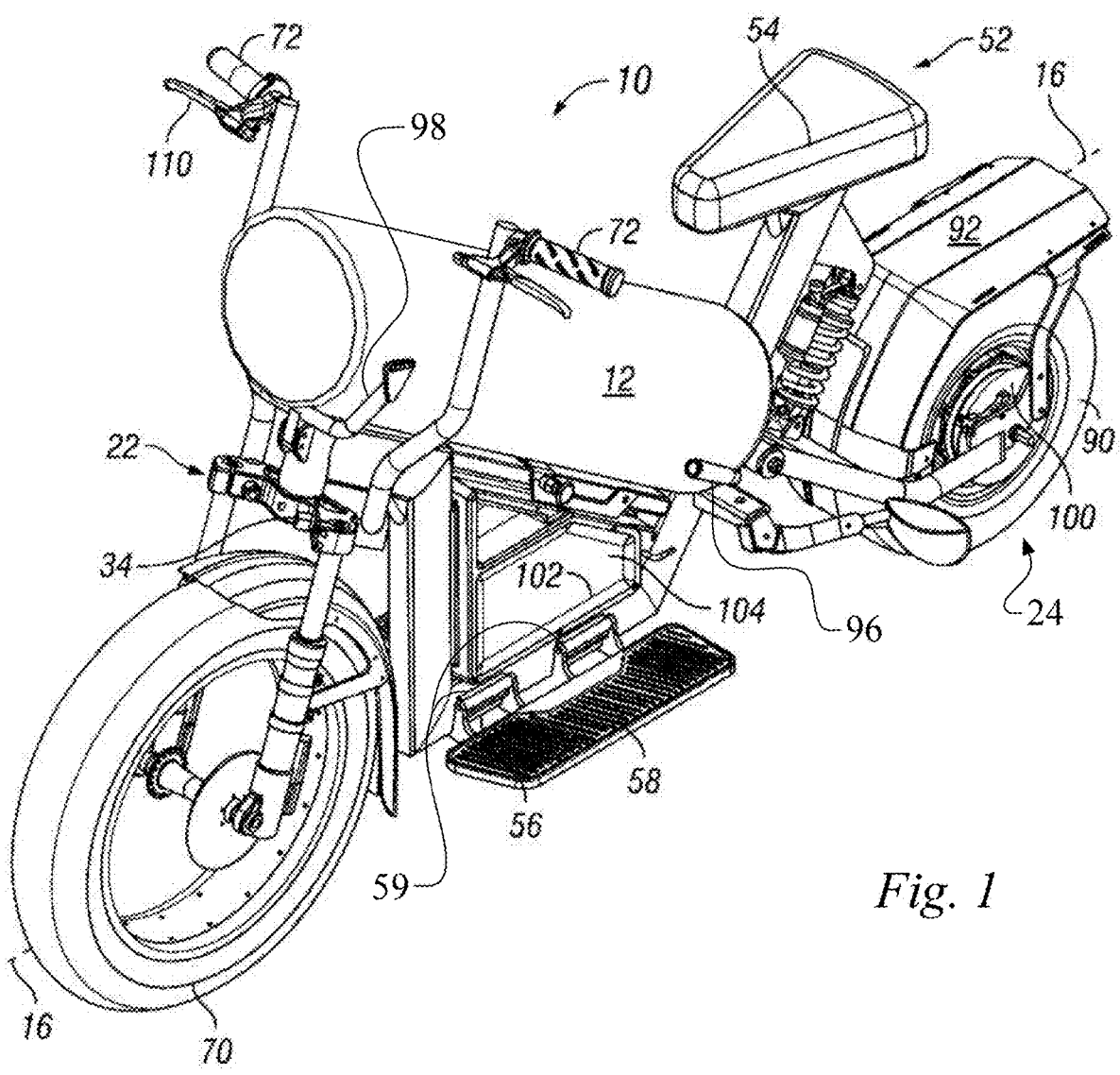
FIG. 1 is a front left perspective view of the powered riding golf bag cart/cycle of the present invention, illustrating a golf bag carried thereon.

In one preferred embodiment of the invention illustrated in FIGS. 1, the rideable cart 10 is shown in a perspective view as appropriate for transporting a typical golf bag 12 as well as a golfer/rider 13 (shown in phantom in FIG. 6). The cart/cycle 10 is generally symmetrical about a vertical (in normal operation) longitudinal plane 16.

The cart/cycle 10 may be thought of as having various principal assemblies or subassemblies (each sometimes referred to in shorthand as a "sba" herein) which operate together in order to function as an easy to use method of transporting a golf bag 12 and rider 13 on the rolling surfaces of a golf course and in other locations such as parking lots and storage facilities. The cart/cycle 10 is not ordinarily intended for use on public roads. The primary subassemblies include: a cycle/frame subassembly (sba) 18; a personal support sba 20; a front wheel and steering sba 22, a rear wheel sba 24, a bag support sba 26, and a motive sba 28. It is understood that some components of the invention interface with others and may be considered to be a part of more than one of the subassemblies. As discussed further below, some of the sbas have structures which allow them to be physically manipulated to create a collapsed/storage mode 30 having a lower and narrower aspect for transport and storage.

The cycle/frame subassembly 18 includes a convoluted frame tube 32, aligned within the vertical longitudinal plane 16, which mates together with a steering bracket 34 at the front of the cycle frame 18 to form a connection with the front wheel/steering sba 22. The frame tube 32 includes a number of component segments 36 extending continuously rearward from the steering bracket 34. The segments 36 are, from the front: a front angle segment 38 extending outward, rearward, and downward; an elongated down segment 40, extending nearly vertically downward; a base segment 42 extending at a right angle (horizontally) to the down segment 40 and extending to the rear wheel sba 24; a rear segment 44 extending upward and rearward at about a forty five degree angle from the base segment 40; and an incline segment 46 extending forward and upward to connect with the upper portions of the personal support sba 20. A shock absorber bracket 50 extends rearward and downward from the upper portion of the rear segment 44 to provide an anchor for mating with the rear wheel sba 24.

The personal support sba 20 is an adjunct to the cycle frame sba 18. The personal support sba 20 includes a seat 52 having a cushion 54. The seat 50 is mounted on and above the incline segment 46. A shock absorber 55 extends from the shock absorber bracket 50 to connect with the rear wheel sba 24 to add comfort. The seat 52 and cushion 54 provide support for the golfer/rider 13 during use.

The personal support sba further includes a pair of includes a pair of running boards 56 pivotally attached on opposing sides of the base segment 42 in order to provide rest for the golfer's feet during use and to aid in mounting the cart/cycle 10. The running boards 56 are attached by a pair of board extensions 58 attached to the bottom of the base segment 42 near the midpoint thereof to extend outward. The board extensions 58 engage a pivot rod 59, upon which the running boards 56 can be rotated to an up position for compact use in the collapsed mode 30 or a down position for use while riding or mounting. A kickstand 60 is also provided on at least one side to prevent the cart/cycle 10 from tipping over when at rest.

Figure 12:
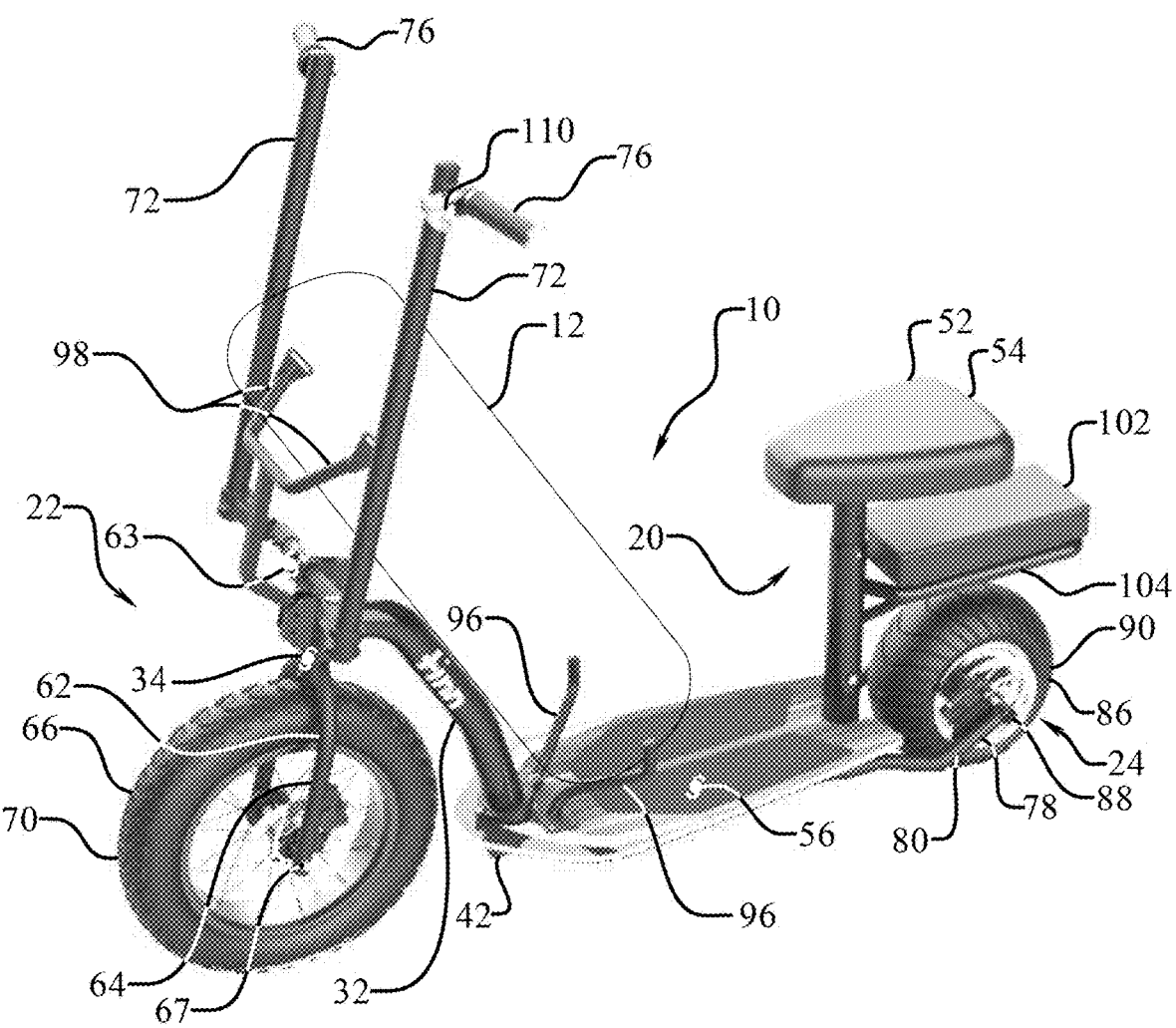
FIG. 12 is a front left perspective view of a powered riding golf bag cart/cycle of an alternate embodiment of the invention, illustrating a silhouette of a golf bag carried thereon.
Figure 13:
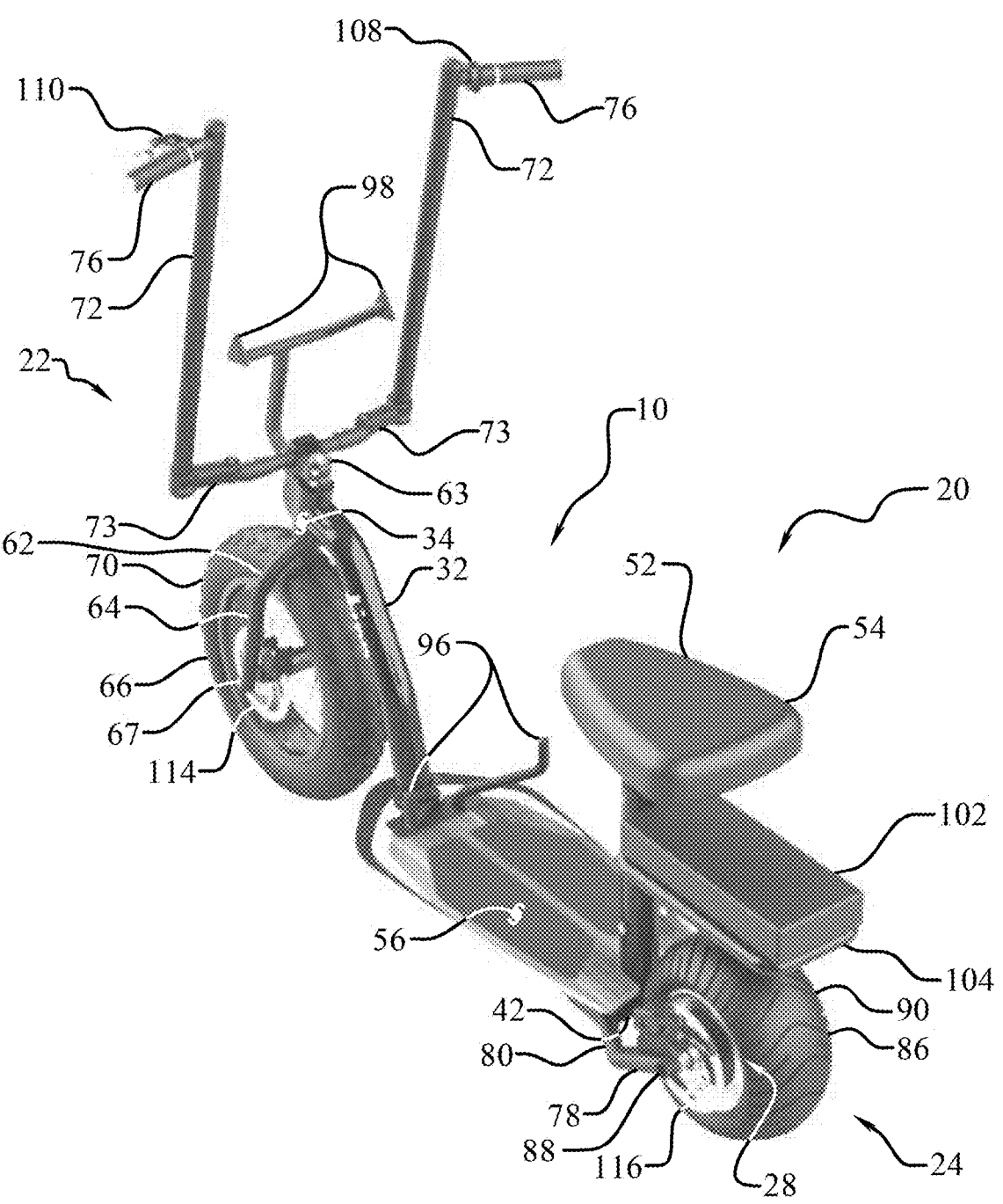
FIG. 13 is a top rear left side perspective view of an alternate embodiment of the invention.

The front wheel/steering subassembly 22 includes a front fork 62 pivotally mounted to depend from the steering bracket 34. The front fork 62 includes a fork bracket 63 pivotally connected to the steering bracket 34 and supports a pair of opposed fork arms 64 depending therefrom, each including a shock absorber 55. Alternatively, in some embodiments the fork bracket 63 is located above the steering bracket 34 and is the location for the handlebars 72 to connect to the rotational assembly that includes the front fork 62, as seen in FIGS. 12 and 13, and therefore the fork bracket 63 may be referred to as the handlebar connector 63 in embodiments where it is located above the steering backed 34, and in embodiments such as that of FIG. 177 is the location that the handlebars 72 are connected to the steering column 35. The fork arms 64 support a front wheel 66 on a front axle 68 extending between the lower extents of the opposing fork arms 64. The front wheel 66 has a substantial diameter and supports a front tire having a moderately wide tread for traction while being pneumatic and relatively soft so as to avoid damaging the turf in use.

Figure 9:
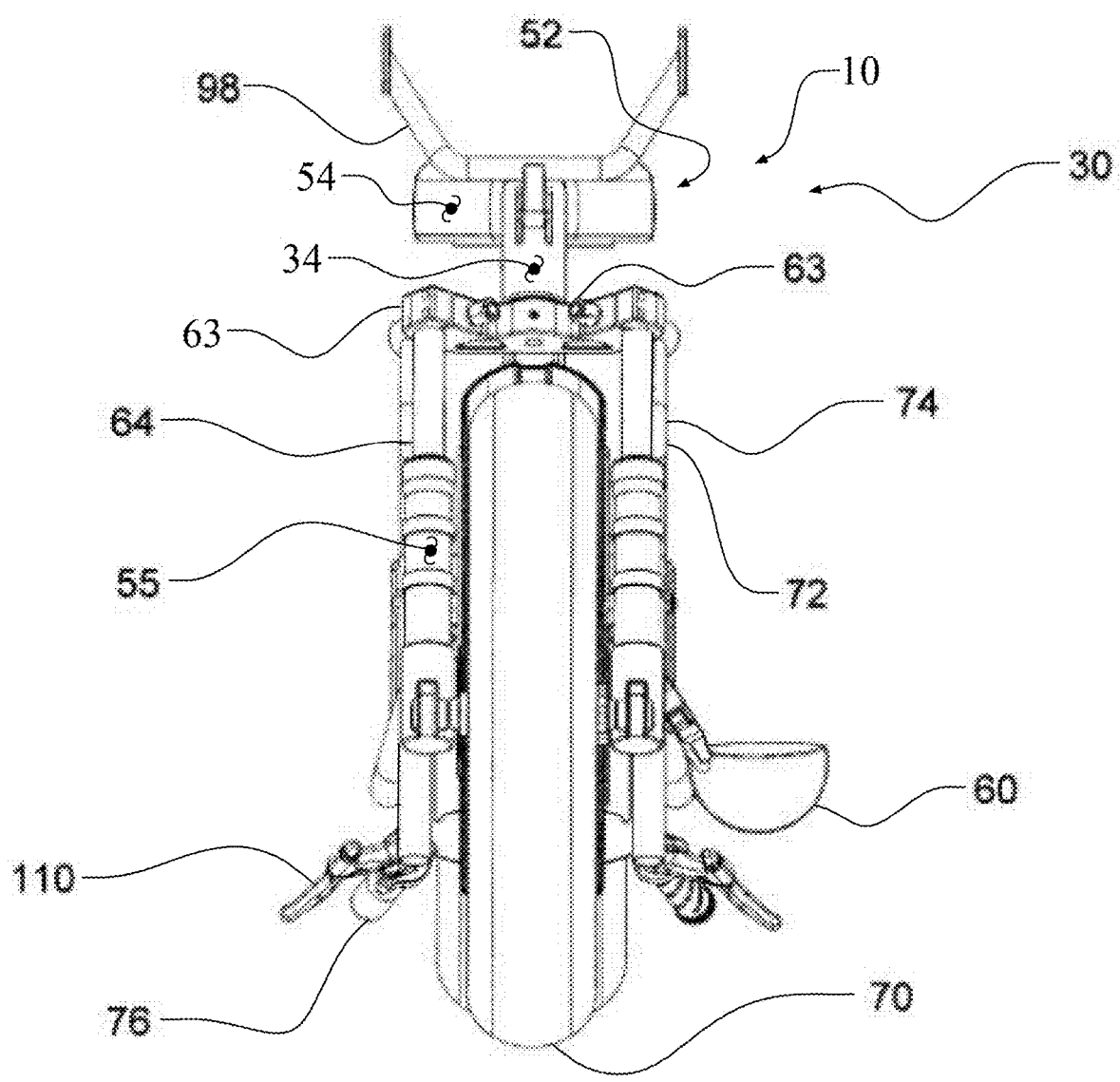
FIG. 9 is a front elevational view, showing the collapsed mode of the invention.

In the preferred embodiments 10 and 118 (FIGS. 10 and 11) the upper portion of the front wheel/steering sba 22 includes a set of handlebars 72 pivotally attached to the fork bracket 63 by pivot tubes 73 on either side. Each handlebar 72 is bent outwards to form a curved tube 74 pivotally extending above the respective pivot tube 73 in order to facilitate steering and turning without impacting the golf bag 12 which extends therebetween. The curved tube 74 extends upward to handle grips 76 for comfortable hand positioning and steering. The pivotal attachment of the handlebars 72 to the fork bracket 63 allows the handlebars 72 to pivot downward around the front 70 tire in the compact storage more 30 (see FIG. 9). The curved tube 74 may also be rotated on the pivot tube 73 such that the handle grips 76 are aligned to be generally parallel with the front tire 70, thus minimizing net width in the collapsed storage mode 30.

Figures 2, 3:
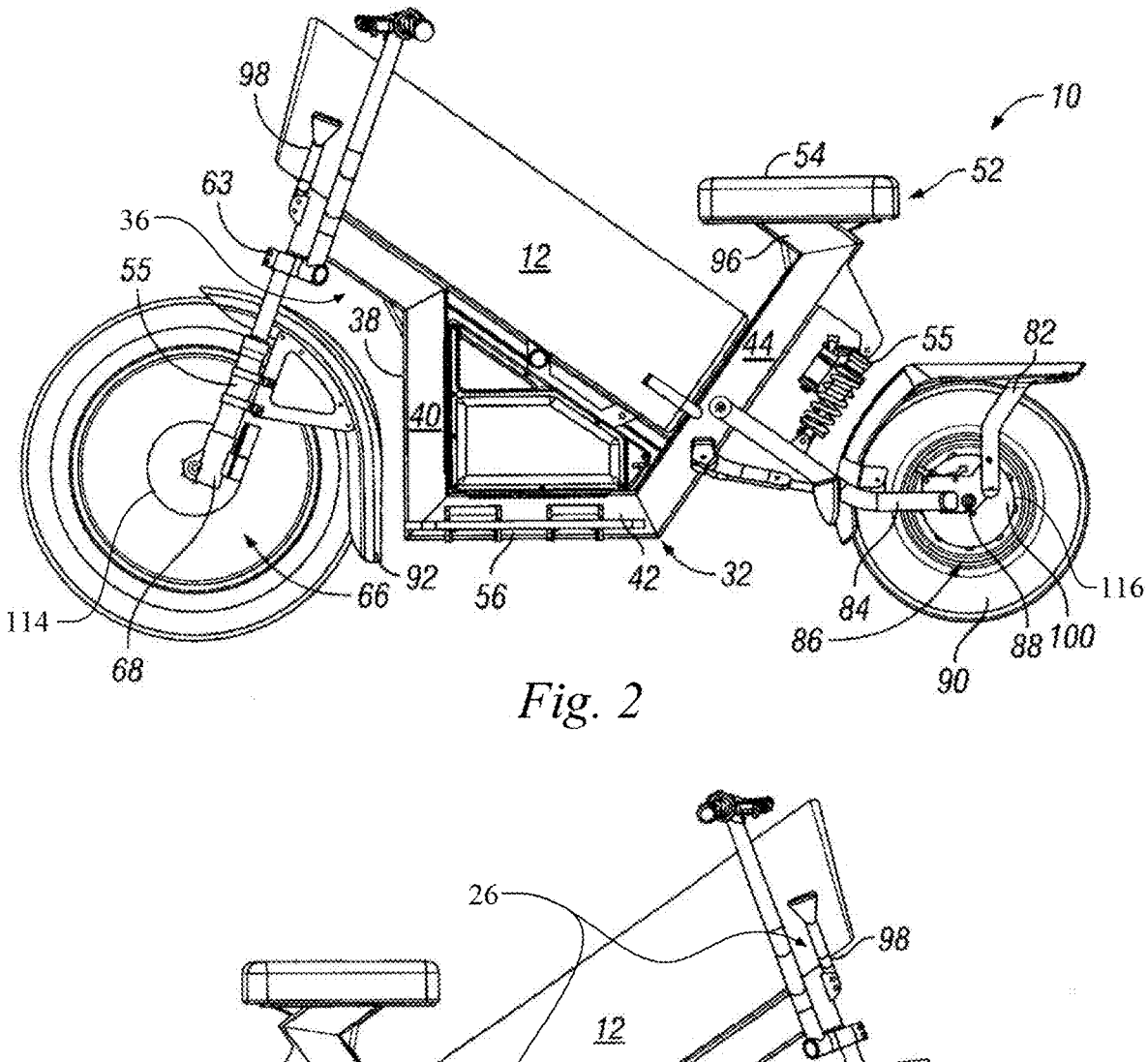
FIG. 2 is a left elevational view of the riding golf bag cart/cycle of the present invention, showing the golf bag.
FIG. 3 a right elevational view of the riding golf bag cart/cycle of the present invention showing the golf bag.
Figure 4:
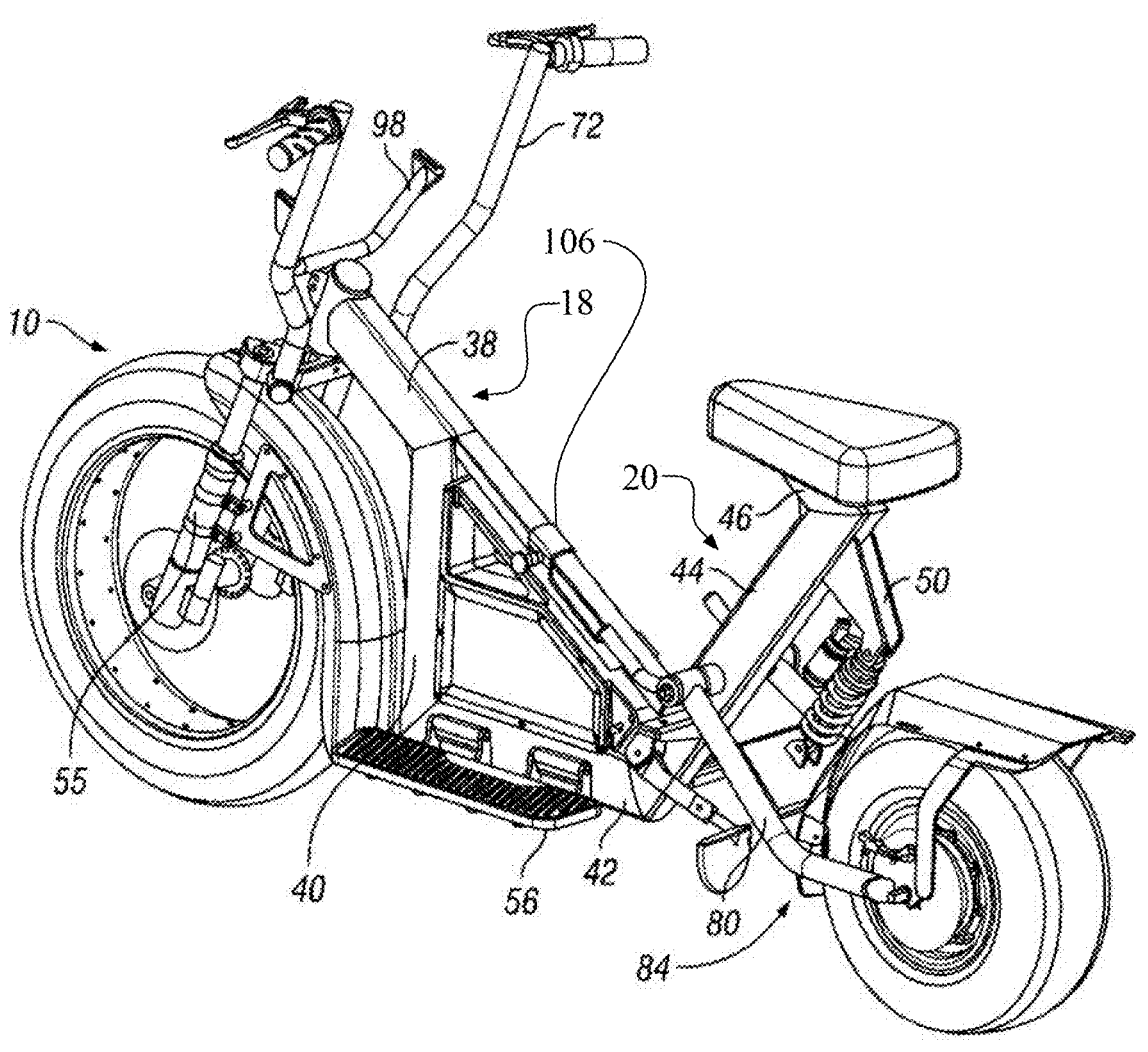
FIG. 4 is a top rear left side perspective view of the present invention, shown without a golf bag.
Figure 7:
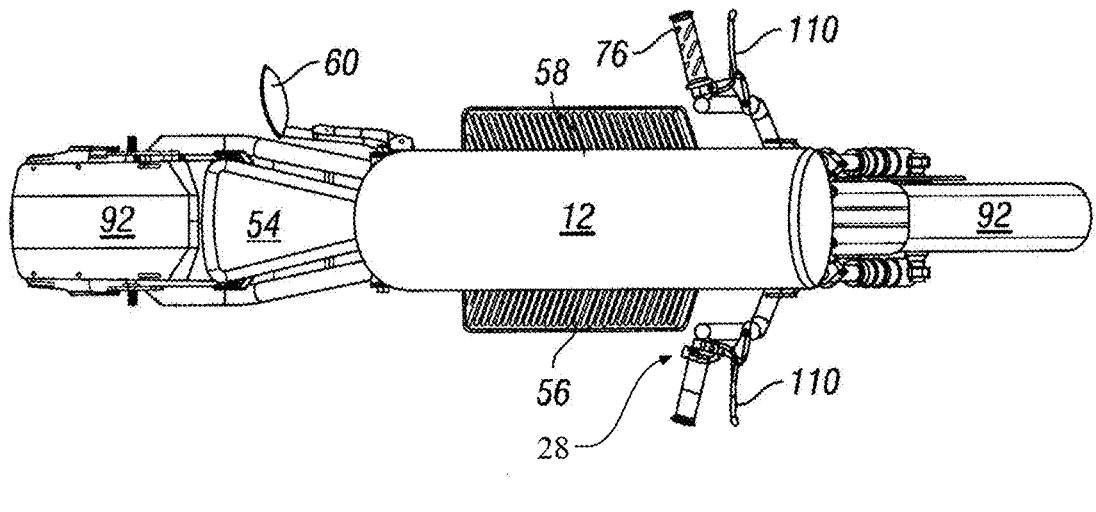
FIG. 7. is a top view of the invention, shown without a golf bag.
Figure 8:
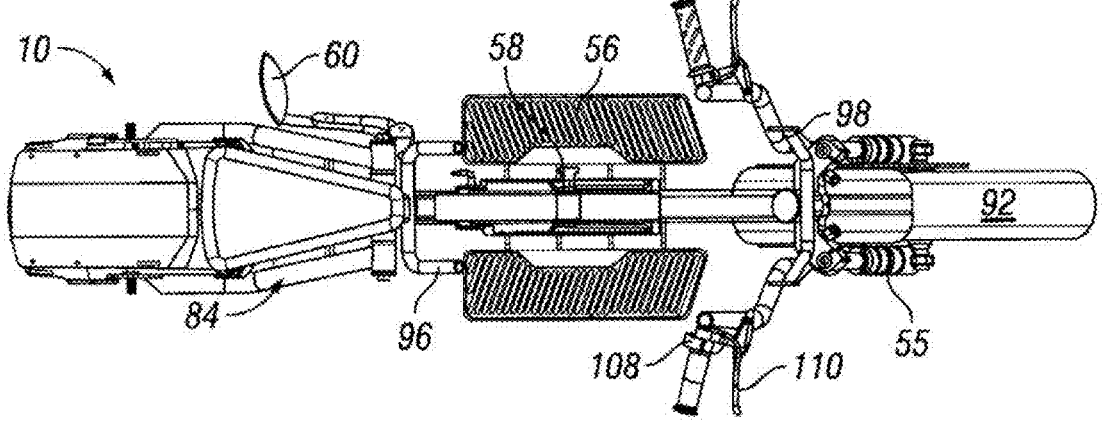
FIG. 8 is a bottom view of the preferred embodiment.

The rear wheel subassembly 24 includes a rear fork 78 including a pair of rear fork arms pivotally attached at proximal ends to the rear segment 44 of the frame sba 18 and extending downward and rearward therefrom. At least one of the rear fork arms 80 attaches to the shock absorber 55 by a connector 82 (see FIG. 2). A distal fork portion 84 of each rear fork 78 supports a rear wheel 86 on a rear axle 88. The rear wheel 86 is much smaller in diameter than the front wheel 66 and supports a rear tire 90. The rear tire 90 is wider than the front tire 70 to provide good driving traction while minimizing impact on the turf of the course. The rear tire 90 may be inflatable or solid. A rear fender 92 attached to the rear fork arms 80 and over the upper portion of the rear tire 90. An optional basket 94 may be mounted on top of the fender 92 to facilitate storage of the rider's possessions and accessories during use.

The bag support sba 26 is adapted to hold the golf bag 12 in place on the cart/cycle 10. The golf bag 12 is supported at about a sixty degree vertical angle (thirty degree horizontal) with the club heads extending forward through the handlebars 72 and above the front wheel 66. The base of the golf bag 12 rests against the rear segment 44 and upon a pair of bag bottom rods 96 which extend forward from the rear segment 44 to hold the bag bottom up and laterally in place.

The bag bottom rods 96 serve as a cradle for the bag bottom. An upper bag cradle 98 is mounted on the steering bracket 34 to laterally cradle the upper part of the golf bag 12 and prevent the bag and clubs from interfering with the handle bars 72. The upper bag cradle 98 is mounted on the frame 18 in such a manner that it is stationary with respect to the handlebars 72 and such that the golf bag 12 is maintained to be centered on the longitudinal plane 16 when the cart/cycle/cycle is steered.

The motive/control sba 28 provides the power to move the cart/cycle 10 and the golfer 13 around the course. The presently preferred embodiments 10 and 118 utilize a rear wheel drive system with an electrical motor 100 and a rechargeable battery 102. The electrical motor 98 is ordinarily a disc motor situated in the hub of the rear wheel 86, but may drive the rear wheel by any of a variety of mechanisms, including a chain drive, or a belt drive. The battery 102 may be mounted at various locations on the cycle frame 18 but the preferred location, illustrated in the drawings, is within a battery cradle 104 mounted on the base segment 42. A removable or hinged retaining bar 106 vertically restrains the battery 102 while facilitating easy removability for recharging.

In the preferred embodiment 10 the electrical motor 100 is powerful enough to propel the cart/cycle 10, the rider 13, and the golf bag 12 and contents around a golf course. For this reason it has to have enough power to climb steep hills and otherwise negotiate difficult terrain. In order to accomplish these purposes the motor 100 may have more power than is considered to be "street legal" in many jurisdictions. For these reasons the present embodiment of the cart/cycle is not intended for use except on golf courses or private property.

The speed of the motor 100 (including "off" and "idle" will typically be regulated by the golfer by a control unit 108 usually mounted on one of the handlebars 72 adjacent to the handle grips 76. A brake actuator 110, also typically situated near a handle grip 74, will control a brake applied to one or both of the front wheel 66 and the rear wheel 86. The front brake 114 will typically be a conventional friction brake while a rear brake 116 may be a motor brake, a disc brake, or a friction brake.

Figure 10:
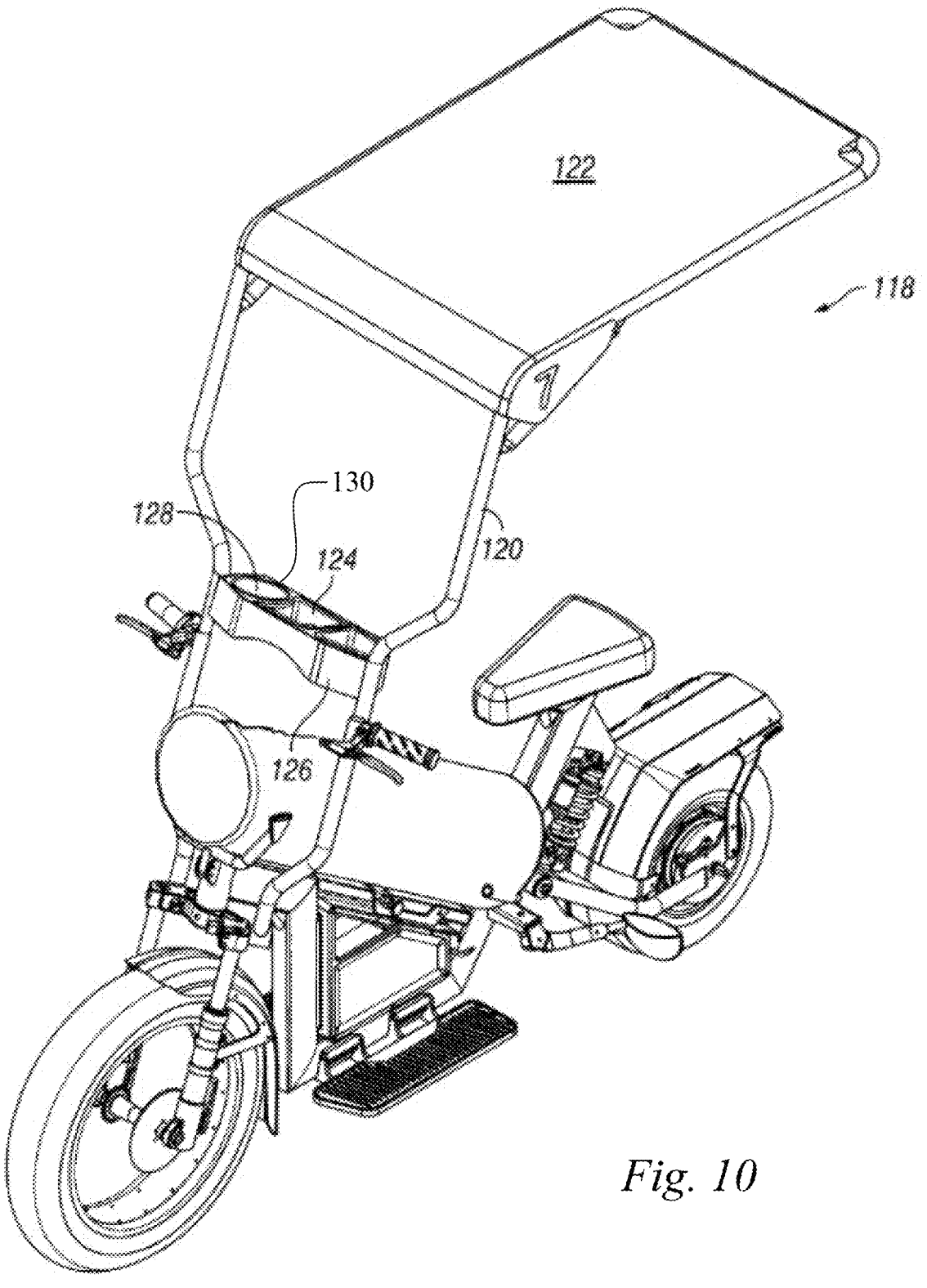
FIG. 10 is a front left perspective view of an alternate preferred embodiment of the invention.
Figure 11:
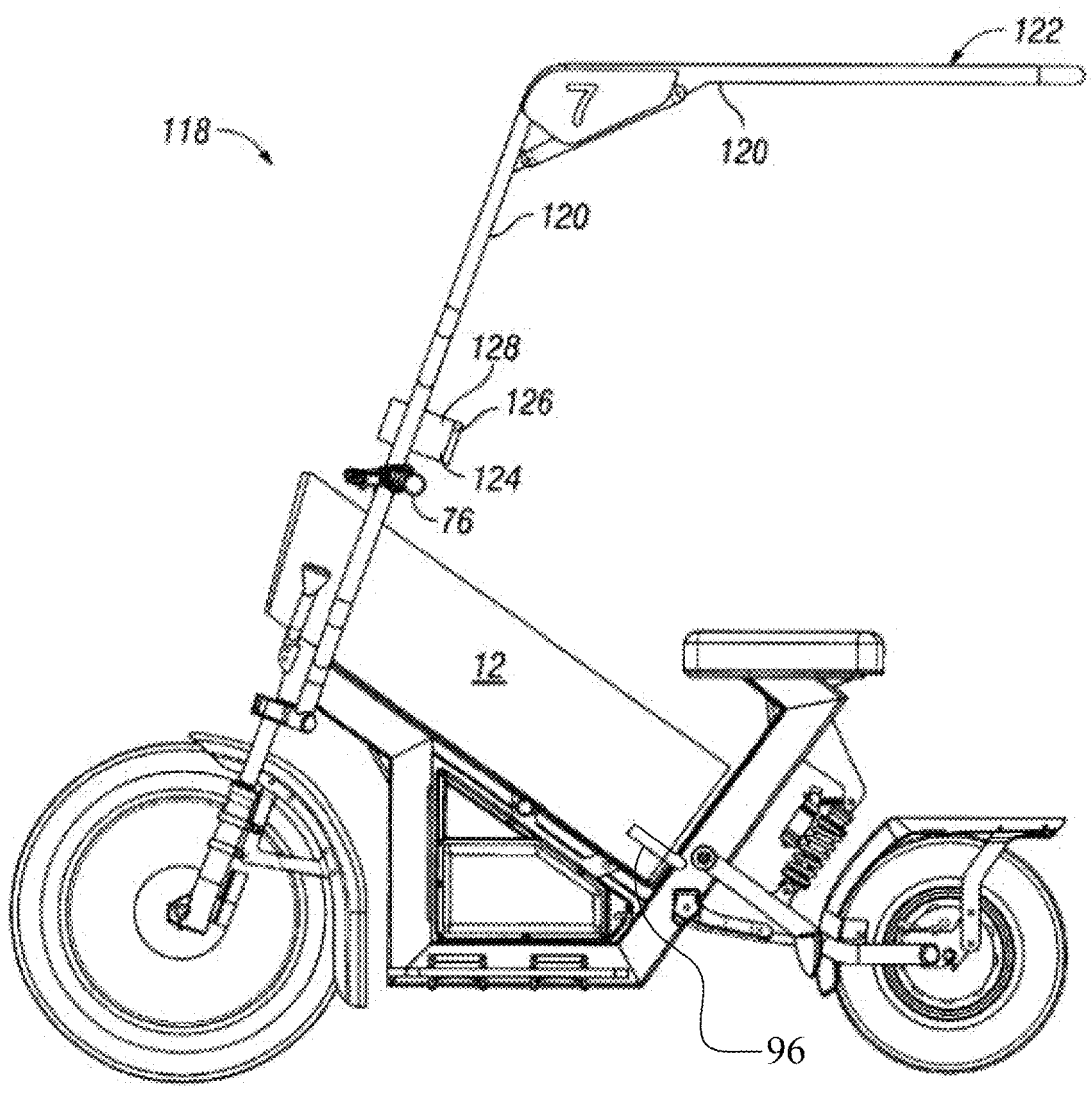
FIG. 11 is a right elevational view of the alternate embodiment.

An alternate embodiment 118 is illustrated in FIGS. 10 and 11. This is basically an enhancement to the previously described invention and includes several components which increase rider comfort and enhanced utilities. All of the overlapping features of the enhanced embodiment 118 are essentially the same as the preferred embodiment 10 except as described below.

The alternate embodiment 118 includes a detachable canopy frame 120 which mounts on the handlebars 72 on both sides inward of the handle grips 76. The canopy frame 120 upward and angles slightly rearward until it is significantly above the head of seated rider 13 and then bends rearward above the rider 13 to support a canopy 122 adapted to provide shade and some rain protection. The canopy frame 120 is relatively rigid and strong while the canopy 122 itself is typically an opaque fabric. It is noted that there is no extension providing rear support to the canopy frame 120 such that minimal impediment to the mounting and dismounting of the rider 13 occurs. Also, the canopy frame 120 and canopy 122 structure are optimized such that does not significant catch the wind and to minimally impact handling.

The canopy frame 120 also supports a console 124 which extends across the canopy frame 120 above the golf bag 12 and at approximately eye level to the rider 13. The console 124 is adjustable to facilitate loading the golf bag 12, either by sliding upward from its normal location of by pivoting out of the way so that it is easy to install and remove the golf bag 12 from the upper bag cradle 98.

The console 124 provides a desired number of compartments 126 suitable for storing small items, holding a drink. The console 124 also supports a display screen 128 (typically touch screen) facing the rider such that GPS information may be utilized and also utilizes a login control 130. The login control function of the display requires the (typically rental) user to: review and acknowledge safe riding instructions; agree to all terms and conditions; and validate prepayment before the control unit 108 is activated to allow powered movement. This streamlines interactions with the pro shop and allows the user to go directly to an unused unit to begin the round, this can be especially desirable to golfers who prepay greens fees and have established tee times. In a personally owned unit, these login controls 130 may be minimized or modified. Further, personally owned units may have a motor restriction in order to be "street legal".

The preferred embodiments 10 and 118 are primarily constructed of cast anodized aluminum for light weight and durability. The wheels 66 and 86 are formed of lightweight structural plastic with cushioned traction surfaces and may either be provided with solid hubs or spoke hubs. In some embodiments rubberlike friction surfaces are also provided to the front tire and the rear tire 90.

Figure 46:
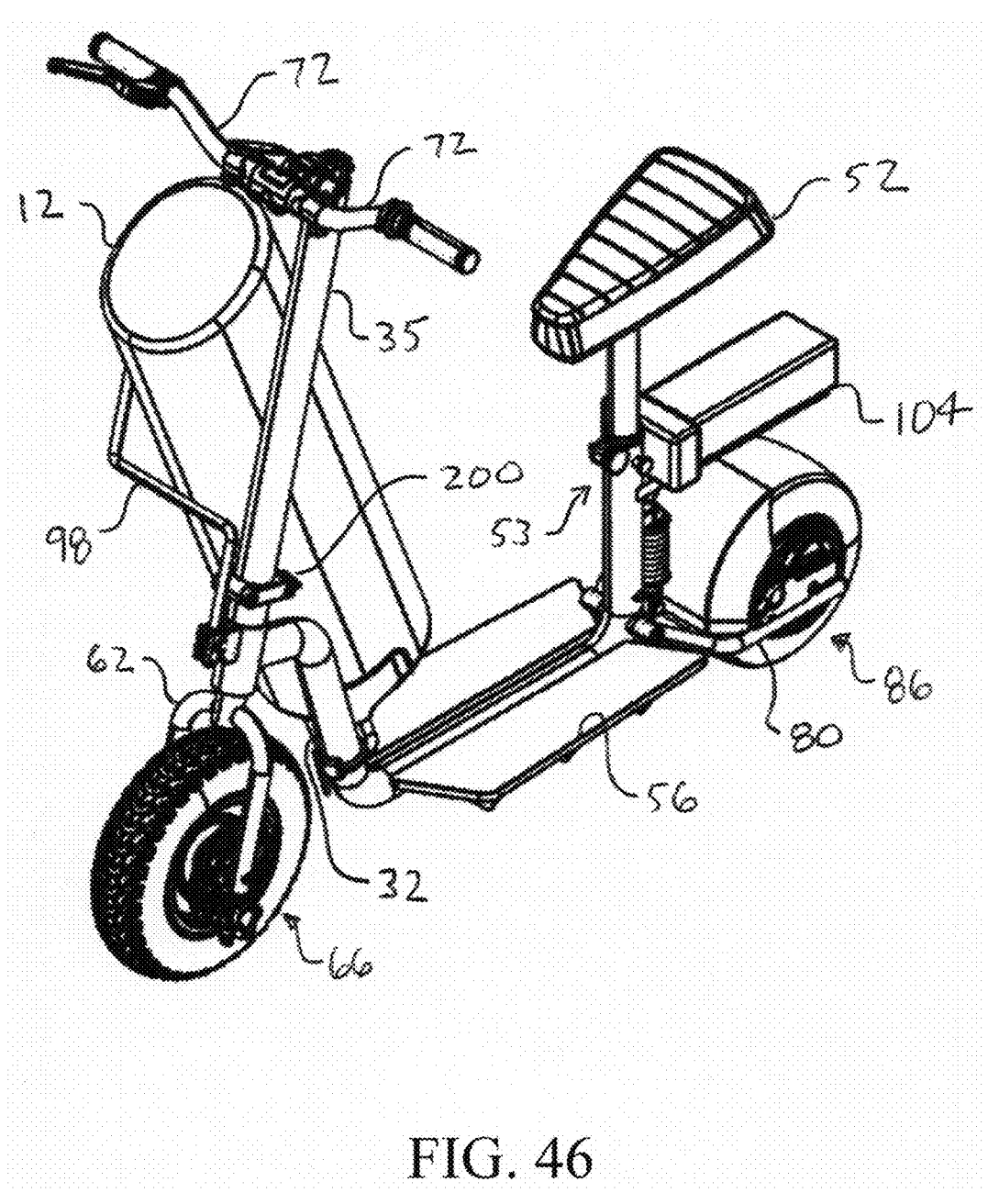
FIG. 46 is a front left perspective view of the invention alternate embodiment, showing a golf bag.
Figures 47, 48:
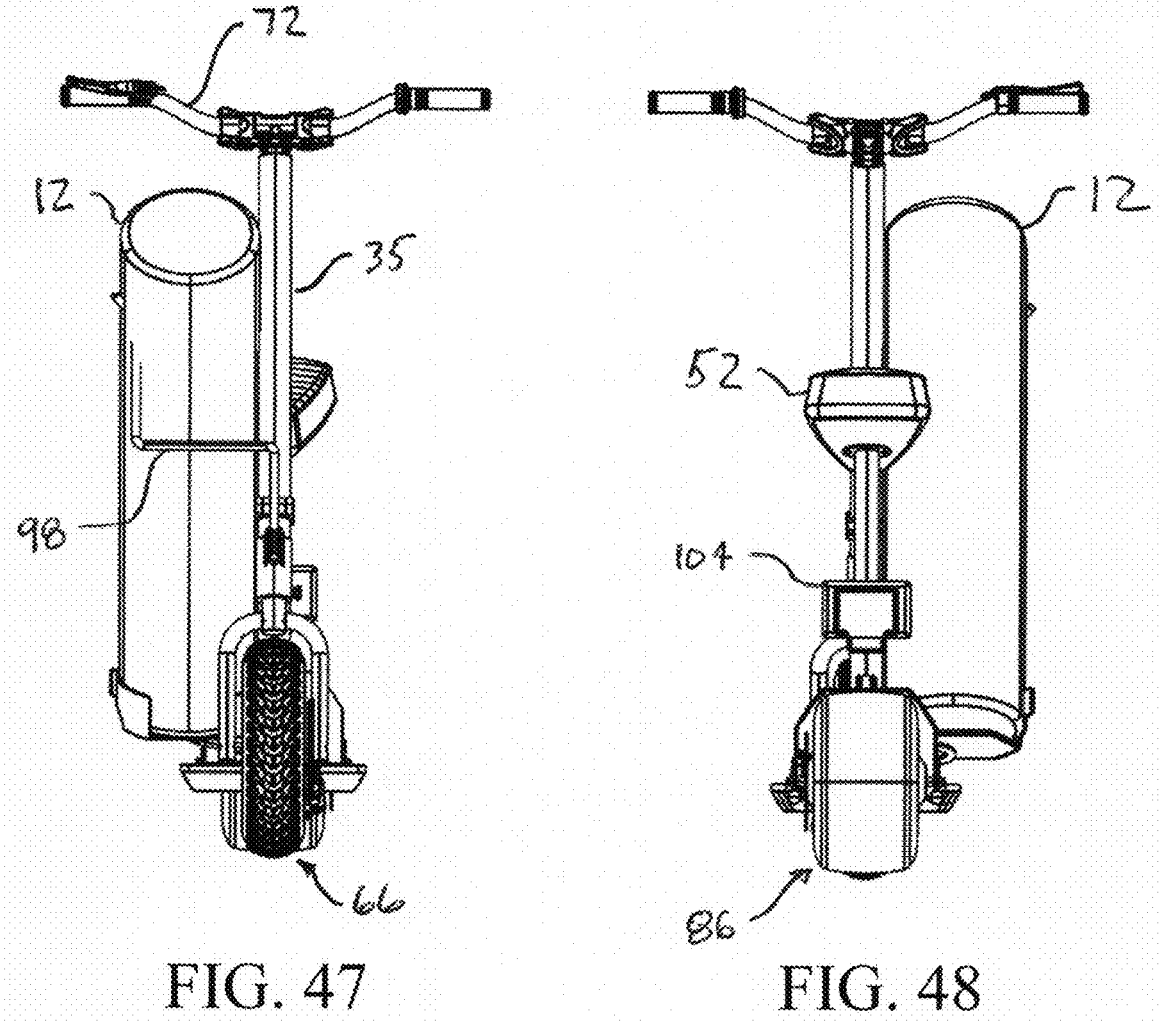
FIG. 47 is a front elevational view of an alternate embodiment of the invention, shown with a golf bag.
FIG. 48 is a rear elevational view of an alternate embodiment of the invention, shown with a golf bag.
Figure 49:
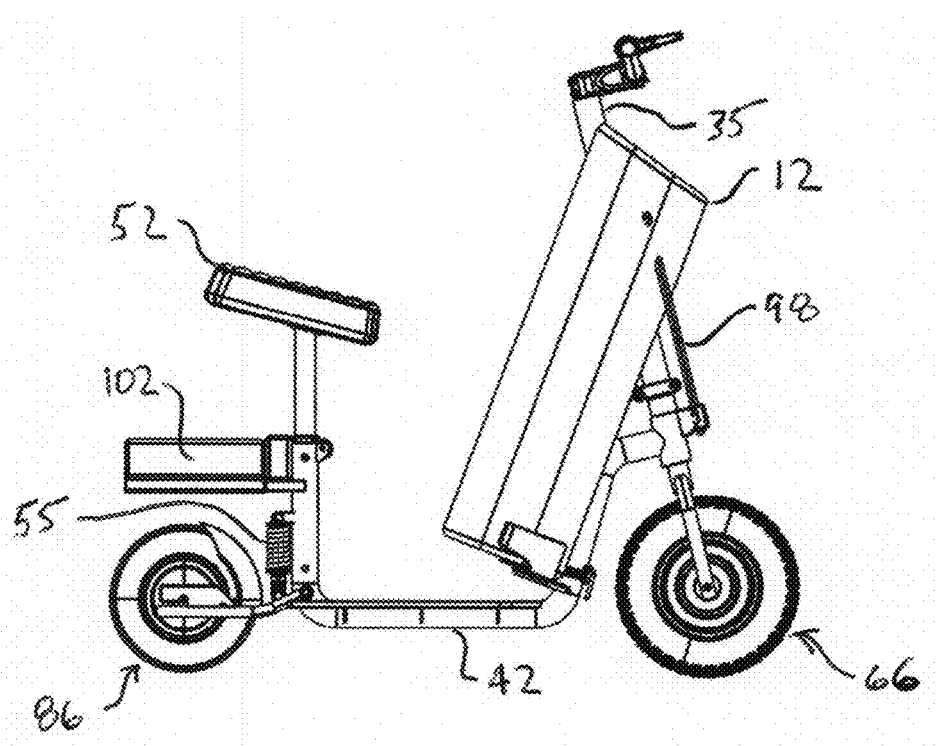
FIG. 49 is a right elevation view of an alternate embodiment of the invention, shown with a golf bag.
Figure 50:
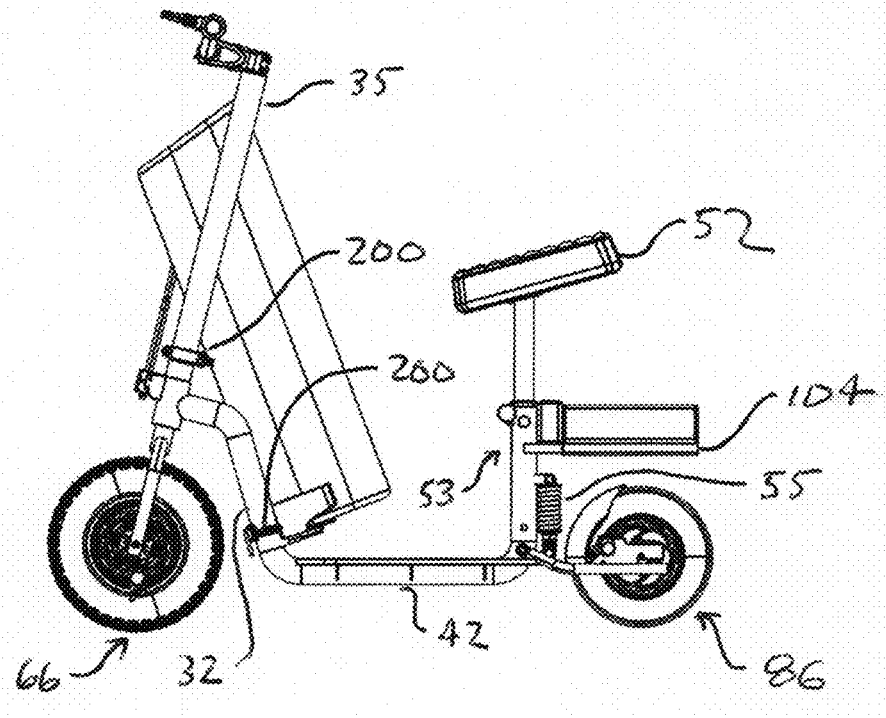
FIG. 50 is a left elevation view of an alternate embodiment of the invention, shown with a golf bag.
Figures 51, 52:
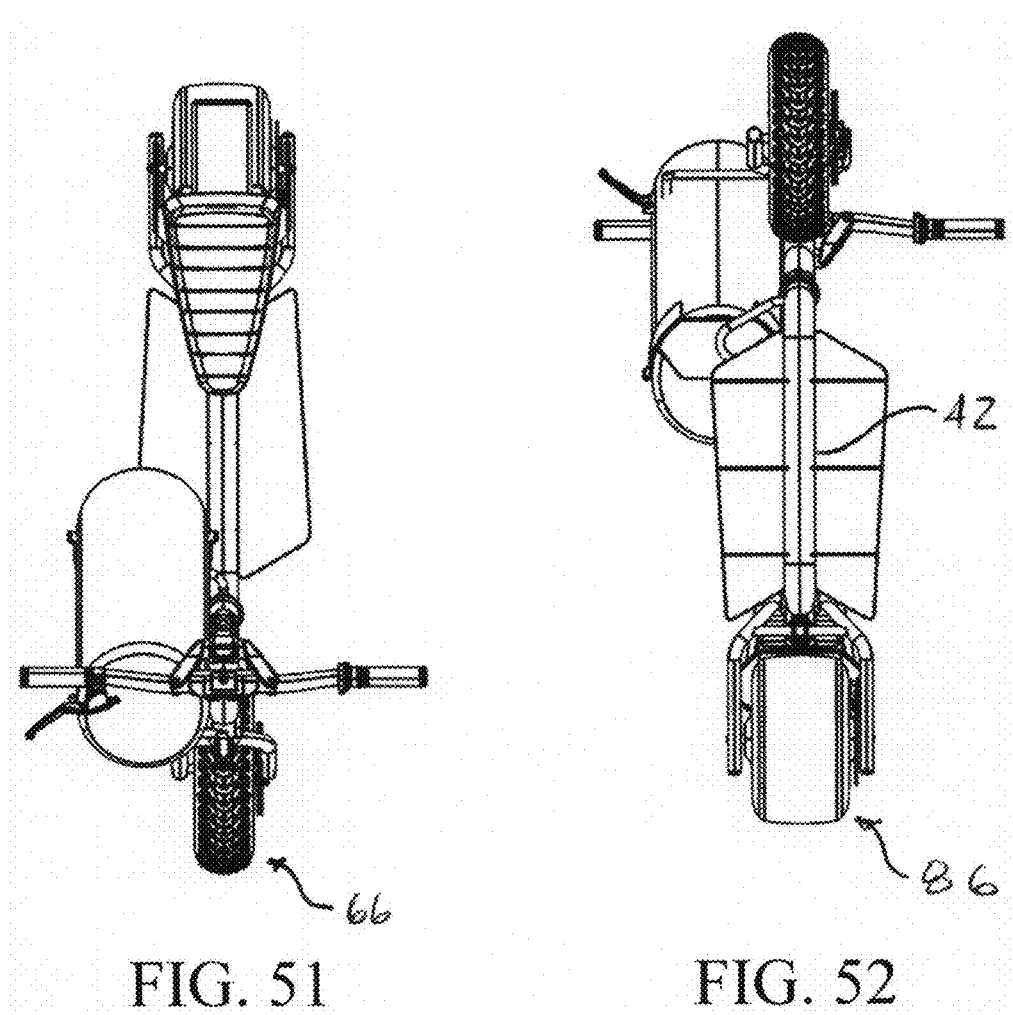
FIG. 51 is a top view of an alternate embodiment of the invention, shown with a golf bag.
FIG. 52 is a bottom view of an alternate embodiment of the invention, shown with a golf bag.
Figure 53:
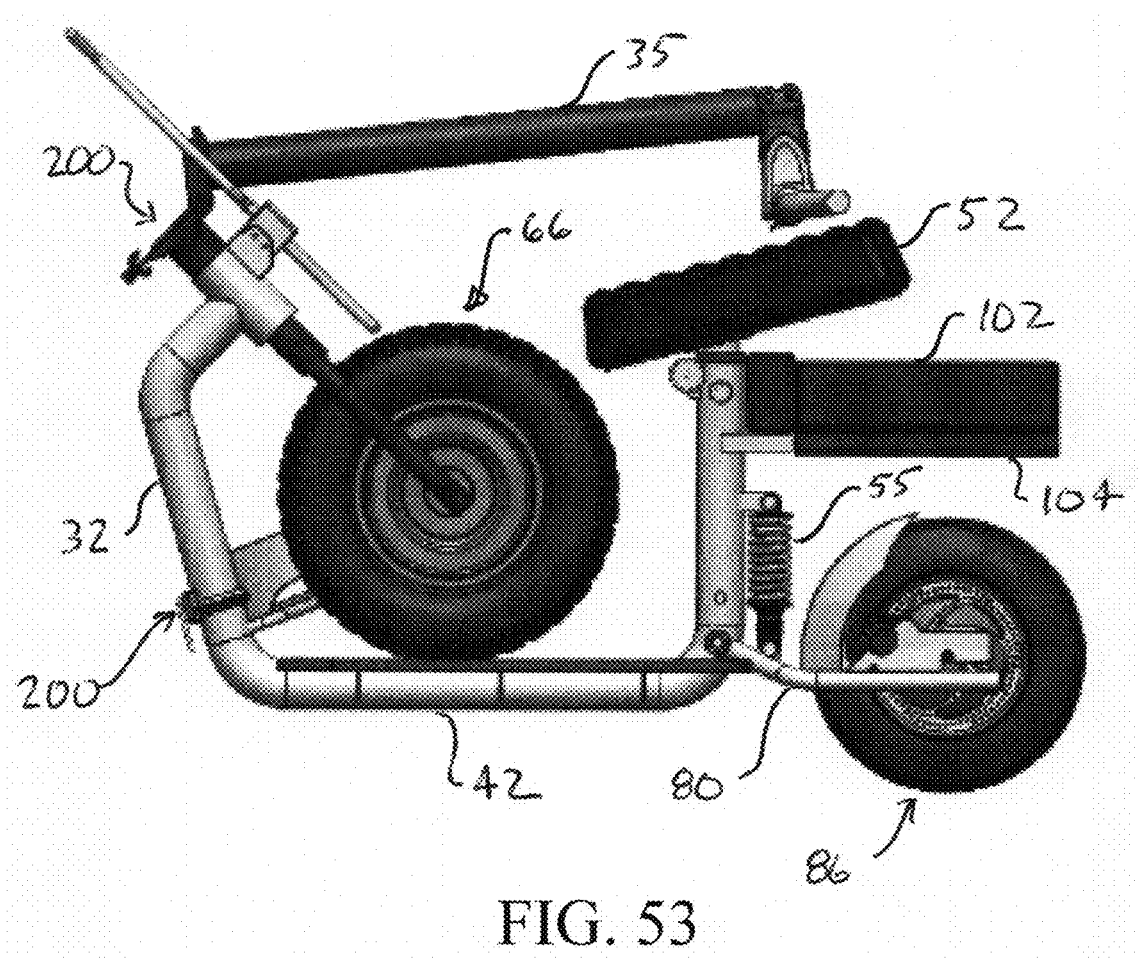
FIG. 53 is a left elevation view of an alternate embodiment of the invention, shown in a folded state.
Figure 54:
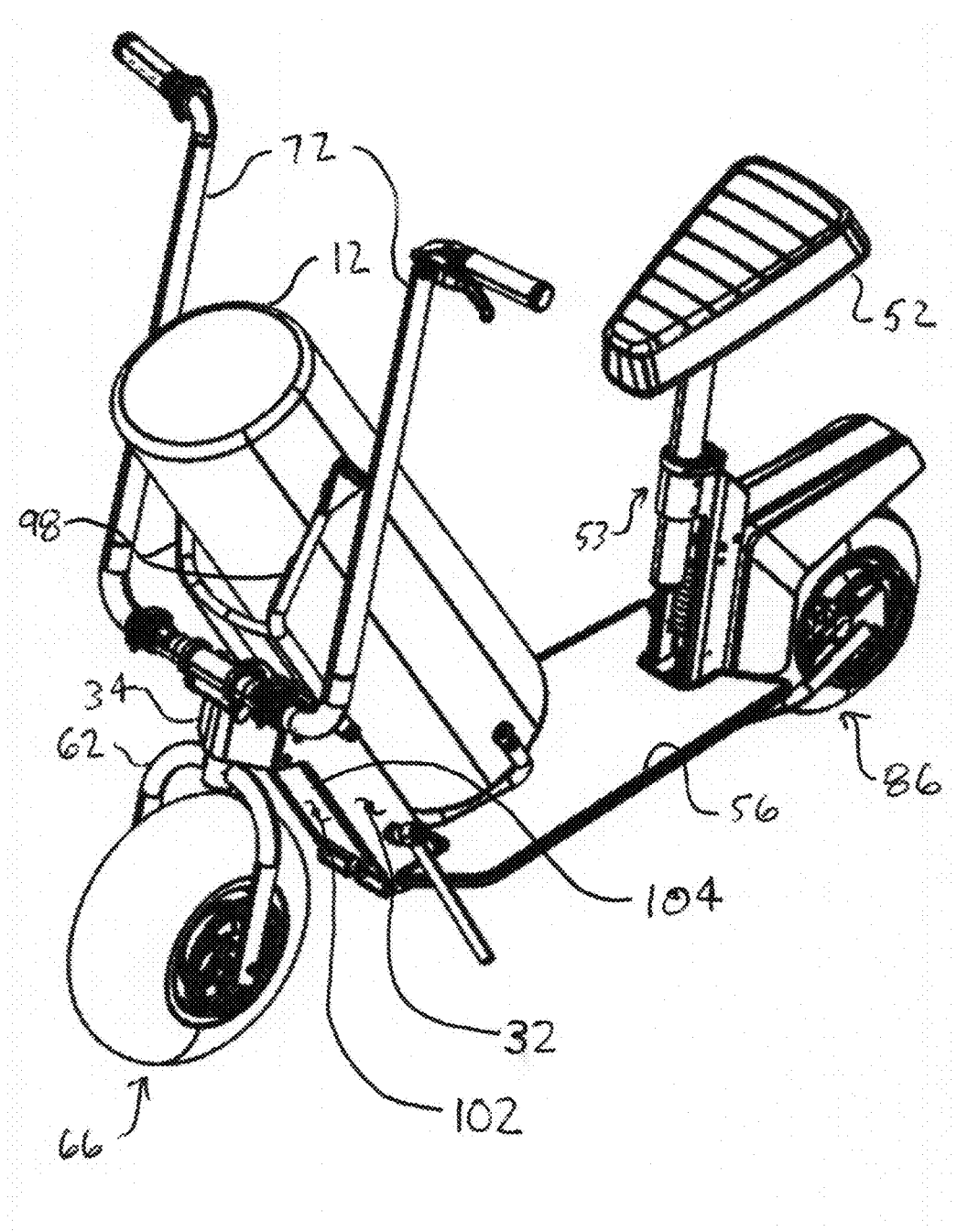
FIG. 54 is a front left perspective view of the invention alternate embodiment, showing a golf bag.
Figure 57:
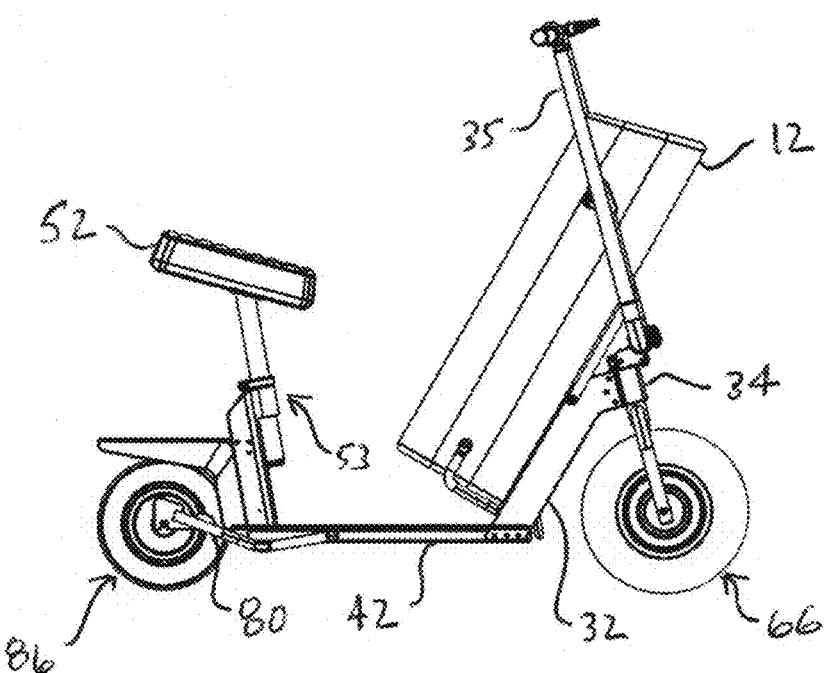
FIG. 57 is a right elevation view of an alternate embodiment of the invention, shown with a golf bag.
Figure 58:
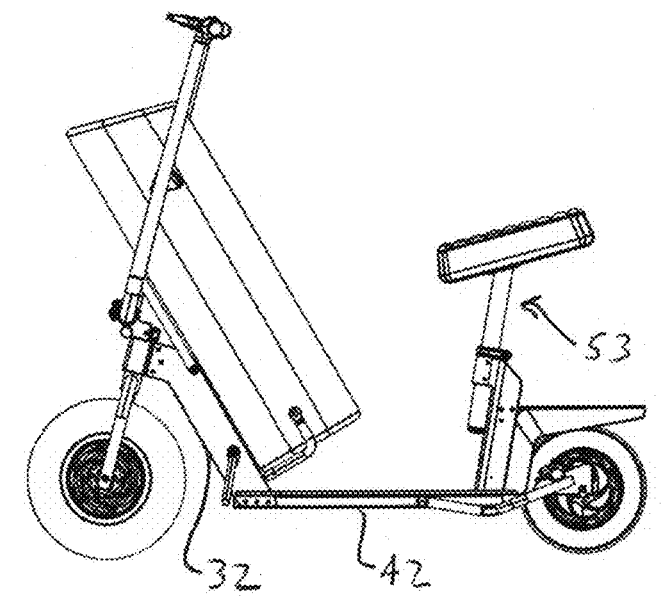
FIG. 58 is a left elevation view of an alternate embodiment of the invention, shown with a golf bag.
Figures 59, 60, 61:
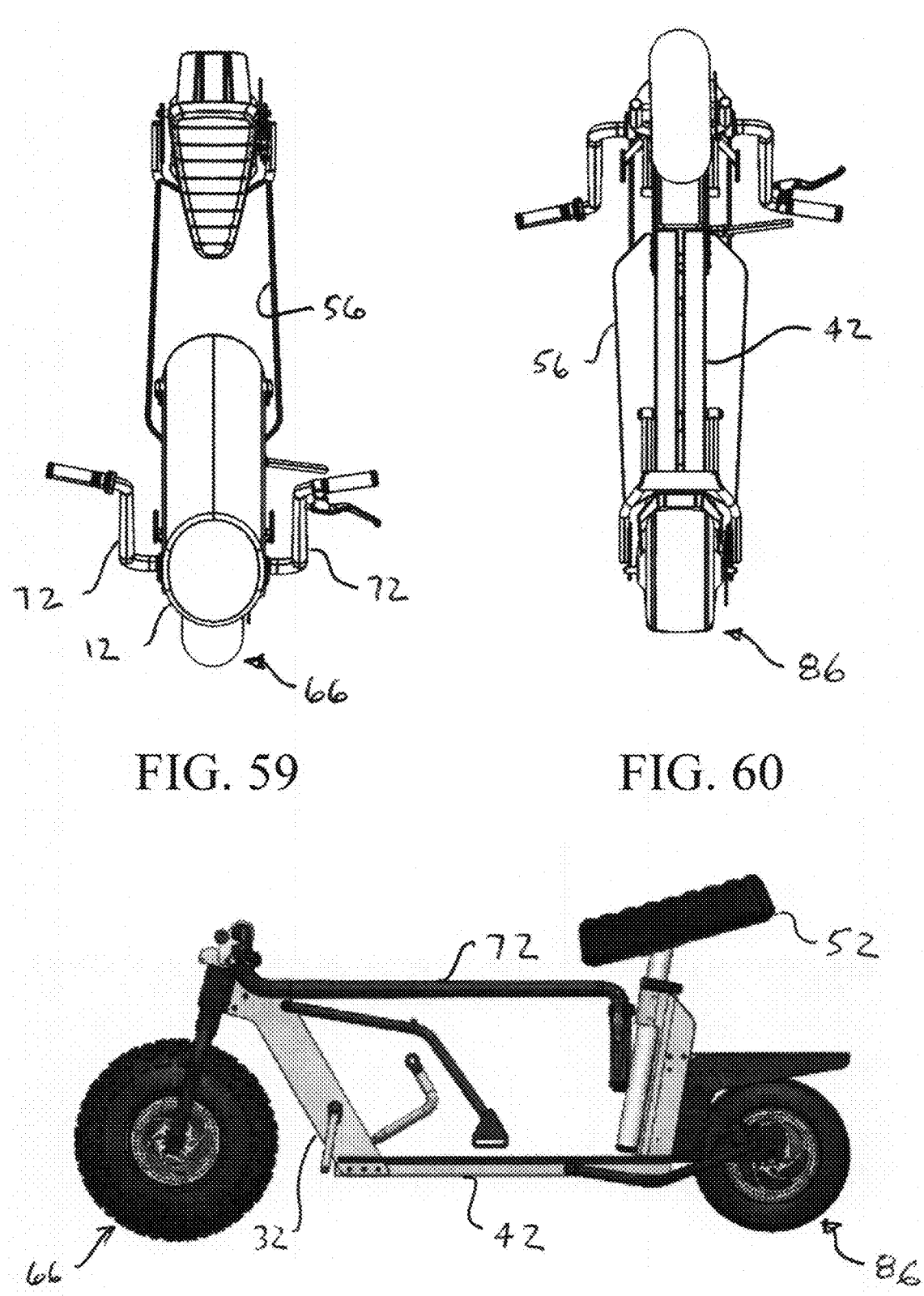
FIG. 59 is a top view of an alternate embodiment of the invention, shown with a golf bag.
FIG. 60 is a bottom view of an alternate embodiment of the invention, shown with a golf bag.
FIG. 61 is a left elevation view of an alternate embodiment of the invention, shown in a folded state.
Figure 62:
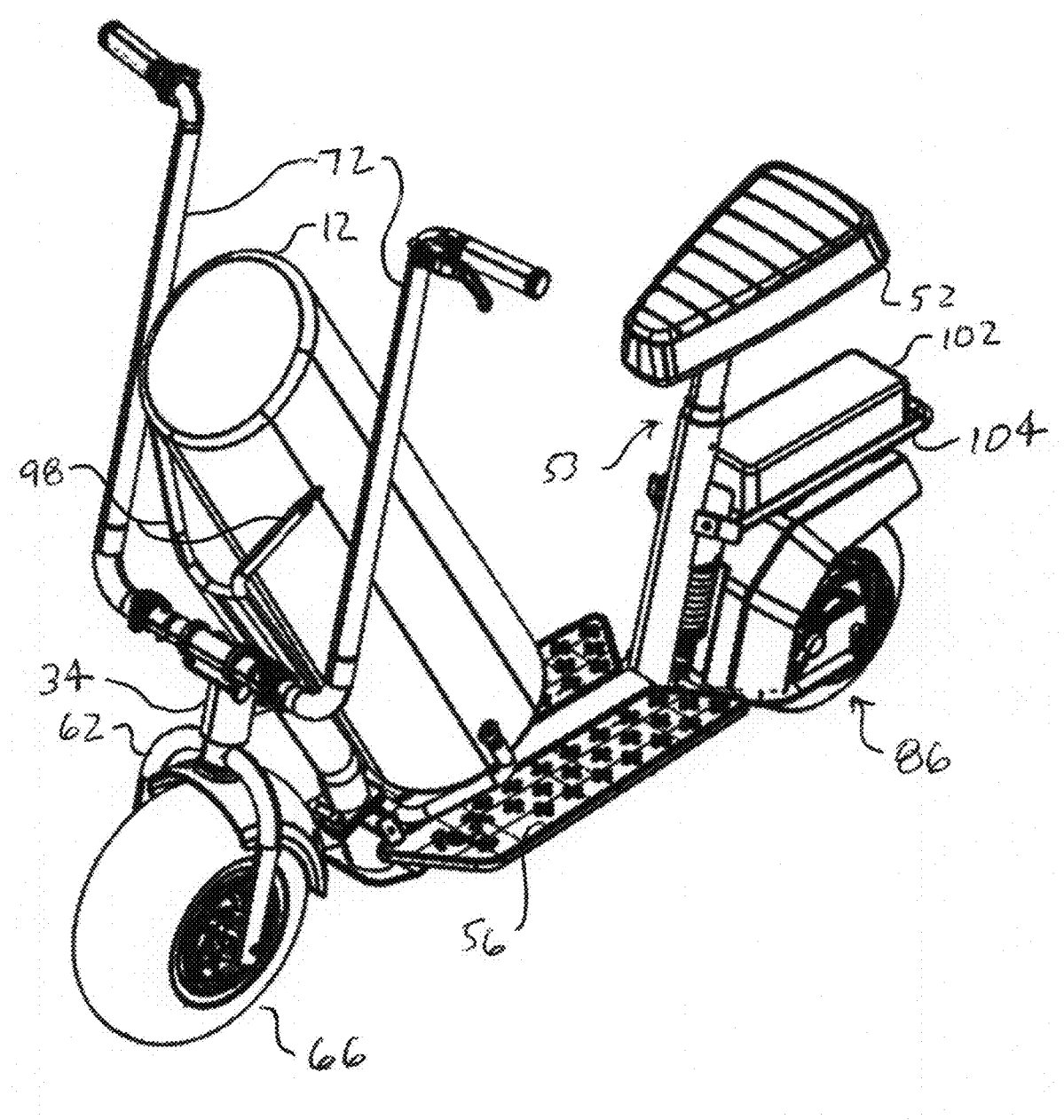
FIG. 62 is a front left perspective view of the invention alternate embodiment, showing a golf bag.
Figures 63, 64:
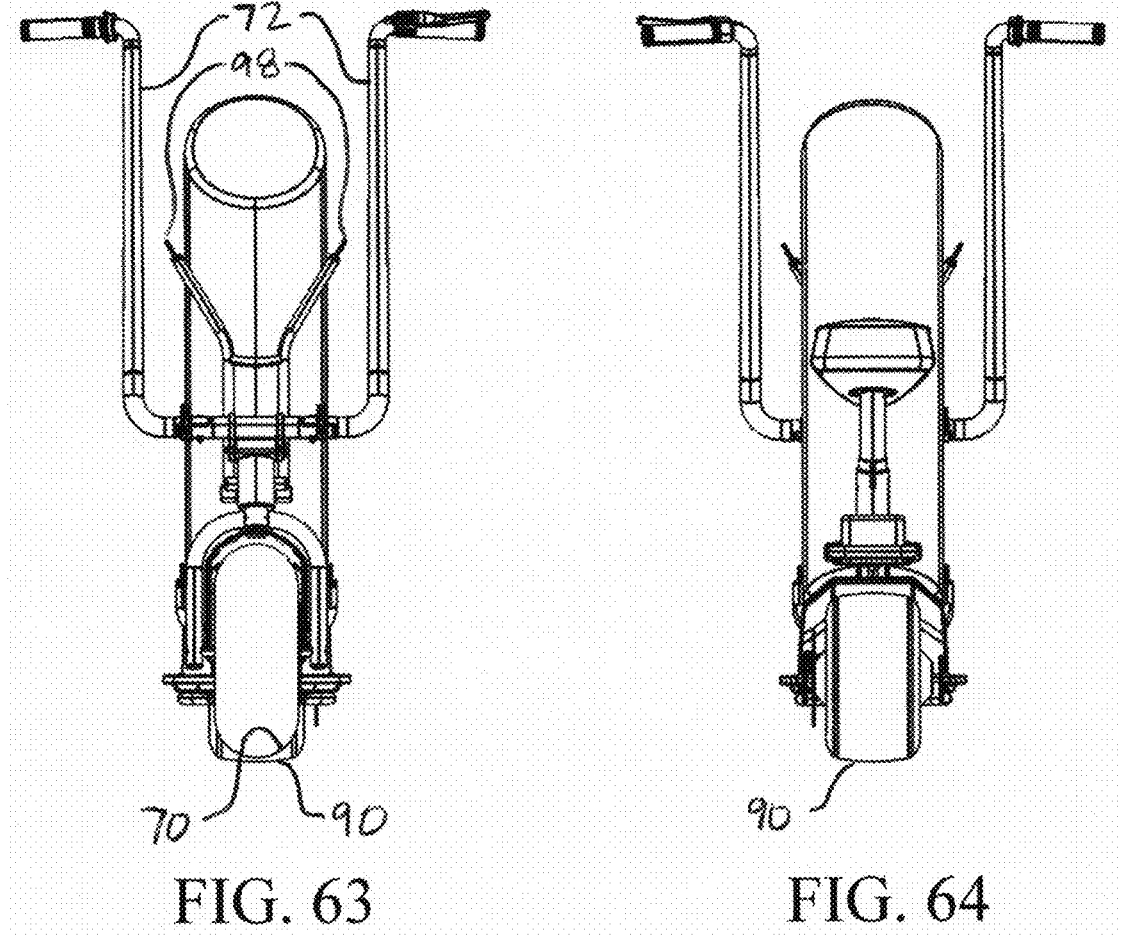
FIG. 63 is a front elevational view of an alternate embodiment of the invention, shown with a golf bag.
FIG. 64 is a rear elevational view of an alternate embodiment of the invention, shown with a golf bag.
Figure 65:
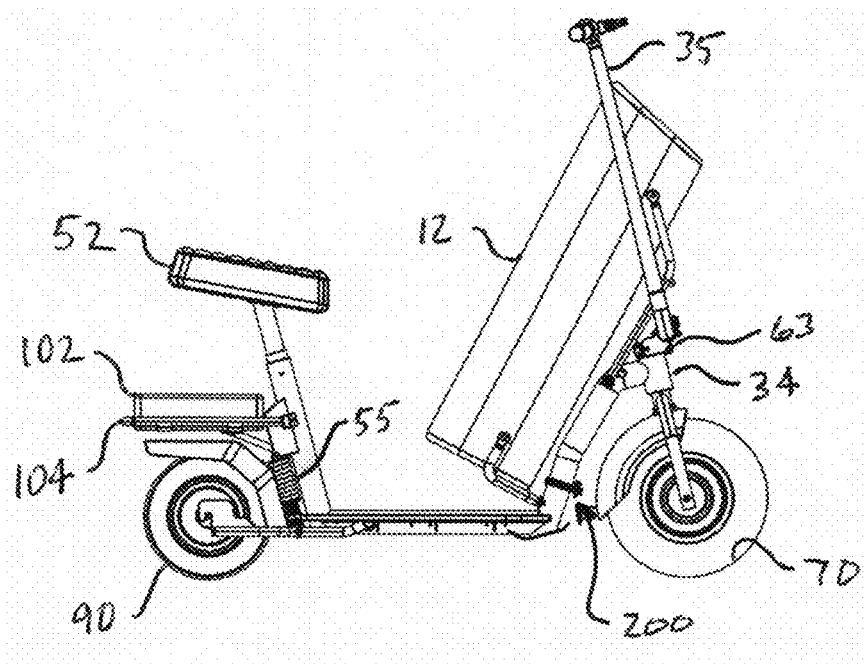
FIG. 65 is a right elevation view of an alternate embodiment of the invention, shown with a golf bag.
Figure 66:
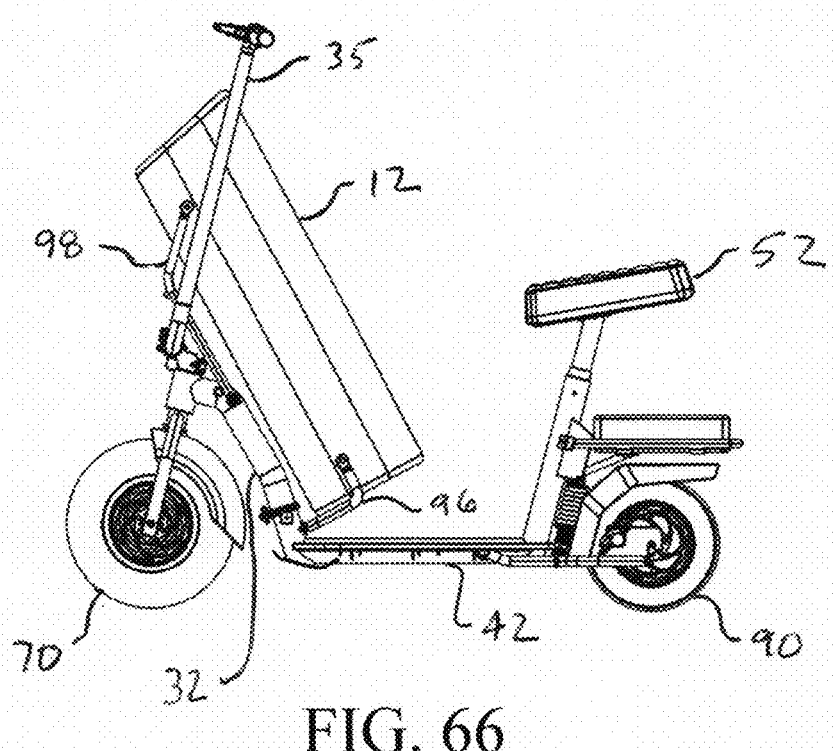
FIG. 66 is a left elevation view of an alternate embodiment of the invention, shown with a golf bag.
Figures 67, 68, 69:
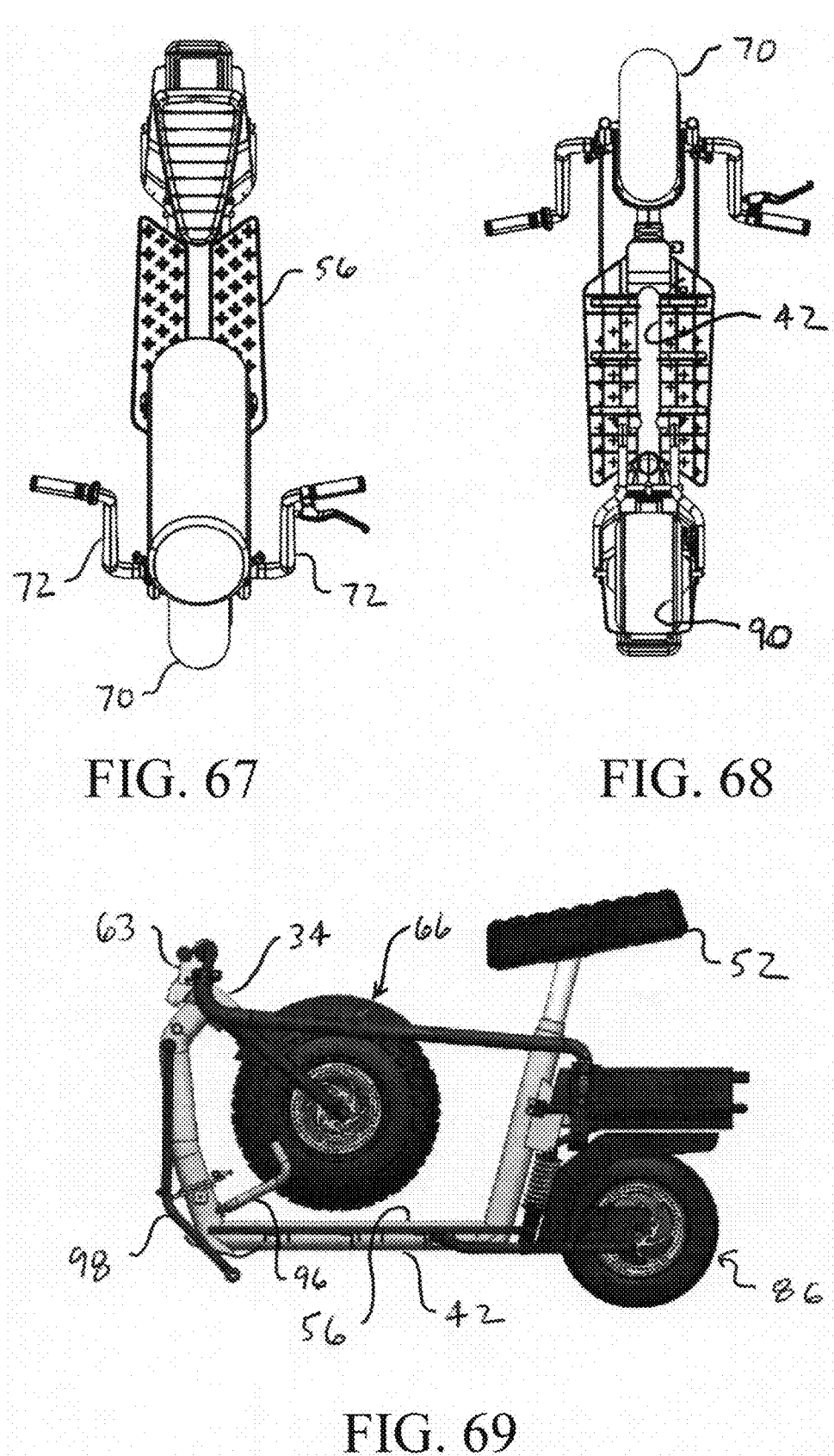
FIG. 67 is a top view of an alternate embodiment of the invention, shown with a golf bag.
FIG. 68 is a bottom view of an alternate embodiment of the invention, shown with a golf bag.
FIG. 69 is a left elevation view of an alternate embodiment of the invention, shown in a folded state.
Figure 70:
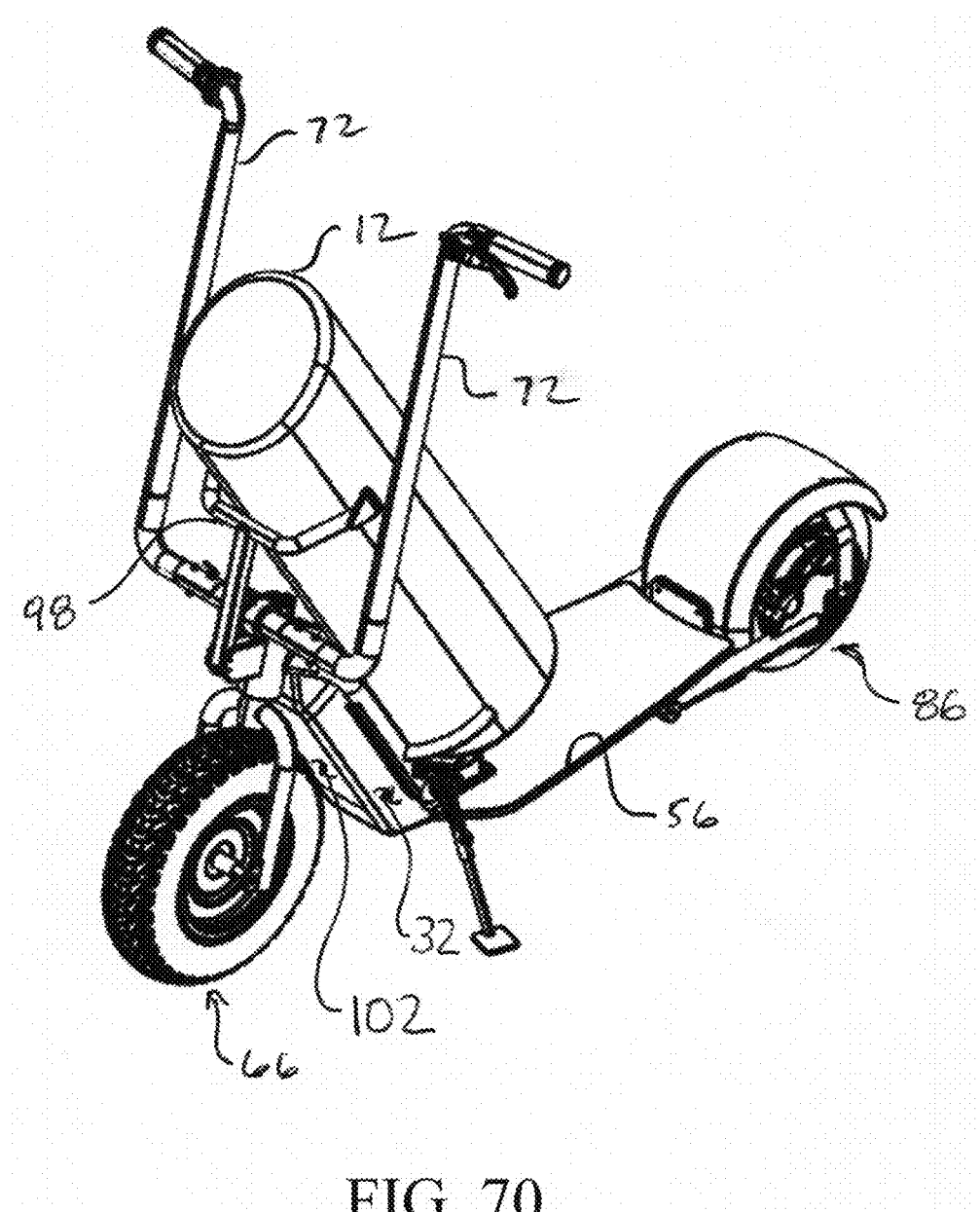
FIG. 70 is a front left perspective view of the invention alternate embodiment, showing a golf bag.
Figures 71, 72:
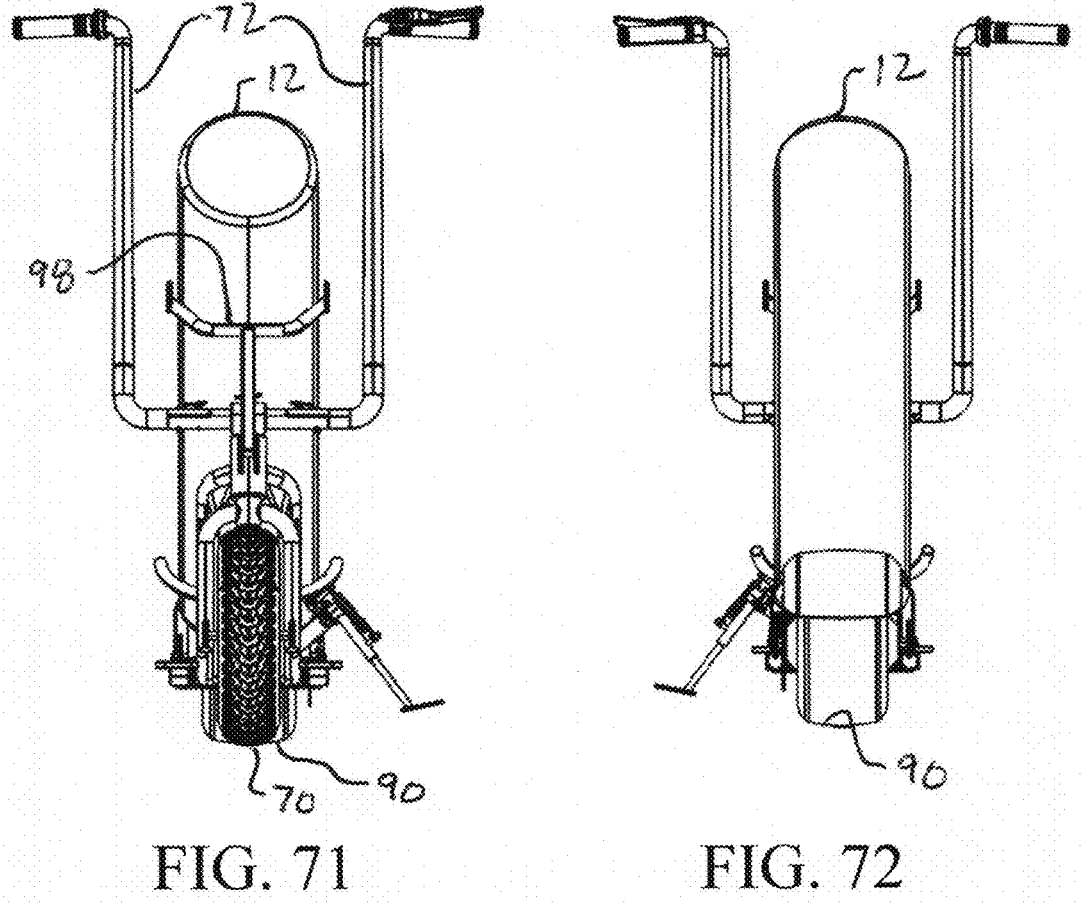
FIG. 71 is a front elevational view of an alternate embodiment of the invention, shown with a golf bag.
FIG. 72 is a rear elevational view of an alternate embodiment of the invention, shown with a golf bag.
Figure 94:
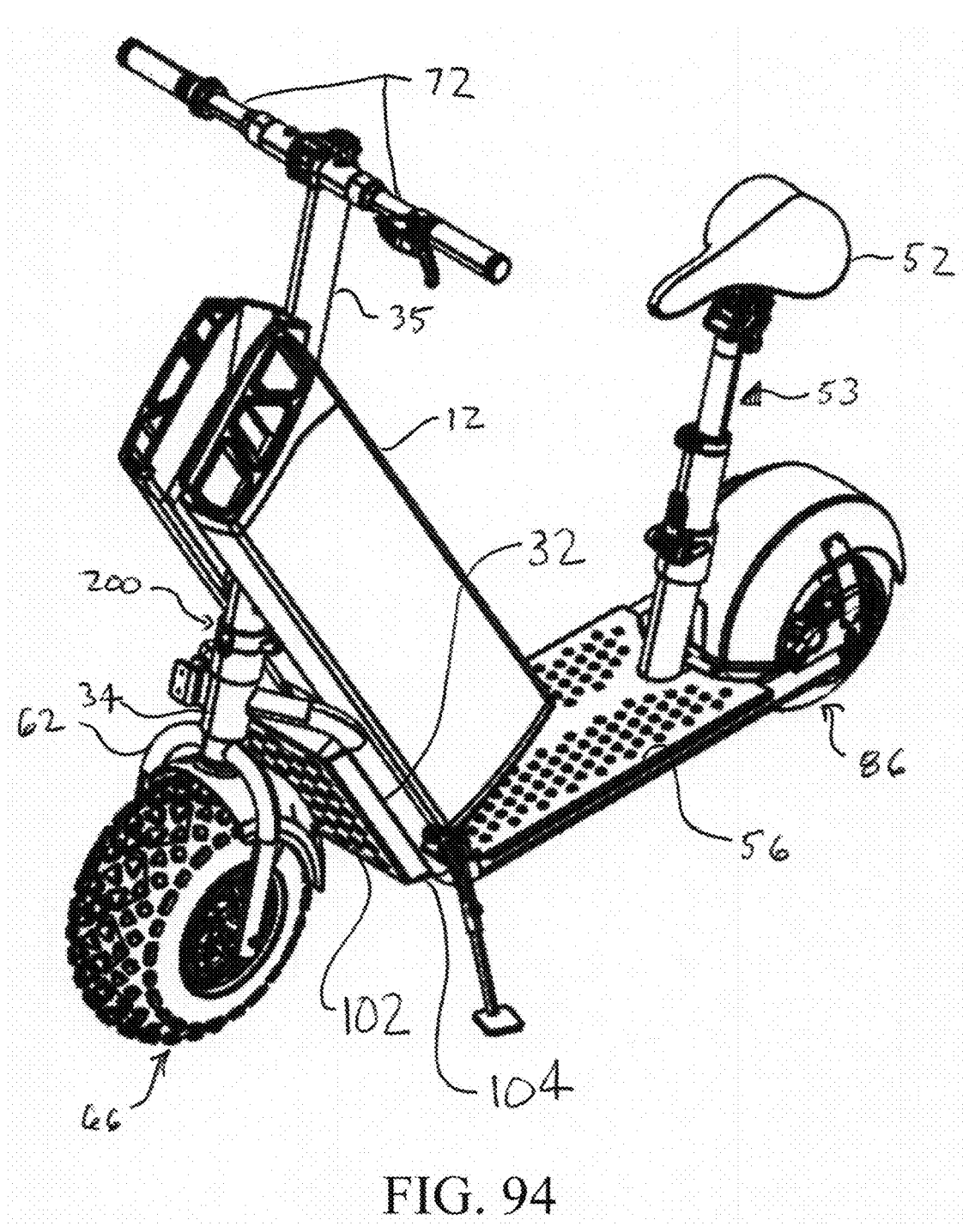
FIG. 94 is a front left perspective view of the invention alternate embodiment, showing a golf bag.
Figures 95, 96:
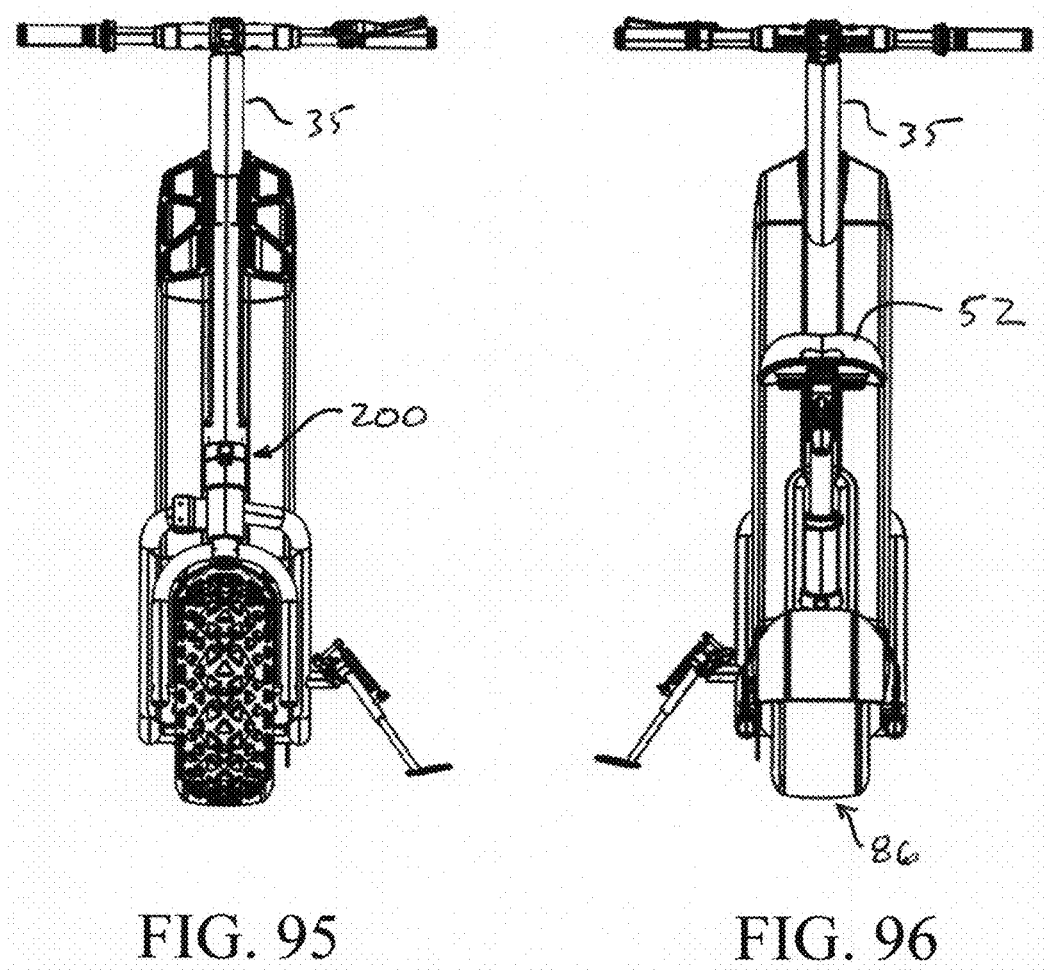
FIG. 95 is a front elevational view of an alternate embodiment of the invention, shown with a golf bag.
FIG. 96 is a rear elevational view of an alternate embodiment of the invention, shown with a golf bag.
Figures 97, 98, 99:
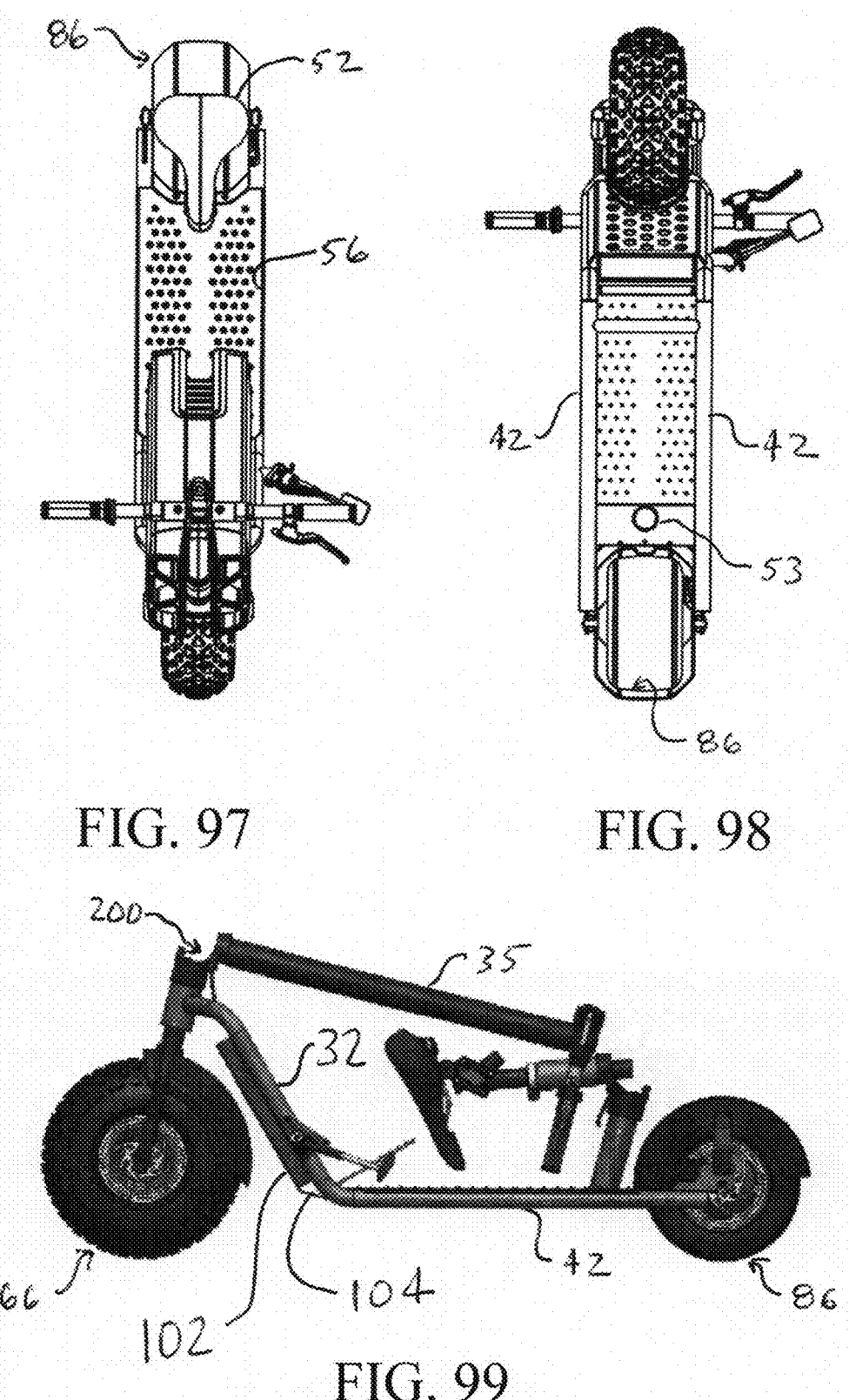
FIG. 97 is a right elevation view of an alternate embodiment of the invention, shown with a golf bag.
FIG. 98 is a left elevation view of an alternate embodiment of the invention, shown with a golf bag.
FIG. 99 is a left elevation view of an alternate embodiment of the invention, shown in a folded state.

FIGS. 12-210 illustrate embodiments of a rideable cart (10) whereby the user can stand and/or sit while operating the cart (10). Further, embodiments such as that of FIG. 12 allow operation with a golf bag (12) extending between the handlebars (12), while embodiments such as FIGS. 27 and 46 allow operation with the golf bag (12) offset from a wheel plane (WP), while embodiments such as that of FIG. 94 incorporate a unique golf bag (12), seen in FIGS. 139 and 149-154, designed to permit passage of a steering column (35) through the golf bag (12). The referenced wheel plane (WP), seen in FIGS. 178-179, is a vertical plane passing through the center of the front wheel (66) and the center of the rear wheel (86).

Figures 73, 74:
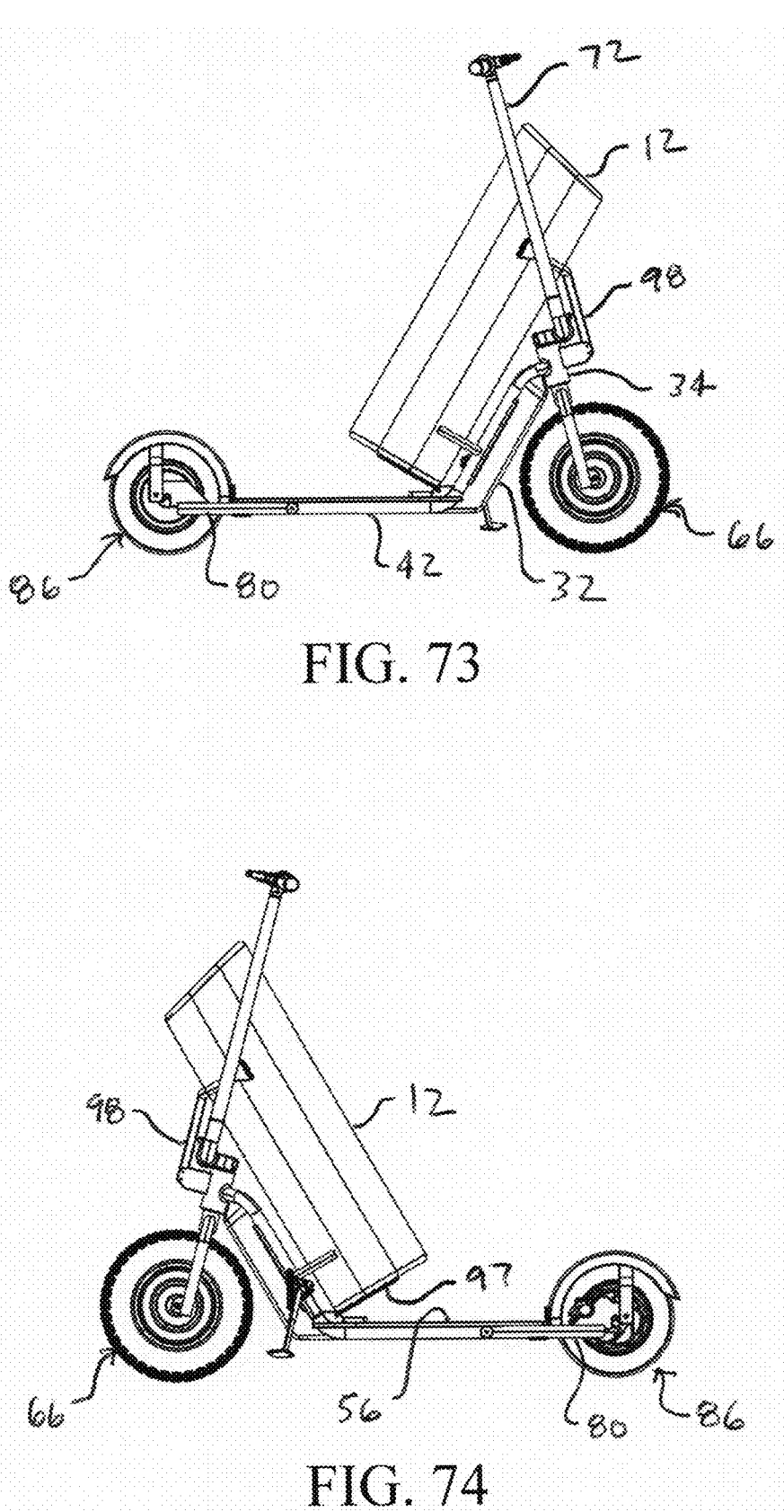
FIG. 73 is a right elevation view of an alternate embodiment of the invention, shown with a golf bag.
FIG. 74 is a left elevation view of an alternate embodiment of the invention, shown with a golf bag.
Figures 75, 76, 77:
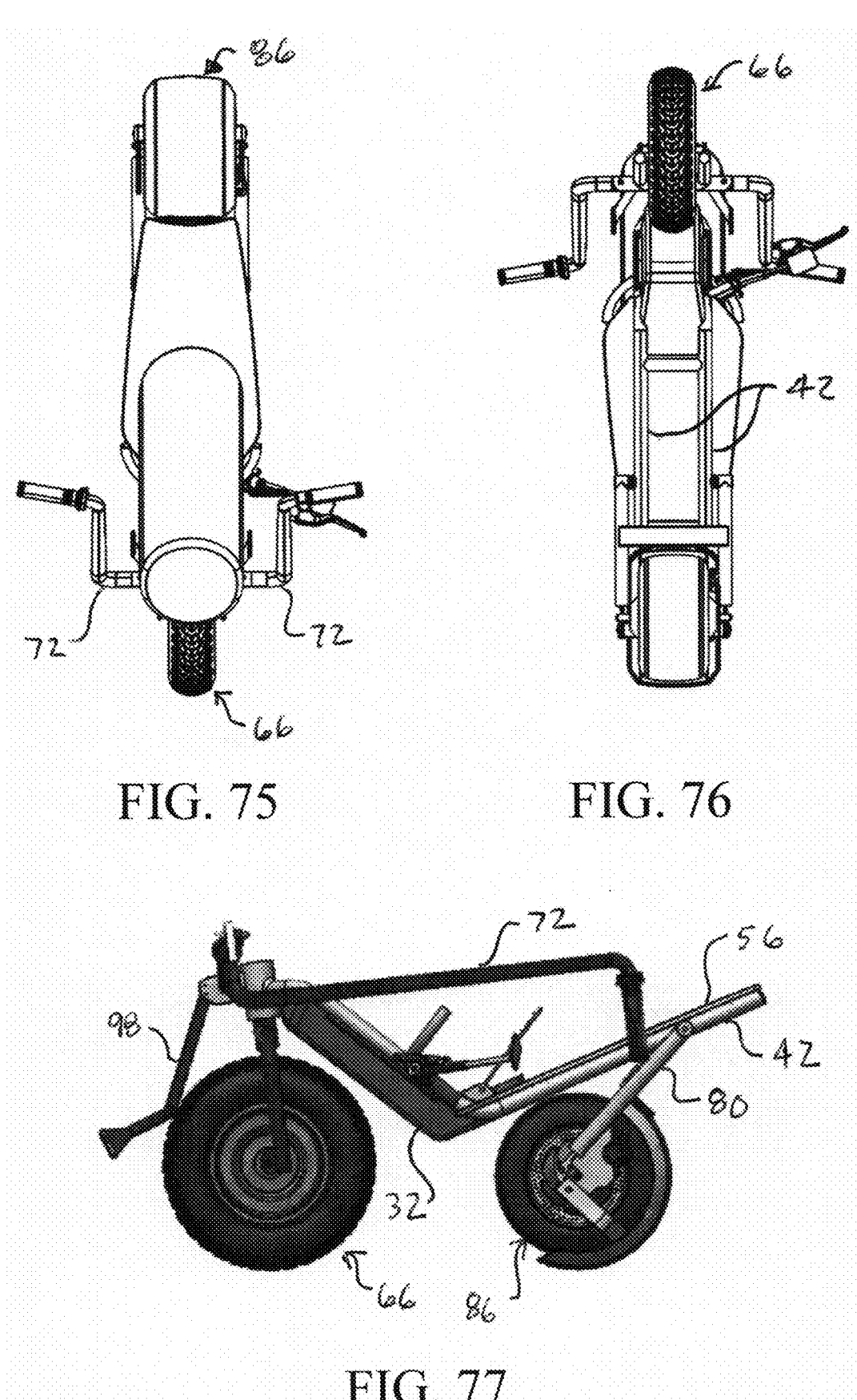
FIG. 75 is a top view of an alternate embodiment of the invention, shown with a golf bag.
FIG. 76 is a bottom view of an alternate embodiment of the invention, shown with a golf bag.
FIG. 77 is a left elevation view of an alternate embodiment of the invention, shown in a folded state.
Figure 78:
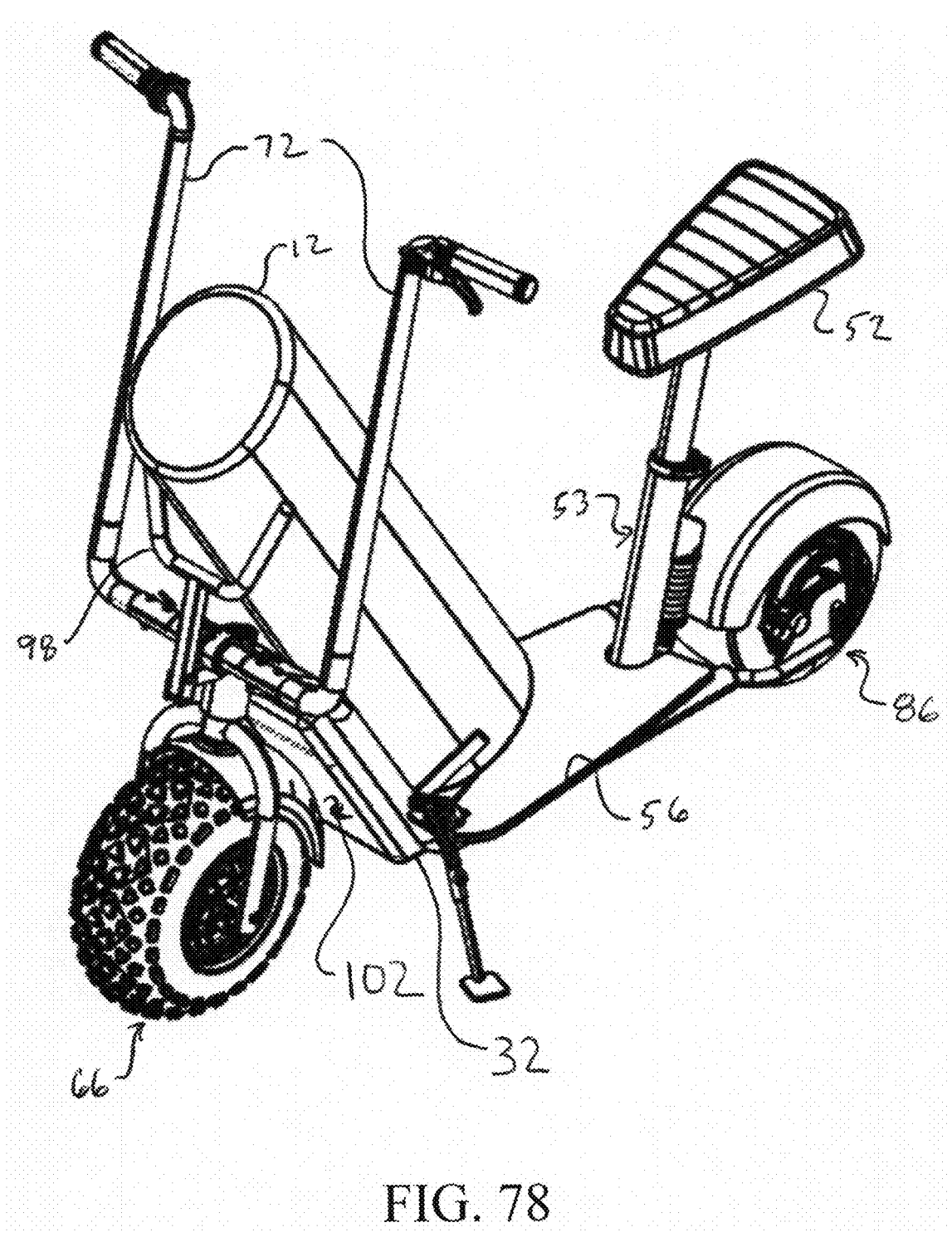
FIG. 78 is a front left perspective view of the invention alternate embodiment, showing a golf bag.
Figures 79, 80:
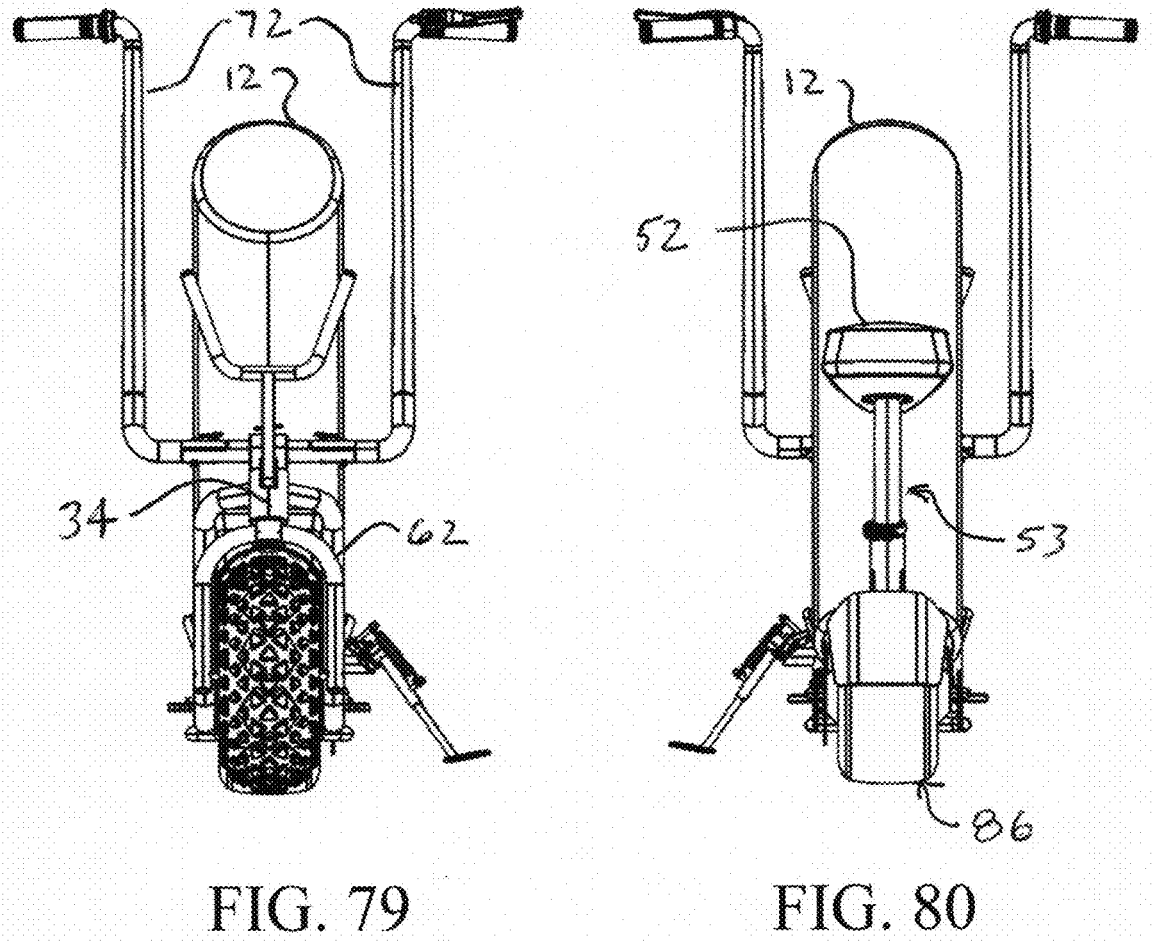
FIG. 79 is a front elevational view of an alternate embodiment of the invention, shown with a golf bag.
FIG. 80 is a rear elevational view of an alternate embodiment of the invention, shown with a golf bag.
Figure 81:
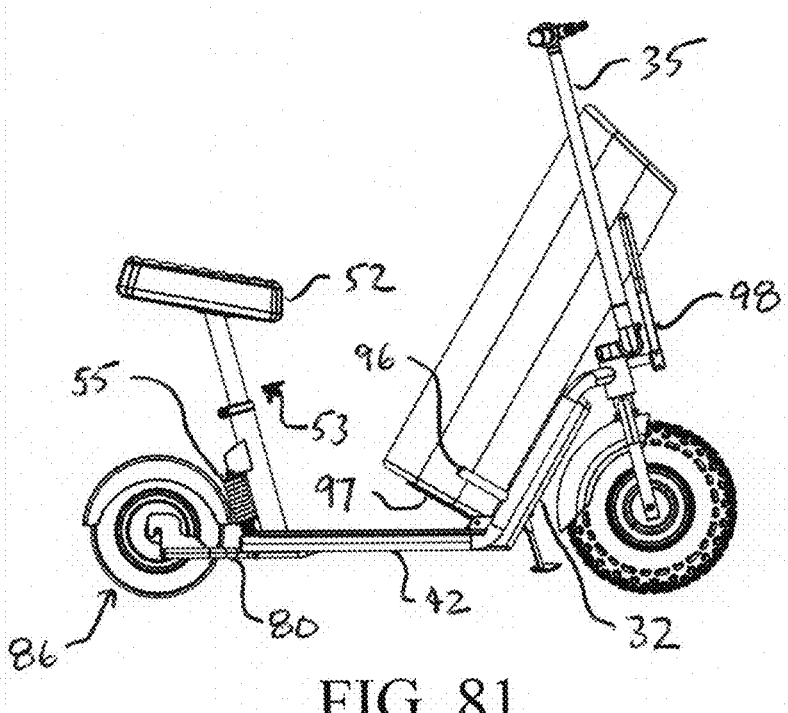
FIG. 81 is a right elevation view of an alternate embodiment of the invention, shown with a golf bag.
Figure 82:
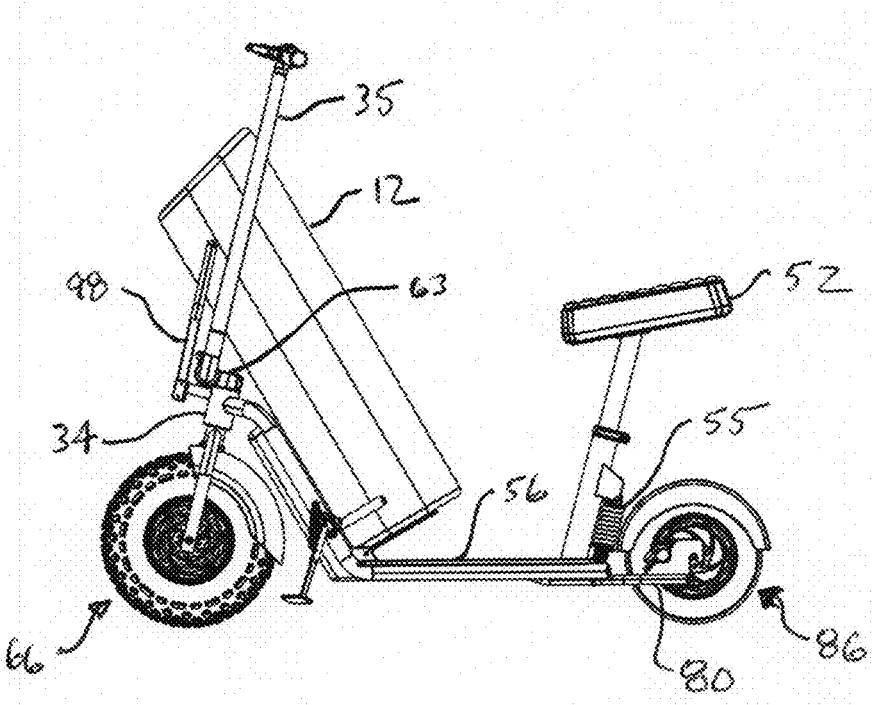
FIG. 82 is a left elevation view of an alternate embodiment of the invention, shown with a golf bag.
Figures 83, 84, 85:
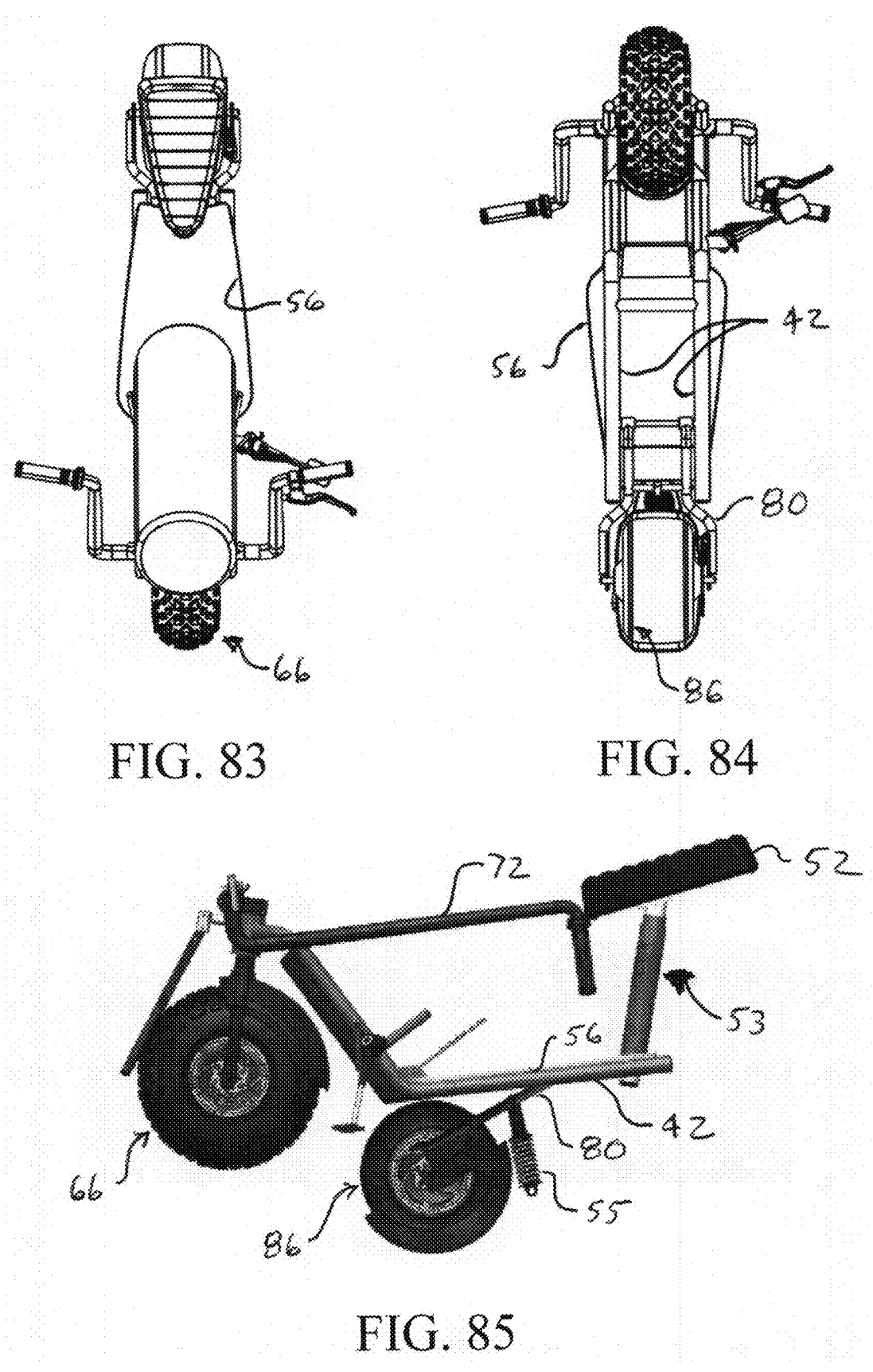
FIG. 83 is a top view of an alternate embodiment of the invention, shown with a golf bag.
FIG. 84 is a bottom view of an alternate embodiment of the invention, shown with a golf bag.
FIG. 85 is a left elevation view of an alternate embodiment of the invention, shown in a folded state.
Figure 86:
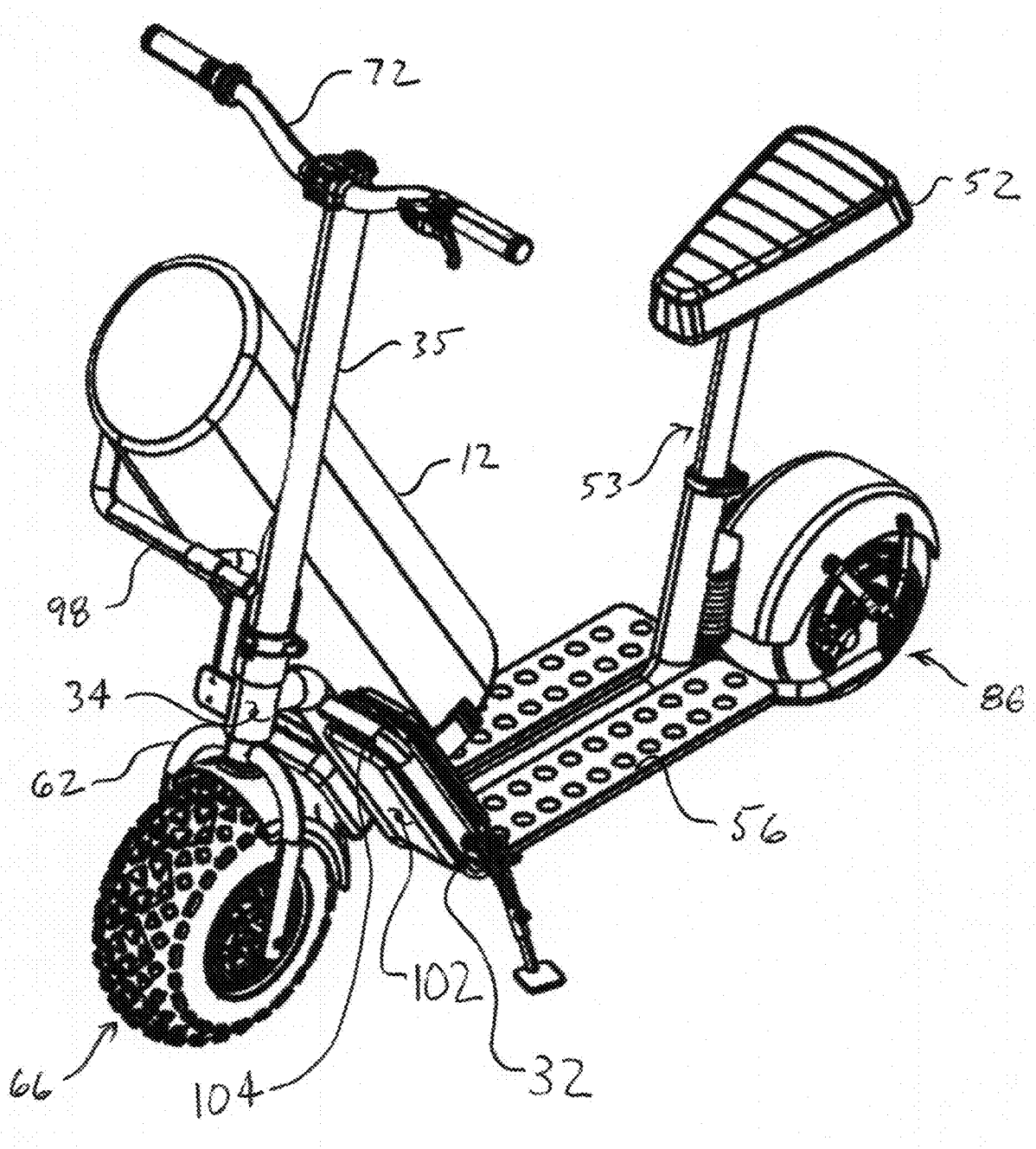
FIG. 86 is a front left perspective view of the invention alternate embodiment, showing a golf bag.
Figures 87, 88:
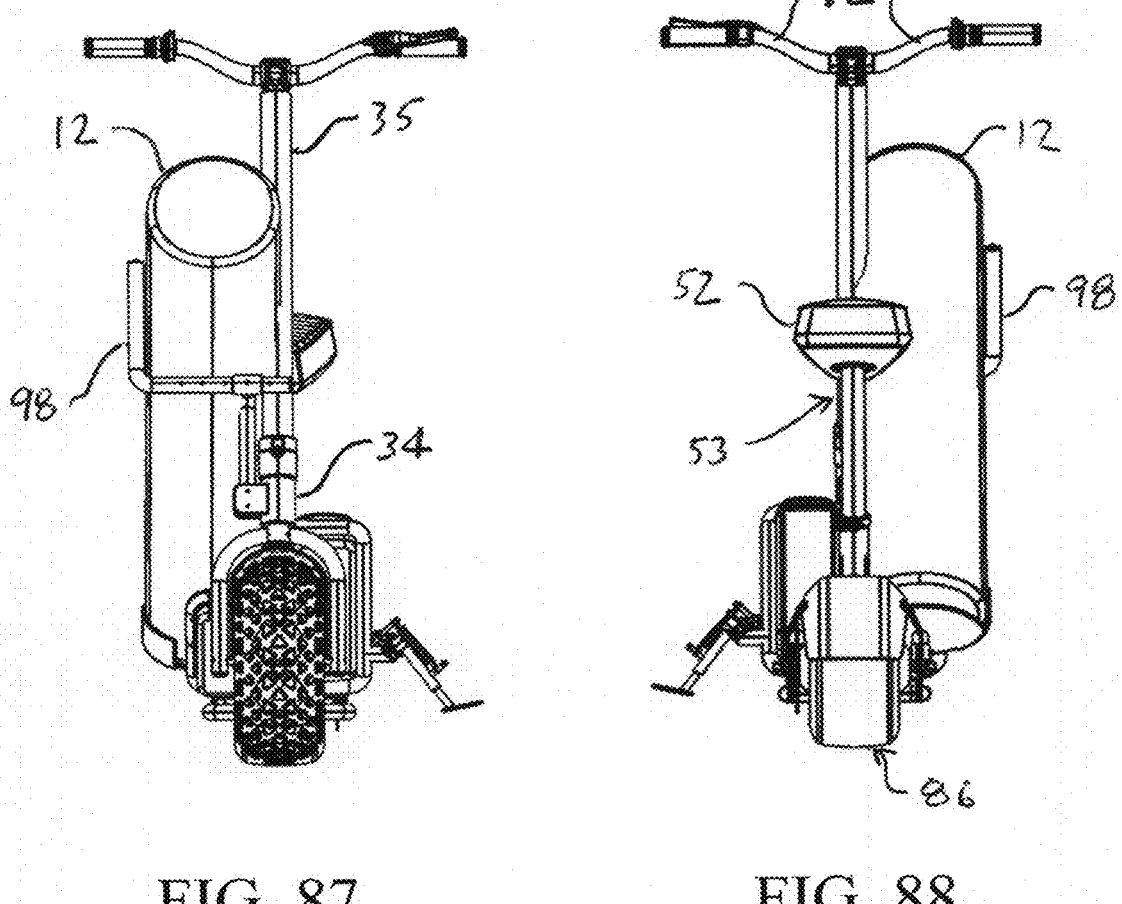
FIG. 87 is a front elevational view of an alternate embodiment of the invention, shown with a golf bag.
FIG. 88 is a rear elevational view of an alternate embodiment of the invention, shown with a golf bag.
Figure 89:
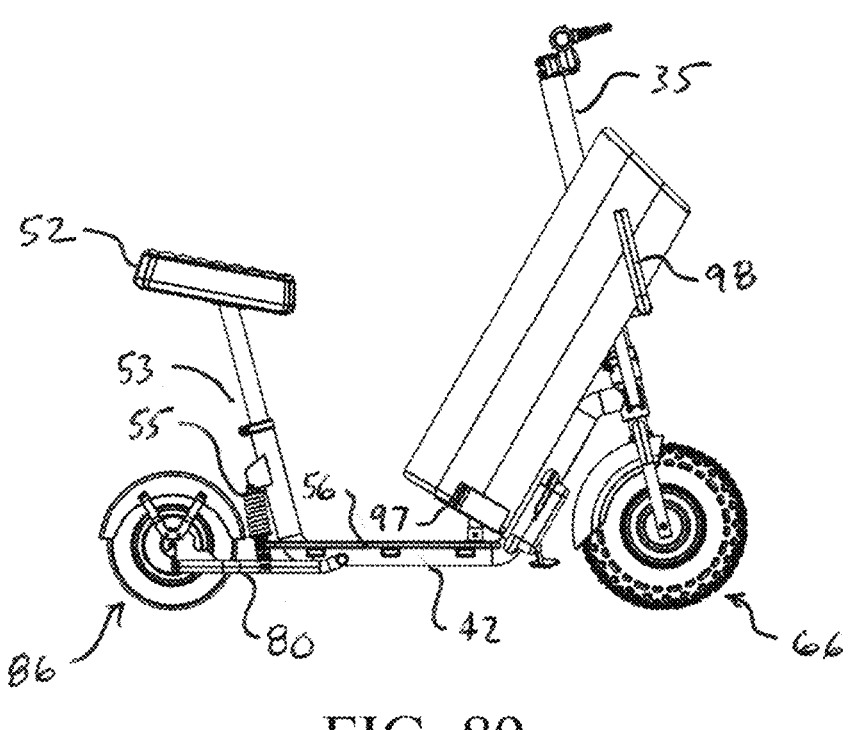
FIG. 89 is a right elevation view of an alternate embodiment of the invention, shown with a golf bag.
Figure 90:
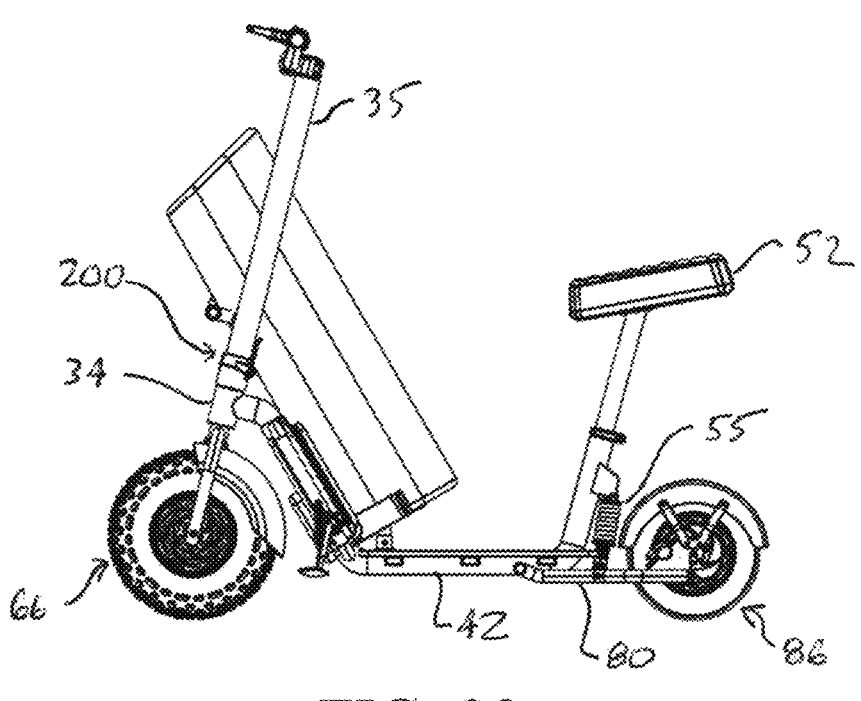
FIG. 90 is a left elevation view of an alternate embodiment of the invention, shown with a golf bag.
Figures 91, 92, 93:
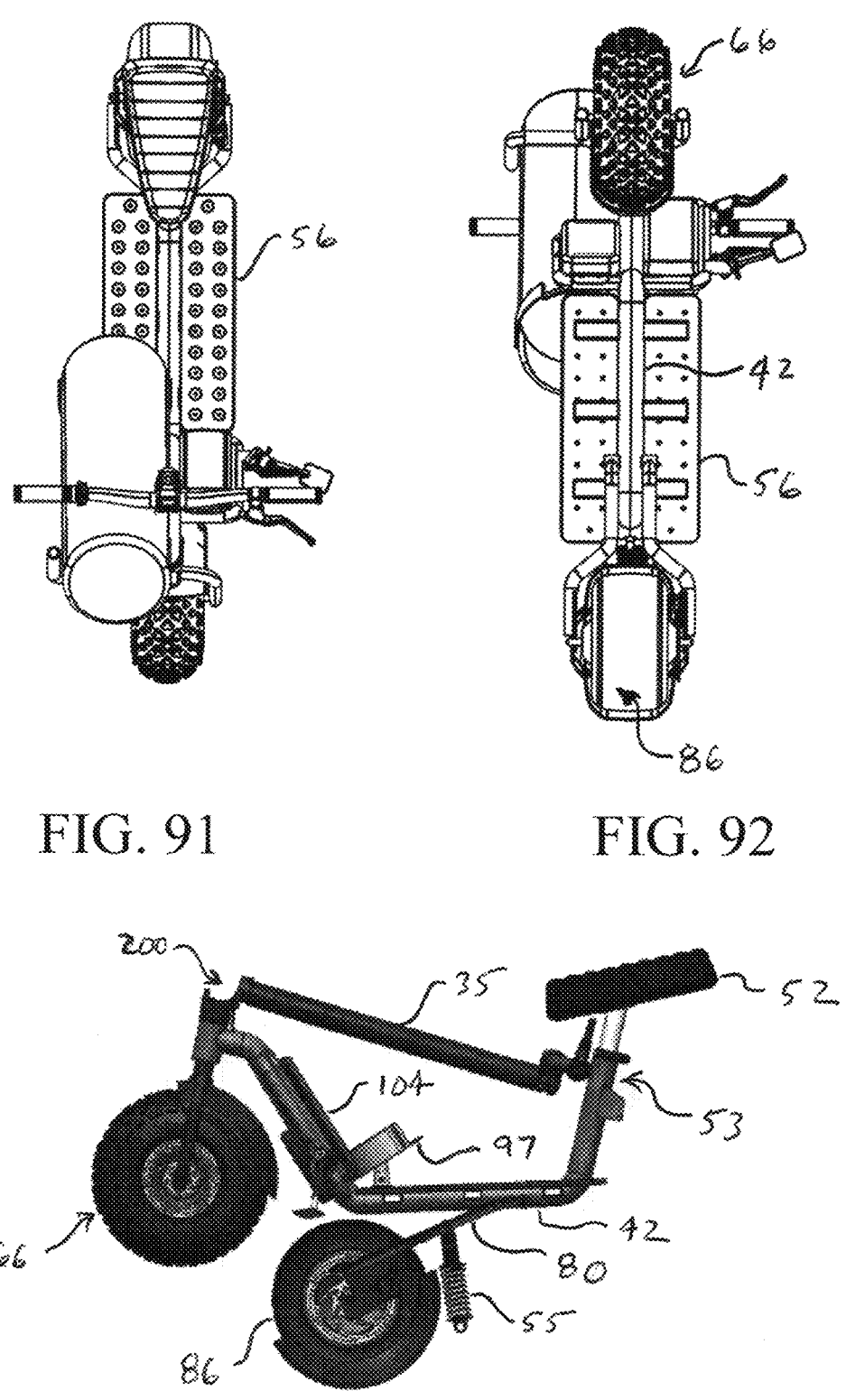
FIG. 91 is a top view of an alternate embodiment of the invention, shown with a golf bag.
FIG. 92 is a bottom view of an alternate embodiment of the invention, shown with a golf bag.
FIG. 93 is a left elevation view of an alternate embodiment of the invention, shown in a folded state.

The embodiment of FIGS. 177-196 will first be disclosed in detail because aspects of the embodiment are applicable to all other embodiments. The primary components include a frame tube (32) extending upwardly and forward from a base segment (42), which extends rearwardly to the rear wheel (86) and serves as support for a running board (56). Some embodiments include a seat support (53) extending upward from the base segment (42) to support a seat (52). The seat support (53) may be adjustable in height and include a upper seat support (53U) and a lower seat support (53L). The frame tube (32) extends upward and over a portion of a front wheel (66) to a steering bracket (34), which in bicycle nomenclature is often referred to as a head tube while the frame tube (32) is analogous to a bicycle down tube. In this embodiment a steering column (35) and a front fork (62) are rotationally attached to the steering bracket (34). A handlebar (72), or individual left and right handlebars (72), are attached to the steering column (35), which in some embodiments is made possible via a handlebar connector (63). As previously explained, when the handlebar (72) is connected to the system below the steering bracket the connection is referred to as a front fork bracket (63), as seen in FIGS. 1-11, however when the handlebar (72) is connected to the system above the steering bracket, and in the embodiment of FIG. 177 to the steering column (35), the connection is referred to as a handlebar connector (63). The seat (52) is not required in any of the embodiments, as illustrated by FIGS. 74 and 155.

A portion of the steering column (35), or the interface of the steering column (35) and the steering bracket (34), may incorporate a connector assembly (200), as seen in FIGS. 177, and 205-208, referred to as a steering connector assembly (201) seen in FIG. 180. Further, a portion of the frame tube (32) may also incorporate a connector assembly (200), as seen in FIGS. 177 and 209-210, referred to as a frame tube connector assembly (205) seen in FIG. 180. The steering connector assembly (201) and the frame tube connector assembly (205) work to reorient the components from a riding configuration, seen in FIG. 177, to a storage configuration illustrated in FIG. 184.

The frame tube connector assembly (205) allows all of the components connected to the frame tube (32) above the frame tube connector assembly (205) to rotate 180 degrees so that the front wheel (66) is over the running board (56). The steering connector assembly (201) allows the steering column (35) to pivot and fold about the steering connector assembly (201). In one embodiment in the storage configuration a steering column axis (35A), seen in FIG. 190, is within ±25 degrees of being parallel to the surface of the running board (56), and in further embodiments ±20 degrees, ±15 degrees, ±10 degrees, ±5 degrees, or 0 degrees (i.e. parallel). In another embodiment in the storage configuration a portion of the steering column (35) contacts the seat (52), seen in FIG. 184. In a further embodiment the steering connector assembly (201) is also securely lockable in the storage configuration so that the steering column (35) cannot pivot.

In one embodiment the seat support (53) is adjustable in height via an upper seat support (53U) sliding within a lower seat support (53L). As seen in FIG. 190, the seat support (53) has a support axis (53A) and a support axis angle (53AA), which is measured from horizontal, or a ground plane (GP). Similarly, the steering column (35) has a column axis (35A) and a column axis angle (35AA), also measured from horizontal, or the ground plane (GP). Likewise, the support surface of the seat (52) is oriented at a seat angle (52A). In one embodiment the support axis angle (53AA) is less than 90 degrees, and in further embodiments is less than 88 degrees, 86 degrees, 84 degrees, or 82 degrees. In another embodiment the support axis angle (53AA) is at least 65 degrees, and in further embodiments at least 70 degrees, 72 degrees, 74 degrees, or 76 degrees. In another embodiment at least a portion of the seat support (53) extends over a portion of the rear wheel (86), while in a further embodiment at least a portion of the upper seat support (53U) extends over a portion of the rear wheel (86), and in a further embodiment at least a portion of the lower seat support (53L) extends over a portion of the rear wheel (86). In one embodiment the support axis angle (53AA) is ±15 degrees of the column axis angle (35AA), and in further embodiments is ±10 degrees, ±5 degrees, or 0 degrees (i.e. parallel). In another embodiment the seat angle (52A) is at least 2.5 degrees, and in further embodiments at least 5 degrees, 7.5 degrees, 10 degrees, or 12.5 degrees. In another series of embodiments the seat angle (52A) is no more than 35 degrees, and no more than 30 degrees, 25 degrees, or 20 degrees in additional embodiments. As seen in FIG. 180, the bag support base (97) is oriented at a bag support base angle (97A) that is at least 10 degrees in one embodiment, and no more than 45 degrees in another embodiment.

The upper seat support (53U) has an upper seat support length and the lower seat support (53L) has a lower seat support length, which in one embodiment is less than the upper seat support length. In one embodiment the upper seat support length is at least 10% greater than the lower seat support length, and in further embodiments at least 15%, 20%, 25%, or 30%. In a further embodiment the upper seat support length is no more than 180% of the lower seat support length, and in further embodiments no more than 170%, 160%, 150%, or 140%. These relationships are not merely for adequate structural engagement of support sections, but rather to facilitate compactness in the storage configuration. In a further embodiment the end of the lower seat support (53L) is open and unobstructed by any other components so that the upper seat support (53U) may extend out of the lower end of the lower seat support (53L), as seen in FIG. 204. In an additional embodiment safety is provided by ensuring the upper seat support (53U) cannot be secured to the lower seat support (53L) when the upper seat support (53U) is extending out of the lower end of the lower seat support (53L). Thus, in the riding configuration the upper seat support (53U) will not be the component defining the minimum ground clearance.

A maximum elevation of the seat (52H), seen in FIG. 179, is selected to facilitate riding while leaning against the seat (52) rather than just sitting on the seat (52), and thus in one embodiment the seat support (53) must be adjustable to heights greater than that required for a solely seated riding configuration, and the components must be configured to safely facilitate the increased height. Improved safety and maneuverability has been found in a riding position characterized by a slight user lean against a high seat (52) with a narrow forward neck so that it is easily positioned between a rider's legs without requiring an unnatural riding position with the legs spread apart. As seen in FIG. 177, the seat (52) has a seat width (52W) that may vary from a minimum width to a maximum width, and a seat length (52L). In one embodiment the seat length (52L) is at least 150% of the maximum seat width (52W), and at least 160%, 170%, or 180% in further embodiments. In one embodiment the maximum seat width (52W) is equal to, or greater than, a front tire width (70W), seen in FIG. 182; while in a further embodiment the maximum seat width (52W) is equal to, or less than, a rear tire width (90W). In one embodiment the maximum elevation of the seat (52H), seen in FIG. 179, is at least 22", and in further embodiments at least 24", 26", or 28". The handlebar height (72W), seen in FIG. 179, is at least 32" inches in one embodiment, and at least 34", 36", 38", or 40" in further embodiments. In an even further embodiment the seat (52) is not a seat but a lower back support, or buttocks support.

A center of gravity (CG) of the rideable cart (10) is illustrated in FIG. 181. The location of the center of gravity (CG), and all of the disclosed relationships, are essential in providing a rideable cart (10) that is stable off-road, particularly when transporting a user and a golf bag full containing a full set of golf clubs and all the ancillary components typically found in a golf bag. The center of gravity (CG) is located a CGy dimension behind the front axle (67), measured horizontally parallel to the ground plane (GP), and is located a CGh dimension above the ground plane (GP), measured vertically perpendicular to the ground plane (GP), as seen in FIG. 181. Additionally, the rideable cart (10) has a minimum clearance (500), seen in FIG. 181, and a wheelbase (510), which is the horizontal distance measured between a center of the front wheel (66) and a center of the rear wheel (86), as seen in FIG. 180. Further, a top surface of the running board (56) is located a running board height (56H), measured vertically above the ground plane (GP), as shown in FIG. 181. The point that the front tire (70) contacts the ground plane (GP) directly below the front axle (67) is the contact point (530). The steering bracket (34) defines the headset axis (520), seen in FIG. 181, which intersects the ground plane (GP) at an axis contact point (540). A horizontal distance from the contact point (530) and the axis contact point (540) is referred to as the trail (550), which is positive if the axis contact point (540) is further from the rear wheel (86) than the contact point (530). The front tire (70) has a front tire outer diameter, and the rear tire (90) has a rear tire outer diameter, wherein the front tire outer diameter is greater than the rear tire outer diameter. Further, the front tire (70) has a front tire width (70W) and the rear tire (90) has a rear tire width (90W), wherein the rear tire width (90W) is greater than the front tire width (70W). Additionally, the front tire (70) has a front tire crown radius, and the rear tire has a rear tire crown radius that is greater than the front tire crown radius. Characteristics of the tires disclosed herein are measured when no external forces are acting upon the tires.

Figure 108:
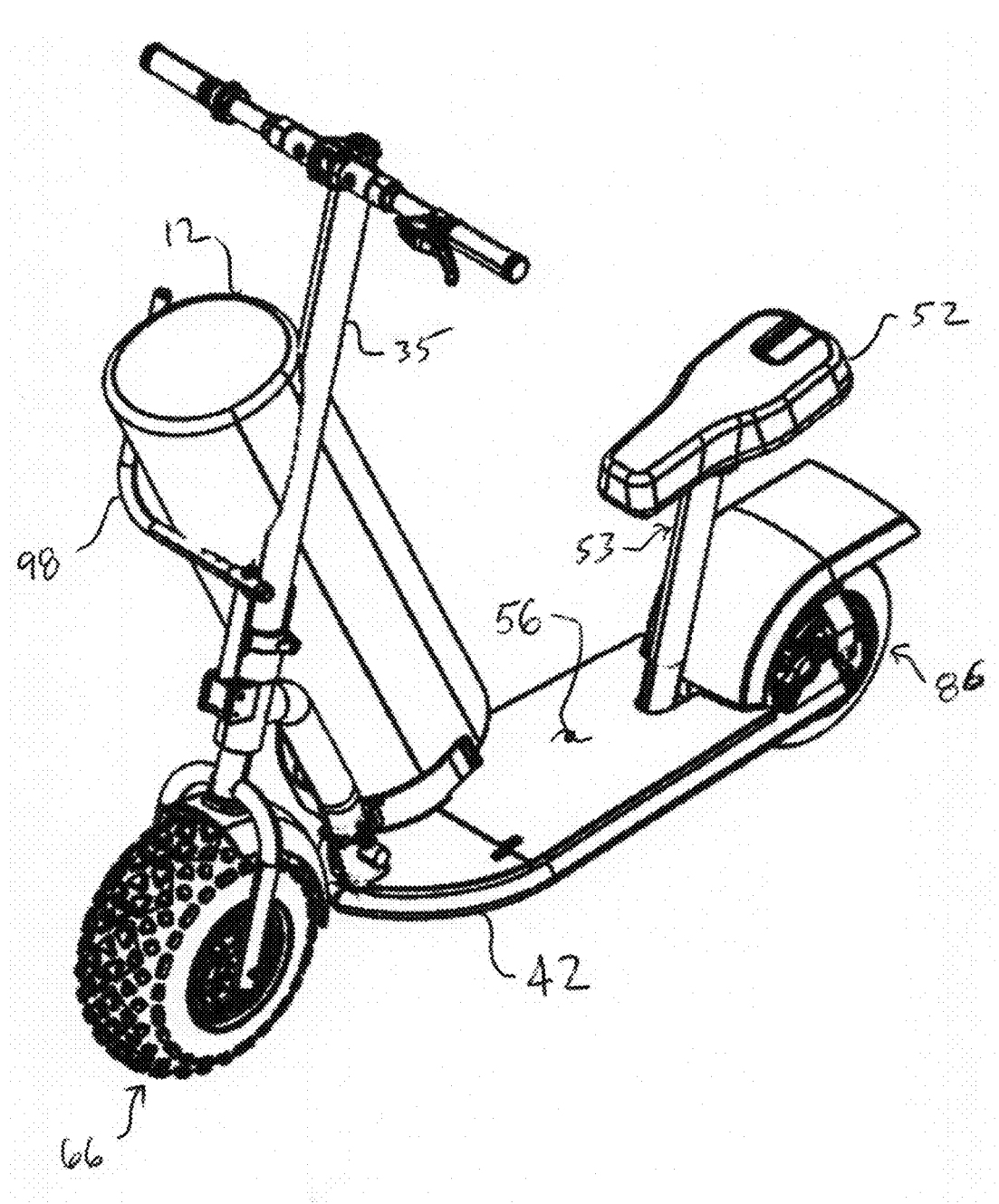
FIG. 108 is a front left perspective view of the invention alternate embodiment, showing a golf bag.
Figures 109, 110:
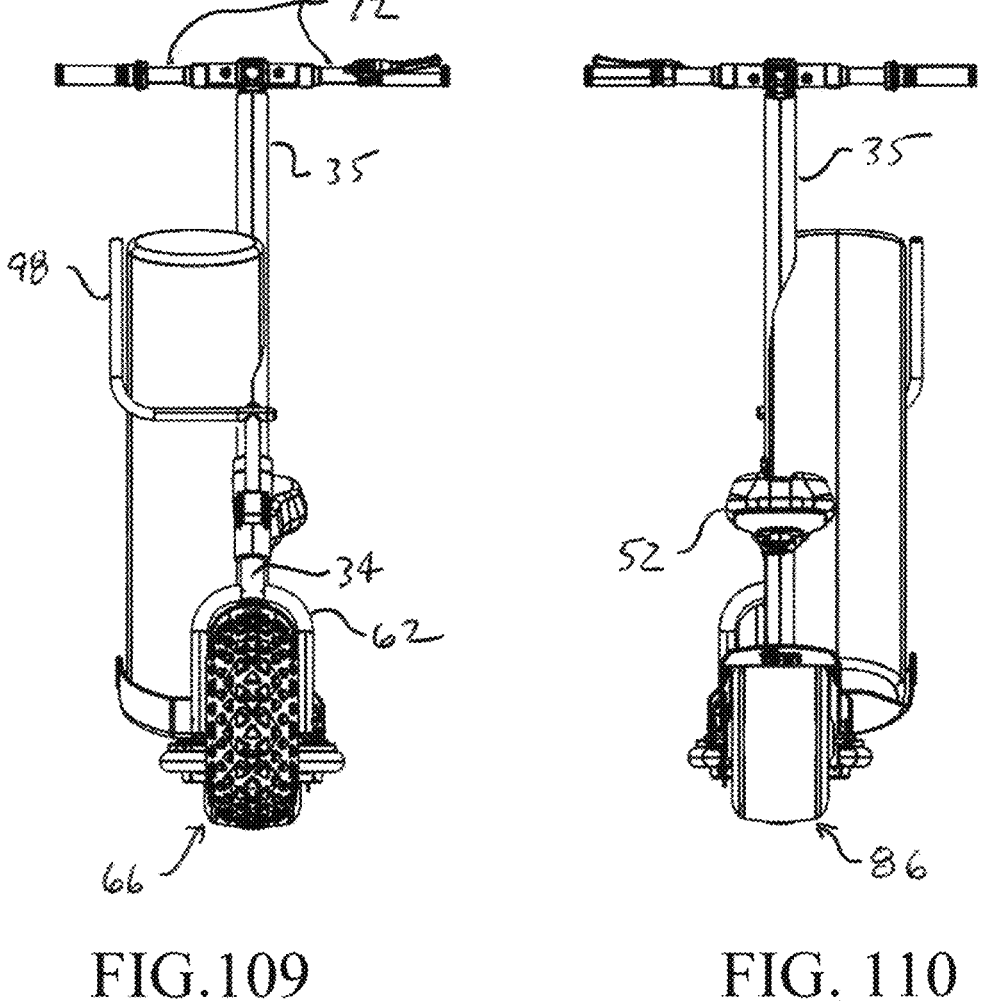
Figures 111, 112:
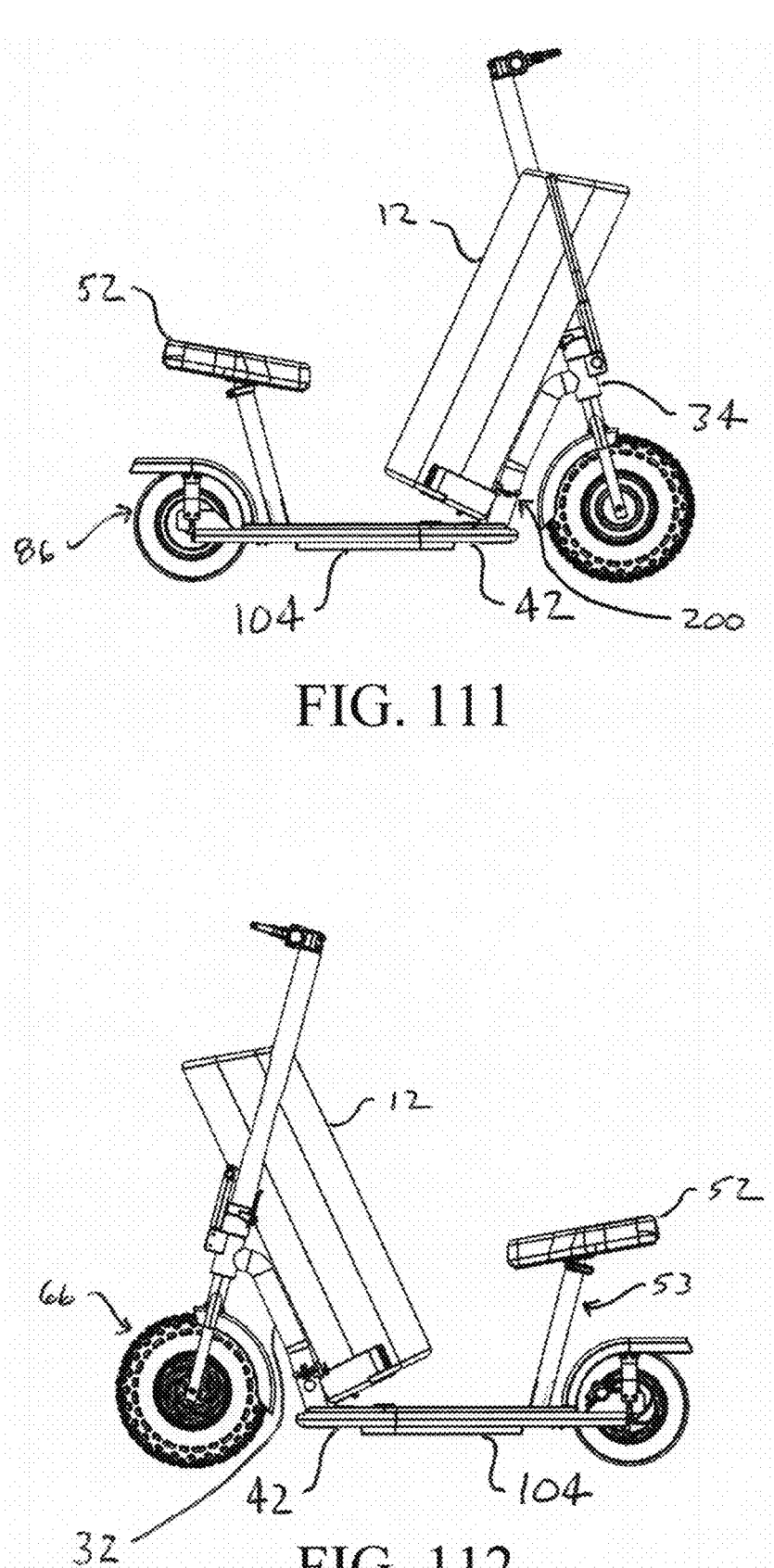
Figures 113, 114:
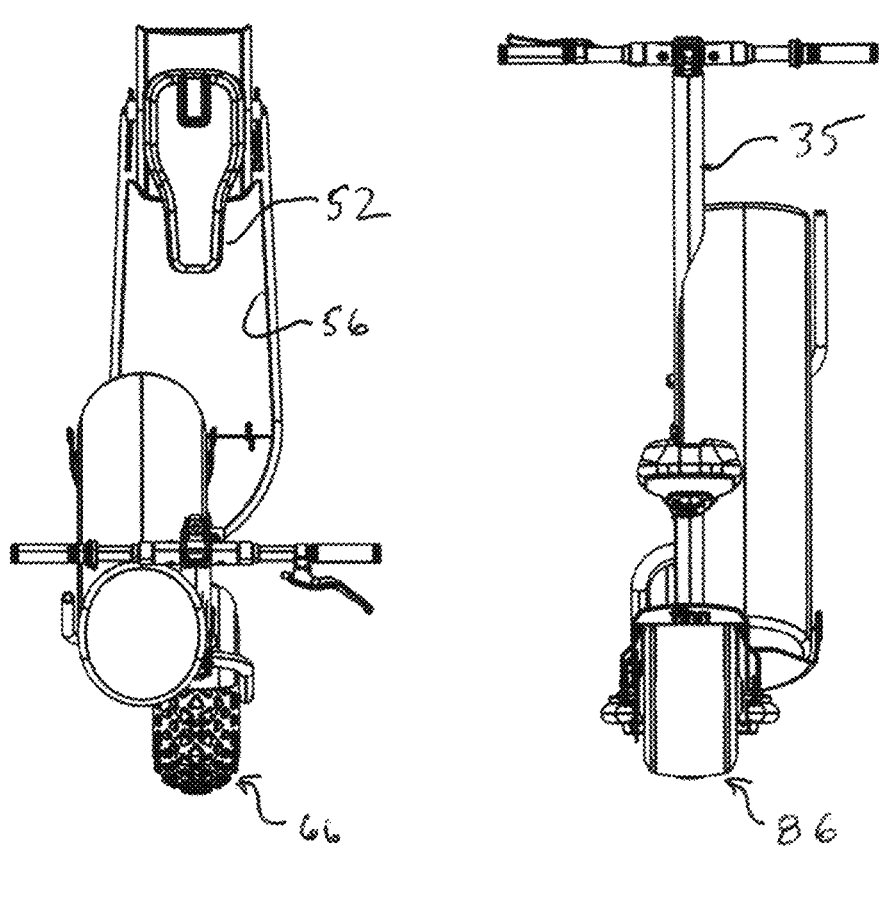
Figure 115:
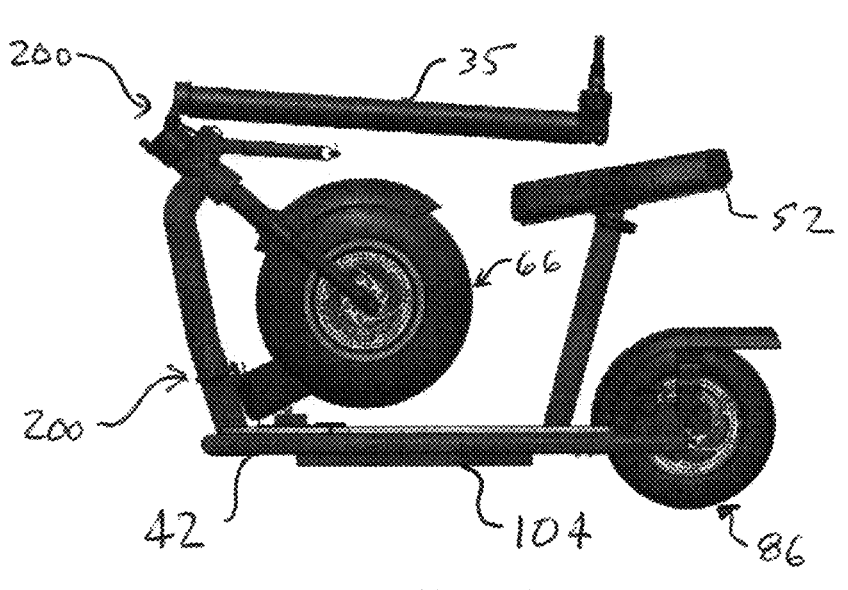
Figure 116:
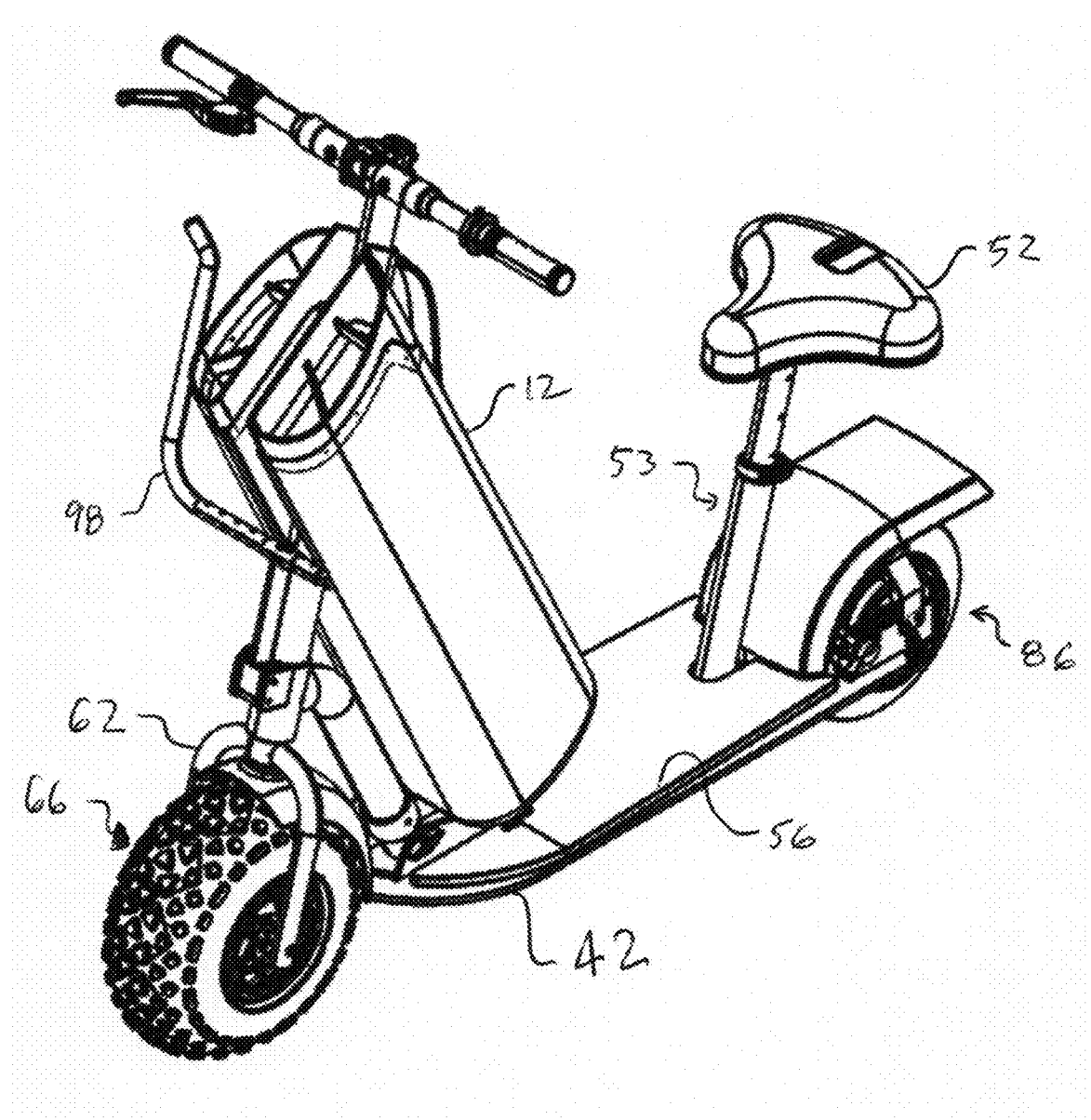
Figures 117, 118:
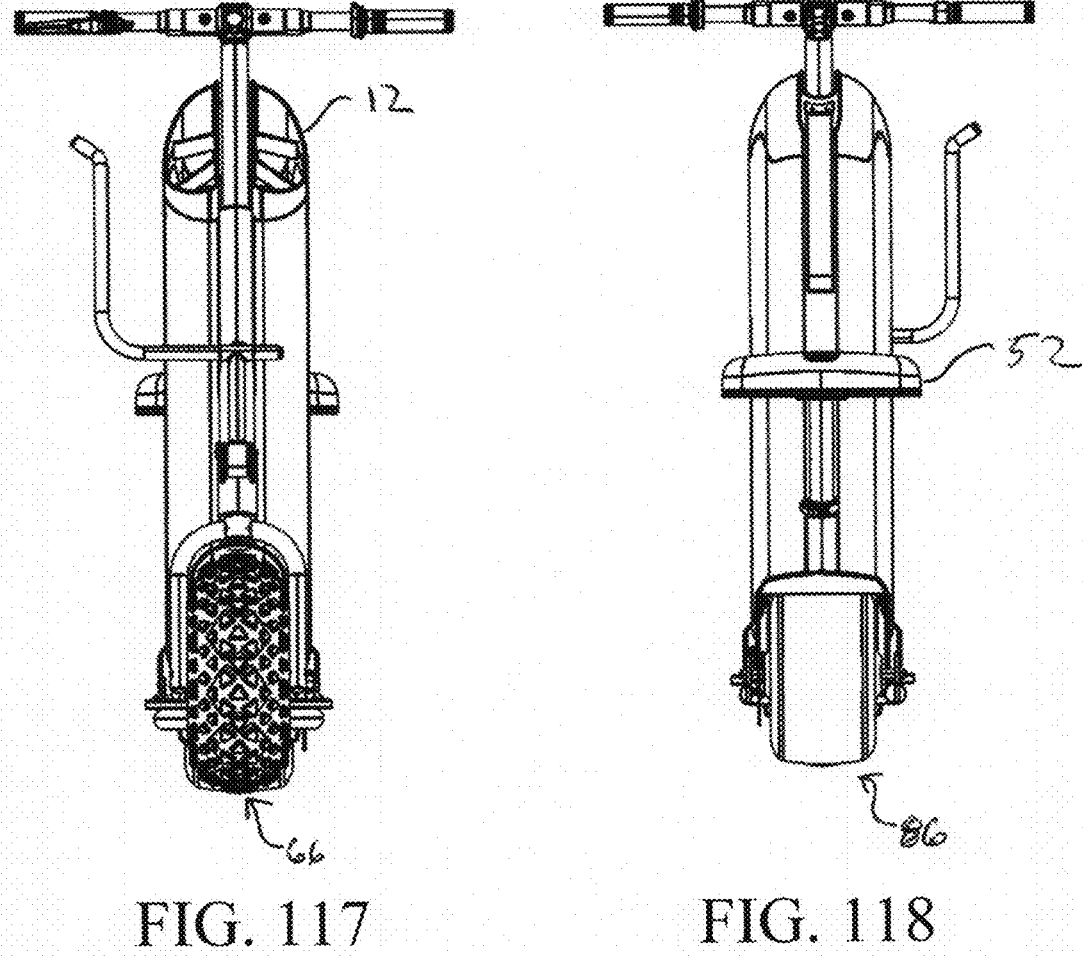
Figure 119:
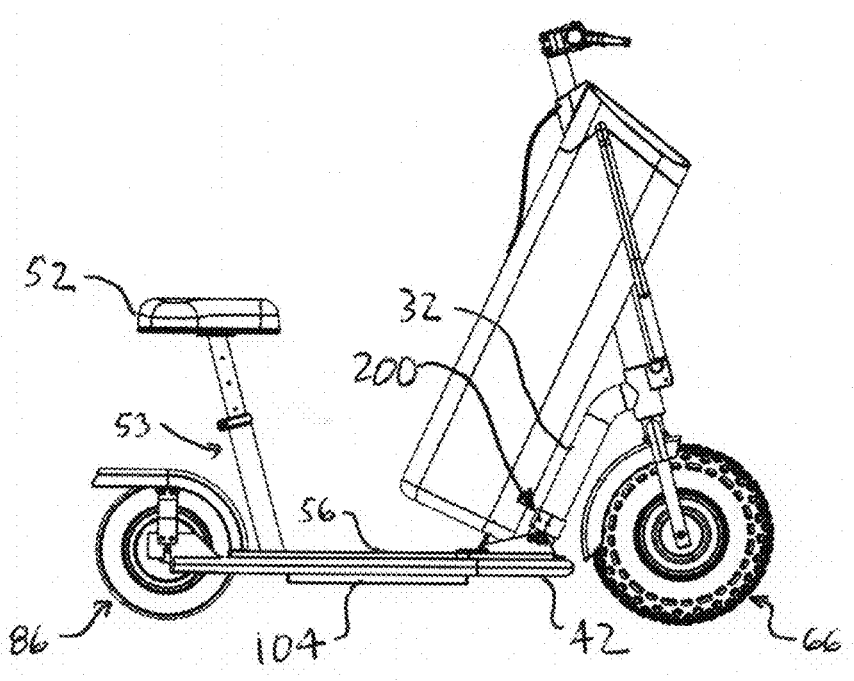
Figure 120:
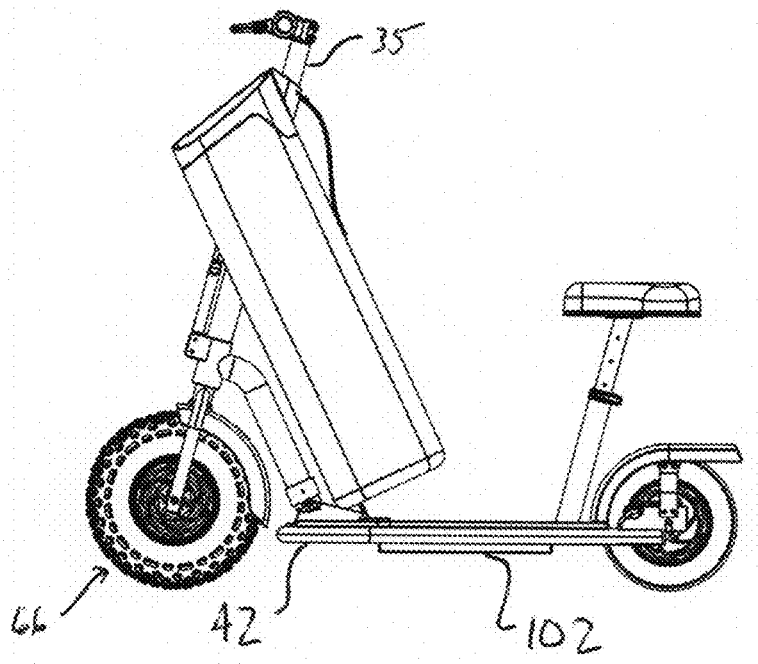

In one embodiment CGy is within ±25% of CGh, and in further embodiments within ±20%, ±15%, ±10%, or ±5%. In one embodiment CGy is greater than CGh. In a further embodiment CGy is less than 45% of the wheelbase (510), and less than 40%, 38%, or 36% in further embodiments. In another series of embodiments CGy is at least 24%, 26%, 28%, or 30% of the wheelbase (510). Such forward center of gravity embodiments are influenced by many factors, including the location of the battery (102) and/or battery cradle (104), such as when attached to, within, or created by the frame tube (32), as seen in FIGS. 54, 70, 78, 86, and 94, or attached to, within, or created by the base segment (42), as seen in FIG. 108, 116, 132, 169, 177. These forward center of gravity embodiments create unique challenges and have some undesirable performance characteristics that are reduced by other relationships disclosed herein, including, but not limited to, attributes of the tires.

For instance, in one embodiment the front tire outer diameter is at least 10% greater than the rear tire outer diameter, and in further embodiments at least 15%, 17.5%, or 20% greater. Another series of embodiments limits this relationship such that the front tire outer diameter is no more than 160% of the rear tire outer diameter, and in further embodiments is no more than 150%, 140%, or 130%. The rear tire width (90W) is at least 10% greater than the front tire width (70W) in one embodiment, and the rear tire width (90W) is at least 12.5%, 15%, or 17.5% greater than the front tire width (70W) in further embodiments. Another series of embodiments limits this relationship such that the rear tire width (90W) is no more than 160% of the front tire width (70W) in one embodiment, and in further embodiments is no more than 150%, 140%, 130%, or 125%.

The front tire crown radius is at least 30% of the front tire outer diameter in one embodiment, and is at least 32.5%, 35%, or 37.5% in further embodiments. Another series of embodiments limits this relationship such that the front tire crown radius is no more than 85% of the front tire outer diameter in one embodiment, and is no more than 80%, 75%, 70%, 65%, 60%, 55%, 50%, or 45% in further embodiments. In another embodiment the rear tire crown radius is at least 200% of the front tire crown radius, and is at least 225%, 250%, 275%, or 300% in further embodiments. In another embodiment the front tire outer diameter is at least 30% of the wheelbase (510), and at least 32.5% or 35% in additional embodiments. The front tire outer diameter is no more than 50% of the wheelbase (510) in one embodiment, and no more than 47.5%, 45%, 42.5%, or 40% in additional embodiments. Further, the front tire outer diameter is at least 85% of CGh in one embodiment, and at least 90%, 95%, and 100% in further embodiments. Conversely, the rear tire outer diameter is no more than CGh in one embodiment, and no more than 95%, 90%, or 85% in further embodiments. In another stable embodiment CGh is less than the front tire outer diameter, but greater than the rear tire outer diameter; and in a further embodiment CGy is likewise less than the front tire outer diameter, but greater than the rear tire outer diameter. In another embodiment rear tire has a lower design pressure than the front tire. The disclosed relationships ensure the cart (10) can easily traverse curbs, holes, cracks, and steep obstacles, while being stable under severe braking and reducing the likelihood of pitching a rider forward. The disclosed rear wheel is beneficial high torque, relative to motor power, is desired.

Recently we have another innovation: we are developing a flatter crowned rear tire. This is used in combination with the standard crown front tire. The effect of this combination is improved stability when stepping onto the cart and at low speed. The front wheel provides plenty of steering control. The flat crown rear takes away slightly from maneuverability in that it slightly reduces the turning or leaning rate, but not noticeably so. The improved low speed handling is noticeable. This wider flat crowned tire, about 6.5×11 inches, works much better with a riding style that has the feet parallel and pointing ahead. This is how most people (except kids) try to ride a traditional scooter with a narrow deck, resulting in difficulty and accidents Our deck is at least 10 inches wide at the heels, and wider at the toe are to support a toe out riding position.

The trail (550) is at least 1.0" in one embodiment, and at least 1.5", 1.75", and 2.0" in further embodiments. Another series of embodiments limits the trail (550) to no more than 4.0" in one embodiment, and no more than 3.5", 3.0", or 2.5" in additional embodiments. The CGh is preferably less than 5 times the minimum clearance (500) in one embodiment, and less than 4.75 times, 4.5 times, 4.25 times, or 4.0 times in further embodiments. Another series of embodiments has a CGh of at least 2.75 times the minimum clearance (500) in one embodiment, and at least 3.0 times, and 3.25 times in further embodiments. The running board height (56H), seen in FIG. 181, is no more than 65% of the rear tire outer diameter in one embodiment, and no more than 60%, 55%, or 50% in further embodiments. The running board height (56H) is at least 35% of the rear tire outer diameter in one embodiment, and at least 37.5% or 40% in additional embodiments. The running board height (56H), seen in FIG. 181, is no more than 50% of the front tire outer diameter in one embodiment, and no more than 47.5%, 45%, or 42.5% in additional embodiments. Embodiments having the battery (102) located below the running board (56) require a battery having a height, measured vertically as with all heights shown in FIG. 181, of no more than 2.5 inches, and in further embodiments no more than 2.25 inches or 2.0 inches. Embodiments having base segments (42) consisting to a dual tube configuration, such as those of FIGS. 42, 76, 84, 98, 106, 122, 138, 148, 168, 175, 183, and 203, are ideal designs for locating the battery (102) below the running board (56).

As with all the relationships disclosed herein, these relationships are more than mere optimization, maximization, or minimization of a single characteristic or variable, and are often contrary to conventional design thinking yet have been found to achieve a unique balance of the trade-offs associated with competing criteria such as size, portability, durability, weight distribution, CG placement, vehicle dynamics, and low speed stability over rough terrain while carrying a load. The aforementioned balance requires trade-offs among the competing characteristics recognizing key points of diminishing returns. Therefore, this disclosure contains a unique combination of relationships that produce enhanced stability, performance, and durability, while controlling the overall size and arrangement of components to facilitate a very compact storage configuration. Further, the relative dimensions, including, but not limited to component length, width, depth, thickness, and height, as well as their placement within the cart, and their relationships to one another and the other design variables disclosed herein, influence the aforementioned criteria. Additionally, many embodiments have identified upper and/or lower limits ranges. For embodiments outside these ranges or relationships, the performance may suffer and adversely impact the goals of the design.

The figures show numerous riding configurations and storage configuration. The movement of various components about the illustrated connector assembly(s) (200) would be evident to one skilled in the art, and therefore will not be described in detail. The location and configuration of the illustrated connector assembly(s) (200) is essential to achieving the desired storage configuration, both for portability of the cart (10) to and from the golf course, but also for shipping of the cart (10). For instance, in the illustrated storage configurations the cart (10) can be confined in a box having a width measured in the same direction as the tire widths of FIGS. 182-183, a height measured in the same direction as the heights of FIG. 181, and a length measured in the same direction as wheelbase (510); wherein (a) the girth is 130 inches or less, where the girth is defined as two times the sum of the width and height, and (b) the sum of the girth and the length is 165 inches or less. Most of the disclosed embodiments achieve this compact storage configuration via the rotation of the front wheel (66) 180 degrees such that it is positioned above the running board (56), however some embodiments achieve a compact storage configuration via a sliding base segment (42) that reduces the wheelbase (510) in the storage configuration. One such wheelbase reducing embodiment is illustrated in FIGS. 124-131 whereby the base segment (42) is composed of multiple sections that may translate with respect to one another to reduce the wheelbase (510) in the storage configuration. While the illustrated base segment (42) is a single tube configuration, another sliding tube embodiment incorporates a sliding tube on each side of the cart (100), similar to the perimeter tubes shown in FIG. 203. In fact, in one embodiment the wheelbase (510) is reduced by at least 8 inches, while in further embodiments it is reduced by 9, 10, 11, or 12 inches. As illustrated in FIG. 131, such designs may incorporate a pivoting running board (56) to thereby permit the rear wheel (86) and seat support (53) to move closer to the front wheel (66).

The illustrated connector assembly (200) of FIGS. 205-208 includes a lever (260) and a pivot (270) to allow the steering column (35) to pivot through at least 90 degrees in one embodiment, and at least 95 degrees, 100 degrees, and 105 degrees in further embodiments. The connector assembly (200) of FIGS. 209-210 includes a plurality of receivers (280), with at least two spaced 180 degrees apart, which in the illustrated embodiment are located on the frame tube (32) with a fastener pivot (292) located on the base segment (42), however the configuration may be the opposite—namely with the receivers (280) on the base segment (42) and the fastener pivot (292) on the frame tube (32). The connector assembly (200) also may include a fastener (290) and a cam (295) to quickly and securely engage the fastener (290) within whichever receiver (280) has been rotated to align with the fastener (290). The cam (295) may be pivoted to release tension on the fastener (290) and allow it to rotate out of the receiver (280) about the fastener pivot (292), thereby allowing the frame tube (32) to rotate 180 degrees so that the opposite receiver aligns with the fastener (290), which can enter the receiver (280) and the cam (295) may be activated to tension the fastener (290) and secure the frame tube (32). The movement provided by the connector assembly(s) (200) of the figures is self-evident and may be included herein as full written disclosure.

In one embodiment the rear wheel (86) is driven by a brushless, direct current, 48 volt, internal geared hub motor having a power rating of 1000-1500 watts. In another embodiment the internal geared hub motor has a sun gear with 3 planets, which in another embodiment produces a 5 to 1 reduction. In a further embodiment the RPM is about 360, and in a further embodiment the stall torque is at least 70 Newton meter (N-m), and at least 75, 80, 85, or 90 N-m in further embodiments. In one embodiment the battery is lithium battery with a capacity of at least 600 watt-hour. The internal geared hub motor performs better on the golf course, where high torque, not high speed, is required; and direct drive (aka gear less motors), require much bigger battery and motor capacities.

Many of the illustrated embodiments include a unique divided passageway golf bag (12), as illustrated in FIGS. 139 and 149-154. The bag (12) has a top (600), bottom (610), length (620), width (630), depth (640), passageway (650), front wheel side (680), and rear wheel side (690). The passageway (650) has a passageway width (660) and a passageway length (670). The bottom (610) may include a receiver (615) designed to cooperate and receive a support base projection (99) extending from the bag support base (97), as seen in FIG. 186. In one embodiment the depth (640) is greater than the width (630). In another embodiment the passageway length (670) is at least 30% of the length (620), and at least 35%, 40%, or 45% in further embodiments. Another series of embodiments limits the passageway length (670) to no more than 75% of the length (620), and in additional embodiments no more than 65%, 60%, or 55%.

The depth that the passageway (650) extends into the bag (12) from the front wheel side (680) toward the rear wheel side (690) varies, with the depth increasing as the passageway (650) approaches the top (600). The passageway width (660) is at least 20% of the bag width (630) in one embodiment, and at least 25% and 30% in further embodiments. The passageway width (660) is less than 60% of the bag width (630) in another embodiment, and less than 55%, 50%, 45%, and 40% in further embodiments. The orientation of the passageway (650) is easily understood with reference to FIG. 190 and the column axis (35A), the column axis angle (35AA), and the support base angle (97A) of FIG. 180, thereby producing a bag (12) that fits securely on the bag support base (97) and around a portion of the steering column (35), while permitting the steering column (35) to rotate freely.

Now referring to an embodiment of rideable cart (10), as seen in FIGS. 12, 13, and 20-24, having a personal support sba (20), a front wheel and steering sba (22), a rear wheel sba (24), a frame tube (32), a base segment (42), a running board (56), as seen in FIG. 12.

Figure 100:
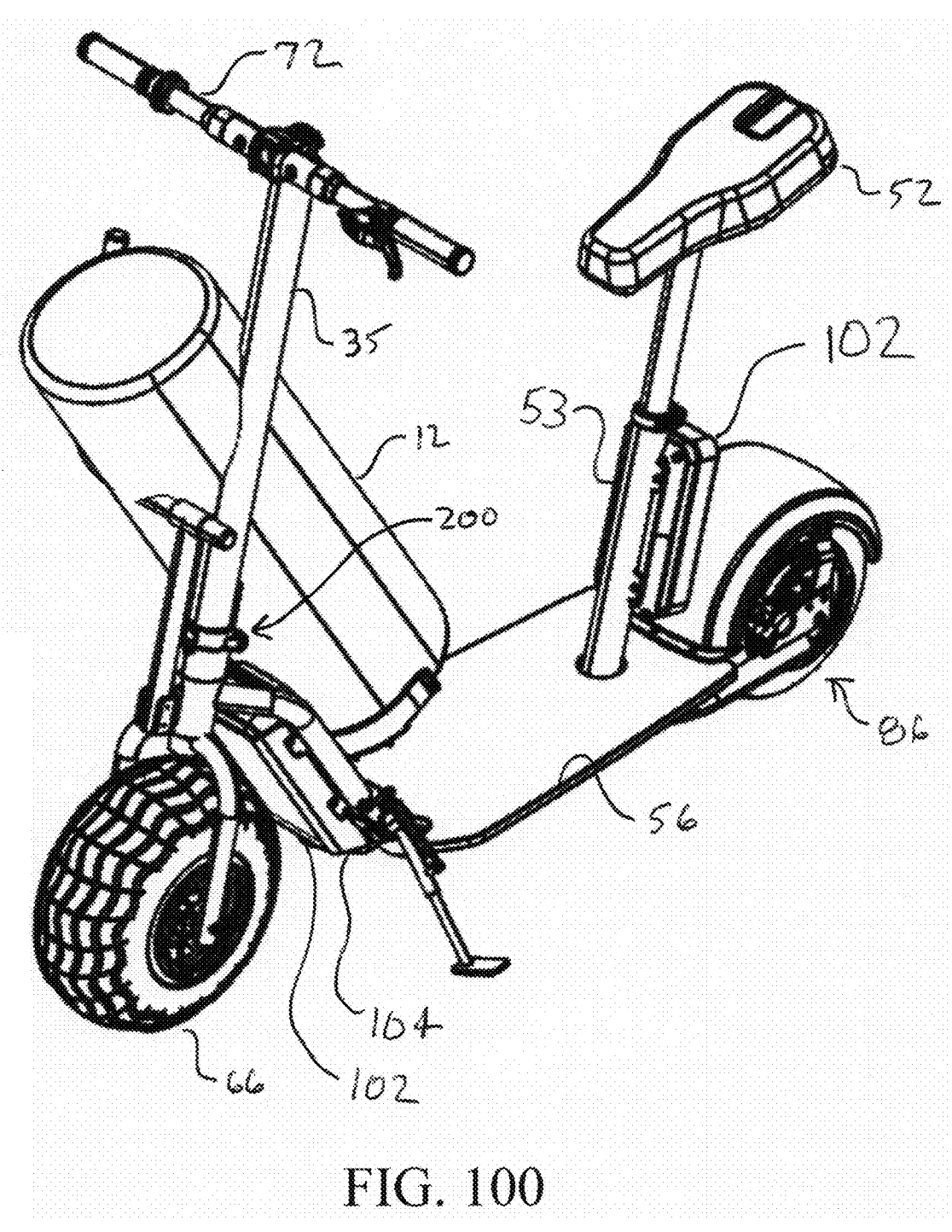
FIG. 100 is a front left perspective view of the invention alternate embodiment, showing a golf bag.
Figures 101, 102:
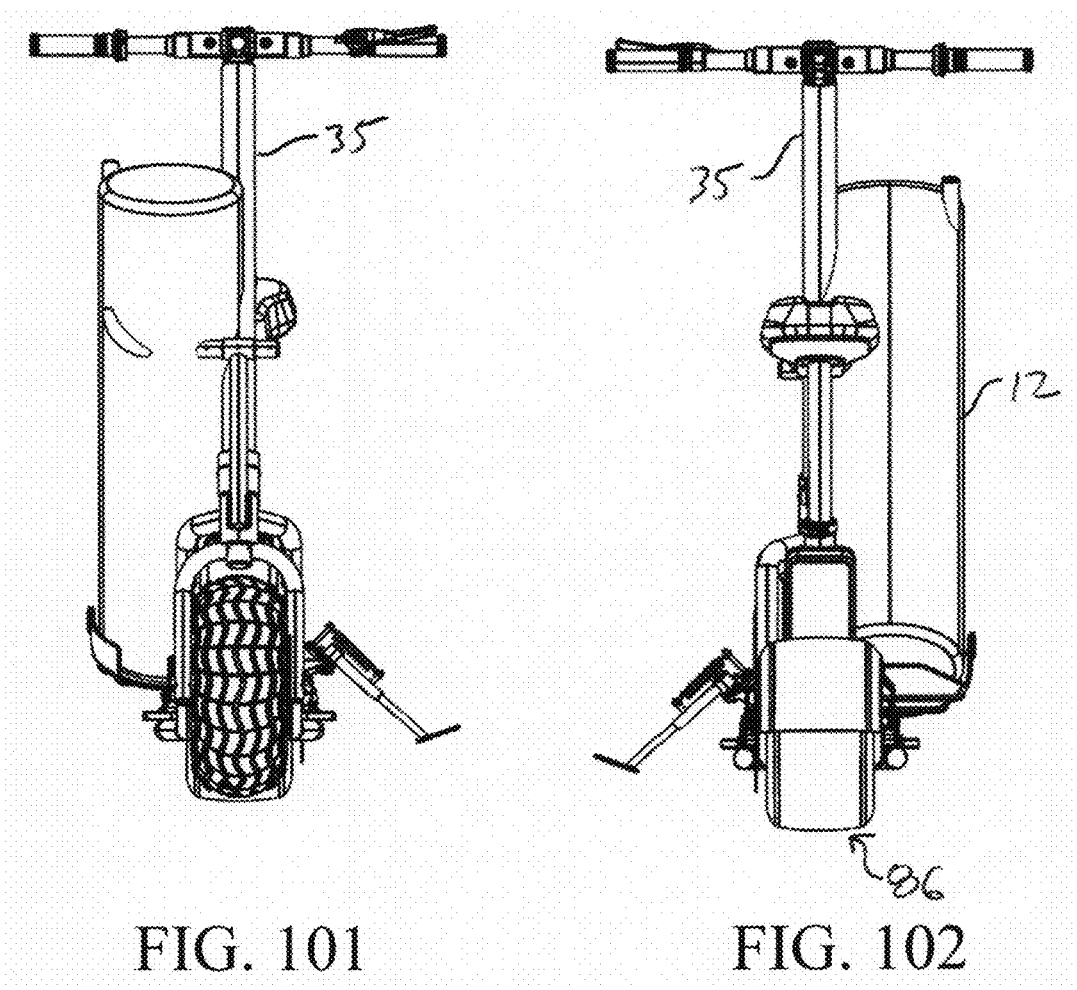
FIG. 101 is a front elevational view of an alternate embodiment of the invention, shown with a golf bag.
FIG. 102 is a rear elevational view of an alternate embodiment of the invention, shown with a golf bag.
Figure 103:
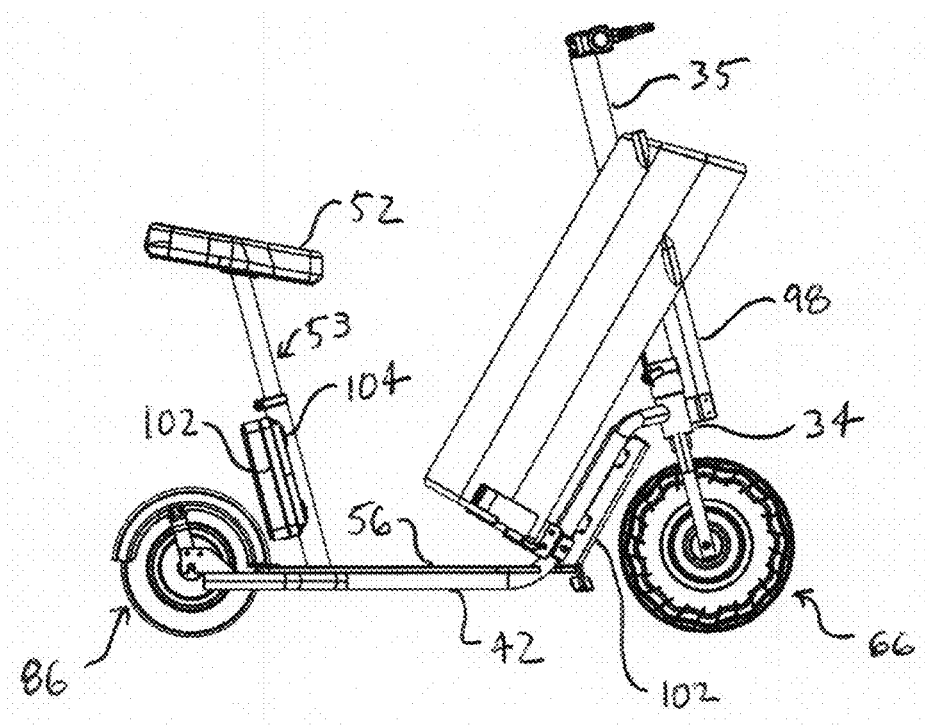
FIG. 103 is a right elevation view of an alternate embodiment of the invention, shown with a golf bag.
Figure 104:
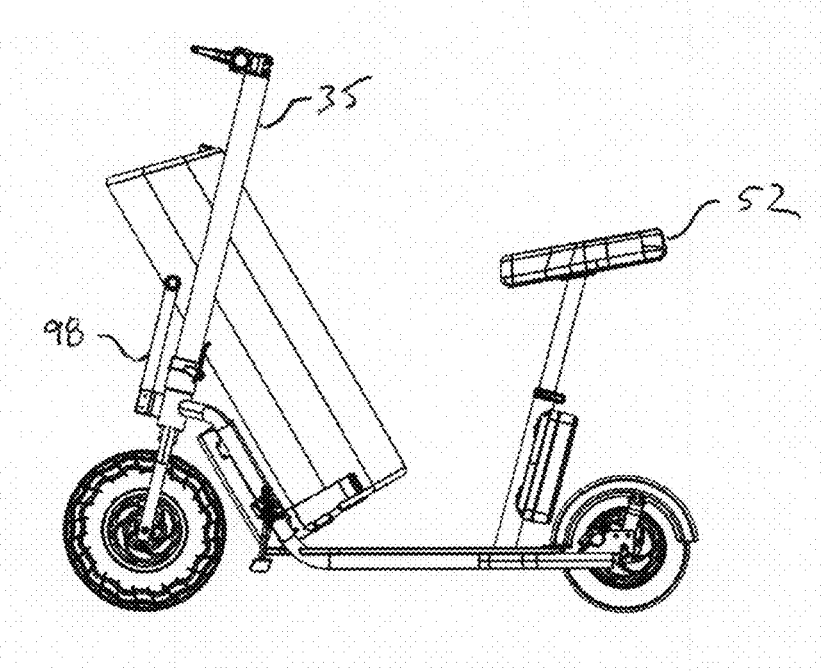
FIG. 104 is a left elevation view of an alternate embodiment of the invention, shown with a golf bag.
Figures 105, 106, 107:
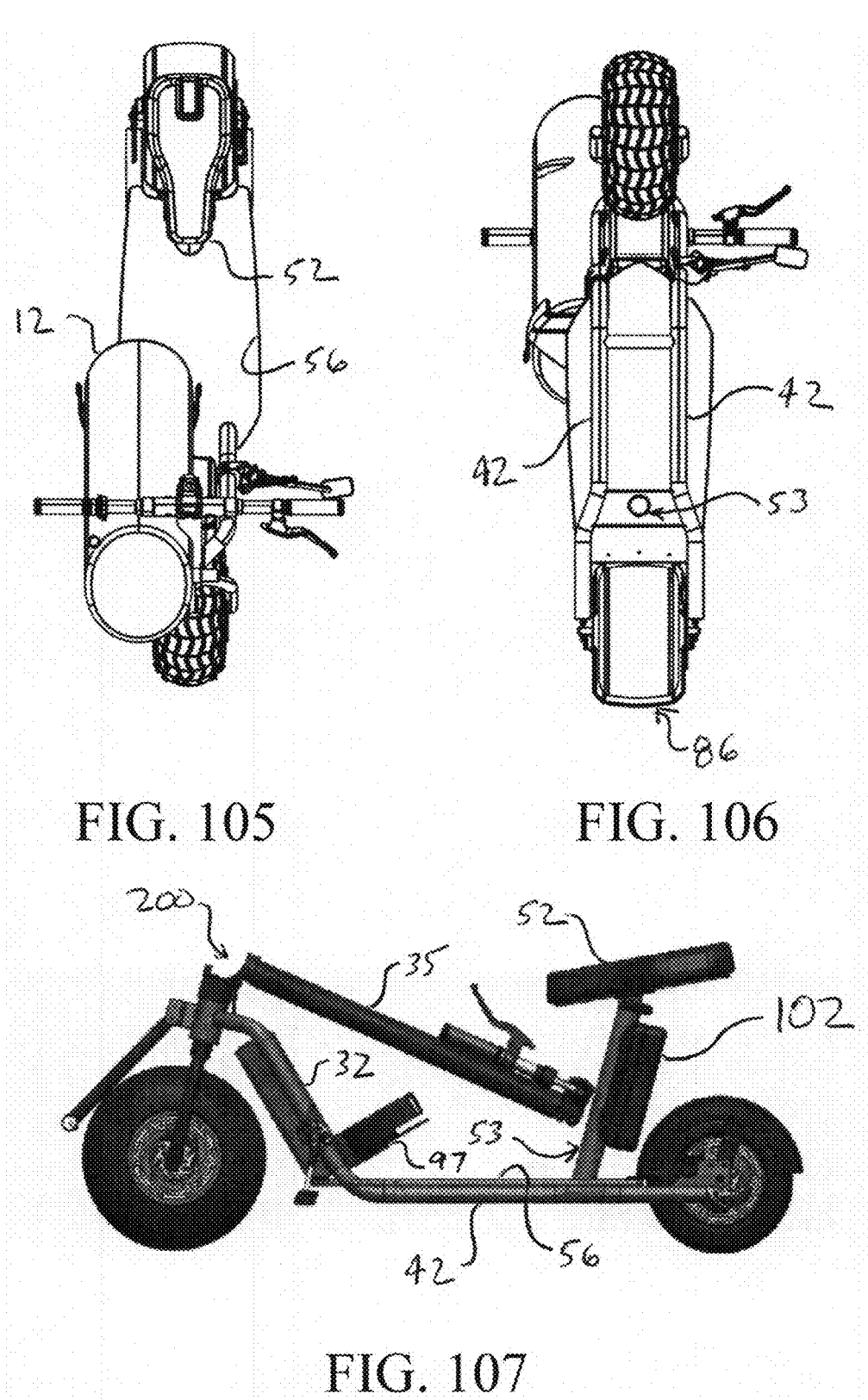
FIG. 105 is a top view of an alternate embodiment of the invention, shown with a golf bag.
FIG. 106 is a bottom view of an alternate embodiment of the invention, shown with a golf bag.
FIG. 107 is a left elevation view of an alternate embodiment of the invention, shown in a folded state.

The personal support sba (20) may include a seat (52) having a cushion (54) that may be made of polyurethane foam and or natural fiber fill, a battery cradle (104) which supports a rechargeable battery (102). However, the battery (102) and battery cradle (104) may be located in a number of locations as disclosed herein. For example, the battery (102) and/or battery cradle (104) may be located above the rear wheel (86) seen in FIGS. 12, 13, 16, 19-24, just to name a few such figures, or attached to, within, or created by the frame tube (32), as seen in FIGS. 54, 78, 86, and 94, or attached to, within, or created by the seat support (53), as seen in FIG. 100, or attached to, within, or created by the base segment (42), as seen in FIG. 108, 116, 132, 169, 177.

Figure 16:
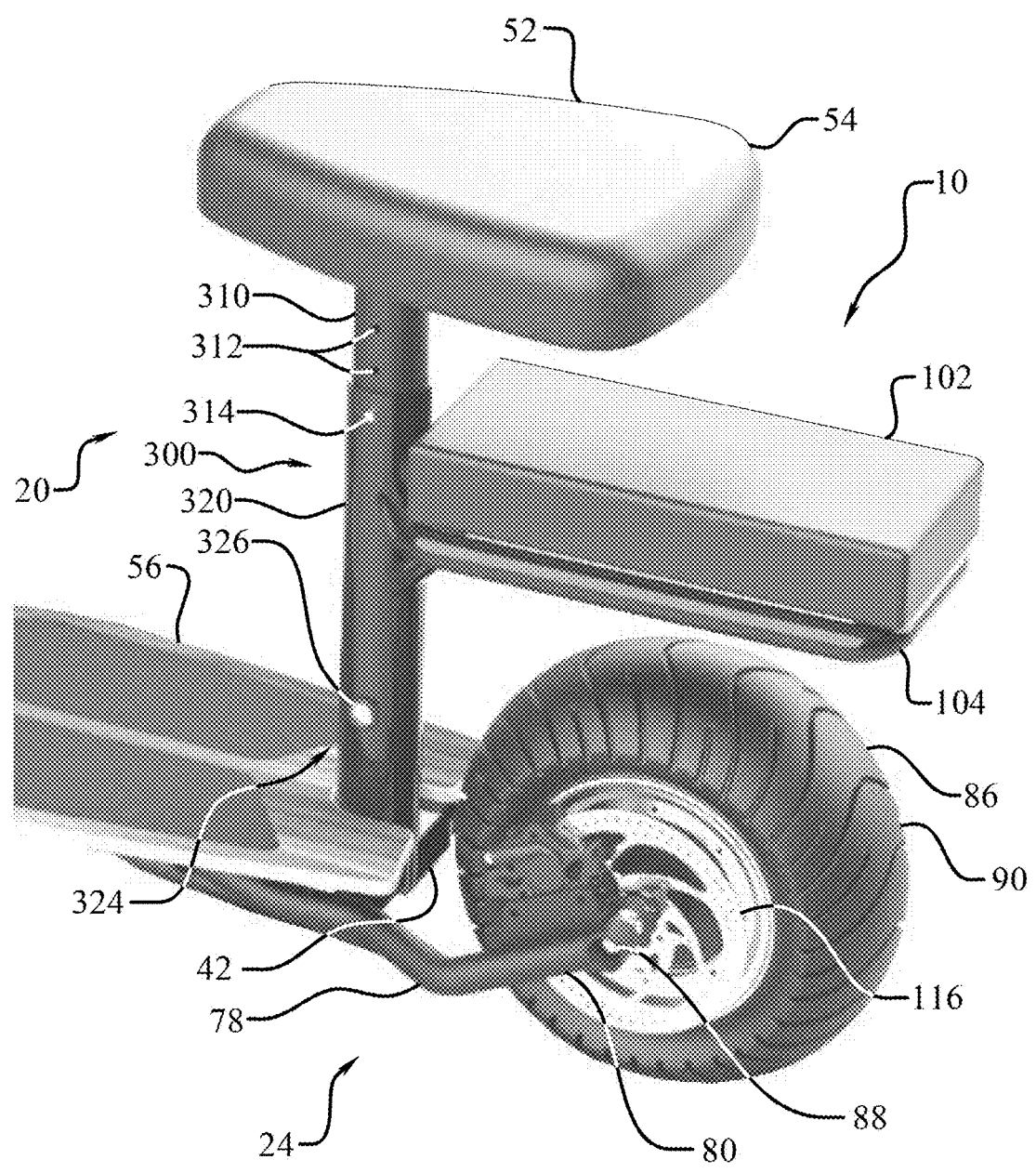
FIG. 16 is a top rear left side perspective view of the present invention.
Figure 17:
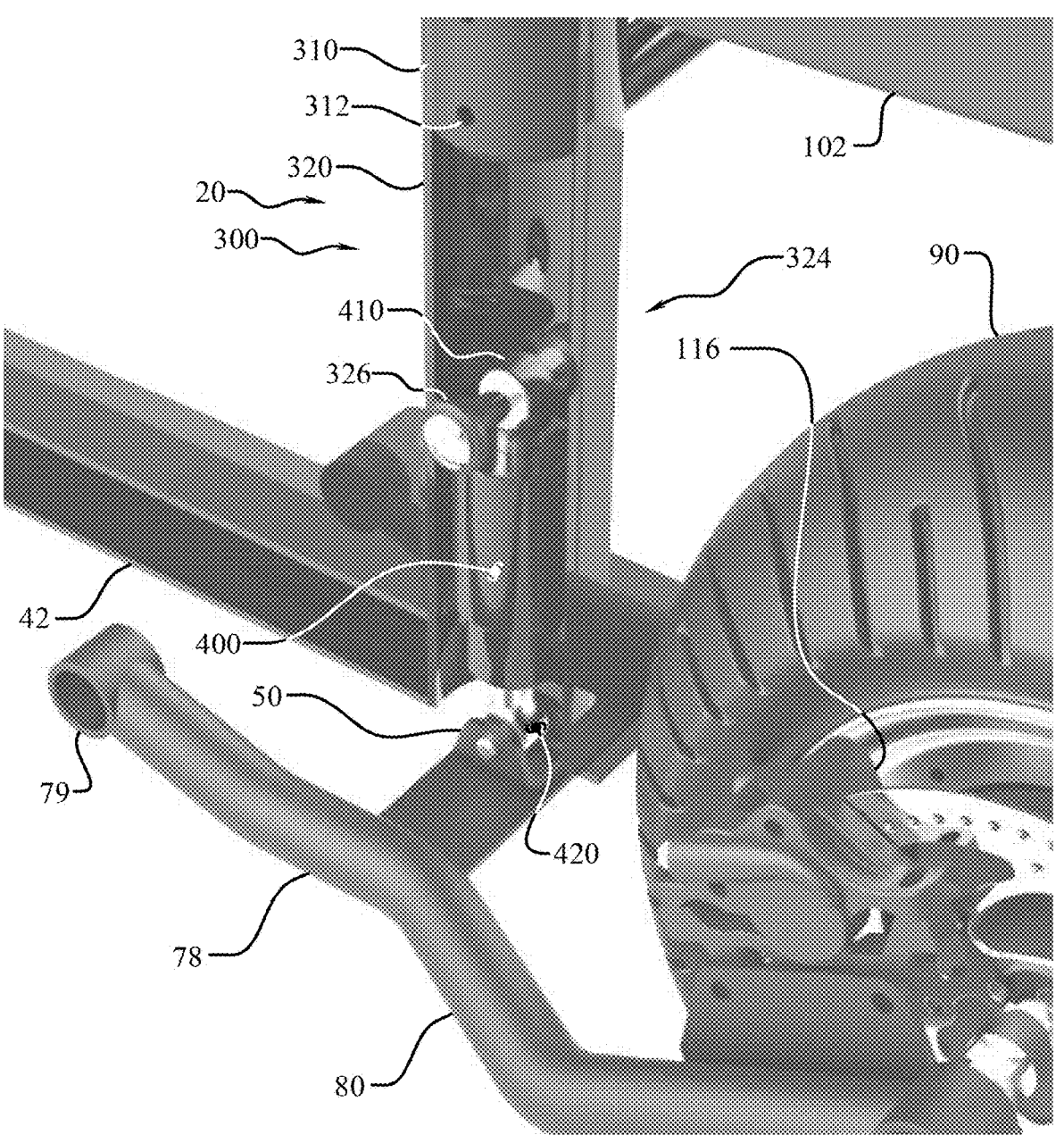
FIG. 17 is a partial cut away view of an alternate embodiment of the invention, showing a shock absorber within a shock absorber housing.

The personal support sba (20) may further include a shock mount housing (300), abbreviated as SMH, and a shock absorber (400) mounted therein, having a shock absorber proximal end (410) and a shock absorber distal end (420), best seen in FIGS. 16 and 17. In this embodiment, the shock absorber (400) helps reduce the jarring a golfer or rider (13) experiences while using the (rideable cart (10). The shock mount housing (300) has a SMH upper portion (310) having at least one SMH upper portion adjustment apertures (312) and a SMH upper portion adjustment fastener (314) that cooperates with a SMH lower portion adjustment aperture (322) to allow adjustment of the seat (52) height, best seen in FIG. 16. The seat (52) height is set by aligning one of the SMH upper portion adjustment apertures (312) with the SMH lower portion adjustment aperture (322) and passing the SMH upper portion adjustment fastener (314) through the respective aligned apertures (312, 322). In one embodiment of shock mount housing (300), the SMH upper portion (310) telescopes from inside of a SMH lower portion (320) allowing linear height adjustments of the seat (52), best seen in FIGS. 12, 16, 17 and 21. In another embodiment, the SMH upper portion (310) may telescopically encompass the SMH lower portion (320), not illustrated in the drawings. Furthermore, the SMH upper portion (310) may also have an attached battery cradle (104), which holds a rechargeable battery (102), as seen in FIGS. 12, 13, 16, 19-21 and 23. The SMH lower portion (320) further includes a SMH lower portion shock proximal end mounting aperture (324), and a SHH lower portion shock proximal end mounting fastener (326) which is positioned through one side of the SMH lower portion shock proximal end mounting aperture (324) through an aperture located on the shock proximal end (410) and through the SMH lower portion shock proximal end mounting aperture (324) located on the opposite side of the SMH lower portion (320), as seen in FIG. 17. Additionally, the SHH lower portion shock proximal end mounting fastener (326) may be, but not limited to, a simple pin, a pin having a locking detent, a pin held in place with a cotter pin, and a nut and bolt combination. The shock distal end (420) is connected to a shock absorber bracket (50) that connects to a rear fork (78), also seen in FIG. 17.

Figure 18:
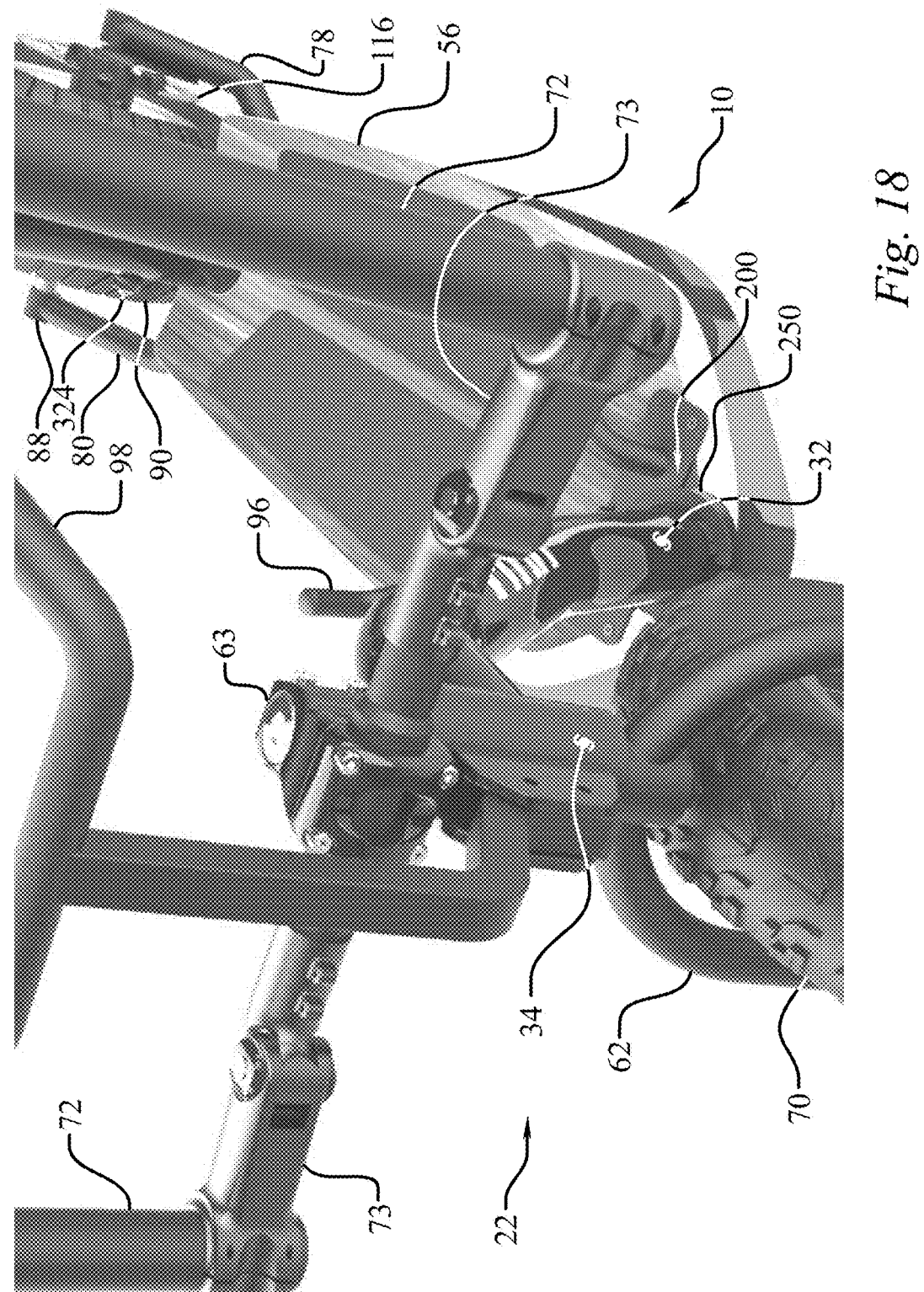
FIG. 18 is a partial front left perspective view of an alternate embodiment of the invention, showing a handlebar assembly.

The front wheel and steering sba (22) in the current embodiment may include: a steering bracket (34) connect to pivot tubes (73) adapted to rotationally and lockable connect a set of handlebars (72) having handle grips (76) terminating the ends thereof, a control unit (108) connected to one of the handle grips (76), and a brake actuator (110) connected to the other handle grips (76), illustrated in FIGS. 12, 13 and 18. The front wheel and steering sba (22) may further include: a front fork bracket (63) that connects a front fork (62) having a pair of front fork arms (64) to the steering bracket (34), such that when the steering bracket (34) is rotated it causes the front fork bracket (63) to rotate. The front fork arms (64) may connect to a front axle (67) of a front wheel (66) having a front tire (70). The front tire (70) in one embodiment may be a typical pneumatic tire, while in another embodiment it may be a tubeless or non-pneumatic tire that may be solid, foam filled, or airless tires that use polymer spokes to maintain the tire's shape and structural integrity. Further, the front wheel and steering sba (22) may have a front brake (114), illustrated in FIG. 13, that may be mechanically, pneumatically, hydraulically or electrically connected to and actuated by the brake actuator (110). In addition, the front wheel and steering sba (22) may also incorporate an upper bag cradle (98) that functions as a part of a bag support sba (26), seen in FIGS. 12, 13, 20-24.

Figure 14:
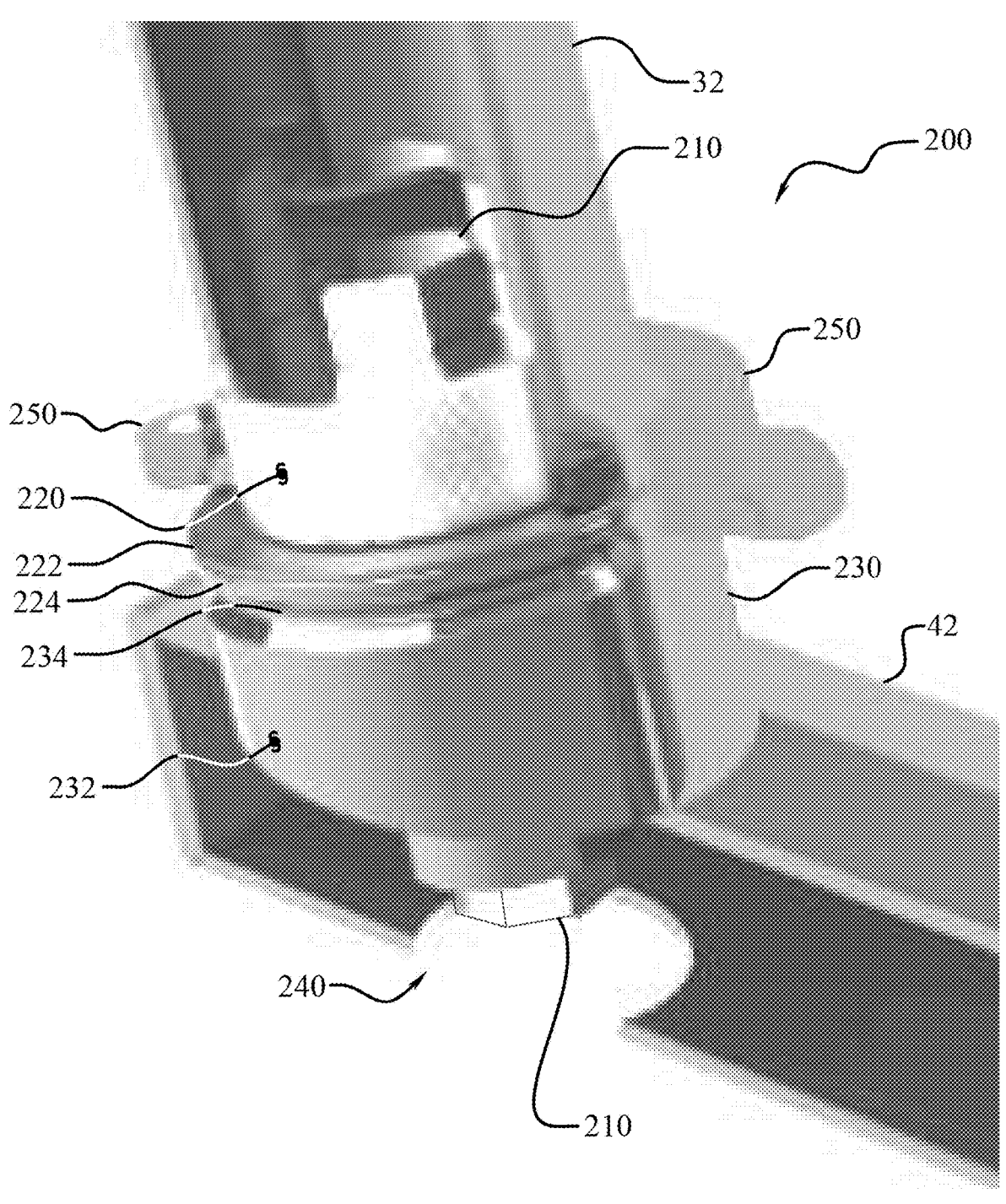
FIG. 14 is a cut away view of the invention, showing a frame tube to base segment connection.
Figure 15:
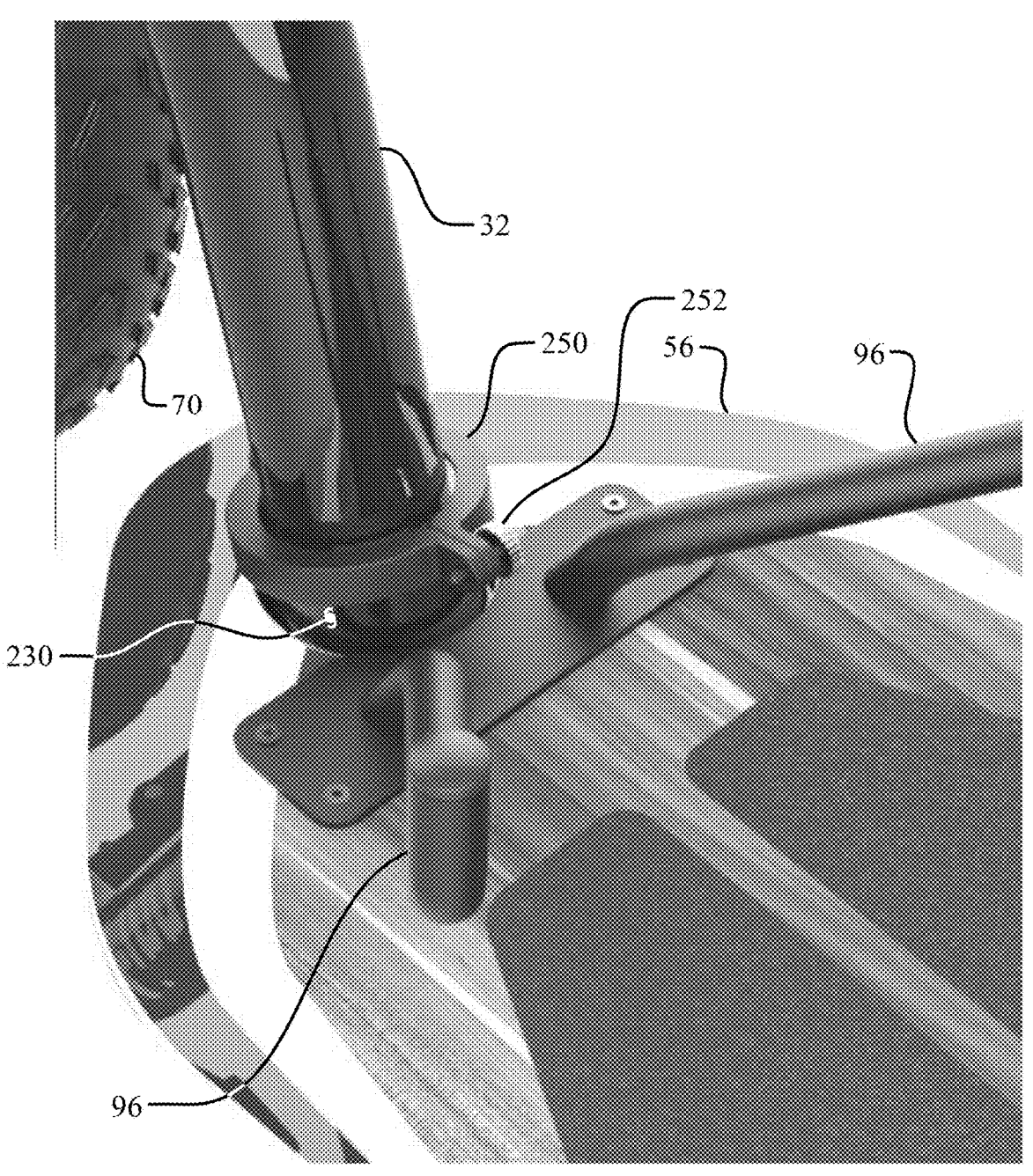
FIG. 15 is a front left perspective view of an alternate embodiment of the invention, showing the frame tube to running board connection.
Figure 19:
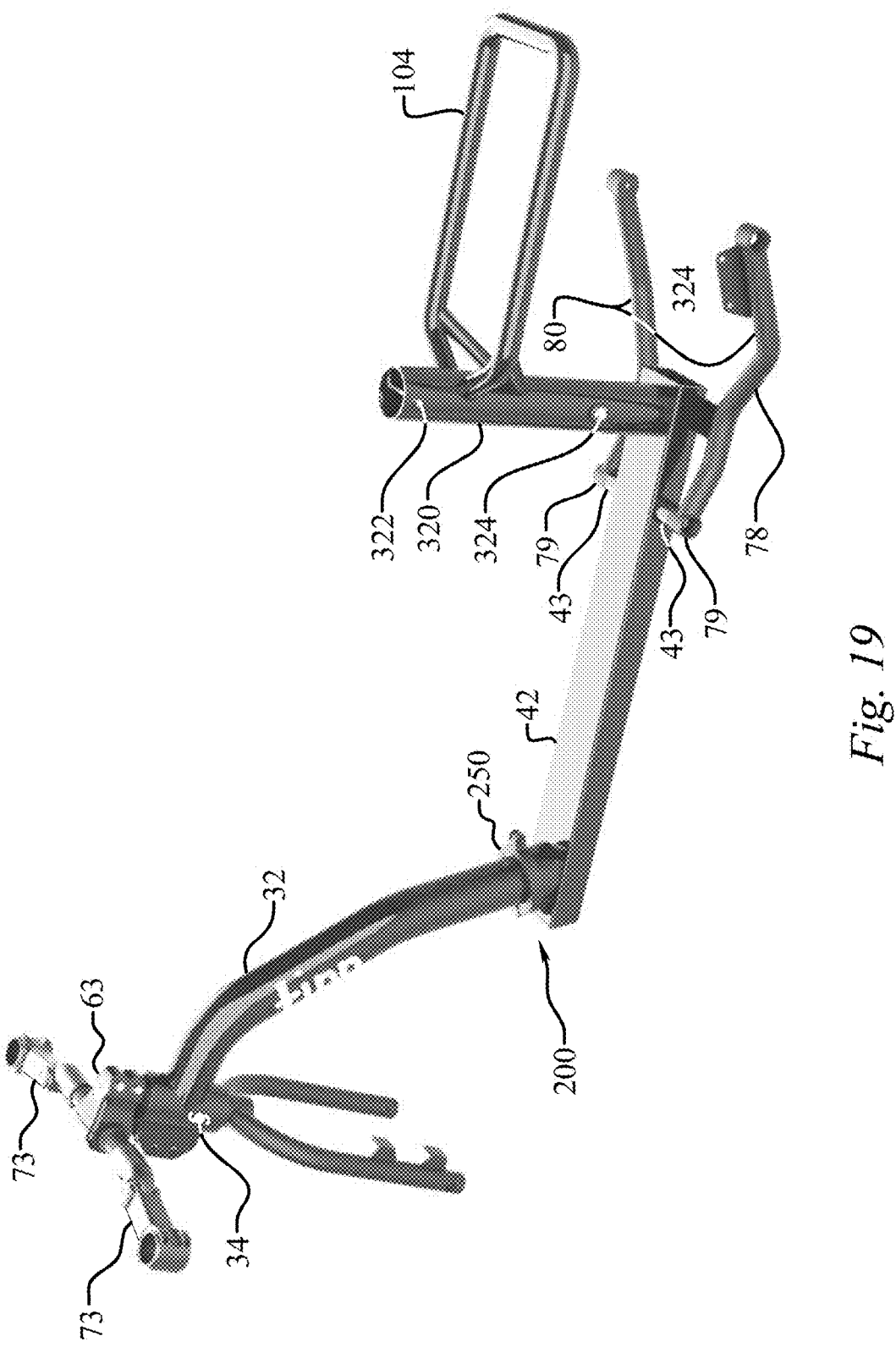
FIG. 19 is a top rear left side view of an alternate embodiment of the invention, showing a frame assembly.
Figure 20:
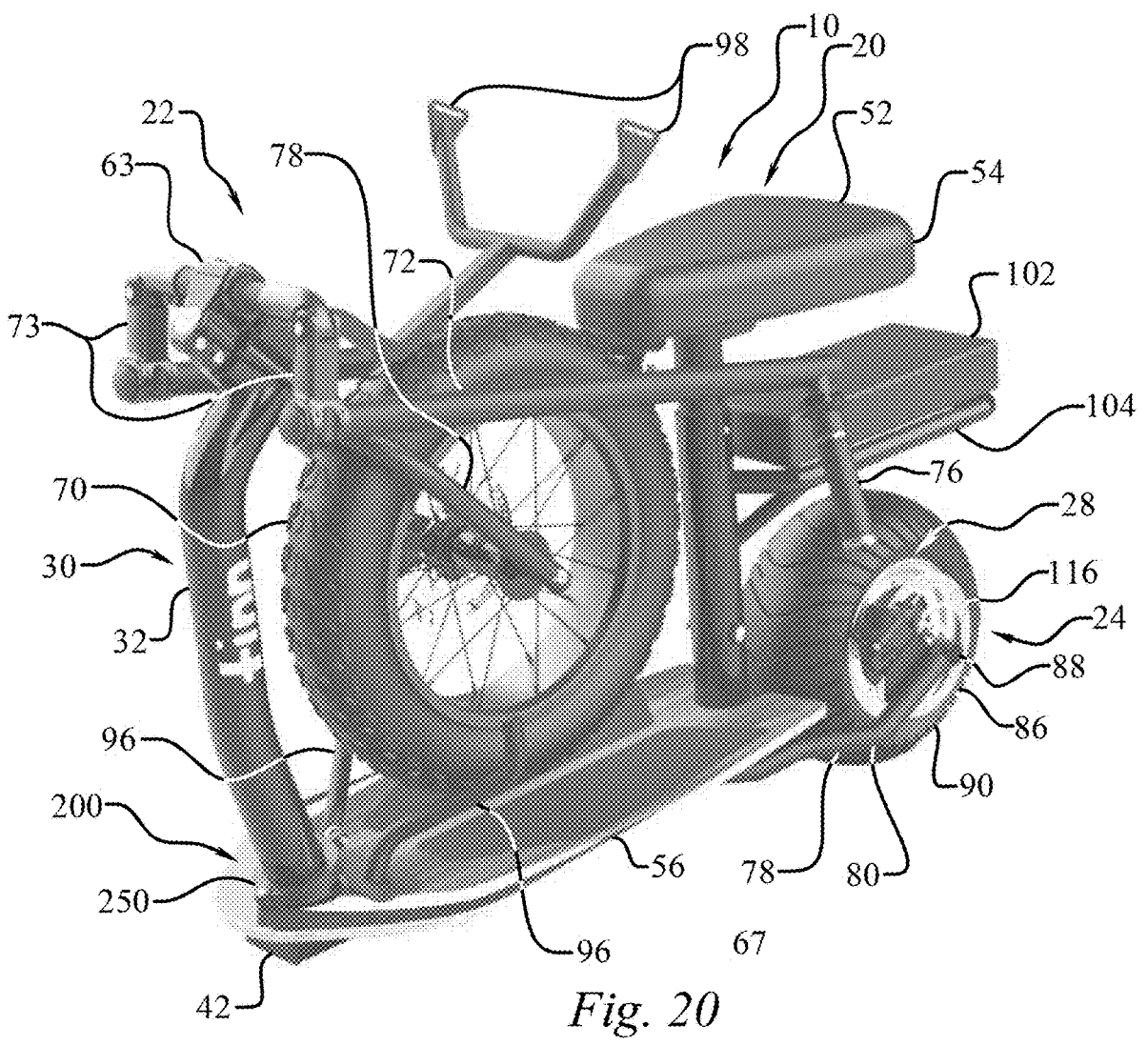
FIG. 20 is a front left perspective view of the powered riding golf bag cart/cycle in a folded state.
Figure 23:
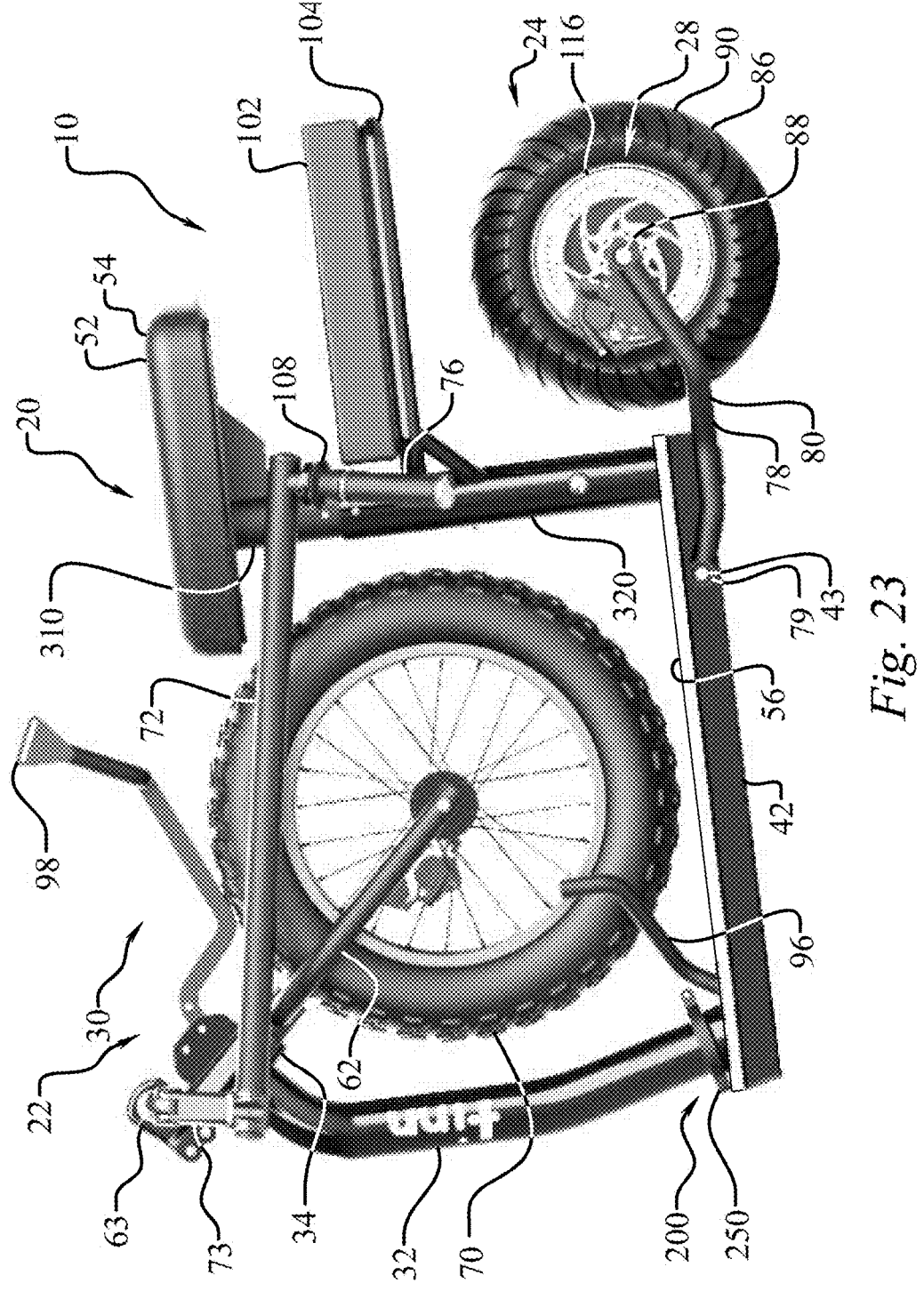
FIG. 23 is a left elevation view of the powered riding golf bag cart/cycle in a folded state.
Figure 24:
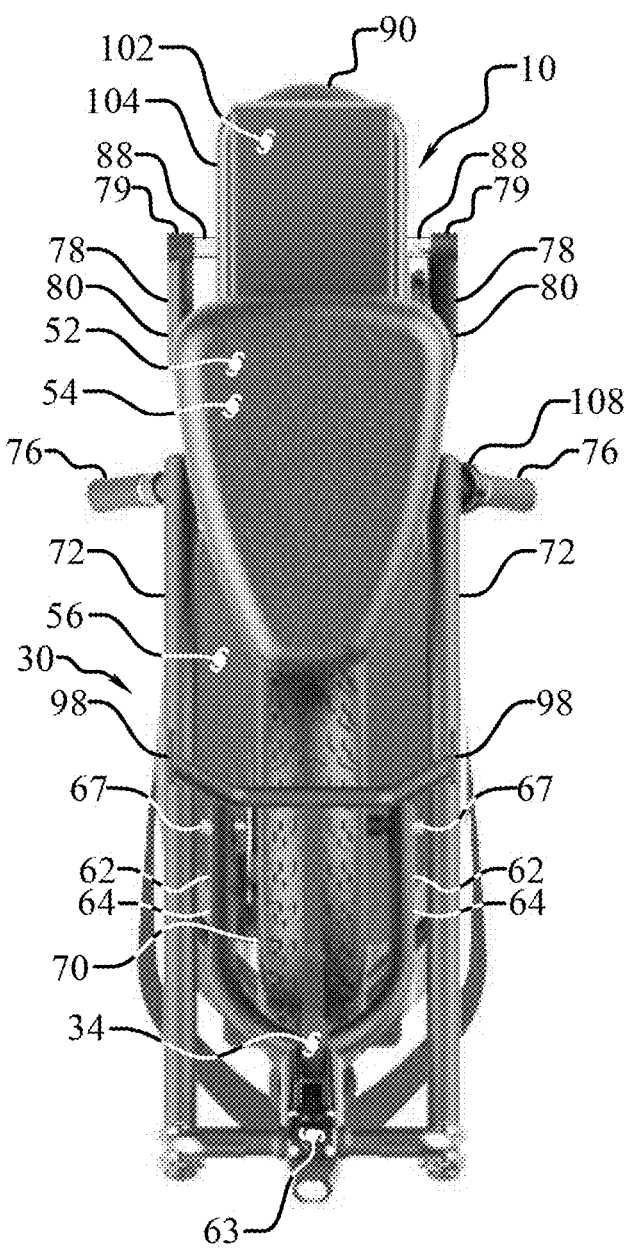
FIG. 24 is a top view of the invention, in a folded state.

In the current embodiment, one end of the frame tube (32) is rotationally connected to the steering bracket (34), as seen in FIGS. 12, 13 and 19, and the opposite end of the frame tube (32) connects to a connector assembly (200), seen in FIGS. 14, 15, 19-23. One embodiment of connector assembly (200) may allow the frame tube (32) to rotate into a storage mode (30), as seen in FIGS. 20, 23 and 24. In this embodiment, the connector assembly (200) may include a frame tube end plug (220) that is fixedly positioned in the end of the frame tube (32), seen in FIG. 14, and a frame tube pivot plate (222) having a frame tube pivot plate surface (224). The connector assembly (200) may further include a base segment connection tube (230) connected to a base segment (42), illustrated in FIG. 14. Additionally, the base segment connection tube (230) may further have a base segment connection tube plug (232), having a base segment connection pivot surface (234), that is fixedly positioned in the base segment connection tube (230), shown in FIG. 14. The frame tube pivot plate surface (224) abuts against the base segment connection pivot surface (234) and allows slidable rotation in respect to each other. A connector fastener (210) may pass through the center of the frame tube end plug (220) and the base segment connection tube plug (232) to secure them together, and still allow rotation. The connector fastener (210) may be, but not limited to, a bolt and nut fastener combination, a riveted fastener, or a detent catch system. Additionally, the base segment (42) may have a base segment fastener aperture (240) that allows access to a portion of the connector fastener (210), as seen in FIG. 14. The connector assembly (200) may utilize a locking clamp (250) that may further include a locking clamp screw (252) that engages the locking clamp (250) to rotationally lock the connector assembly (200) and prevent the rotation of the frame tube (32) in respect to the base segment (42). In another embodiment, not illustrated, the connector assembly (200) may allow removal of the front wheel and steering sba (22) from the rideable cart (10) for storage purposes and lacks the rotational functionality of the former embodiment. In yet another embodiment, the connector assembly (200) may allow the frame tube (32) to pivot towards the personal support sba (20) after a locking mechanism is disengaged, not illustrated in the drawings.

In the current embodiment, the base segment (42), best seen in FIG. 19, forms the foundational support for a golf bag (12) and golfer or rider (13). A running board (56) is attached to the upper surface of the base segment (42), best seen in FIGS. 15 and 21. A set of bag bottom rods (96) which secures the bottom of a golf bag (12) are located on the upper surface of the running board (56) near the frame tube (32), as seen in FIGS. 12, 13, 15 and 21-23. The bag bottom rods (96) work in tandem with the upper bag cradle (98) to secure the golf bag (12) to the rideable cart (10). The SMH lower portion (320) of the personal support sba (20) is permanently connected to the base segment (42) on the opposite side of from the frame tube (32), seen in FIG. 19. Additionally, base segment pivot rods (43) are permanently connected to the base segment (42) and allow a rear fork (78) to attach to the base segment (42) by rear fork pivots (79) located on a pair of rear fork arms (80), seen in FIG. 19.

Figure 21:
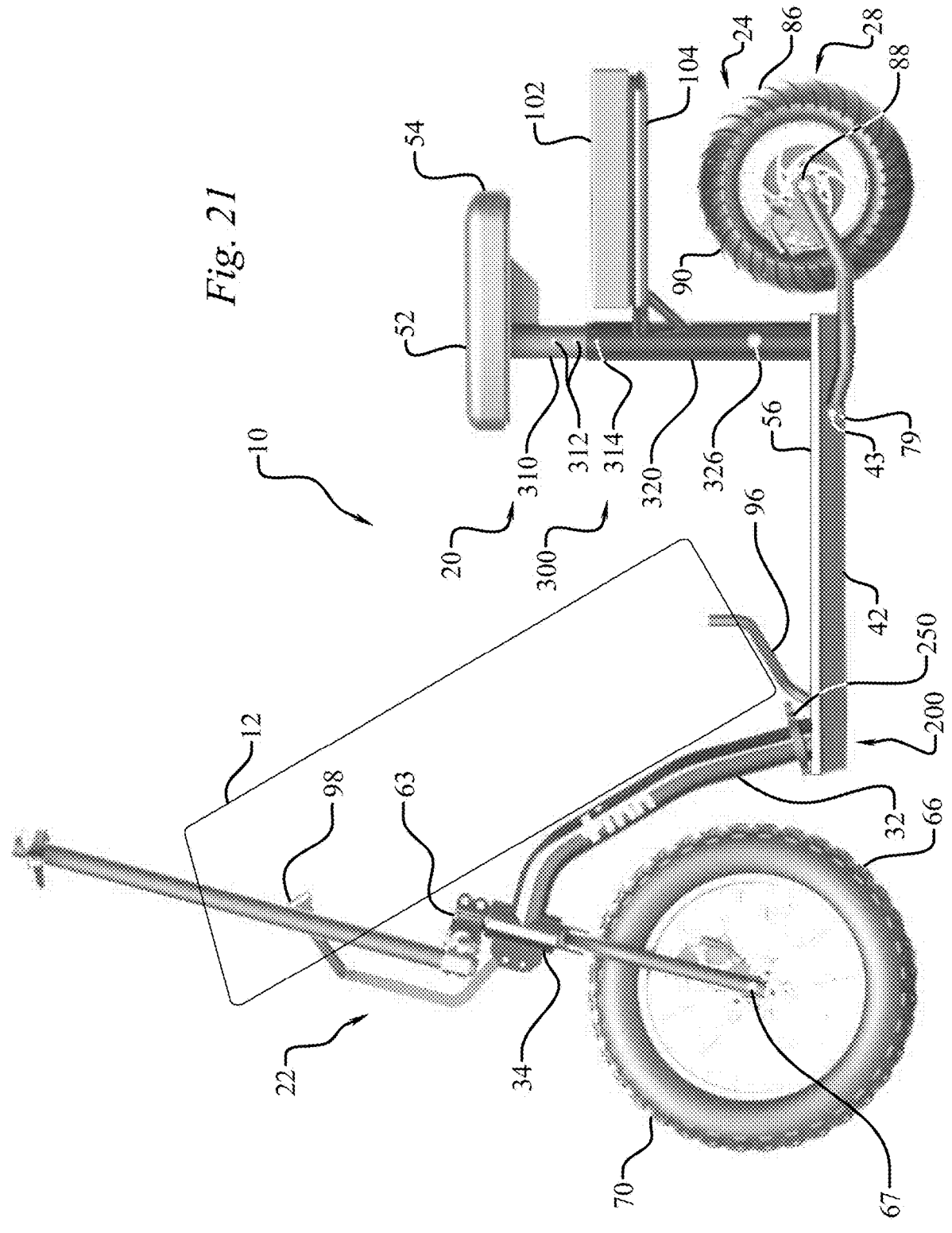
FIG. 21 is a left elevational view of the riding golf bag cart/cycle of the invention, showing a golf bag silhouette.
Figure 22:
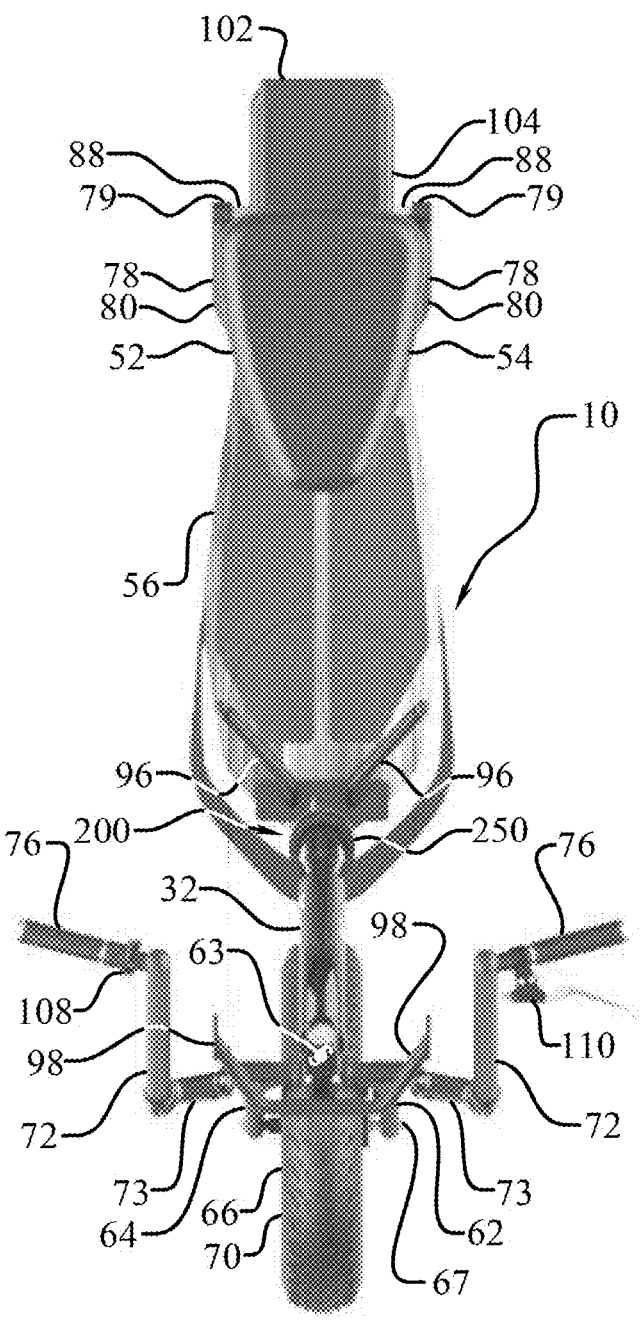
FIG. 22 is a top view of the invention, shown without a golf bag.

The current embodiment of rear wheel sba (24) may include a rear fork (78) having a pair of rear fork arms (80), rear fork pivots (79) located on the front portion of the rear fork arms (80), a rear wheel (86) having a rear axle (88) that is connected to the rear portion of the rear fork arms (80), a rear tire (90), a rear brake (116), and a motive sba (28), seen in FIGS. 12, 13, 16, 17, 21 and 23. The rear fork pivots (79) are mounted and partially rotate on the base segment pivot rods (43), as seen in FIGS. 19, 21 and 23. Additionally, the rear fork (78) may have a shock absorber bracket (50) that is connected to each of the rear fork arms (80), and connects to the shock distal end (420), illustrated in FIG. 17. The rear tire (90) in one embodiment may be a typical pneumatic tire, while in another embodiment it may be a tubeless or non-pneumatic tire that may be solid, foam filled, or airless tires that use polymer spokes to maintain the tire's shape and structural integrity. The rear brake (116), in one embodiment, may be a disc caliper style brake, with the caliper mounted to one of the rear fork arms (80) and the disc mounted on the rear wheel (86), best seen in FIGS. 16, 17 and 23. Another embodiment of the rear brake (116) may use a shoe and brake drum system, not shown in the drawings. Regenerative braking, which slows the rideable cart (10) by converting movement into electricity, may also be utilized as the rear brake (116) or as a part thereof, not illustrated. Further, the rear brake (114) may be mechanically, pneumatically, hydraulically or electrically connected to, and actuated by, the brake actuator (110) which may be located on one of the handle bars (72) in one embodiment, as seen in FIG. 13, and maybe located on a foot switch in another embodiment, not shown in the drawings.

The motive sba (28) maybe located within the perimeter of the rear wheel (86) in one embodiment of the rideable cart (10), as illustrated in FIG. 16. Additionally, in another embodiment, not shown in the drawings, the motive sba (28) may be mounted to one side of the rear wheel (86) and the motive sba (28) body may be fixed to one of the rear fork arms (80) and the motive sba (28) drive shaft coupled to the rear axle (88). Furthermore, the rideable cart (10), motive sba (28) may be, but not limited to, a direct current (DC) brushed motor, an out-runner type brushless DC motor, also known as a hub-motor, an in-runner type brushless DC motor, a permanent magnet synchronous motor, a three phase alternating current (AC) induction motor, or a switched reluctance motor. DC brushed motors have high starting torque, and utilize a commutator and brush arrangement which switches the magnetic field of the armature. However, DC brushed motors are generally high maintenance because their brushes must be periodically replaced.

Out-runner type brushless DC motors do not suffer from the maintenance issues of DC brushed motors since it lacks the commutator and brush arrangement found in DC brushed motors. In brushless DC motors, the commutation is done electronically. Additionally, the rotor of the motor is present outside and the stator is present inside and the wheel is directly connected to the exterior rotor. Out-runner type brushless DC motors do not require external gear systems, but some may have an inbuilt planetary gearing system.

In-runner type brushless DC motors have the rotor located inside and the stator is outside like conventional motors. However, this results in the need of an external transmission system to convey power to the driving wheel or wheels. The in-runner type brushless DC motors also have expensive permanent magnets attached to the rotor. If in-runner type brushless DC motors are overloaded, it over heats the magnets and reduces their operating lifespan.

Permanent magnet synchronous motors are similar to brushless DC motors in that they have permanent magnets located on the rotors and have similar performance and efficiencies as brushless DC motors. The biggest difference between permanent magnet synchronous motors and brushless DC motors is that permanent magnet synchronous motors produce a sinusoidal back electric and magnetic fields (EMF). Whereas, brushless DC motors found in out-runner, and in-runner type brushless DC motors produce trapezoidal back EMF.

Three phase AC induction motors lack the high starting torque of DC brushed and brushless motors when operated with fixed voltage and fixed frequency operation. However, the lack the high starting torque of three phase AC induction motors can be mitigated by using a variable frequency drive system to drive the motors, allowing maximum torque when the motors start. Unfortunately, induction motors using a variable frequency drive systems require complex inverter circuits which increases the complexity and cost.

Switched reluctance motors are a type of variable reluctance motors which are not only simple in construction but also tough. The rotors found in switched reluctance motors utilize laminated steel and lacks windings and permanent magnets. As a result, rotor inertia of the motor is reduced during periods of high acceleration. Unfortunately, switch reluctance motors require complex and costly control and switching electronics to drive the motor.

Figures 35A, 35B, 35C, 36A, 36B, 36C:
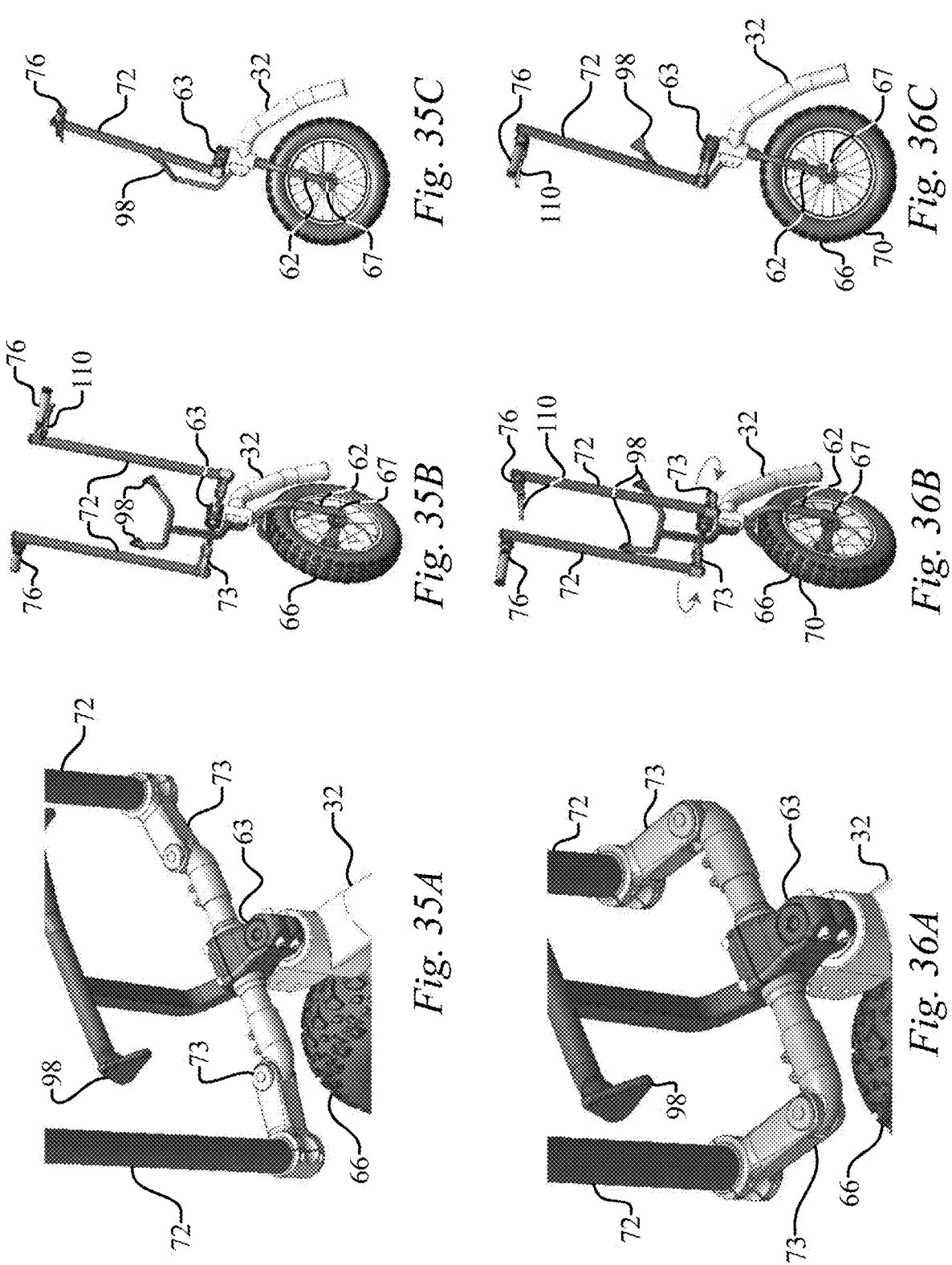
FIG. 35A is a partial rear left perspective view of an alternate embodiment of the invention, showing the handle bar assembly.
FIG. 35B is a partial front left perspective view of an alternate embodiment of the invention, showing the handle bars in the non-storage state.
FIG. 35C is a partial left elevation view of an alternate embodiment of the invention, showing the handle bars in the non-storage state.
FIG. 36A is a partial rear left perspective view of an alternate embodiment of the invention, showing the handle bar assembly with rotated pivot tubes.
FIG. 36B is a partial front left perspective view of an alternate embodiment of the to invention, showing the rotated pivot tubes.
FIG. 36C is a partial left elevation view of an alternate embodiment of the invention, showing the rotated pivot tubes.
Figures 37A, 37B, 37C, 38A, 38B, 38C:
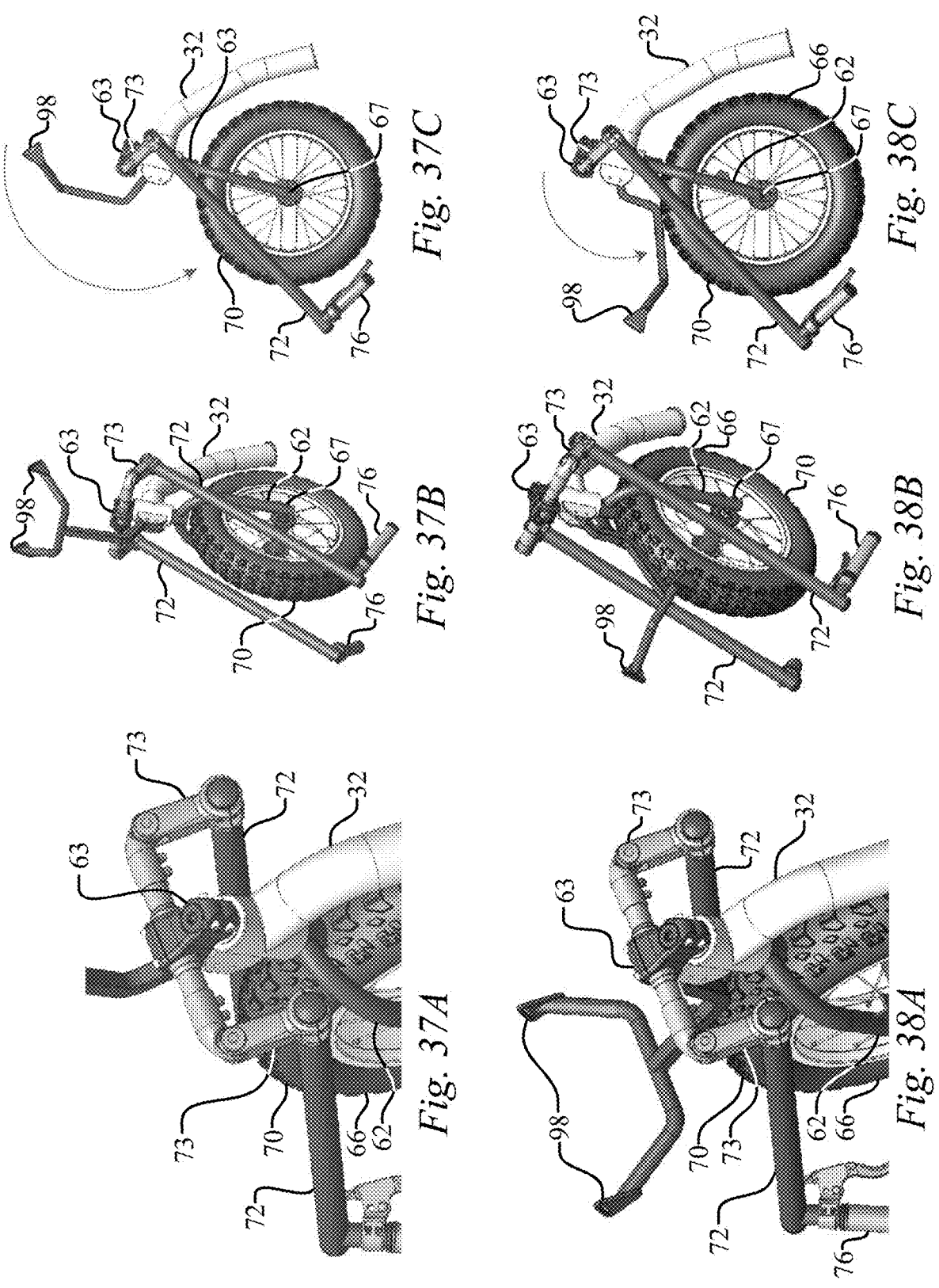
FIG. 37A is a partial rear left perspective view of an alternate embodiment of the invention, showing the handle bar assembly with rotated pivot tubes and forward rotated handlebars.
FIG. 37B is a partial front left perspective view of an alternate embodiment of the invention, showing the handle bar assembly with forward rotated pivot tubes and forward rotated handlebars.
FIG. 37C is a partial left elevation view of an alternate embodiment of the invention, showing the handle bar assembly with forward rotated pivot tubes and forward rotated handlebars.
FIG. 38A is a partial rear left perspective view of an alternate embodiment of the invention, showing the handle bar assembly with rotated pivot tubes and forward rotated handlebars and forward rotated upper bag cradle.
FIG. 38B is a partial front left perspective view of an alternate embodiment of the invention, showing the handle bar assembly with rotated pivot tubes and forward rotated handlebars and forward rotated upper bag cradle.
FIG. 38C is a partial left elevation view of an alternate embodiment of the invention, showing the handle bar assembly with rotated pivot tubes and forward rotated handlebars and forward rotated upper bag cradle.
Figure 39:
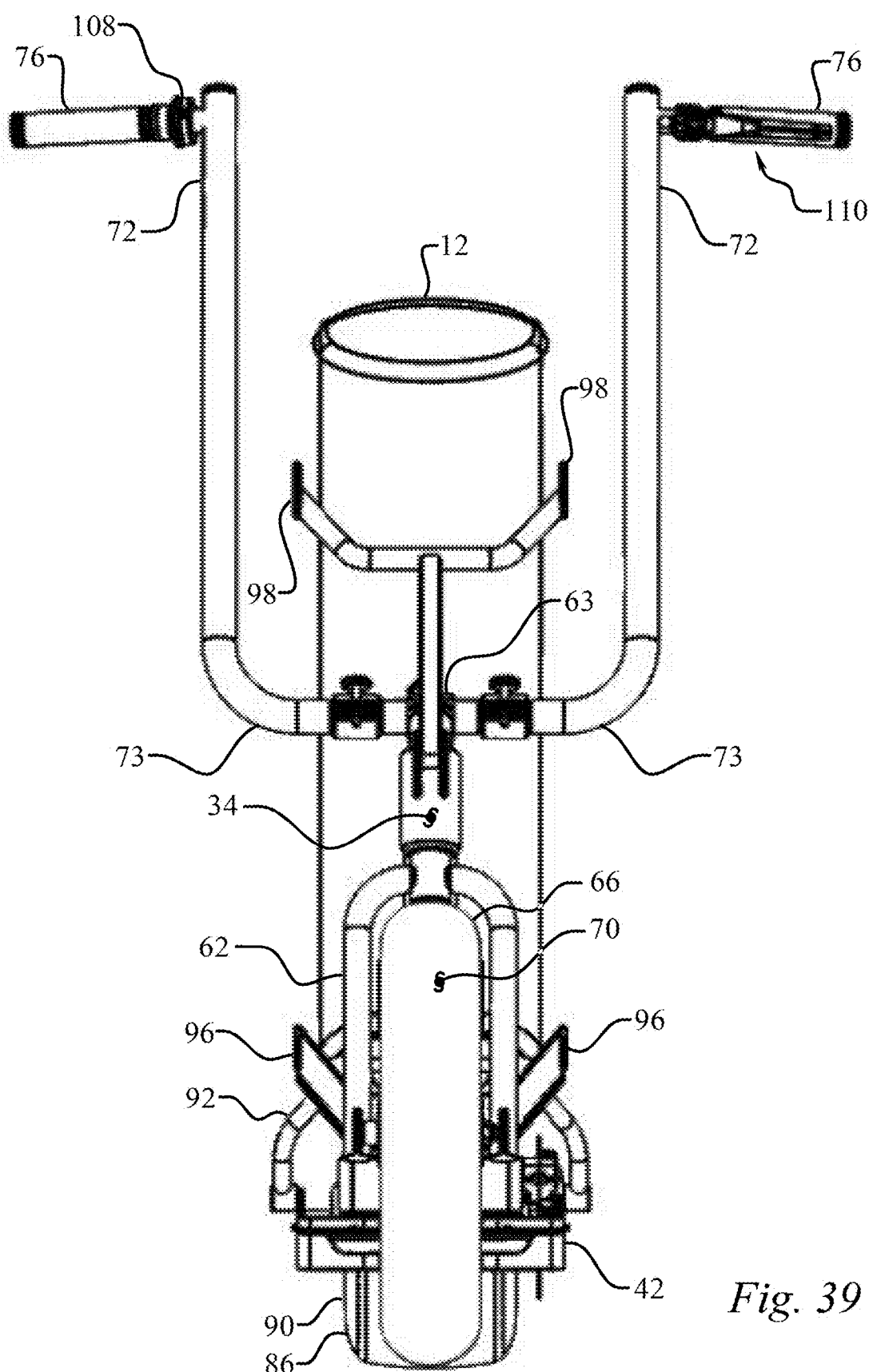
FIG. 39 is a front elevational view of an alternate embodiment of the invention, shown with a golf bag.
Figure 40:
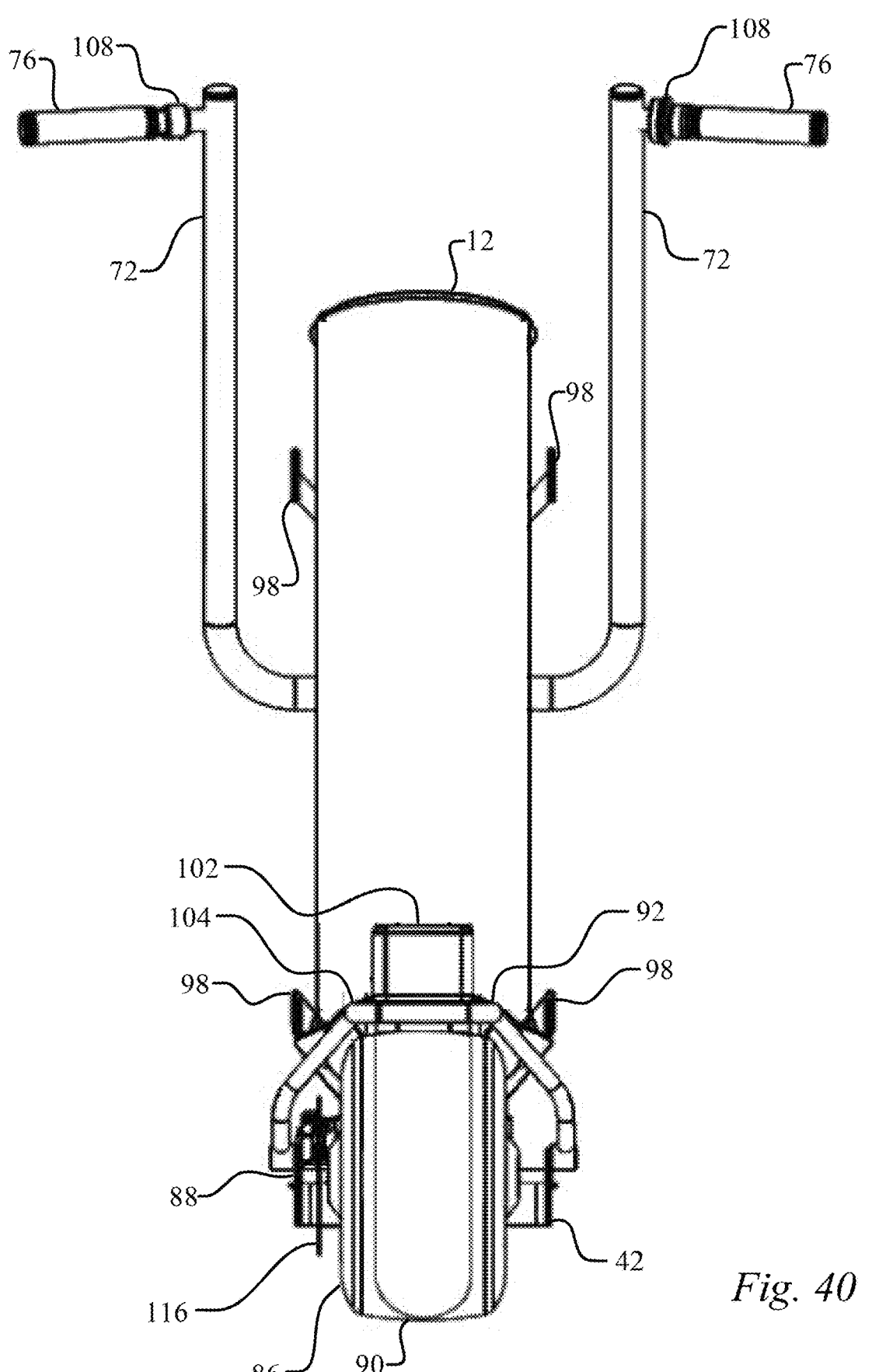
FIG. 40 is a rear elevational view of an alternate embodiment of the invention, shown with a golf bag.
Figure 41:
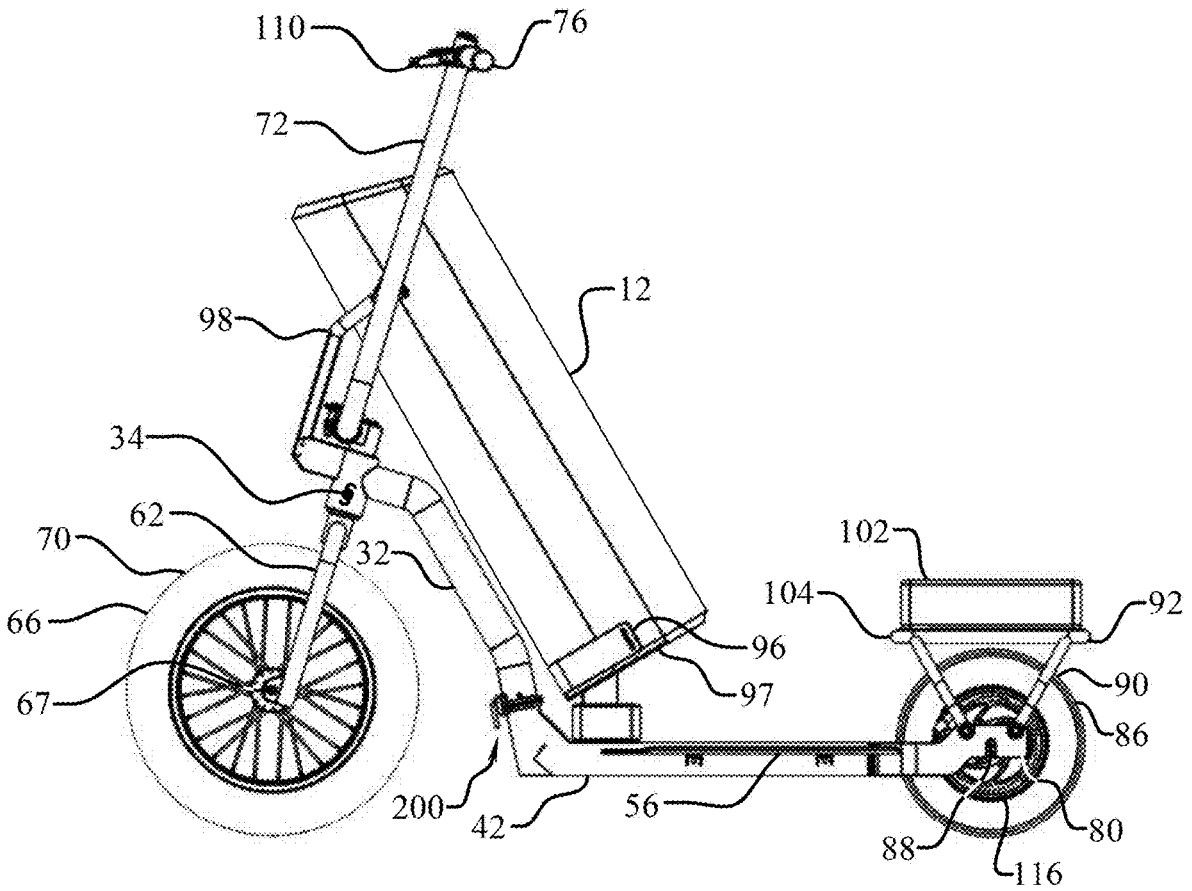
FIG. 41 is a left elevational view of an alternate embodiment of the invention, shown with a golf bag.
Figure 42:
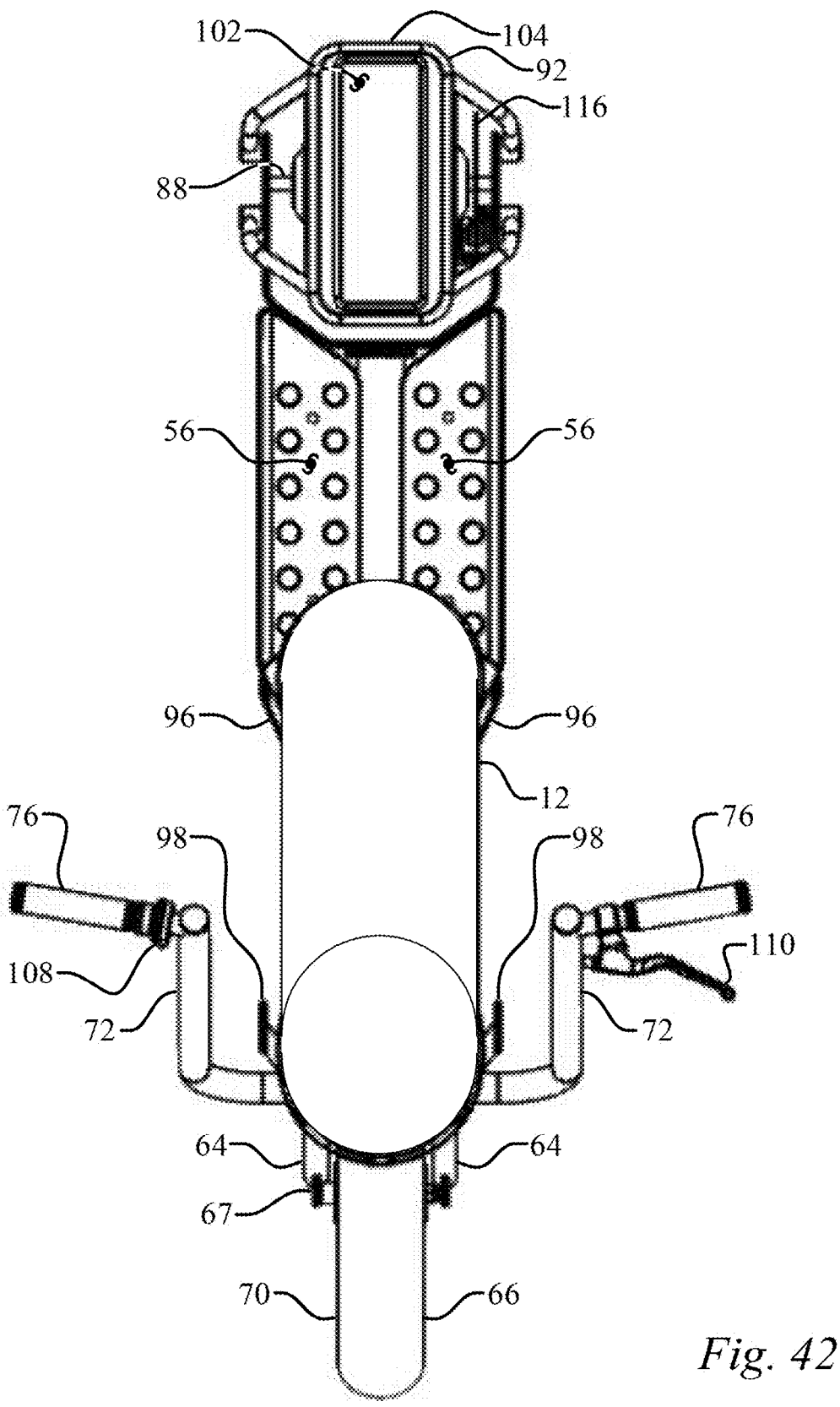
FIG. 42 is a top view of an alternate embodiment of the invention, shown with a golf bag.
Figure 43:
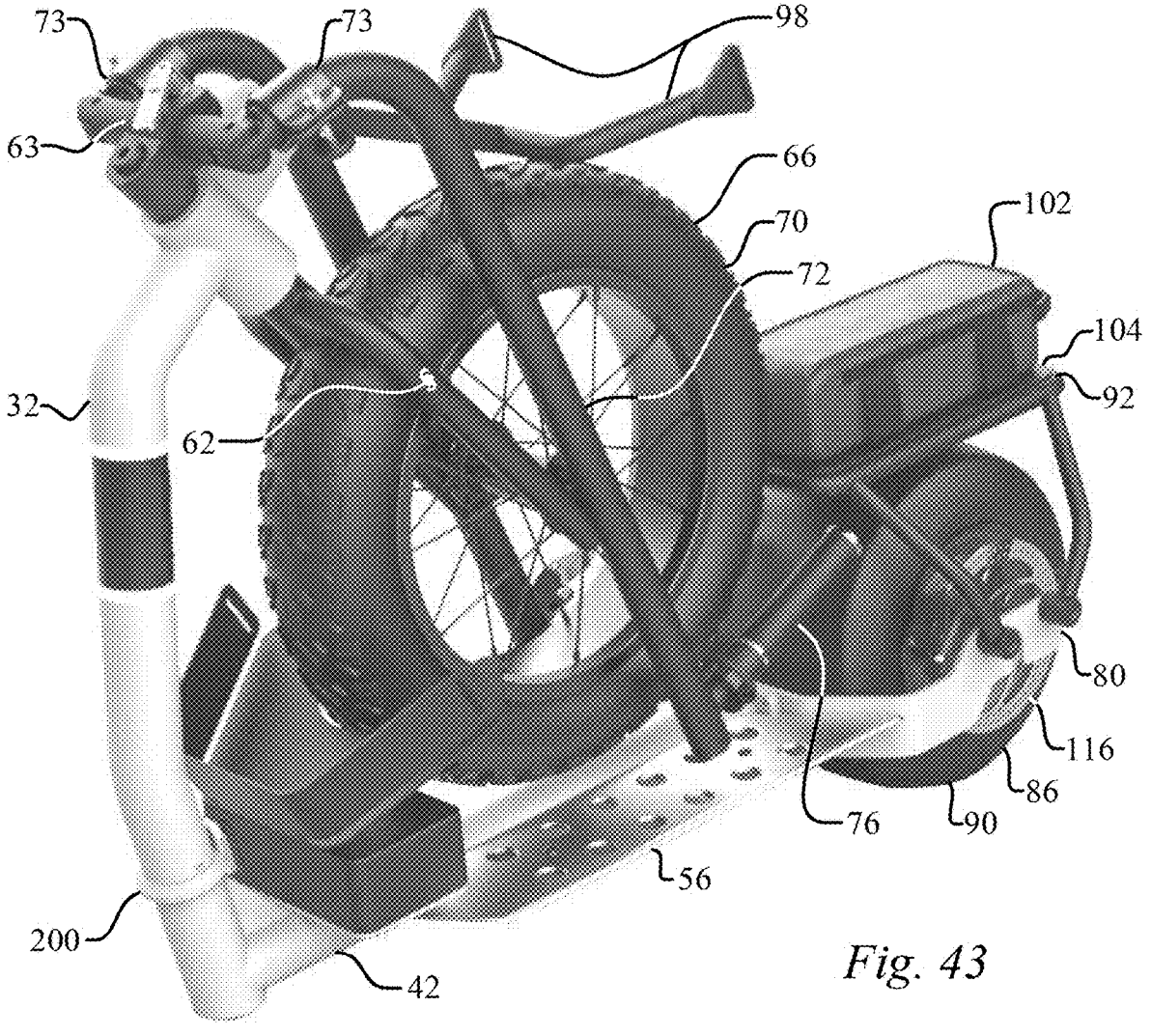
FIG. 43 is a front left perspective view of the invention alternate embodiment, in a folded state.
Figure 44:
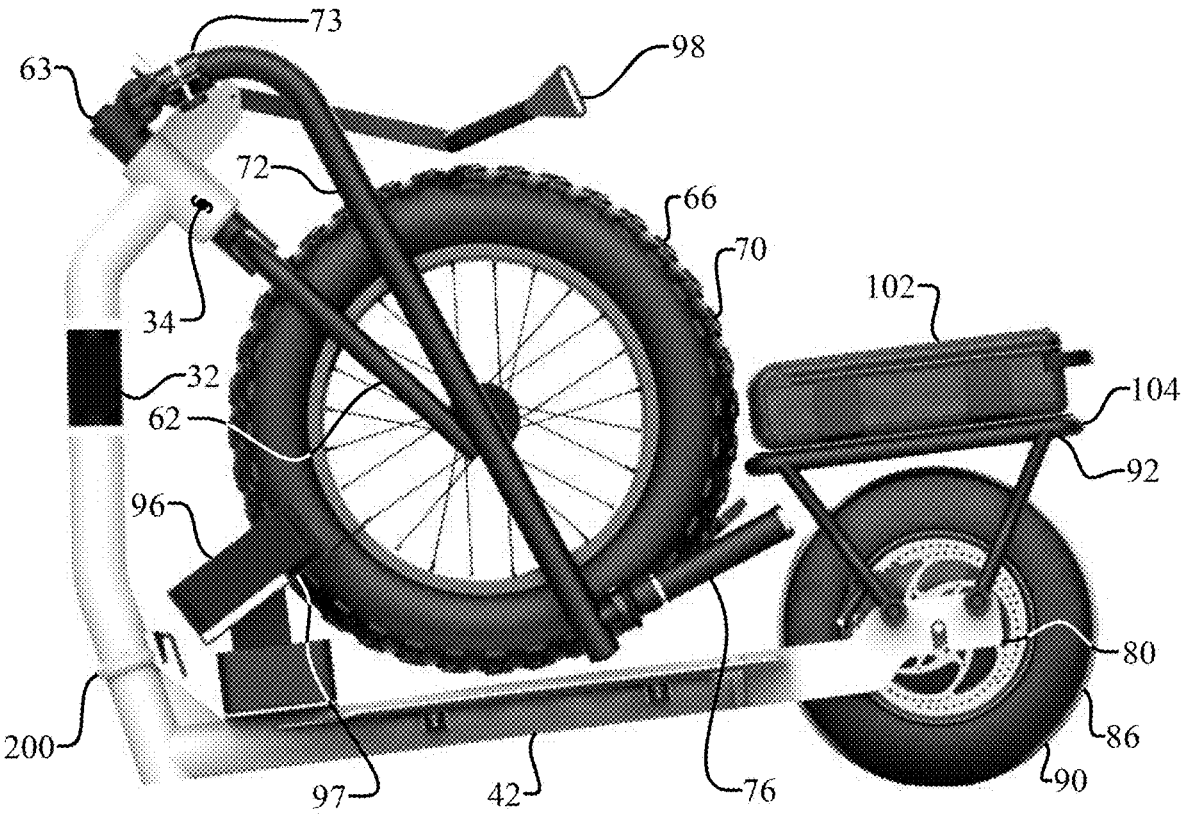
FIG. 44 is a left elevation view of the invention alternate embodiment, in a folded state.
Figure 45:
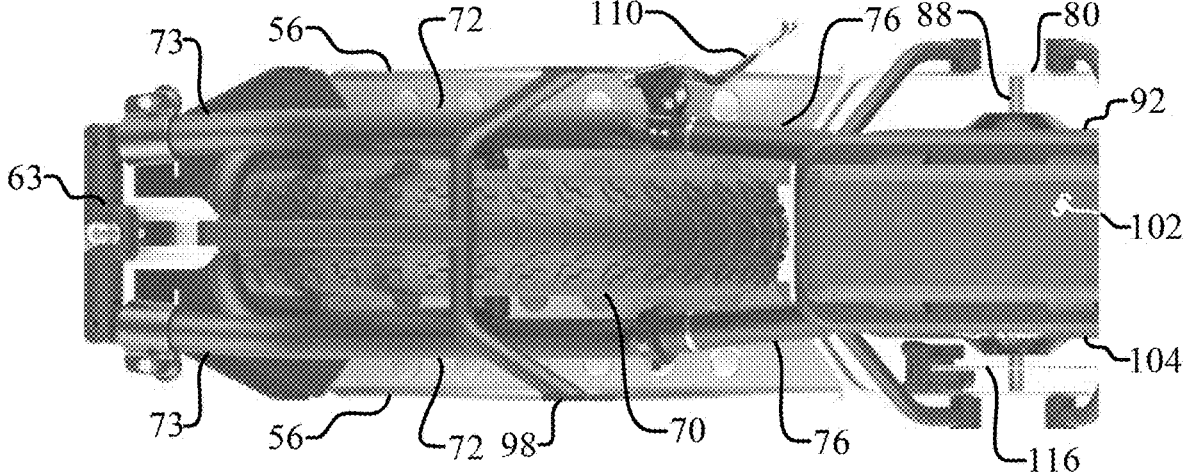
FIG. 45 is a top view of the invention alternate embodiment, in a folded state.

The current embodiment of rideable cart (10) may be configured to fold into a storage mode (30) for transport or storage, as seen in FIGS. 23, 24 and 35A-38C. FIG. 35A-35C show the rideable cart (10) in a state ready for usage by a golfer or rider (13), with the pivot tubes (73) locked outwards, thereby preventing the handlebars (72) from rotating about a vertical axis. Next, in FIGS. 36A-36C the pivot tubes (73) are in an unlocked state and the handlebars (72) have been rotated forward about a vertical axis. In FIGS. 37A-37C, the steering bracket (34) is in an unlocked state allowing the handlebars (72) to rotate about a horizontal axis forward. FIGS. 38A-38C show an unlocked upper bag cradle (98) that is rotated about a horizontal axis forward. FIGS. 23 and 24 shows the rideable cart (10) in a storage mode (30) state with the frame tube (32) being rotated 180 degrees following the preceding steps.

Figure 25:
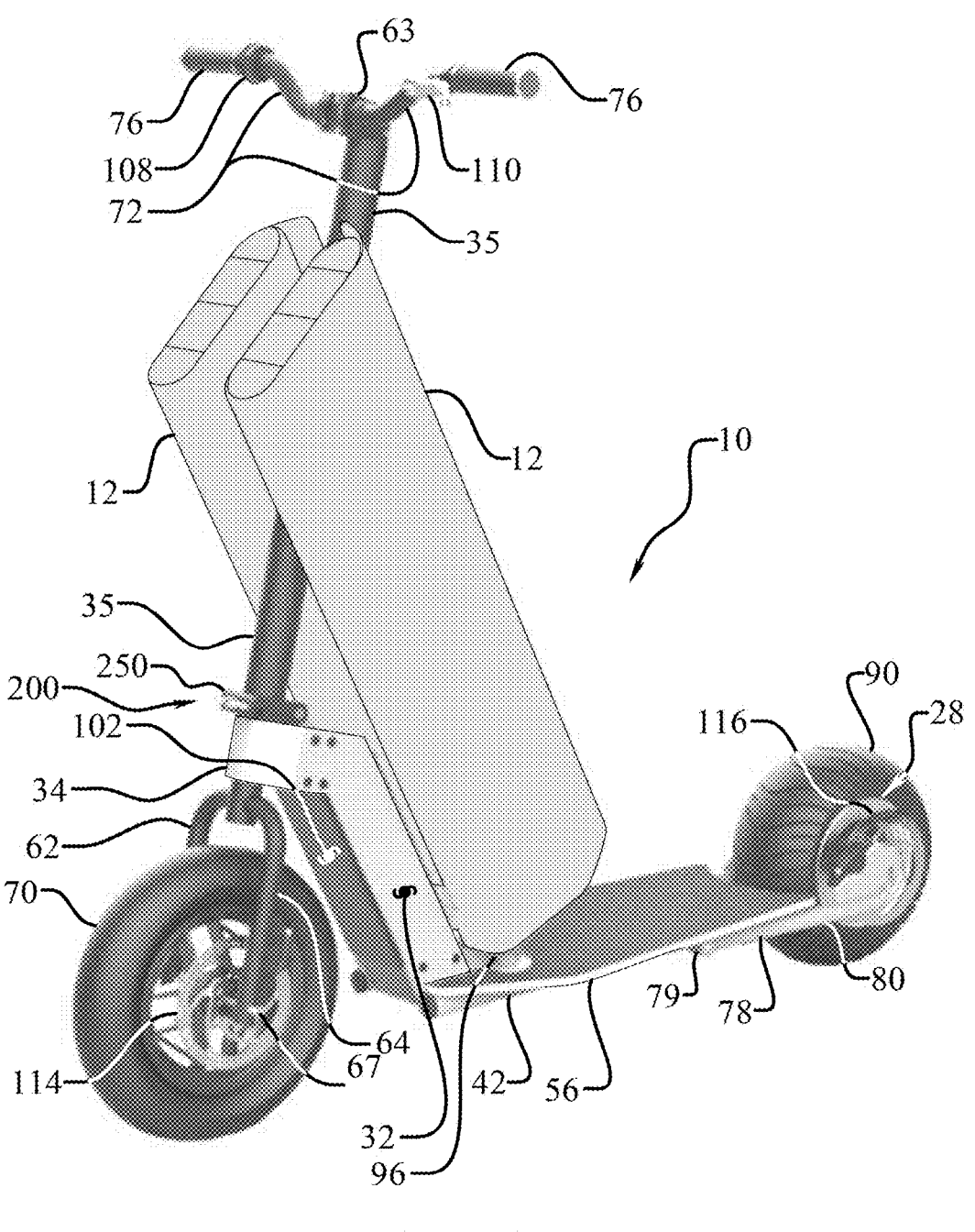
FIG. 25 is a front left perspective view of an alternate embodiment of powered riding golf bag cart/cycle, illustrating a golf bag carried thereon.
Figure 26:
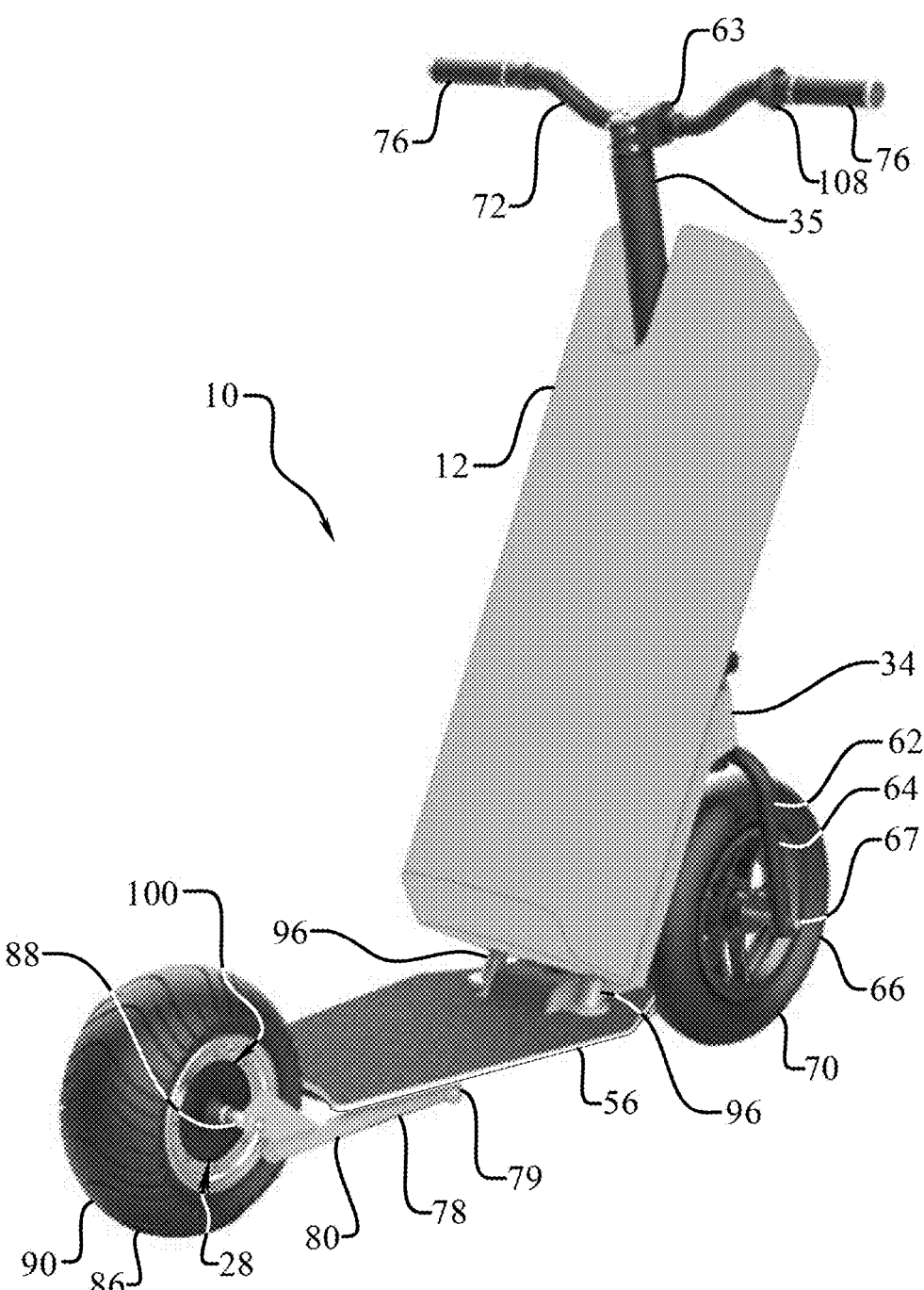
FIG. 26 is a top rear right side perspective view of the present invention, shown with a golf bag.

Now addressing a rideable cart (10) embodiment, as seen in FIGS. 25 and 26, which may have a pair of handlebars (72) with a pair of handle grips (76), a control unit (108) which allows a golfer or rider (13) to control the speed of the rideable cart (10), a brake actuator (110), a steering bracket (34) that connects the pair of handlebars (72) to a steering column (35). Furthermore, the current embodiment of rideable cart (10) may further have a connector assembly (200), seen in FIG. 25, which may further include a locking clamp (250), that may further include a locking clamp screw (252), which releasably connects the steering column (35) to a portion of a front fork bracket (63) which passes through a frame tube (32). The front fork bracket (63) connects to a front fork (62) having a pair of front fork arms (64), illustrated in FIG. 25. The current embodiment of rideable cart (10) may further have a front wheel (66) having a front tire (70) and a front axle (67) that connects to the front fork (62), and may further include a front brake (114), as seen in FIG. 25. The front brake (114), in one embodiment, may be a disc caliper style brake, with the caliper mounted to one of the front fork arms (64) and the disc mounted on the front wheel (66). Another embodiment of the front brake (114) may use a shoe and brake drum system, not shown in the drawings. Additionally, a regenerative braking system, which slows the rideable cart (10) by converting momentum into electricity, may also be utilized as the front brake (114) or as a part thereof, not illustrated. Further, the front brake (114) may be mechanically, pneumatically, hydraulically or electrically connected to and actuated by the brake actuator (110). Additionally, the frame tube (32) may also house a rechargeable battery (102) and may be permanently attached to one or more base segments (42), as seen in FIG. 25. A running board (56) may be located on the one or more base segments (42) and provides a place for a golfer or rider (13) to stand while using the rideable cart (10). Further, at least on bag bottom rods (96) may be located on the upper side of the running board (56) and couples with a bottom portion of a golf bag (12) to help stabilize and hold it in place, best seen in FIG. 26. The golf bag (12) in this embodiment is configured to be held at the bottom of the golf bag (12) by the bag bottom rods (96), and the top of the bag is configured to straddle the steering column (35), seen in FIGS. 25 and 26. Additionally, the current embodiment of rideable cart (10) may have a rear fork (78) having rear fork arms (80) each having rear fork pivots (79) that may attach to the one or more base segments (42). Further, the rear fork pivots (79) allow the rear fork (78) to rotationally pivot in relation to the one or more base segments (42), thereby acting as a rear suspension system. The rear portion of the rear fork (78) attaches to a rear axle (88) located on a rear wheel (86). Additionally, the rear wheel (86) may have a rear tire (90), a rear brake (116) and a motive sba (28). The rear brake (116), in one embodiment, may be a disc caliper style brake, with the caliper mounted to one of the rear fork arms (80) and the disc mounted on the rear wheel (86). Another embodiment of the rear brake (116) may use a shoe and brake drum system, not shown in the drawings. Additionally, a regenerative braking system, which slows the rideable cart (10) by converting momentum into electricity, may also be utilized as the rear brake (116) or as a part thereof, not illustrated. The rear brake (116) may be mechanically, pneumatically, hydraulically or electrically connected to and actuated by the brake actuator (110). The rideable cart (10) motive sba (28) may be, but not limited to, a direct current (DC) brushed motor, an out-runner type brushless DC motor, also known as a hub-motor, an in-runner type brushless DC motor, a permanent magnet synchronous motor, a three phase alternating current (AC) induction motor, or a switched reluctance motor.

Figure 27:
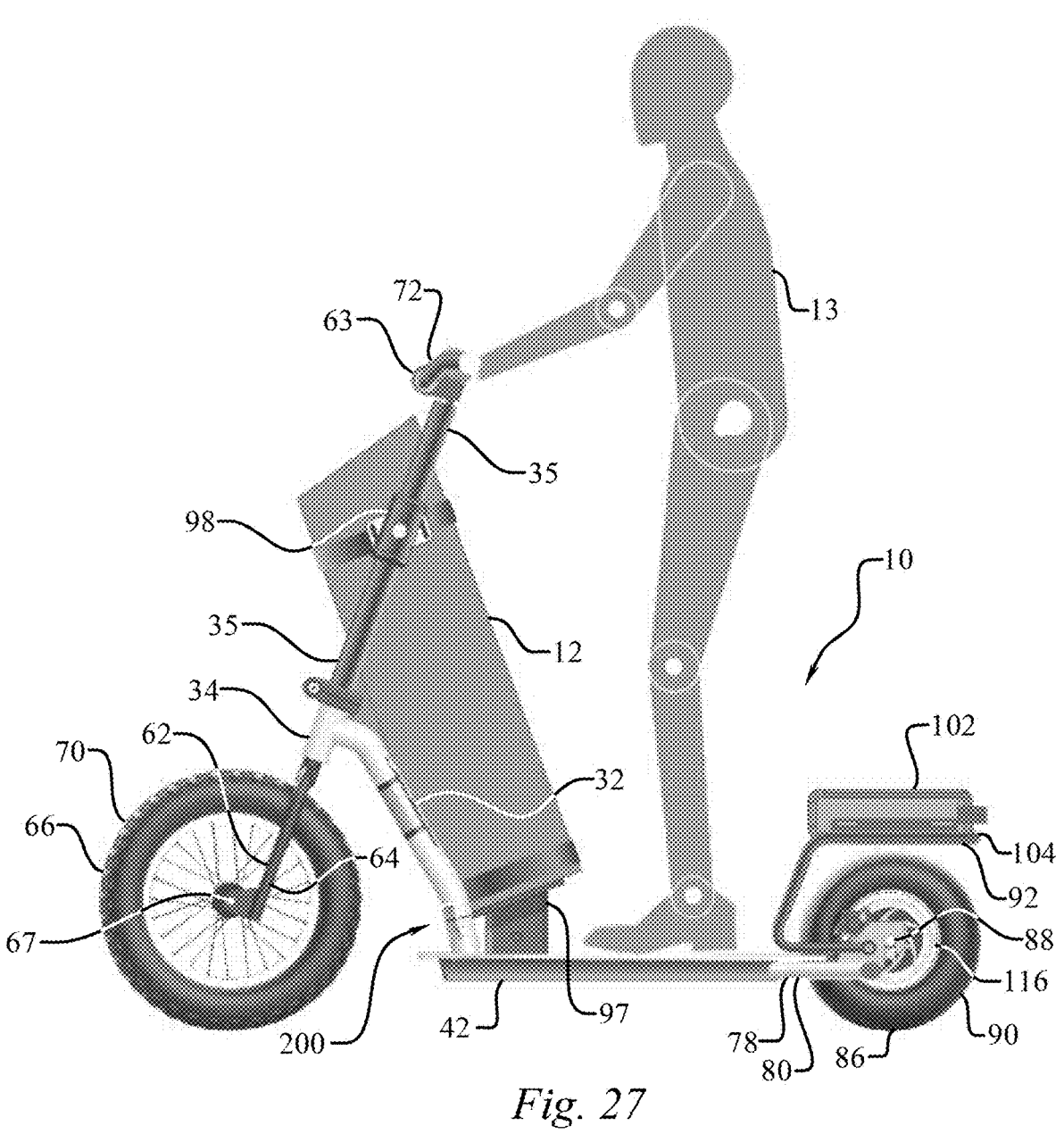
FIG. 27 is a left elevational view of the riding golf bag cart/cycle of an alternate embodiment, showing the golf bag and a rider silhouette.
Figure 28:
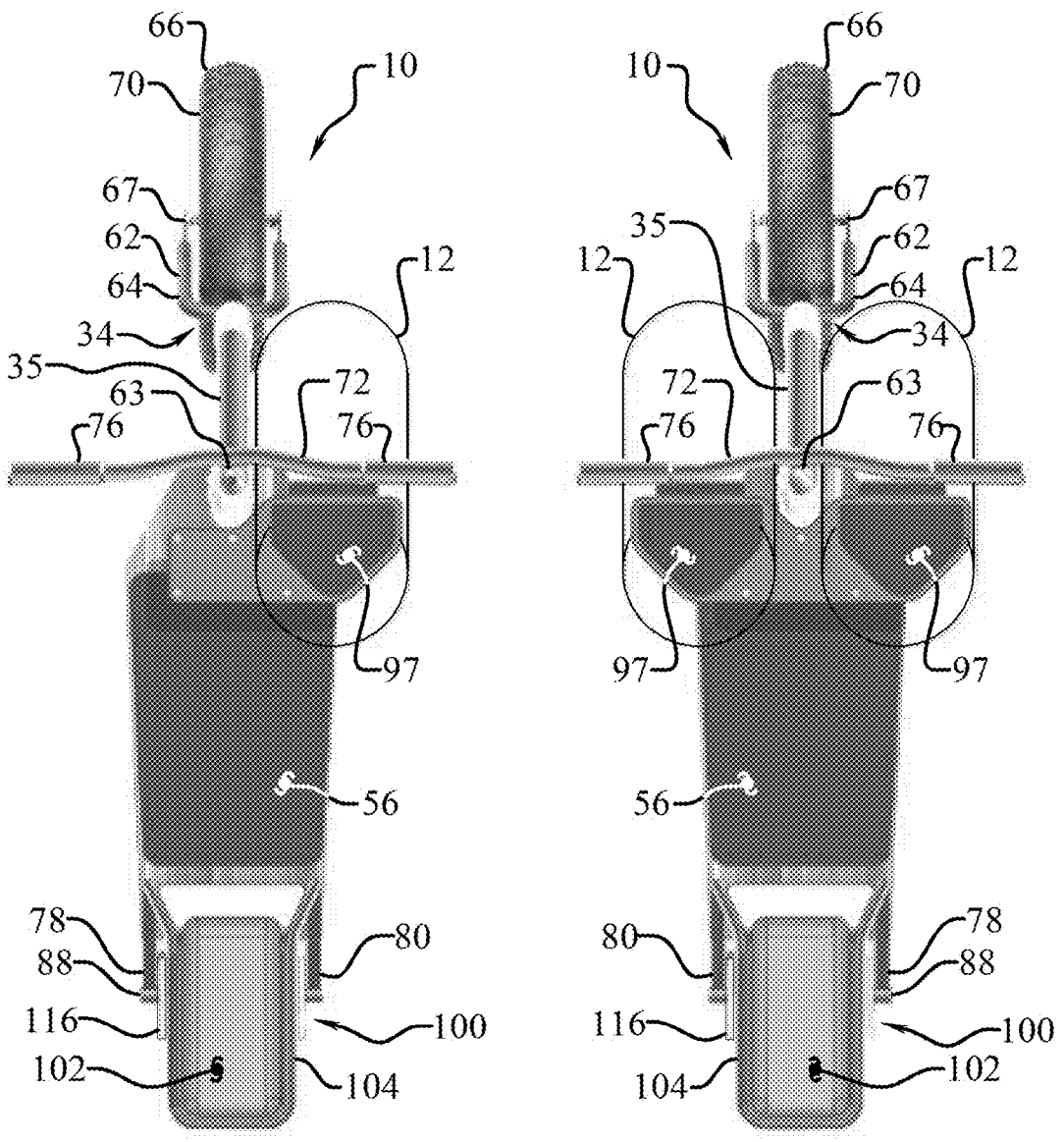
FIG. 28A is a top view of the invention, showing a golf bag silhouette.
FIG. 28B is a top view of the invention, showing two golf bag silhouettes.

Now addressing a rideable cart (10) embodiment, as seen in FIGS. 27-28B, which may have a pair of handlebars (72) with a pair of handle grips (76), a control unit (108) which allows a golfer or rider (13) to control the speed of the rideable cart (10), a brake actuator (110), a steering bracket (34) that connects the pair of handlebars (72) to a steering column (35), and at least one a upper bag cradle attached to the steering column (35), as seen in FIG. 27. Furthermore, the steering column (35) may connect to a portion of a front fork bracket (63) that passes through a frame tube (32), also seen in FIG. 27. The front fork bracket (63) connects to a front fork (62) having a pair of front fork arms (64). The current embodiment of rideable cart (10) may further have a front wheel (66) having a front tire (70) and a front axle (67) that connects to the front fork (62), seen in FIG. 27, and may further include a front brake (114), not illustrated. The front brake (114), in one embodiment, may be a disc caliper style brake, with the caliper mounted to one of the front fork arms (64) and the disc mounted on the front wheel (66). Another embodiment of the front brake (114) may use a shoe and brake drum system, not shown in the drawings. Additionally, a regenerative braking system, which slows the rideable cart (10) by converting momentum into electricity, may also be utilized as the front brake (114) or as a part thereof, not illustrated. Further, the front brake (114) may be mechanically, pneumatically, hydraulically or electrically connected to and actuated by the brake actuator (110). A running board (56) may be attached to a base segment (42) and provides a place for a golfer or rider (13) to stand while using the rideable cart (10) as seen in FIG. 27. Further, at least one bag support base (97) may be located on the upper side of the running board (56) and supports a bottom portion of a golf bag (12), as seen in FIGS. 27-28B. The golf bag (12) in this embodiment is configured to be held at the bottom of the golf bag (12) by the bag support base (97), and the top of the bag is configured to be held by the upper bag cradle (98), to help stabilize and hold it in place off to one side of the steering column (35), as seen in FIGS. 27 and 28A. Additionally, as seen in FIG. 28B, the current rideable cart (10) embodiment may also be configured to carry two golf bags (12) positioned on each side of the steering column (35), seen in FIG. 28B. The current embodiment of rideable cart (10) may further include a rear fork (78) having rear fork arms (80) that may attach to the base segment (42), as seen in FIG. 27. The rear portion of the rear fork (78) attaches to a rear axle (88) located on a rear wheel (86). Additionally, the rear wheel (86) may have a rear tire (90), a rear brake (116) and a motive sba (28). The rear brake (116), in one embodiment, may be a disc caliper style brake, with the caliper mounted to one of the rear fork arms (80) and the disc mounted on the rear wheel (86). Another embodiment of the rear brake (116) may use a shoe and brake drum system, not shown in the drawings. Additionally, a regenerative braking system, which slows the rideable cart (10) by converting momentum into electricity, may also be utilized as the rear brake (116) or as a part thereof, not illustrated. The rear brake (116) may be mechanically, pneumatically, hydraulically or electrically connected to and actuated by the brake actuator (110). The rideable cart (10) motive sba (28) may be, but not limited to, a direct current (DC) brushed motor, an out-runner type brushless DC motor, also known as a hub-motor, an in-runner type brushless DC motor, a permanent magnet synchronous motor, a three phase alternating current (AC) induction motor, or a switched reluctance motor. Additionally, the current rideable cart (10) embodiment may further include a rear fender (92) that also acts as a battery cradle (104) which holds a rechargeable battery (102) as seen in FIG. 27.

Figure 29:
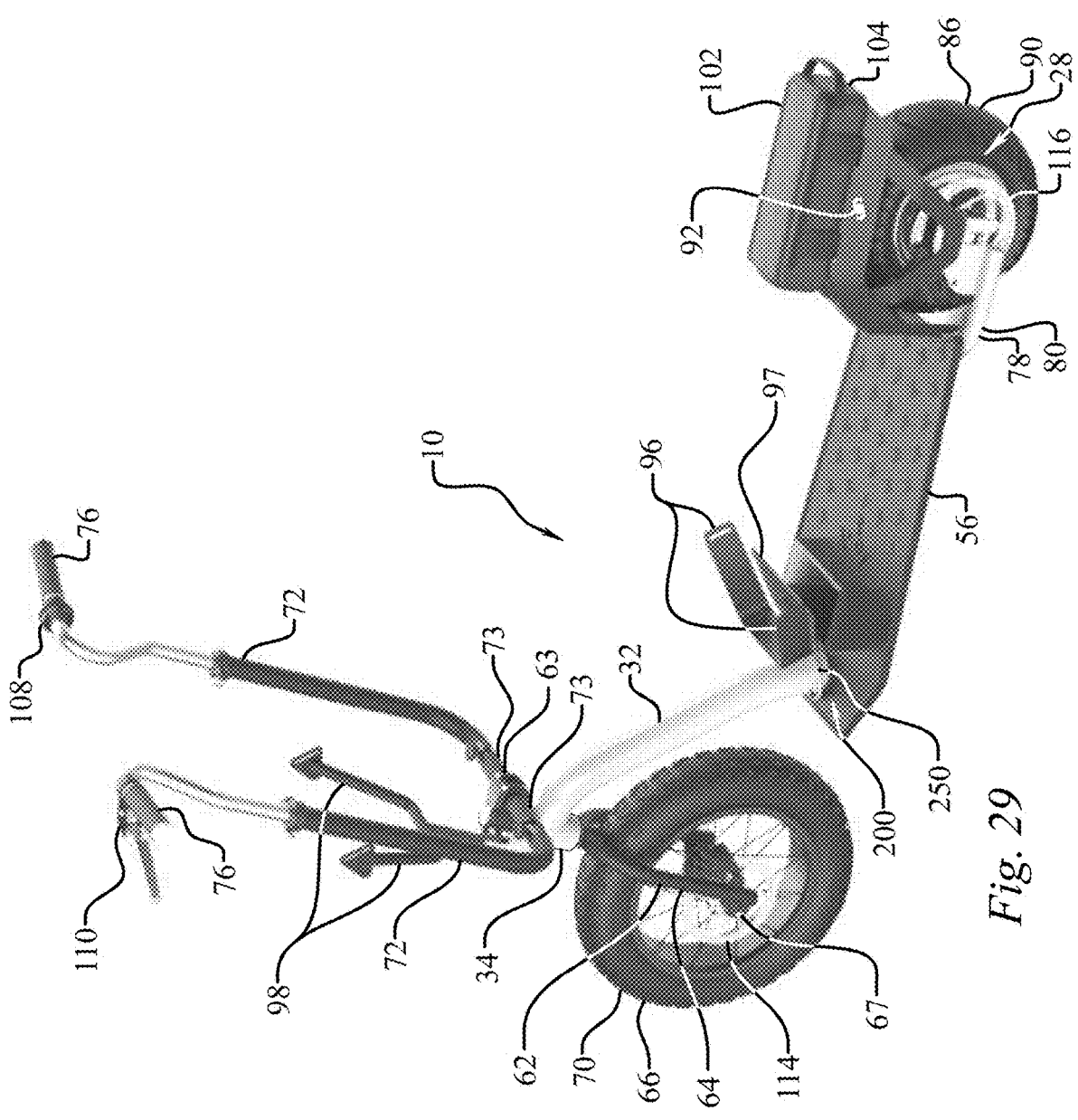
FIG. 29 is a rear left perspective view of an alternative embodiment of powered riding golf bag cart/cycle.
Figure 30:
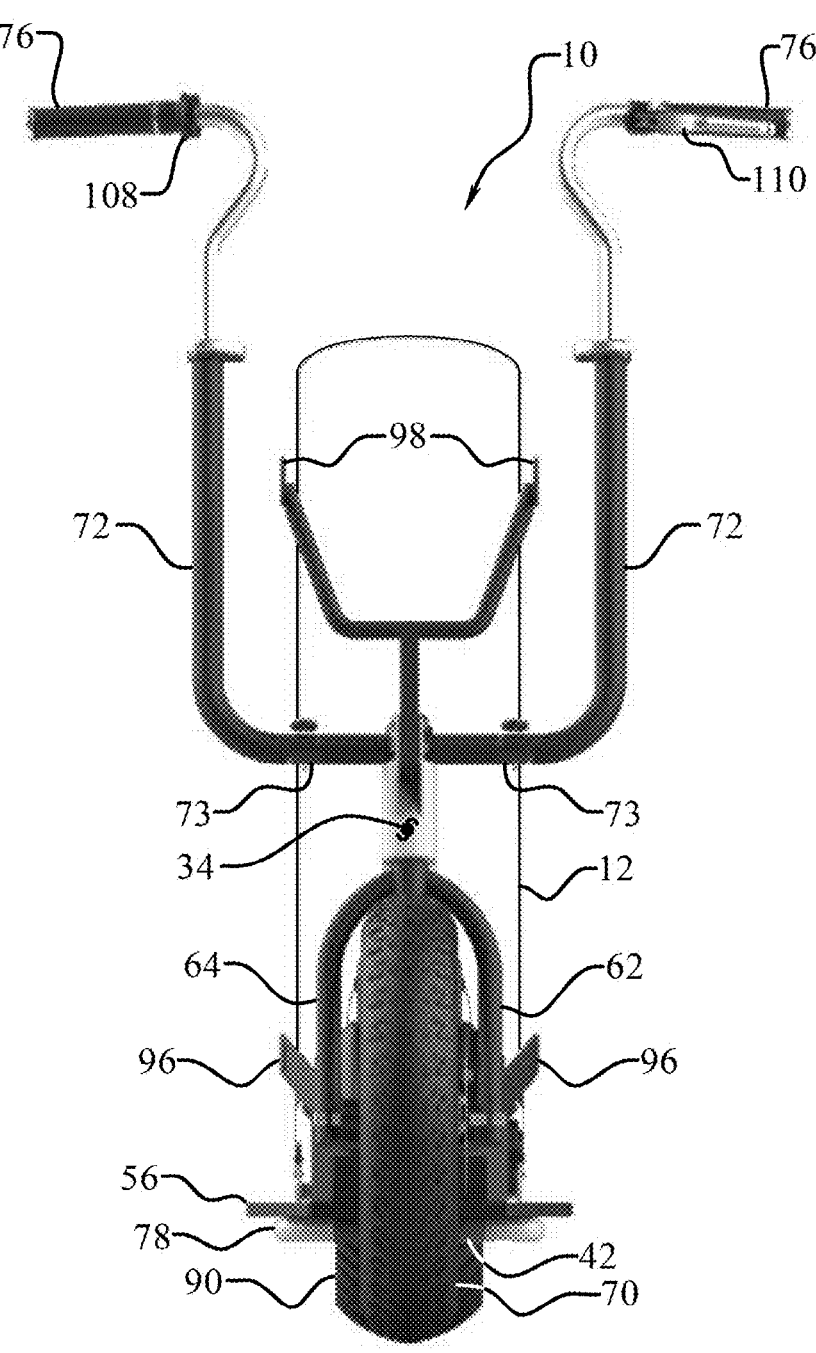
FIG. 30 is a front elevational view of the alternative embodiment of the invention, showing a golf bag silhouette.
Figure 31:
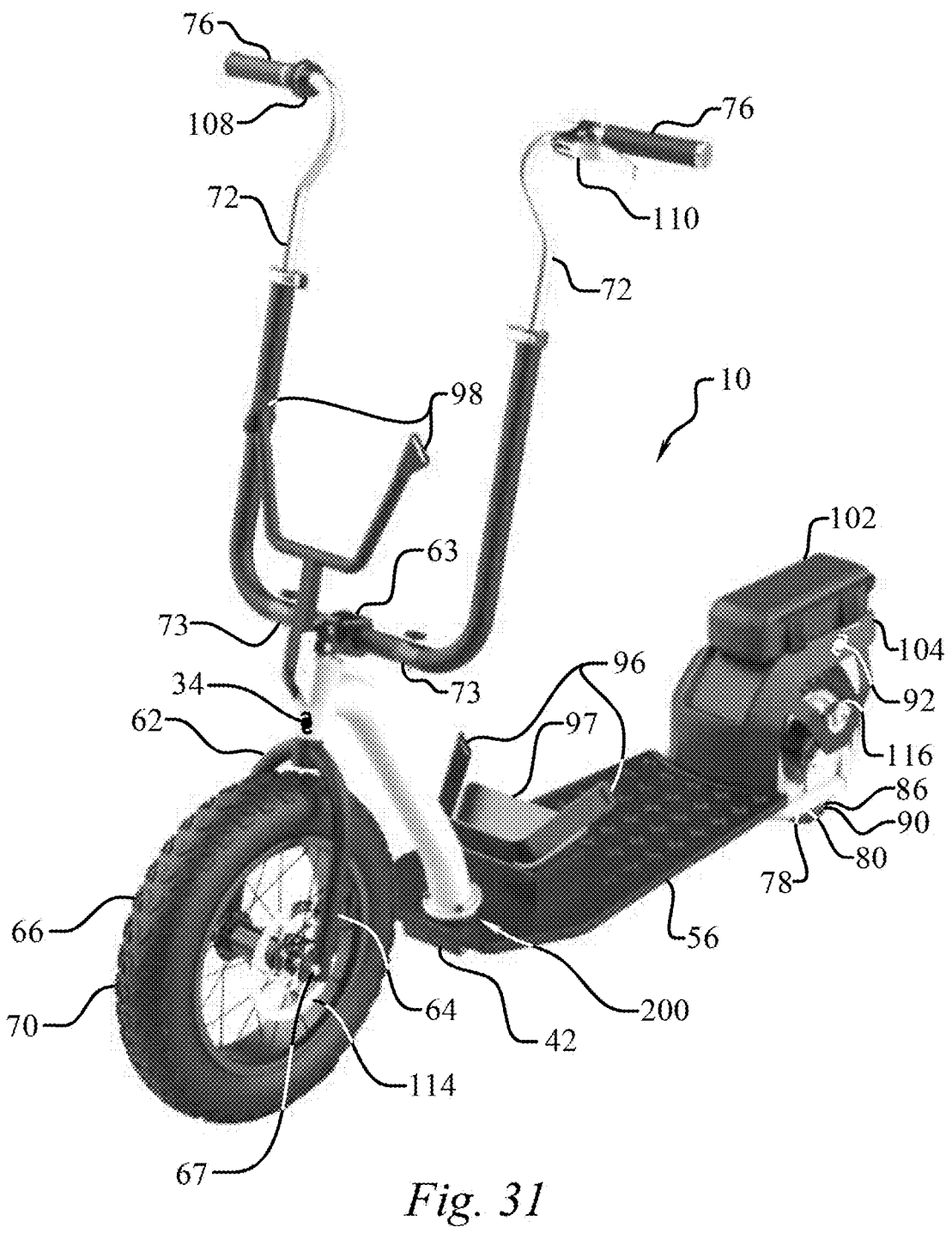
FIG. 31 is a front left perspective view of an alternative embodiment of powered riding golf bag cart/cycle.
Figure 32:
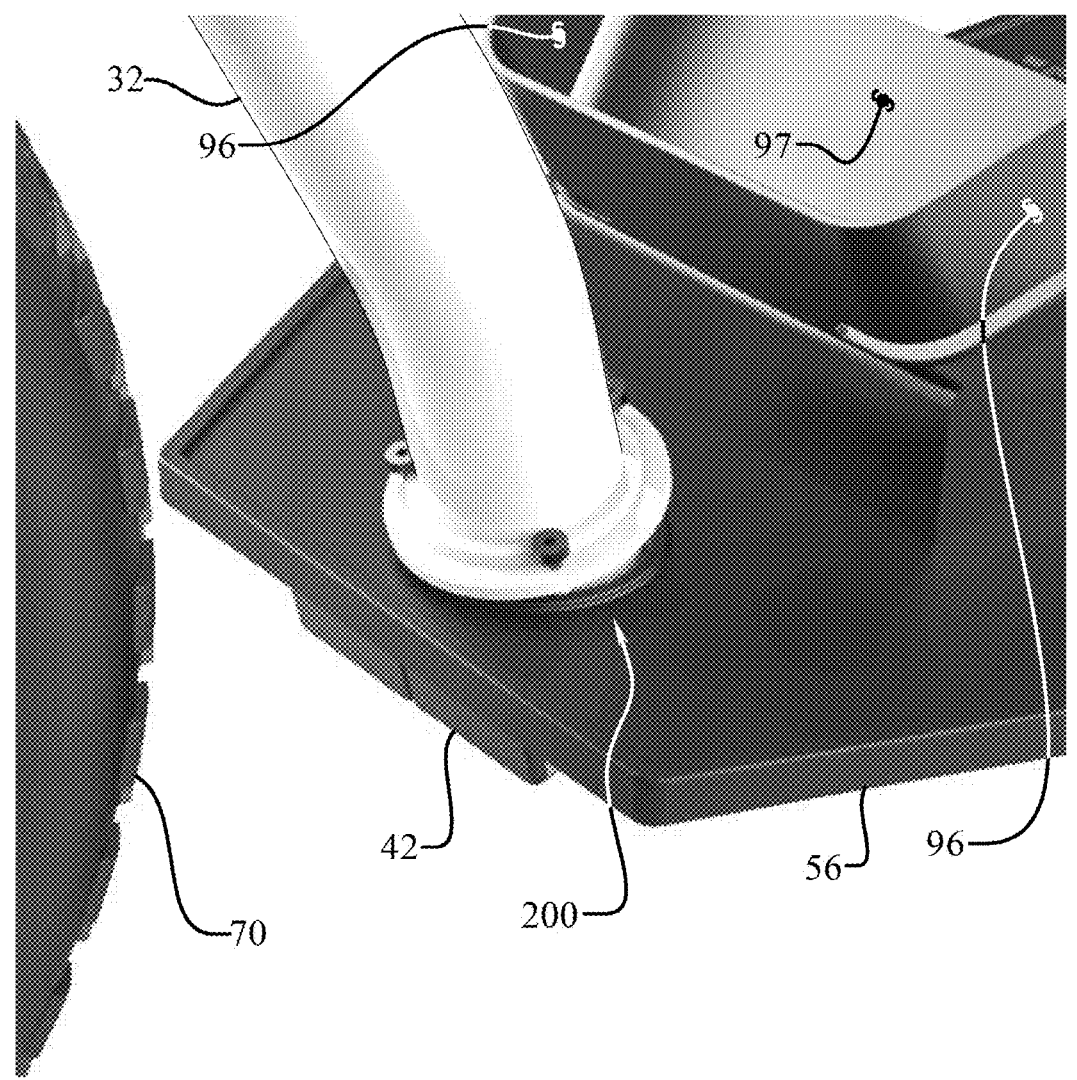
FIG. 32 is a front left perspective view of an alternate embodiment of the invention, showing the frame tube to running board connection.
Figure 33:
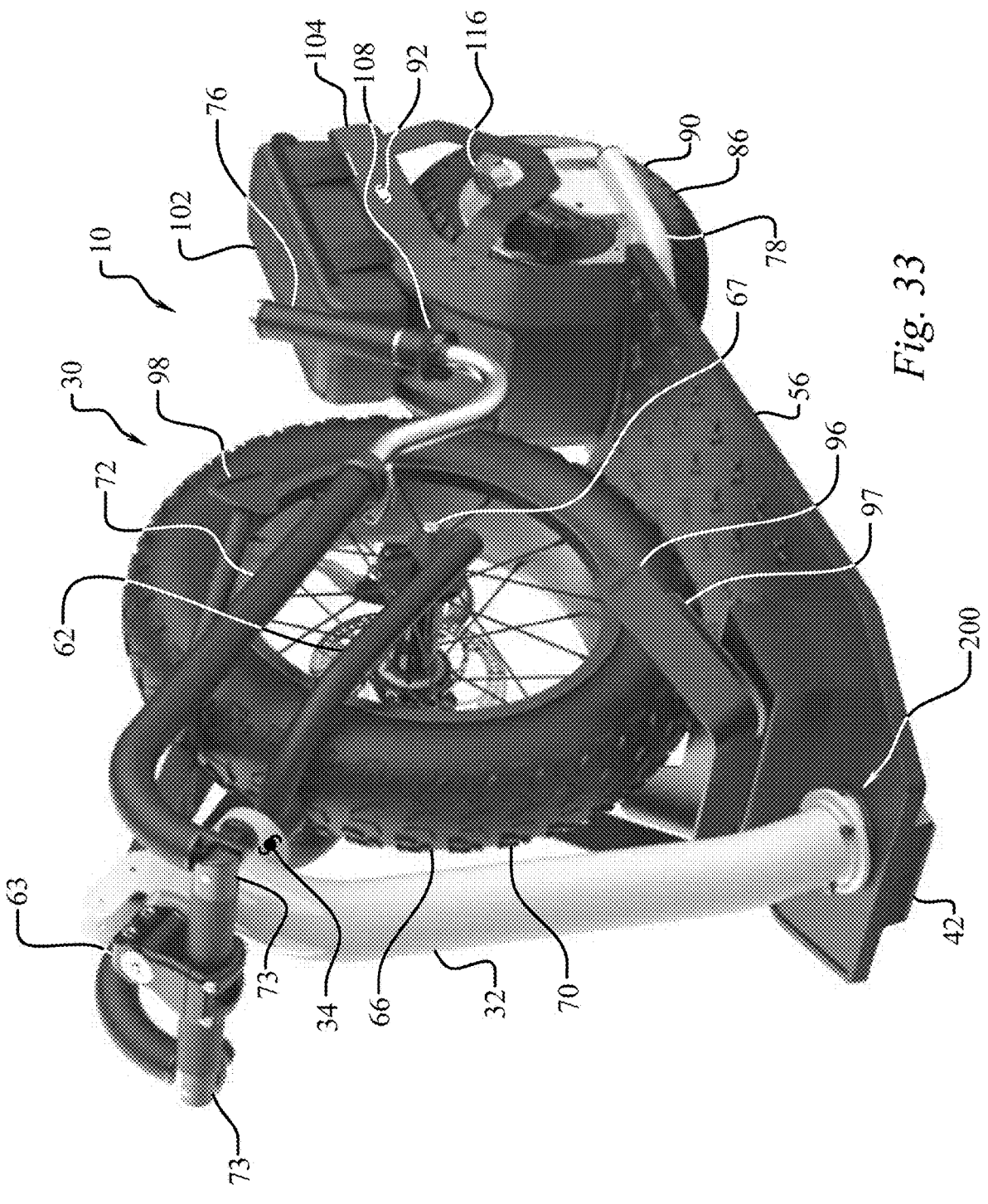
FIG. 33 is a front left perspective view of the invention alternate embodiment, in a folded state.
Figure 34:
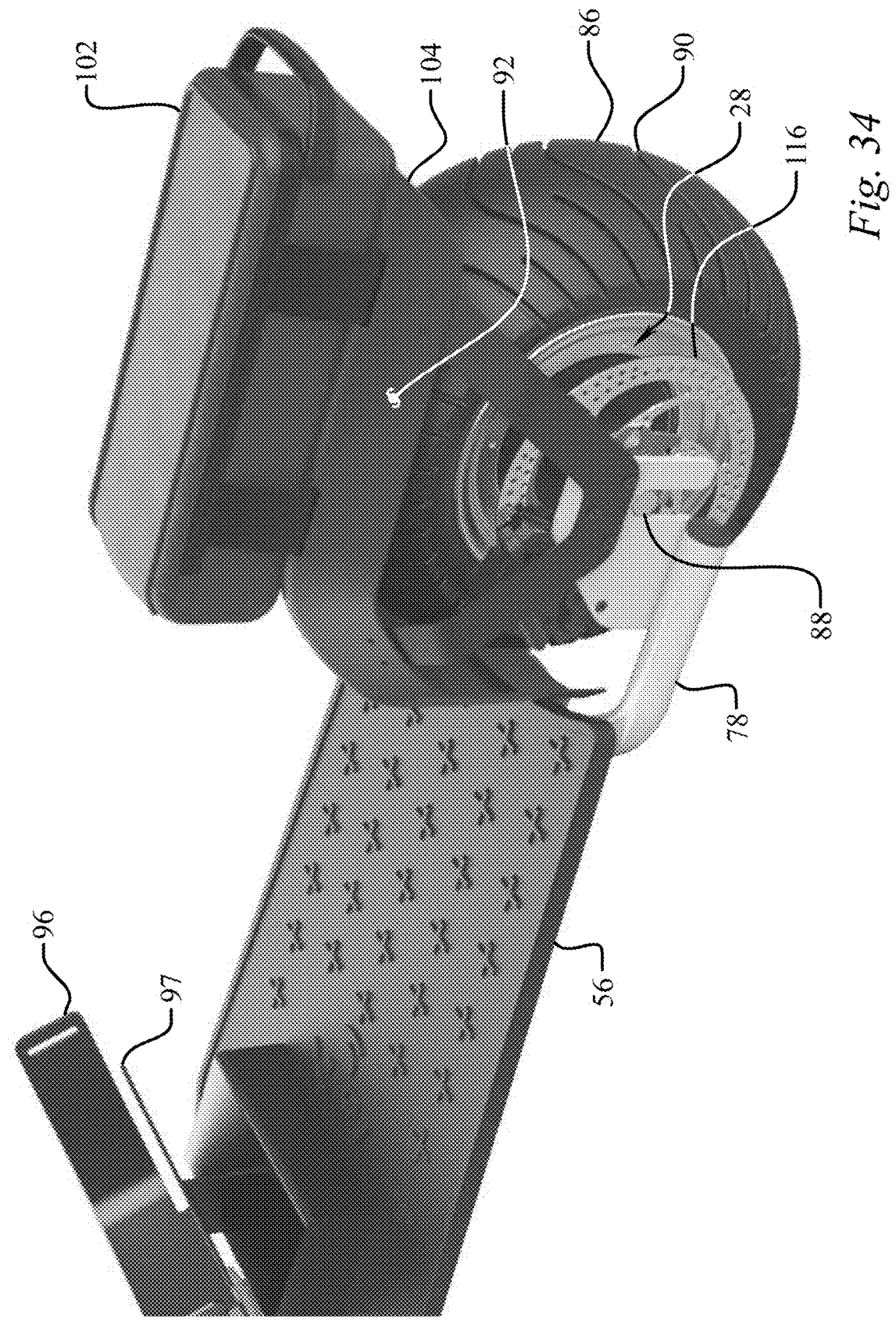
FIG. 34 is a rear left perspective view of an alternate embodiment of the invention.

FIGS. 29-34 show another embodiment of a rideable cart (10), that may have a pair of handlebars (72) with a pair of handle grips (76), a pair of pivot tubes (73) with one side of each connected to the handlebars (72), a control unit (108) which allows a golfer or rider (13) to control the speed of the rideable cart (10), a brake actuator (110), a steering bracket (34) that connects to the pivot tubes (73) opposite of the handlebars (72), and a rechargeable battery (102) that is fixed to a battery cradle (104) that also serves as a rear fender (92), as seen in FIG. 29. Furthermore, the current embodiment of rideable cart (10) may further include a connector assembly (200), seen in FIGS. 29, 31-33, which may further include a locking clamp (250) which releasably connects a frame tube (32) to a base segment (42), best seen in FIG. 32. The front fork bracket (63) connects to a front fork (62) having a pair of front fork arms (64). The current embodiment of rideable cart (10) may further have a front wheel (66) having a front tire (70) and a front axle (67) that connects to the front fork (62), seen in FIG. 29, and may further include a front brake (114), best seen in FIGS. 29, and 31. The front brake (114), in one embodiment, may be a disc caliper style brake, with the caliper mounted to one of the front fork arms (64) and the disc mounted on the front wheel (66). Another embodiment of the front brake (114) may use a shoe and brake drum system, also not shown in the drawings. Additionally, regenerative braking, which slows the rideable cart (10) by converting movement into electricity, may also be utilized as the front brake (114) or as a part thereof, not illustrated. Further, the front brake (114) may be mechanically, pneumatically, hydraulically or electrically connected to and actuated by the brake actuator (110). A running board (56) may be fixed upon a base segment (42) and provides a place for a golfer or rider (13) to stand while using the rideable cart (10). Further, the bag bottom rods (96) may be located to each side of a bag base support (97) that is fixed to the upper side of the running board (56) and cradles and supports a bottom portion of a golf bag (12). The golf bag (12) in this embodiment is configured to be supported at the bottom of the golf bag (12) by the bag bottom rods (96) and the bag base support (97) while the top of the bag is configured to be secured in a upper bag cradle (98), as seen in FIGS. 29-31. Additionally, the current embodiment of rideable cart (10) may have a rear fork (78) having rear fork arms (80) that may attach to the base segment (42). In another variation of this embodiment, the rear fork arms (80) may have rear fork pivots (79) that allow the rear fork (78) to rotationally pivot in relation to the base segment (42), thereby acting as a rear suspension system. The rear portion of the rear fork (78) attaches to a rear axle (88) located on a rear wheel (86), best seen in FIG. 34. Additionally, the rear wheel (86) may have a rear tire (90), a rear brake (116) and a motive sba (28), illustrated in FIG. 29. The rear brake (116), in one embodiment, may be a disc caliper style brake, with the caliper mounted to one of the rear fork arms (80) and the disc mounted on the rear wheel (86). Another embodiment of the rear brake (116) may use a shoe and brake drum system, not shown in the drawings. Additionally, regenerative braking, which slows the rideable cart (10) by converting movement into electricity, may also be utilized as the rear brake (116) or as a part thereof, not illustrated. The rear brake (116) may be mechanically, pneumatically, hydraulically or electrically connected to and actuated by the brake actuator (110). The rideable cart (10), motive sba (28) may be, but not limited to, a direct current (DC) brushed motor, an out-runner type brushless DC motor, also known as a hub-motor, an in-runner type brushless DC motor, a permanent magnet synchronous motor, a three phase alternating current (AC) induction motor, or a switched reluctance motor.

The preceding embodiments may have further variations wherein the motive sba (28) may be configured in the front wheel (66) instead of the rear wheel (86). In other variations, the motive sba (28) may be configured in both the front wheel (66) and rear wheel (86). Additionally, the preceding embodiments may also have an additional rechargeable battery (102) located within the running board (56) to increase the total energy stored for usage. The preceding embodiments may yet further include an inductive charging system that would allow the rideable cart (10) to park on a charging station, thereby eliminating the need to physically plug the rideable cart (10) for charging the rechargeable battery (102).

Many modifications to the above embodiment may be made without altering the nature of the invention. The dimensions and shapes of the components and the construction materials may be modified for particular circumstances or types of bags to be carried. While various embodiments have been described above, it should be understood that they have been presented by way of example only, and not as limitations.

In view of the many possible embodiments to which the principles of this disclosure may be applied, it should be recognized that the illustrated embodiments are only preferred examples and should not be taken as limiting the scope of the inventions. Rather, the scope of the invention is defined by the following claims. We therefore claim all that comes within the scope and spirit of these claims. Whereas the invention has been described in connection with representative embodiments, it will be understood that the invention is not limited to those embodiments. On the contrary, the invention is intended to encompass all modifications, alternatives, and equivalents as may fall within the scope of the invention, as defined by the following claims.

INDUSTRIAL APPLICABILITY

The rideable golf bag cart/cycle 10 (and 118) of the present invention is intended for use primarily by golfers who desire maximum convenience and safety while transporting a golf bag and a rider during a round of golf. It is expected that these units will be optimal for rental uses at golf courses. The cart/cycle 10 is relatively lightweight. Like any cycle having two wheels, the cart/cycle 10 does require balancing by the rider 13 when in motion and tip-prevention by the kickstand 60 when not attended. The general symmetry of the cart/cycle 10 substantially aids in keeping the unit balance. The cart/cycle 10 also typically requires no straps or other fasteners to retain and support the golf bag 12 (although these may be optionally utilized), thus minimizing the amount of loose or dangling components and reducing effort.

We claim:

1. A motor driven rideable golf cycle for transporting a rider and a golf bag, comprising:
   a front wheel (66) having a front wheel center, a front wheel axle (67), and a front tire having a front tire outer diameter, a front tire width, and a front tire crown radius;
   a front fork (62) attached to the front wheel (66);

a steering bracket (34) to which the front fork (62) is rotationally engaged;
   a steering column (35) engaging the front fork (62);
   a handlebar (72) attached to the steering column (35) via a handlebar connector (63), and having a control unit;
   a frame tube (32) connected to the steering bracket (34) and extending downward and rearward from the steering bracket (34) when in a riding configuration;
   a rear wheel (86) having a rear wheel center, a rear wheel axle (88), an internal hub motor, and a rear tire having a rear tire outer diameter, a rear tire width, and a rear tire crown radius, and establishing a wheelbase (510) measured between the front wheel center and the rear wheel center, and a vertical wheel plane containing the front wheel center and the rear wheel center, oriented perpendicular to a ground plane, intersecting the steering bracket (34), and defining a first side and a second side of the vertical wheel plane;
   a base segment (42) attached to the rear wheel (86) and extending toward the front wheel (66);
   a pivoting connector assembly (200) attached to the base segment (42) and the frame tube (32), and capable of locking a relative position of the base segment (42) and the frame tube (32);
   a seat support (53) extending from the base segment (42) and comprising an upper seat support (53U) extending from a lower seat support (53L);
   a seat (52) attached to the upper seat support (53U);
   a rechargeable battery (102) attached to the frame tube (32) and in electrical communication with the internal hub motor and the control unit;
   an upper bag cradle (98) attached to the motor driven rideable golf cycle such that it is not symmetrical about the vertical wheel plane;
   a bag support base (97) attached to the motor driven rideable golf cycle such that it is not symmetrical about the vertical wheel plane;
   wherein:
   the pivoting connector assembly (200) facilitates the pivoting of the frame tube (32) toward the seat support (53) and into a storage configuration;
   in the riding configuration the motor driven rideable golf cycle has a center of gravity (CG) located a CGy dimension behind the front axle (67), measured horizontally parallel to the ground plane, and located a CGh dimension above the ground plane, measured vertically perpendicular to the ground plane, and the CGy dimension is less than 45% of the wheelbase (510);
   in the riding configuration the motor driven rideable golf cycle has a minimum clearance (500), and the CGh dimension is less than 5 times the minimum clearance (500);
   the front tire outer diameter is at least 10% greater than the rear tire outer diameter, and the front tire outer diameter is no more than 160% of the rear tire outer diameter;
   the front tire outer diameter is at least 85% of the CGh dimension, and the rear tire outer diameter is no more than the CGh dimension;
   the rear tire width is at least 10% greater than the front tire width, and the rear tire width is no more than 160% of the front tire width;
   the rear tire crown radius is greater than the front tire crown radius; and
   the front tire contacts the ground plane directly below the front axle at a contact point (530), the steering bracket (34) defines a headset axis (520), which intersects the ground plane at an axis contact point (540), a horizontal distance from the contact point (530) and the axis contact point (540) is a trail dimension (550), and the trail dimension (550) is 1.0"-4.0".

2. The motor driven rideable golf cycle of claim 1, wherein the steering column (35) has a column axis (35A) and a column axis angle (35AA), the seat support (53) has a support axis (53A) and a support axis angle (53AA) of less than 90 degrees, and the support axis angle (53AA) is ±15 degrees of the column axis angle (35AA).

3. The motor driven rideable golf cycle of claim 2, wherein the front tire outer diameter is at least 15% greater than the rear tire outer diameter, the rear tire outer diameter is no more than 90% of the CGh dimension, and the support axis angle (53AA) is at least 70 degrees.

4. The motor driven rideable golf cycle of claim 3, wherein the rear tire width is at least 15% greater than the front tire width, and the front tire outer diameter is at least 100% of the CGh dimension.

5. The motor driven rideable golf cycle of claim 3, wherein the CGy dimension is +25% of the CGh dimension, and the CGy dimension is at least 24% of the wheelbase (510).

6. The motor driven rideable golf cycle of claim 3, wherein the CGy dimension is at least 24% of the wheelbase (510), the CGy dimension is greater than the CGh dimension, and the trail dimension (550) is 1.5".

7. The motor driven rideable golf cycle of claim 1, further including a running board (56) attached to the base segment (42) and having a top surface defining a running board height (56H) measured vertically above the ground plane, wherein the running board height (56H) is 35-65% of the rear tire outer diameter.

8. The motor driven rideable golf cycle of claim 1, wherein the CGh dimension is at least 2.75 times the minimum clearance (500).

9. The motor driven rideable golf cycle of claim 1, wherein the front tire crown radius is at least 30% of the front tire outer diameter, and the rear tire crown radius is at least 200% of the front tire crown radius.

10. The motor driven rideable golf cycle of claim 9, wherein the front tire crown radius is no more than 85% of the front tire outer diameter, and the front tire outer diameter is 30-50% of the wheelbase (510).

11. The motor driven rideable golf cycle of claim 1, wherein in the storage configuration the motor driven rideable golf cycle fits within an imaginary box having a box width, a box height, and a box length, wherein:

a girth is 130 inches or less, where the girth is defined as two times a sum of the box width and the box height; and a sum of the girth and the box length is 165 inches or less.

12. A motor driven rideable golf cycle for transporting a rider and a golf bag, comprising:

a front wheel (66) having a front wheel center, a front wheel axle (67), and a front tire having a front tire outer diameter, a front tire width, and a front tire crown radius;

a front fork (62) attached to the front wheel (66);

a steering bracket (34) to which the front fork (62) is rotationally engaged;

a steering column (35) engaging the front fork (62);

a handlebar (72) attached to the steering column (35) via a handlebar connector (63), and having a control unit;

a frame tube (32) connected to the steering bracket (34) and extending downward and rearward from the steering bracket (34) when in a riding configuration;

a rear wheel (86) having a rear wheel center, a rear wheel axle (88), an internal hub motor, and a rear tire having a rear tire outer diameter, a rear tire width, and a rear tire crown radius, and establishing a wheelbase (510) measured between the front wheel center and the rear wheel center, and a vertical wheel plane containing the front wheel center and the rear wheel center, oriented perpendicular to a ground plane, intersecting the steering bracket (34), and defining a first side and a second side of the vertical wheel plane;

a base segment (42) attached to the rear wheel (86) and extending toward the front wheel (66);

a pivoting connector assembly (200) attached to the base segment (42) and the frame tube (32), and capable of locking a relative position of the base segment (42) and the frame tube (32);

a seat support (53) extending from the base segment (42) and comprising an upper seat support (53U) extending from a lower seat support (53L);

a seat (52) attached to the upper seat support (53U);

a running board (56) attached to the base segment (42) and having a top surface defining a running board height (56H) measured vertically above the ground plane;

a rechargeable battery (102) attached to the frame tube (32) and in electrical communication with the internal hub motor and the control unit;

an upper bag cradle (98) attached to the motor driven rideable golf cycle such that it is not symmetrical about the vertical wheel plane;

a bag support base (97) attached to the motor driven rideable golf cycle such that it is not symmetrical about the vertical wheel plane;

wherein:

the pivoting connector assembly (200) facilitates the pivoting of the frame tube (32) toward the seat support (53) and into a storage configuration;

in the riding configuration the motor driven rideable golf cycle has a center of gravity (CG) located a CGy dimension behind the front axle (67), measured horizontally parallel to the ground plane, and located a CGh dimension above the ground plane, measured vertically perpendicular to the ground plane, and the CGy dimension is less than 45% of the wheelbase (510);

in the riding configuration the motor driven rideable golf cycle has a minimum clearance (500), and the CGh dimension is 2.75-5 times the minimum clearance (500);

the front tire outer diameter is at least 10% greater than the rear tire outer diameter, and the front tire outer diameter is no more than 160% of the rear tire outer diameter;

the front tire outer diameter is at least 85% of the CGh dimension, and the rear tire outer diameter is no more than the CGh dimension;

the rear tire width is at least 10% greater than the front tire width, and the rear tire width is no more than 160% of the front tire width;

the running board height (56H) is 35-65% of the rear tire outer diameter the rear tire crown radius is greater than the front tire crown radius; and the front tire contacts the ground plane directly below the front axle at a contact point (530), the steering bracket (34) defines a headset axis (520), which intersects the ground plane at an axis contact point (540), a horizontal distance from the contact point (530) and the axis contact point (540) is a trail dimension (550), and the trail dimension (550) is 1.0"-4.0".

13. The motor driven rideable golf cycle of claim 12, wherein the steering column (35) has a column axis (35A) and a column axis angle (35AA), the seat support (53) has a support axis (53A) and a support axis angle (53AA) of less than 90 degrees, and the support axis angle (53AA) is +15 degrees of the column axis angle (35AA).

14. The motor driven rideable golf cycle of claim 12, wherein the front tire outer diameter is at least 15% greater than the rear tire outer diameter, the rear tire outer diameter is no more than 90% of the CGh dimension, and the support axis angle (53AA) is at least 70 degrees.

15. The motor driven rideable golf cycle of claim 12, wherein the rear tire width is at least 15% greater than the front tire width, and the front tire outer diameter is at least 100% of the CGh dimension.

16. The motor driven rideable golf cycle of claim 12, wherein the CGy dimension is +25% of the CGh dimension, the CGy dimension is at least 24% of the wheelbase (510), the front tire crown radius is at least 30% of the front tire outer diameter, and the rear tire crown radius is at least 200% of the front tire crown radius.

17. The motor driven rideable golf cycle of claim 12, wherein the CGy dimension is at least 24% of the wheelbase (510), the CGy dimension is greater than the CGh dimension, and the trail dimension (550) is 1.5".

18. The motor driven rideable golf cycle of claim 12, further including a running board (56) attached to the base segment (42) and having a top surface defining a running board height (56H) measured vertically above the ground plane, wherein the running board height (56H) is 35-65% of the rear tire outer diameter.

19. The motor driven rideable golf cycle of claim 12, wherein in the storage configuration the motor driven rideable golf cycle fits within an imaginary box having a box width, a box height, and a box length, wherein:

a girth is 130 inches or less, where the girth is defined as two times a sum of the box width and the box height; and a sum of the girth and the box length is 165 inches or less.

20. A motor driven rideable golf cycle for transporting a rider and a golf bag, comprising:

a front wheel (66) having a front wheel center, a front wheel axle (67), and a front tire having a front tire outer diameter, a front tire width, and a front tire crown radius;

a front fork (62) attached to the front wheel (66);

a steering bracket (34) to which the front fork (62) is rotationally engaged;

a steering column (35) engaging the front fork (62);

a handlebar (72) attached to the steering column (35) via a handlebar connector (63), and having a control unit;

a frame tube (32) connected to the steering bracket (34) and extending downward and rearward from the steering bracket (34) when in a riding configuration;

a rear wheel (86) having a rear wheel center, a rear wheel axle (88), an internal hub motor, and a rear tire having a rear tire outer diameter, a rear tire width, and a rear tire crown radius, and establishing a wheelbase (510) measured between the front wheel center and the rear wheel center, and a vertical wheel plane containing the front wheel center and the rear wheel center, oriented perpendicular to a ground plane, intersecting the steering bracket (34), and defining a first side and a second side of the vertical wheel plane;

a base segment (42) attached to the rear wheel (86) and extending toward the front wheel (66);

a pivoting connector assembly (200) attached to the base segment (42) and the frame tube (32), and capable of locking a relative position of the base segment (42) and the frame tube (32);

a seat support (53) extending from the base segment (42) and comprising an upper seat support (53U) extending from a lower seat support (53L);

a seat (52) attached to the upper seat support (53U);

a running board (56) attached to the base segment (42) and having a top surface defining a running board height (56H) measured vertically above the ground plane;

a rechargeable battery (102) attached to the frame tube (32) and in electrical communication with the internal hub motor and the control unit;

an upper bag cradle (98) attached to the motor driven rideable golf cycle such that it is not symmetrical about the vertical wheel plane;

a bag support base (97) attached to the motor driven rideable golf cycle such that it is not symmetrical about the vertical wheel plane;

wherein:

the pivoting connector assembly (200) facilitates the pivoting of the frame tube (32) toward the seat support (53) and into a storage configuration;

in the riding configuration the motor driven rideable golf cycle has a center of gravity (CG) located a CGy dimension behind the front axle (67), measured horizontally parallel to the ground plane, and located a CGh dimension above the ground plane, measured vertically perpendicular to the ground plane, and the CGy dimension is less than 45% of the wheelbase (510);

in the riding configuration the motor driven rideable golf cycle has a minimum clearance (500), and the CGh dimension is 2.75-5 times the minimum clearance (500);

the front tire outer diameter is at least 10% greater than the rear tire outer diameter, and the front tire outer diameter is no more than 160% of the rear tire outer diameter;

the front tire outer diameter is at least 85% of the CGh dimension, and the rear tire outer diameter is no more than the CGh dimension;

the rear tire width is at least 10% greater than the front tire width, and the rear tire width is no more than 160% of the front tire width;

the running board height (56H) is 35-65% of the rear tire outer diameter the rear tire crown radius is greater than the front tire crown radius;

the front tire contacts the ground plane directly below the front axle at a contact point (530), the steering bracket (34) defines a headset axis (520), which intersects the ground plane at an axis contact point (540), a horizontal distance from the contact point (530) and the axis contact point (540) is a trail dimension (550), and the trail dimension (550) is 1.0"-4.0"; and in the storage configuration the motor driven rideable golf cycle fits within an imaginary box having a box width, a box height, and a box length, wherein:

a girth is 130 inches or less, where the girth is defined as two times a sum of the box width and the box height; and a sum of the girth and the box length is 165 inches or
less.

* * * * *